US012731555B2

(12) United States Patent
Saito

(10) Patent No.: US 12,731,555 B2

(45) Date of Patent: Sep. 8, 2026

(54) CONTROL DEVICE FOR ILLUMINATION DEVICE

(71) Applicant: Japan Display Inc., Tokyo (JP)

(72) Inventor: Hitoshi Saito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/317,881

(22) Filed: Sep. 3, 2025

(65) Prior Publication Data

US 2026/0004750 A1 Jan. 1, 2026

Related U.S. Application Data

(63) Continuation of application No. PCT/JP2024/000334, filed on Jan. 11, 2024.

(30) Foreign Application Priority Data

Mar. 7, 2023 (JP) ................................ 2023-034470

(51) Int. Cl.
*G09G 3/34* (2006.01)
*G06F 3/041* (2006.01)

(52) U.S. Cl.
CPC ....... *G09G 3/3413* (2013.01); *G06F 3/04166* (2019.05); *G09G 3/3426* (2013.01); *G09G 2320/0626* (2013.01); *G09G 2354/00* (2013.01)

(58) Field of Classification Search
CPC ...... G02F 1/133; G02F 1/1336; G02F 1/1347; G06F 3/041; G06F 3/04166; G06F 3/0484; G06F 3/0488; G09G 2320/0626; G09G 2354/00; G09G 3/3413; G09G 3/3426; H05B 45/00; H05B 47/105; H05B 47/165
See application file for complete search history.

(56) References Cited

U.S. PATENT DOCUMENTS

2004/0214414 A1* 10/2004 Matsumura ........ B23K 26/0608 438/488
2006/0215723 A1* 9/2006 Watanabe ............... H01S 5/162 372/103
2022/0148257 A1* 5/2022 Boubekeur ........... G06T 15/506

FOREIGN PATENT DOCUMENTS

JP H02-065001 A 3/1990

OTHER PUBLICATIONS

Search Report issued in related International Patent Application No. PCT/JP2024/000334, mailed on Feb. 13, 2024 and English translation of same. 5 pages.

* cited by examiner

*Primary Examiner* — Nan-Ying Yang
(74) *Attorney, Agent, or Firm* — K&L Gates LLP

(57) ABSTRACT

According to an aspect, a control device includes a touch sensor and a display panel configured to display an adjustment region for adjusting the diffusion degree of each illumination device. The control device is configured to: acquire a target diffusion degree corresponding to a touch detection position in the adjustment region; and execute coarse adjustment processing of adjusting the diffusion degree to be close to the target diffusion degree in steps of a first adjustment interval, matching processing of matching the diffusion degree to the target diffusion degree, and fine adjustment processing of adjusting the diffusion degree to be close to the target diffusion degree in steps of a second adjustment interval. The control device is configured to calculate a diffusion degree difference value and execute the coarse adjustment processing, the matching processing, or the fine adjustment processing depending on the diffusion degree difference value.

16 Claims, 57 Drawing Sheets

Figure 8A:
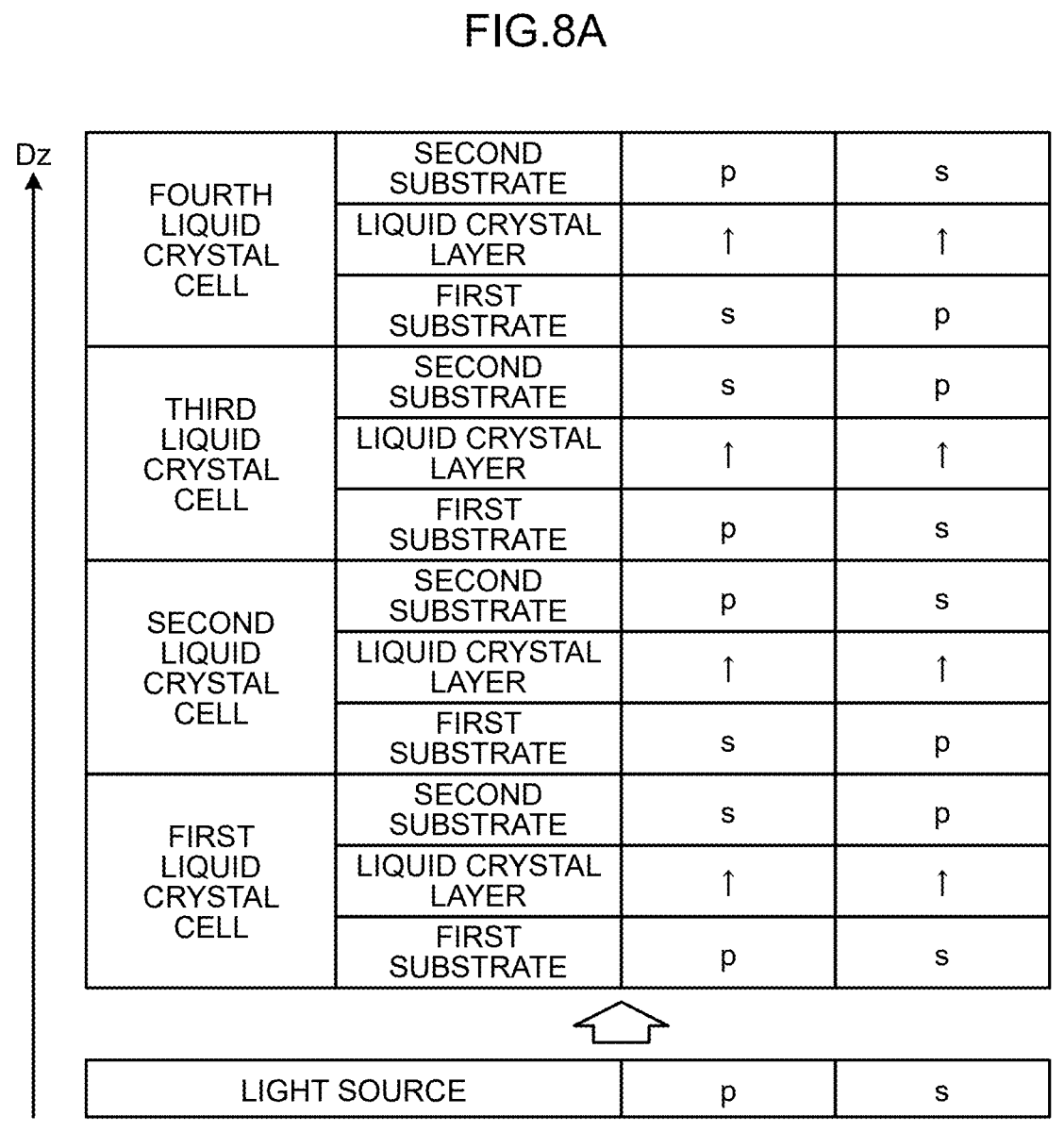

| | | | |
|---|---|---|---|
| FOURTH LIQUID CRYSTAL CELL | SECOND SUBSTRATE | p | s |
| | LIQUID CRYSTAL LAYER | ↑ | ↑ |
| | FIRST SUBSTRATE | s | p |
| THIRD LIQUID CRYSTAL CELL | SECOND SUBSTRATE | s | p |
| | LIQUID CRYSTAL LAYER | ↑ | ↑ |
| | FIRST SUBSTRATE | p | s |
| SECOND LIQUID CRYSTAL CELL | SECOND SUBSTRATE | p | s |
| | LIQUID CRYSTAL LAYER | ↑ | ↑ |
| | FIRST SUBSTRATE | s | p |
| FIRST LIQUID CRYSTAL CELL | SECOND SUBSTRATE | s | p |
| | LIQUID CRYSTAL LAYER | ↑ | ↑ |
| | FIRST SUBSTRATE | p | s |

⇧

| | | |
|---|---|---|
| LIGHT SOURCE | p | s |

Figure 8B:
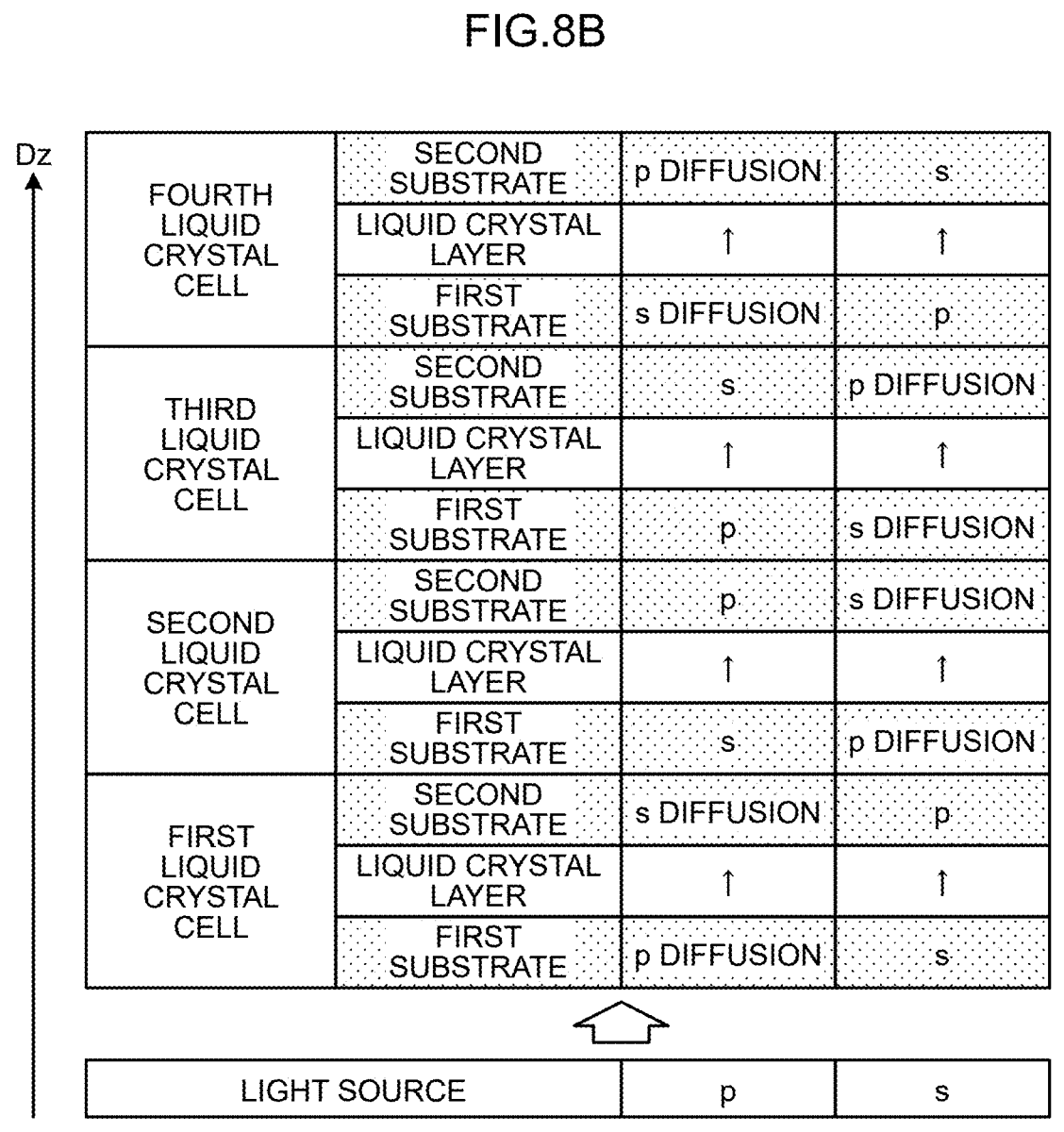

| | | | |
|---|---|---|---|
| FOURTH LIQUID CRYSTAL CELL | SECOND SUBSTRATE | p DIFFUSION | s |
| | LIQUID CRYSTAL LAYER | ↑ | ↑ |
| | FIRST SUBSTRATE | s DIFFUSION | p |
| THIRD LIQUID CRYSTAL CELL | SECOND SUBSTRATE | s | p DIFFUSION |
| | LIQUID CRYSTAL LAYER | ↑ | ↑ |
| | FIRST SUBSTRATE | p | s DIFFUSION |
| SECOND LIQUID CRYSTAL CELL | SECOND SUBSTRATE | p | s DIFFUSION |
| | LIQUID CRYSTAL LAYER | ↑ | ↑ |
| | FIRST SUBSTRATE | s | p DIFFUSION |
| FIRST LIQUID CRYSTAL CELL | SECOND SUBSTRATE | s DIFFUSION | p |
| | LIQUID CRYSTAL LAYER | ↑ | ↑ |
| | FIRST SUBSTRATE | p DIFFUSION | s |

⇧

| | | |
|---|---|---|
| LIGHT SOURCE | p | s |

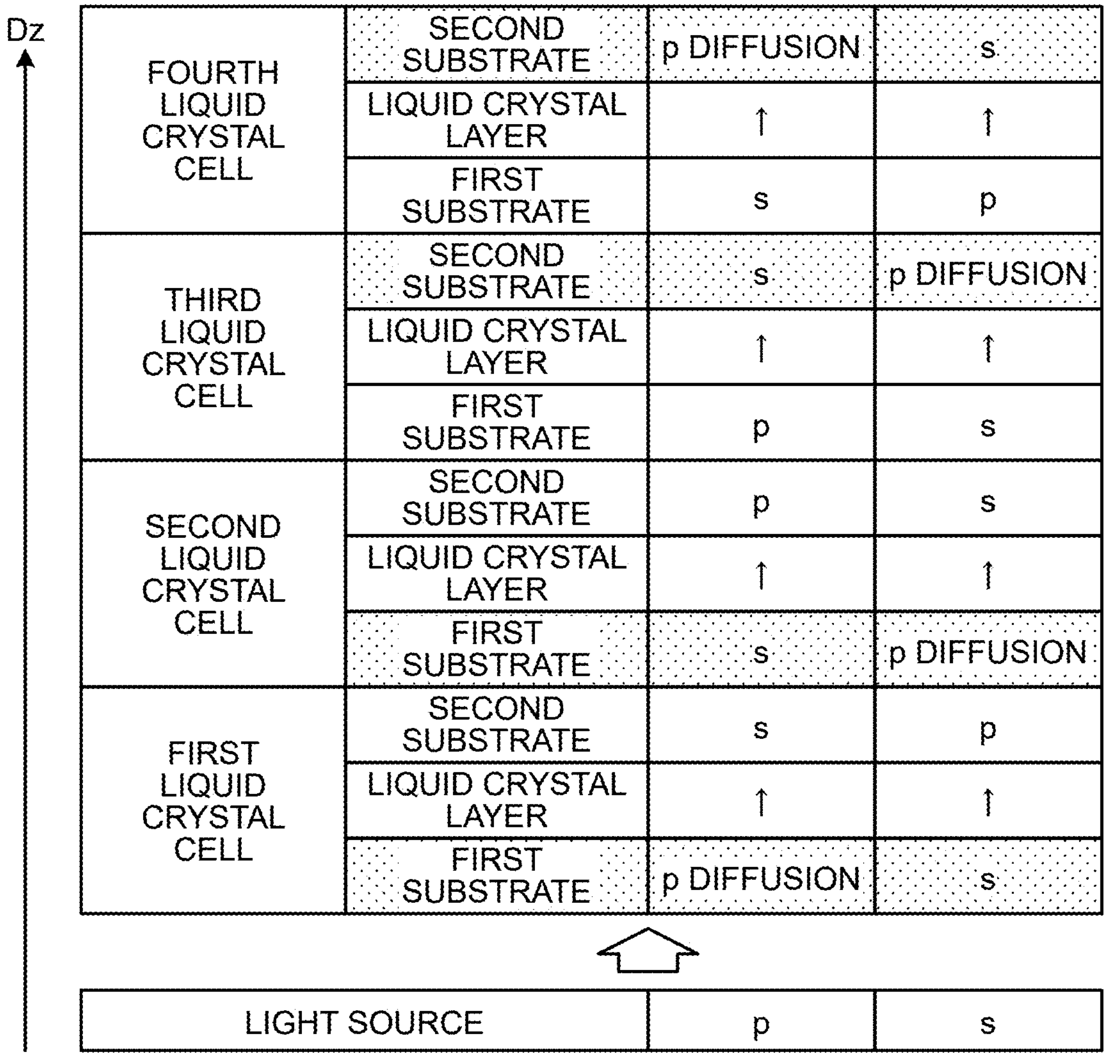

| FOURTH LIQUID CRYSTAL CELL | SECOND SUBSTRATE | p DIFFUSION | s |
|---|---|---|---|
| | LIQUID CRYSTAL LAYER | ↑ | ↑ |
| | FIRST SUBSTRATE | s | p |
| THIRD LIQUID CRYSTAL CELL | SECOND SUBSTRATE | s | p DIFFUSION |
| | LIQUID CRYSTAL LAYER | ↑ | ↑ |
| | FIRST SUBSTRATE | p | s |
| SECOND LIQUID CRYSTAL CELL | SECOND SUBSTRATE | p | s |
| | LIQUID CRYSTAL LAYER | ↑ | ↑ |
| | FIRST SUBSTRATE | s | p DIFFUSION |
| FIRST LIQUID CRYSTAL CELL | SECOND SUBSTRATE | s | p |
| | LIQUID CRYSTAL LAYER | ↑ | ↑ |
| | FIRST SUBSTRATE | p DIFFUSION | s |

⇧

| LIGHT SOURCE | p | s |
|---|---|---|

Figure 8D:
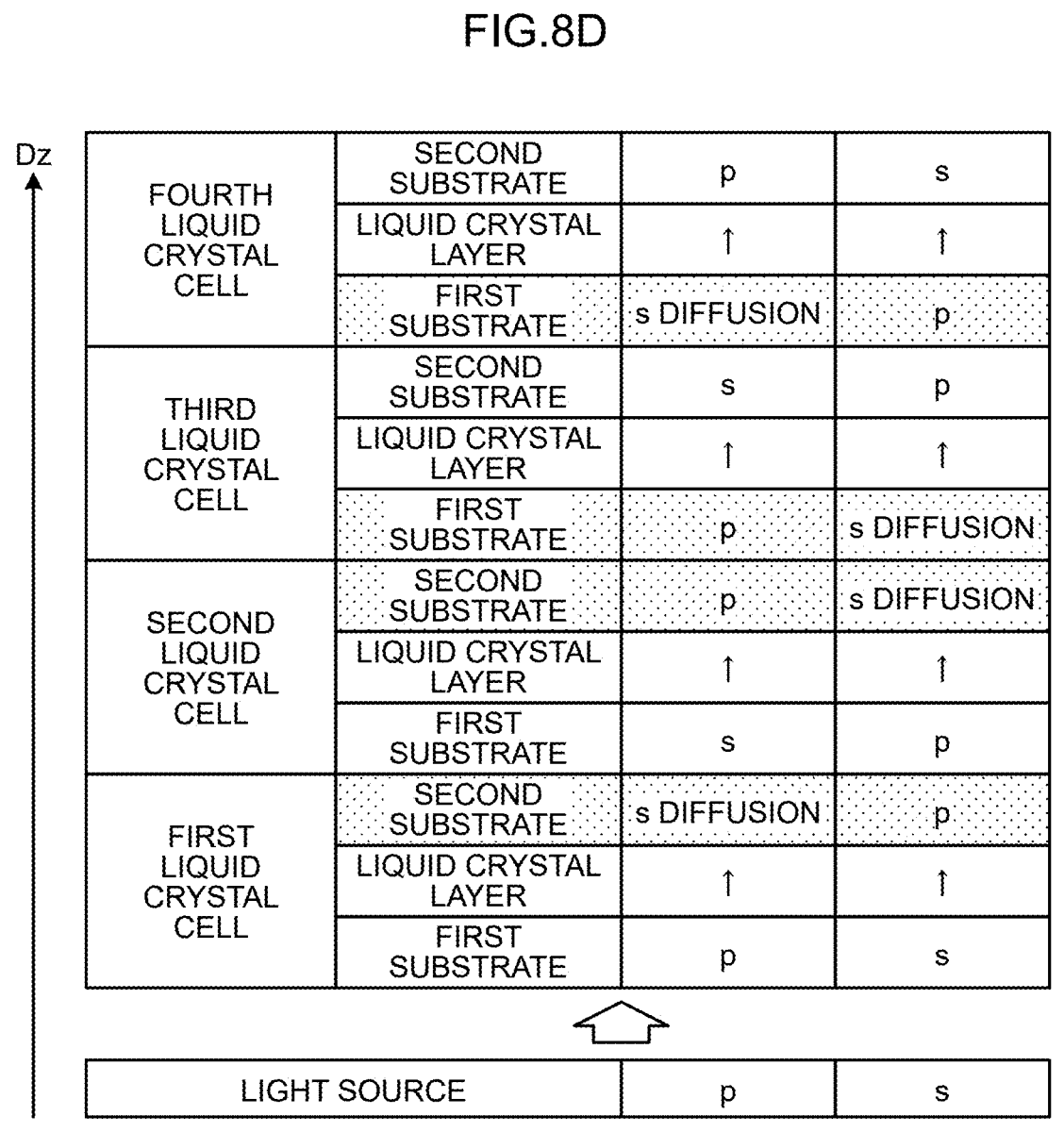

| | | | |
|---|---|---|---|
| FOURTH LIQUID CRYSTAL CELL | SECOND SUBSTRATE | p | s |
| | LIQUID CRYSTAL LAYER | ↑ | ↑ |
| | FIRST SUBSTRATE | s DIFFUSION | p |
| THIRD LIQUID CRYSTAL CELL | SECOND SUBSTRATE | s | p |
| | LIQUID CRYSTAL LAYER | ↑ | ↑ |
| | FIRST SUBSTRATE | p | s DIFFUSION |
| SECOND LIQUID CRYSTAL CELL | SECOND SUBSTRATE | p | s DIFFUSION |
| | LIQUID CRYSTAL LAYER | ↑ | ↑ |
| | FIRST SUBSTRATE | s | p |
| FIRST LIQUID CRYSTAL CELL | SECOND SUBSTRATE | s DIFFUSION | p |
| | LIQUID CRYSTAL LAYER | ↑ | ↑ |
| | FIRST SUBSTRATE | p | s |

⇧

| | | |
|---|---|---|
| LIGHT SOURCE | p | s |

| | DISPLAY VALUE | DETEC-TION VALUE | TARGET VALUE | DIFFERENCE VALUE | INITIAL VALUE |
|---|---|---|---|---|---|
| HORIZONTAL DIFFUSION DEGREE | Sx | - | Sx' | Δ Sx (=Sx'-Sx) | Sx_ini=50 [%] |
| VERTICAL DIFFUSION DEGREE | Sy | - | Sy' | Δ Sy (=Sy'-Sy) | Sy_ini=50 [%] |
| X-DIRECTION TOUCH POSITION | - | x'0 | - | - | |
| Y-DIRECTION TOUCH POSITION | - | y'0 | - | - | |
| X-DIRECTION POSITION | x0 | | | | |
| Y-DIRECTION POSITION | y0 | | | | |

| | SETTING VALUE [%] |
|---|---|
| HORIZONTAL DIFFUSION DEGREE COARSE ADJUSTMENT SCALE | LSCx (ex."20") |
| VERTICAL DIFFUSION DEGREE COARSE ADJUSTMENT SCALE | LSCy (ex."20") |
| HORIZONTAL DIFFUSION DEGREE FINE ADJUSTMENT SCALE | SSCx (ex."1") |
| VERTICAL DIFFUSION DEGREE FINE ADJUSTMENT SCALE | SSCy (ex."1") |

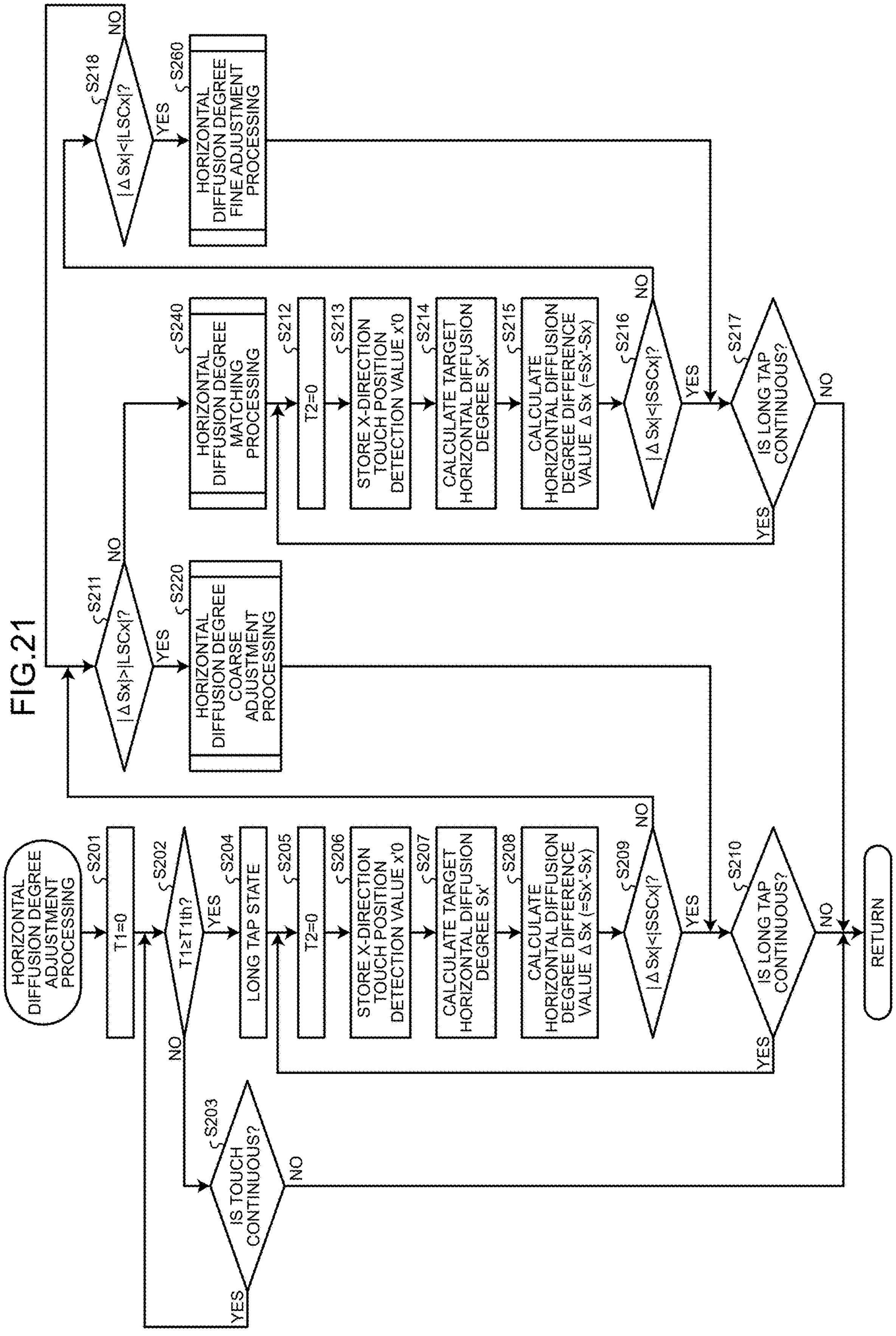

FIG.21
HORIZONTAL DIFFUSION DEGREE ADJUSTMENT PROCESSING
S201
T1=0
S202
T1≥T1th?
YES
NO
S203
IS TOUCH CONTINUOUS?
YES
NO
S204
LONG TAP STATE
S205
T2=0
S206
STORE X-DIRECTION TOUCH POSITION DETECTION VALUE x'0
S207
CALCULATE TARGET HORIZONTAL DIFFUSION DEGREE Sx'
S208
CALCULATE HORIZONTAL DIFFUSION DEGREE DIFFERENCE VALUE ΔSx (=Sx'-Sx)
S209
|ΔSx|<|SSCx|?
YES
NO
S210
IS LONG TAP CONTINUOUS?
YES
NO
RETURN
S211
|ΔSx|>|LSCx|?
YES
NO
S220
HORIZONTAL DIFFUSION DEGREE COARSE ADJUSTMENT PROCESSING
S240
HORIZONTAL DIFFUSION DEGREE MATCHING PROCESSING
S212
T2=0
S213
STORE X-DIRECTION TOUCH POSITION DETECTION VALUE x'0
S214
CALCULATE TARGET HORIZONTAL DIFFUSION DEGREE Sx'
S215
CALCULATE HORIZONTAL DIFFUSION DEGREE DIFFERENCE VALUE ΔSx (=Sx'-Sx)
S216
|ΔSx|<|SSCx|?
YES
NO
S217
IS LONG TAP CONTINUOUS?
YES
NO
S218
|ΔSx|<|LSCx|?
YES
NO
S260
HORIZONTAL DIFFUSION DEGREE FINE ADJUSTMENT PROCESSING

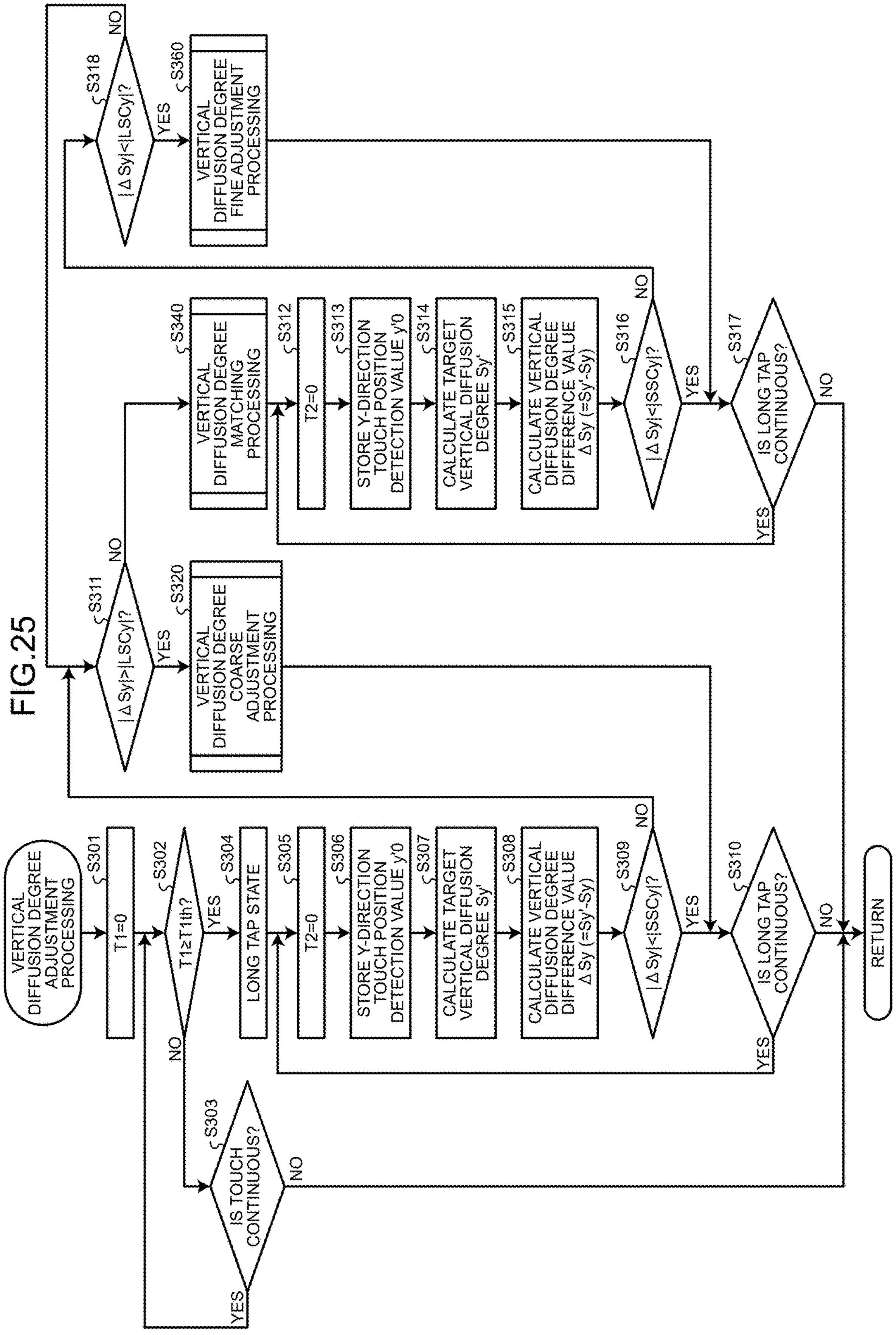

FIG.25
VERTICAL DIFFUSION DEGREE ADJUSTMENT PROCESSING
S301
T1=0
S302
T1≥T1th?
YES
NO
S303
IS TOUCH CONTINUOUS?
YES
NO
S304
LONG TAP STATE
S305
T2=0
S306
STORE Y-DIRECTION TOUCH POSITION DETECTION VALUE y'0
S307
CALCULATE TARGET VERTICAL DIFFUSION DEGREE Sy'
S308
CALCULATE VERTICAL DIFFUSION DEGREE DIFFERENCE VALUE ΔSy (=Sy'-Sy)
S309
|ΔSy|<|SSCy|?
YES
NO
S310
IS LONG TAP CONTINUOUS?
YES
NO
RETURN
S311
|ΔSy|>|LSCy|?
YES
NO
S320
VERTICAL DIFFUSION DEGREE COARSE ADJUSTMENT PROCESSING
S340
VERTICAL DIFFUSION DEGREE MATCHING PROCESSING
S312
T2=0
S313
STORE Y-DIRECTION TOUCH POSITION DETECTION VALUE y'0
S314
CALCULATE TARGET VERTICAL DIFFUSION DEGREE Sy'
S315
CALCULATE VERTICAL DIFFUSION DEGREE DIFFERENCE VALUE ΔSy (=Sy'-Sy)
S316
|ΔSy|<|SSCy|?
YES
NO
S317
IS LONG TAP CONTINUOUS?
YES
NO
S318
|ΔSy|<|LSCy|?
YES
NO
S360
VERTICAL DIFFUSION DEGREE FINE ADJUSTMENT PROCESSING

| | DISPLAY VALUE | DETECTION VALUE | TARGET VALUE | DIFFERENCE VALUE | INITIAL VALUE |
|---|---|---|---|---|---|
| DIFFUSION DEGREE | S | - | S' | ΔS (=S'-S) | S_ini=50 [%] |
| TOUCH POSITION | - | d'0 | - | - | |
| VIRTUAL POSITION | d0 | | | | |

| | SETTING VALUE [%] |
|---|---|
| DIFFUSION DEGREE COARSE ADJUSTMENT SCALE | LSC (ex."20") |
| DIFFUSION DEGREE FINE ADJUSTMENT SCALE | SSC (ex."1") |

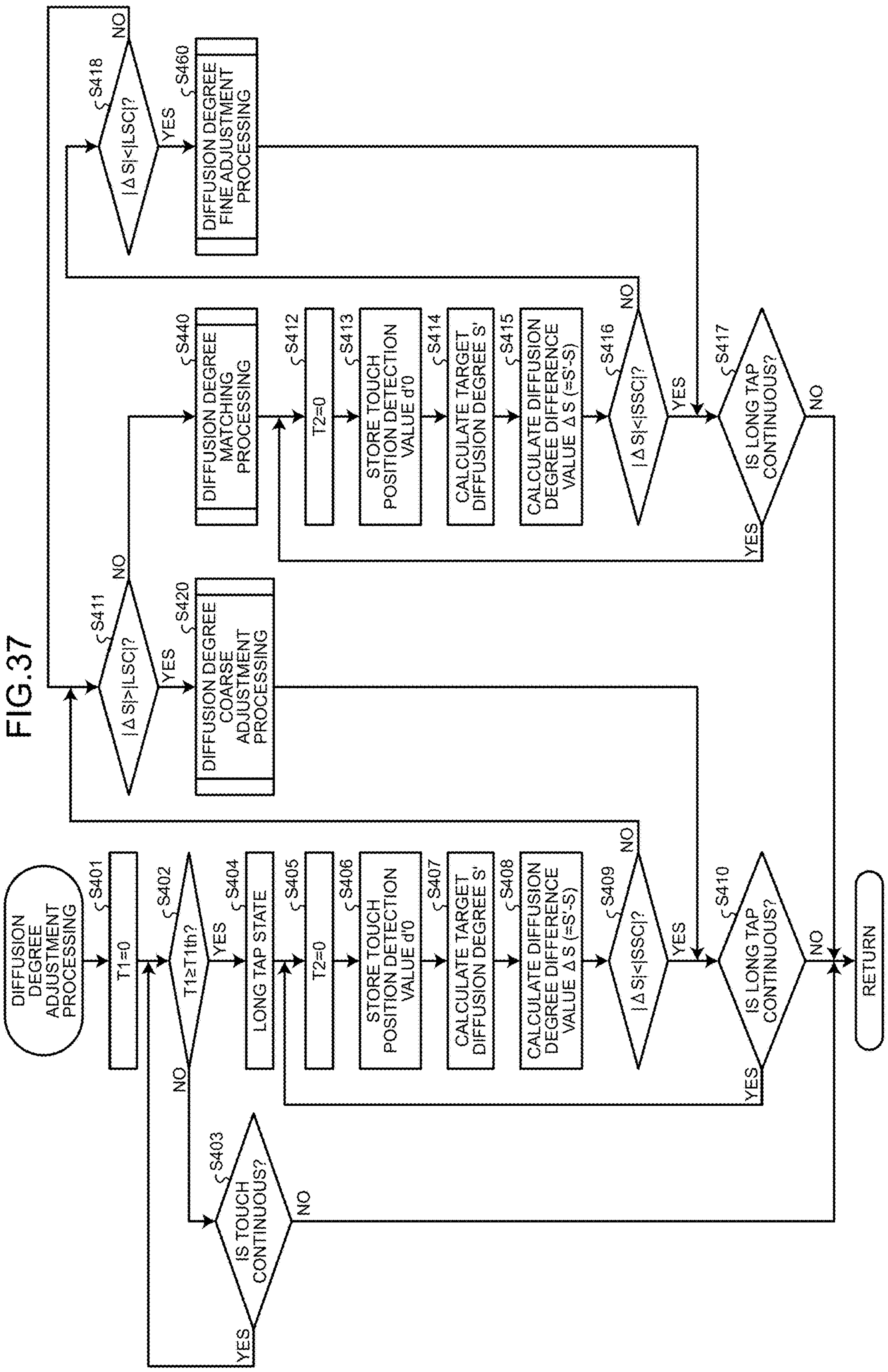

FIG.37
DIFFUSION DEGREE ADJUSTMENT PROCESSING
S401
T1=0
S402
T1≥T1th?
NO
YES
S403
IS TOUCH CONTINUOUS?
YES
NO
S404
LONG TAP STATE
S405
T2=0
S406
STORE TOUCH POSITION DETECTION VALUE d'0
S407
CALCULATE TARGET DIFFUSION DEGREE S'
S408
CALCULATE DIFFUSION DEGREE DIFFERENCE VALUE Δ S (=S'-S)
S409
|Δ S|<|SSC|?
NO
YES
S410
IS LONG TAP CONTINUOUS?
YES
NO
RETURN
S411
|Δ S|>|LSC|?
NO
YES
S420
DIFFUSION DEGREE COARSE ADJUSTMENT PROCESSING
S440
DIFFUSION DEGREE MATCHING PROCESSING
S412
T2=0
S413
STORE TOUCH POSITION DETECTION VALUE d'0
S414
CALCULATE TARGET DIFFUSION DEGREE S'
S415
CALCULATE DIFFUSION DEGREE DIFFERENCE VALUE Δ S (=S'-S)
S416
|Δ S|<|SSC|?
NO
YES
S417
IS LONG TAP CONTINUOUS?
YES
NO
S418
|Δ S|<|LSC|?
NO
YES
S460
DIFFUSION DEGREE FINE ADJUSTMENT PROCESSING

CONTROL DEVICE FOR ILLUMINATION DEVICE

CROSS-REFERENCE TO RELATED APPLICATION

This application claims the benefit of priority from Japanese Patent Application No. 2023-034470 filed on Mar. 7, 2023 and International Patent Application No. PCT/JP2024/000334 filed on Jan. 11, 2024, the entire contents of which are incorporated herein by reference.

BACKGROUND

1. Technical Field

What is disclosed herein relates to a control device for an illumination device.

2. Description of the Related Art

In a conventional illumination instrument, a light source such as an LED is combined with a thin lens provided with a prism pattern, and the distance between the light source and the thin lens is changed to change a light distribution angle. For example, an illumination instrument is disclosed (refer to Japanese Patent Application Laid-open Publication No. H02-065001, for example) in which the front of a transparent light bulb is covered by a liquid crystal light adjustment element, and the transmittance of a liquid crystal layer is changed to switch between directly-reaching light and scattering light.

For example, in an illumination device including a liquid crystal cell for p-wave polarization and a liquid crystal cell for s-wave polarization, the diffusion degree of light in two directions can be controlled by driving the respective liquid crystal cells. In such an illumination device capable of controlling the diffusion degree of light, fine adjustment may be difficult due to fluctuations in a touch detection position, for example, with a conventional adjustment method by detecting a touch position on the screen of a smartphone, a tablet, or the like and adjusting the diffusion degree. Thus, a control device capable of easier fine adjustment of the diffusion degree is desired.

For the foregoing reasons, there is a need for a control device for an illumination device capable of easy fine adjustment of the diffusion degree.

SUMMARY

According to an aspect, a control device for an illumination device is configured to control a plurality of illumination devices each capable of setting a light distribution shape of light emitted onto a virtual plane in two directions of a first direction and a second direction intersecting the first direction, by adjusting a diffusion degree of light emitted from a light source. The control device includes: a touch sensor having a detection region provided with a plurality of detection elements; and a display panel provided with a display region that overlaps the detection region of the touch sensor in plan view and configured to display, in the display region, an adjustment screen provided with an adjustment region for adjusting the diffusion degree of each illumination device. The control device is configured to: acquire a target diffusion degree corresponding to a touch detection position in the adjustment region; and execute coarse adjustment processing of adjusting the diffusion degree of the illumination device to be close to the target diffusion degree in steps of a first adjustment interval, matching processing of matching the diffusion degree of the illumination device to the target diffusion degree, and fine adjustment processing of adjusting the diffusion degree of the illumination device to be close to the target diffusion degree in steps of a second adjustment interval smaller than the first adjustment interval. The control device is configured to: execute processing of calculating a diffusion degree difference value that is a difference between the target diffusion degree and a diffusion degree display value corresponding to a position on the display panel corresponding to the current diffusion degree of the illumination device; and execute any of the coarse adjustment processing, the matching processing, and the fine adjustment processing depending on the diffusion degree difference value.

BRIEF DESCRIPTION OF THE DRAWINGS

FIG. 8A is a conceptual diagram for description of change in shape of light by the optical element according to the embodiment;

FIG. 8B is a conceptual diagram for description of change in shape of light by the optical element according to the embodiment;

FIG. 8C is a conceptual diagram for description of change in shape of light by the optical element according to the embodiment;

FIG. 8D is a conceptual diagram for description of change in shape of light by the optical element according to the embodiment;

FIG. 17 is a conceptual diagram illustrating an example of a first storage region of a storage circuit in a control device for an illumination device according to the first embodiment;

FIG. 18 is a conceptual diagram illustrating an example of a second storage region of the storage circuit in the control device for an illumination device according to the first embodiment;

FIG. 21 is a flowchart illustrating an example of horizontal diffusion degree adjustment processing by the control device for an illumination device according to the first embodiment;

FIG. 25 is a flowchart illustrating an example of vertical diffusion degree adjustment processing by the control device for an illumination device according to the first embodiment;

FIG. 33 is a conceptual diagram illustrating an example of a first storage region of a storage circuit in a control device for an illumination device according to the second embodiment;

FIG. 34 is a conceptual diagram illustrating an example of a second storage region of the storage circuit in the control device for an illumination device according to the second embodiment;

FIG. 37 is a flowchart illustrating an example of diffusion degree adjustment processing by the control device for an illumination device according to the second embodiment;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1A:
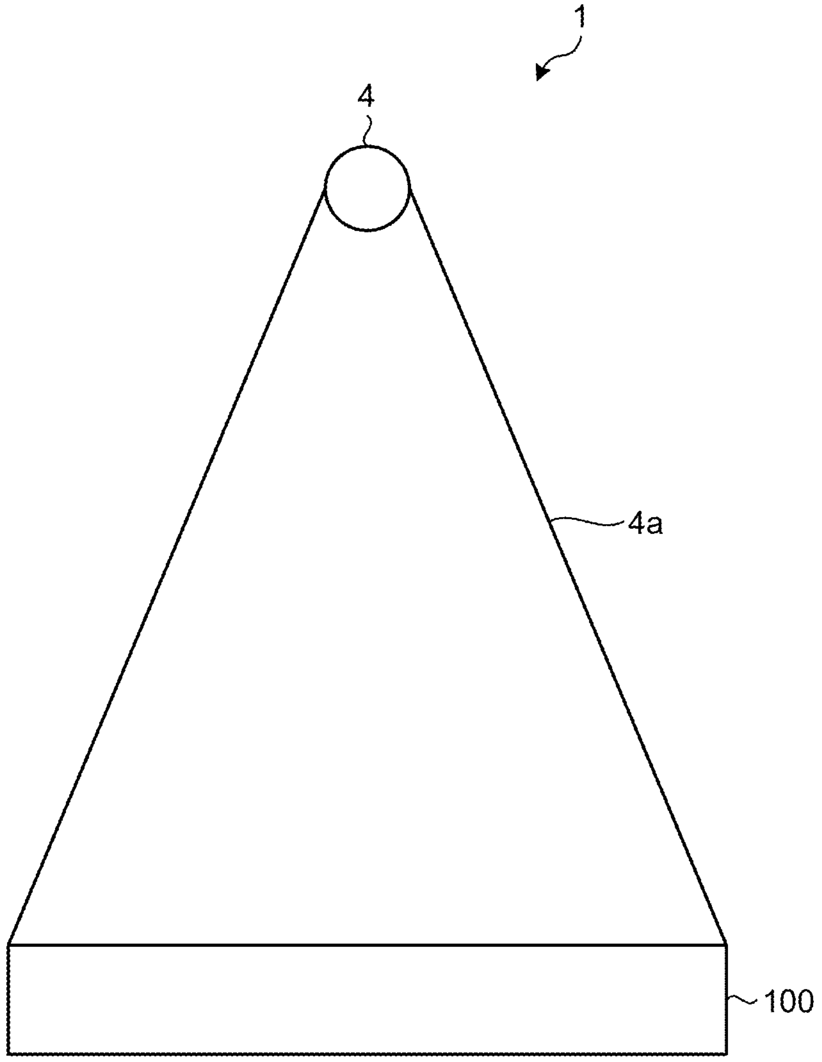
FIG. 1A is a side view illustrating an example of an illumination device according to an embodiment.
Figure 1B:
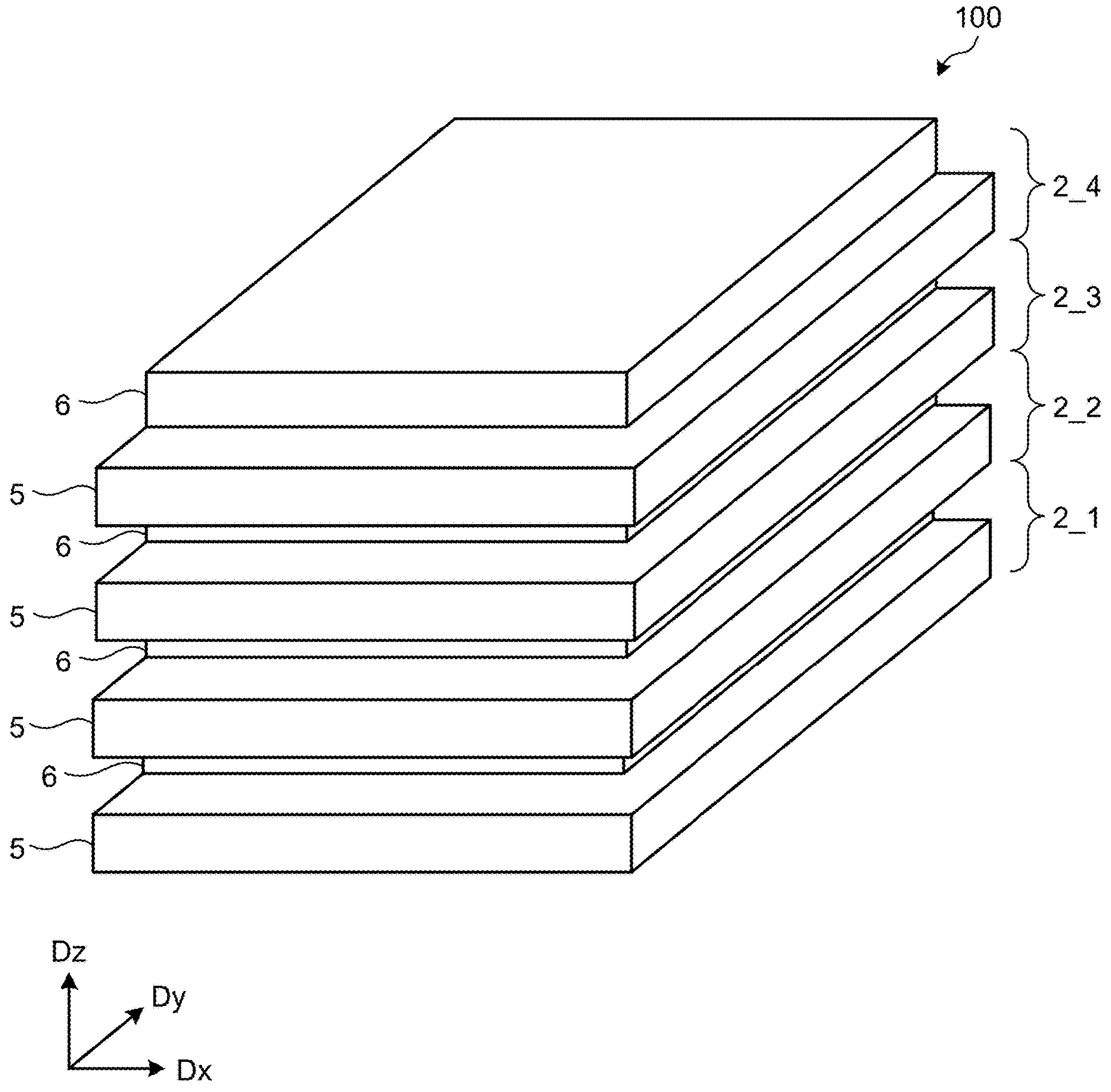
FIG. 1B is a perspective view illustrating an example of an optical element according to the embodiment.

FIG. 1A is a side view illustrating an example of an illumination device 1 according to an embodiment. FIG. 1B is a perspective view illustrating an example of an optical element 100 according to the embodiment. As illustrated in FIG. 1A, the illumination device 1 includes a light source 4, a reflector 4*a*, and the optical element 100. As illustrated in FIG. 1B, the optical element 100 includes a first liquid crystal cell 2_1, a second liquid crystal cell 2_2, a third liquid crystal cell 2_3, and a fourth liquid crystal cell 2_4. The light source 4 is configured with, for example, a light emitting diode (LED). The reflector 4*a* is a component that condenses light from the light source 4 to the optical element 100.

In FIG. 1B, a Dz direction indicates the emission direction of light from the light source 4 and the reflector 4*a*. The optical element 100 has a configuration in which the first liquid crystal cell 2_1, the second liquid crystal cell 2_2, the third liquid crystal cell 2_3, and the fourth liquid crystal cell 2_4 are stacked in the Dz direction. In the present disclosure, the optical element 100 has a configuration in which the first liquid crystal cell 2_1, the second liquid crystal cell 2_2, the third liquid crystal cell 2_3, and the fourth liquid crystal cell 2_4 are sequentially stacked from the light source 4 side (lower side in FIG. 1B). In FIG. 1B, one direction in a plane orthogonal to the Dz direction and parallel to stacking surfaces of the first liquid crystal cell 2_1, the second liquid crystal cell 2_2, the third liquid crystal cell 2_3, and the fourth liquid crystal cell 2_4 is defined as a Dx direction (first direction), and a direction orthogonal to both the Dx direction and the Dz direction is defined as a Dy direction (second direction).

The first liquid crystal cell 2_1, the second liquid crystal cell 2_2, the third liquid crystal cell 2_3, and the fourth liquid crystal cell 2_4 have the same configuration. In the present disclosure, the first liquid crystal cell 2_1 and the fourth liquid crystal cell 2_4 are liquid crystal cells for p-wave polarization. The second liquid crystal cell 2_2 and the third liquid crystal cell 2_3 are liquid crystal cells for s-wave polarization. Hereinafter, the first liquid crystal cell 2_1, the second liquid crystal cell 2_2, the third liquid crystal cell 2_3, and the fourth liquid crystal cell 2_4 are also collectively referred to as "liquid crystal cells 2".

Figure 2:
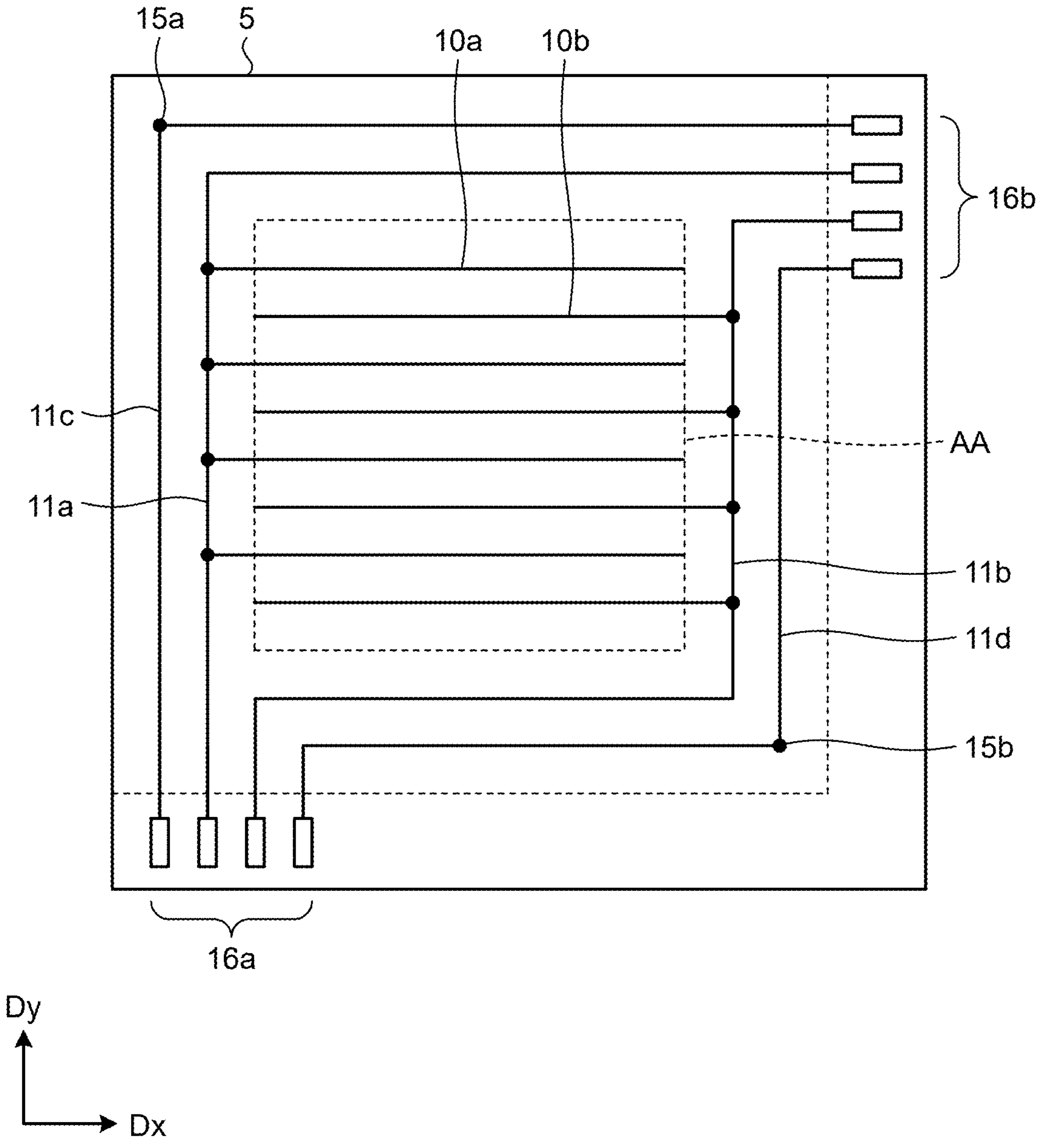
FIG. 2 is a schematic plan view of a first substrate when viewed in a Dz direction.
Figure 3:
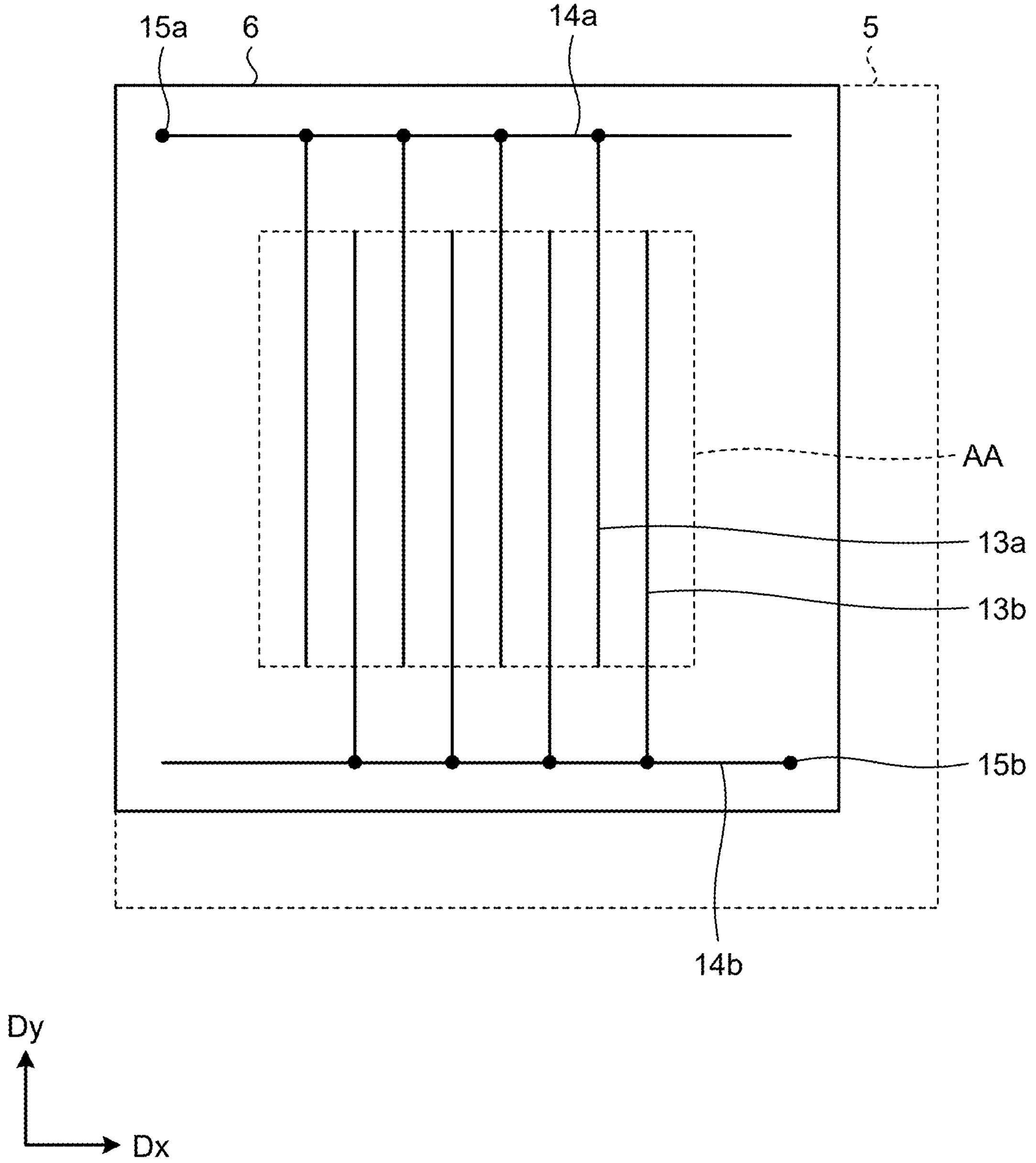
FIG. 3 is a schematic plan view of a second substrate when viewed in the Dz direction.
Figure 4:
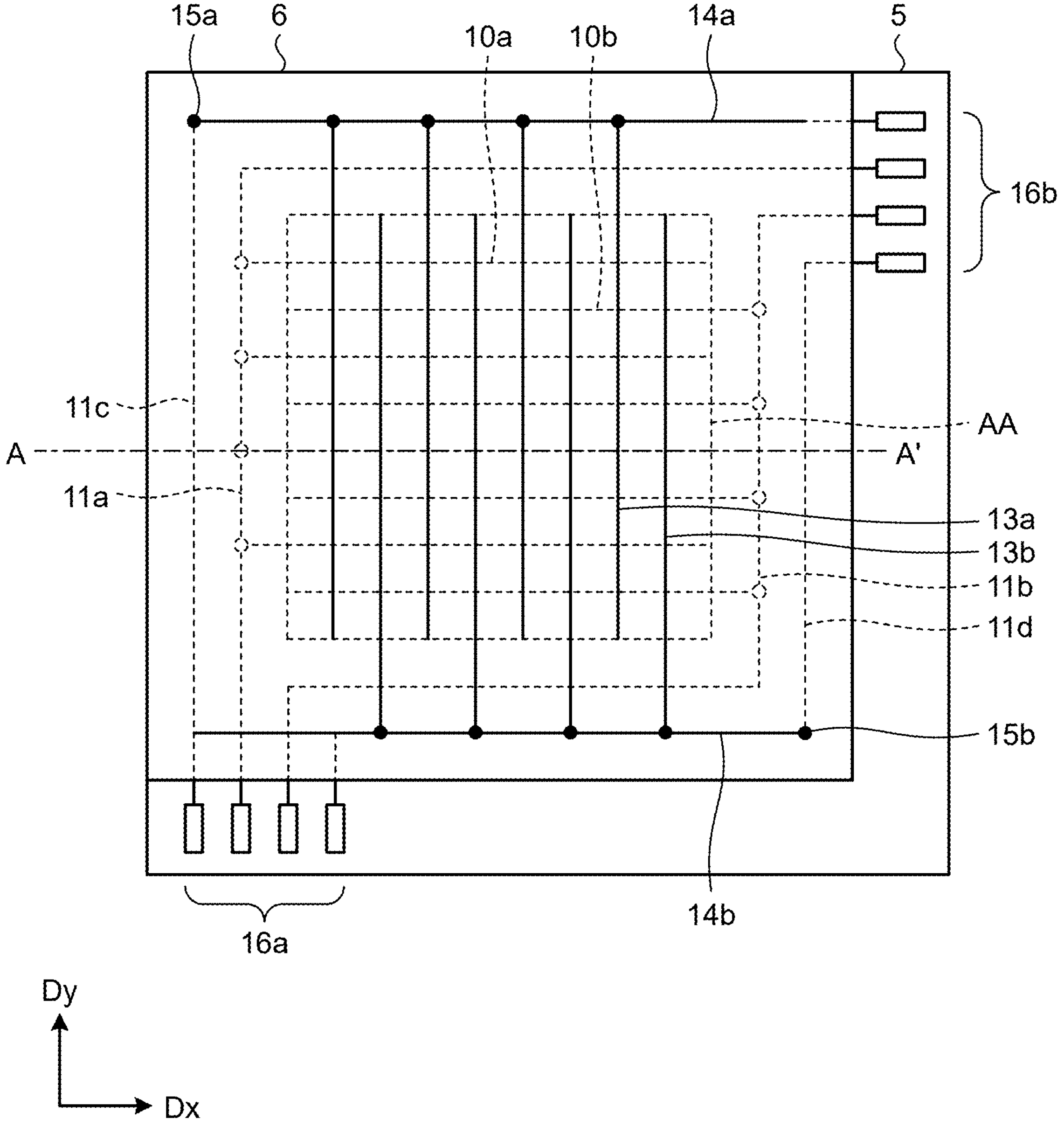
FIG. 4 is a see-through diagram of a liquid crystal cell in which the first substrate and the second substrate are stacked in the Dz direction.
Figure 5:
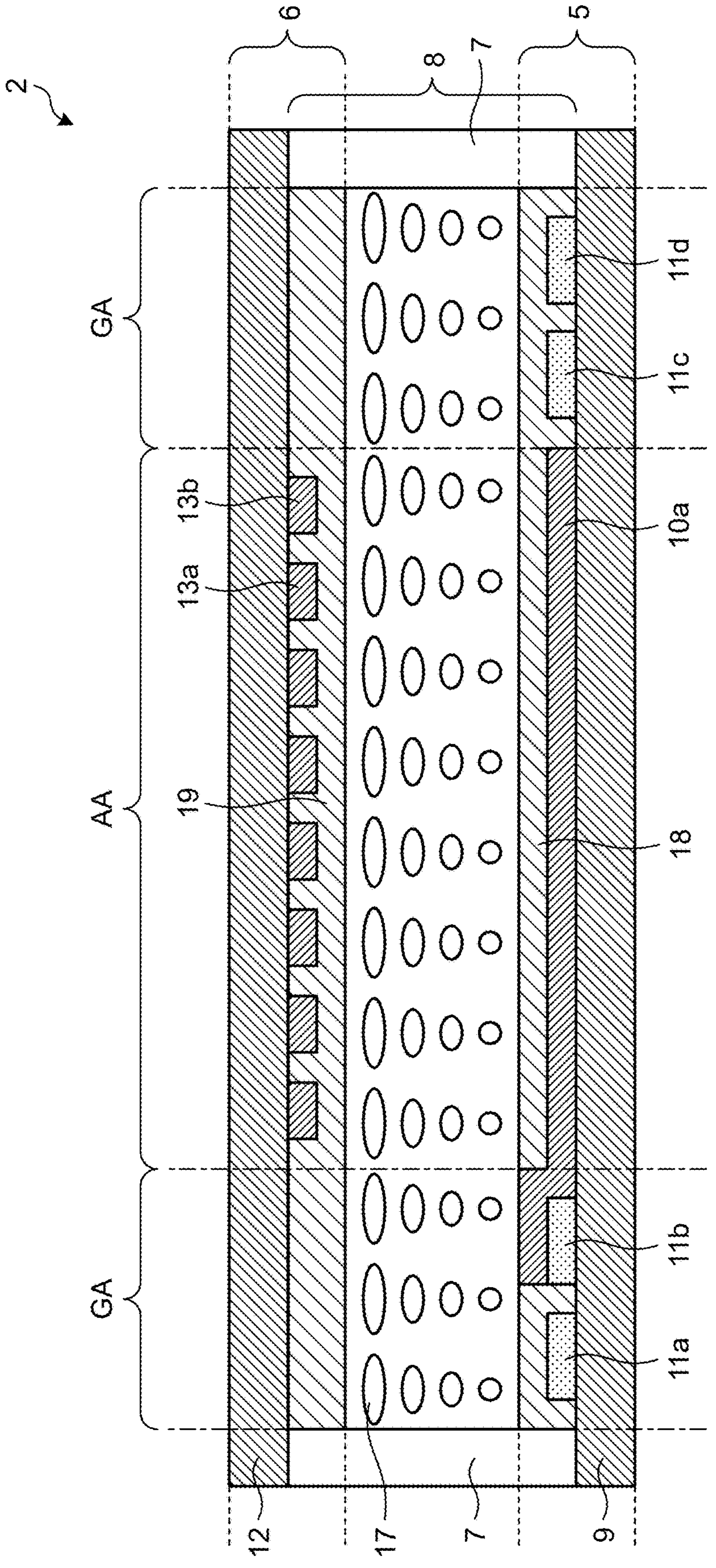
FIG. 5 is a cross-sectional view along line A-A' illustrated in FIG. 4.

Each liquid crystal cell 2 includes a first substrate 5 and a second substrate 6. FIG. 2 is a schematic plan view of the first substrate 5 when viewed in the Dz direction. FIG. 3 is a schematic plan view of the second substrate 6 when viewed in the Dz direction. In FIG. 3, drive electrodes are visible through the substrates, but for clarity, the drive electrodes and wiring lines are illustrated with solid lines. FIG. 4 is a see-through view of a liquid crystal cell in which the first substrate 5 and the second substrate 6 are stacked in the Dz direction. In FIG. 4 as well, for clarity, the drive electrodes and wiring lines on the second substrate side are illustrated with solid lines, and the drive electrodes and wiring lines on the first substrate side are illustrated with dotted lines. FIG. 5 is a sectional view along line A-A' illustrated in FIG. 4. FIGS. 2, 3, 4, and 5 exemplarily illustrate the third liquid crystal cell 2_3 and the fourth liquid crystal cell 2_4 in which drive electrodes 10*a* and 10*b* of the first substrate 5 extend in the Dx direction and drive electrodes 13*a* and 13*b* of the second substrate 6 extend in the Dy direction.

As illustrated in FIG. 5, the liquid crystal cell 2 includes a liquid crystal layer 8 sealed around its periphery by a sealing member 7 between the first substrate 5 and the second substrate 6.

The liquid crystal layer 8 modulates light passing through the liquid crystal layer 8 in accordance with the state of electric field. As liquid crystal molecules, positive-type nematic liquid crystals are used, but other liquid crystals with the same effects may be used.

Figure 7:
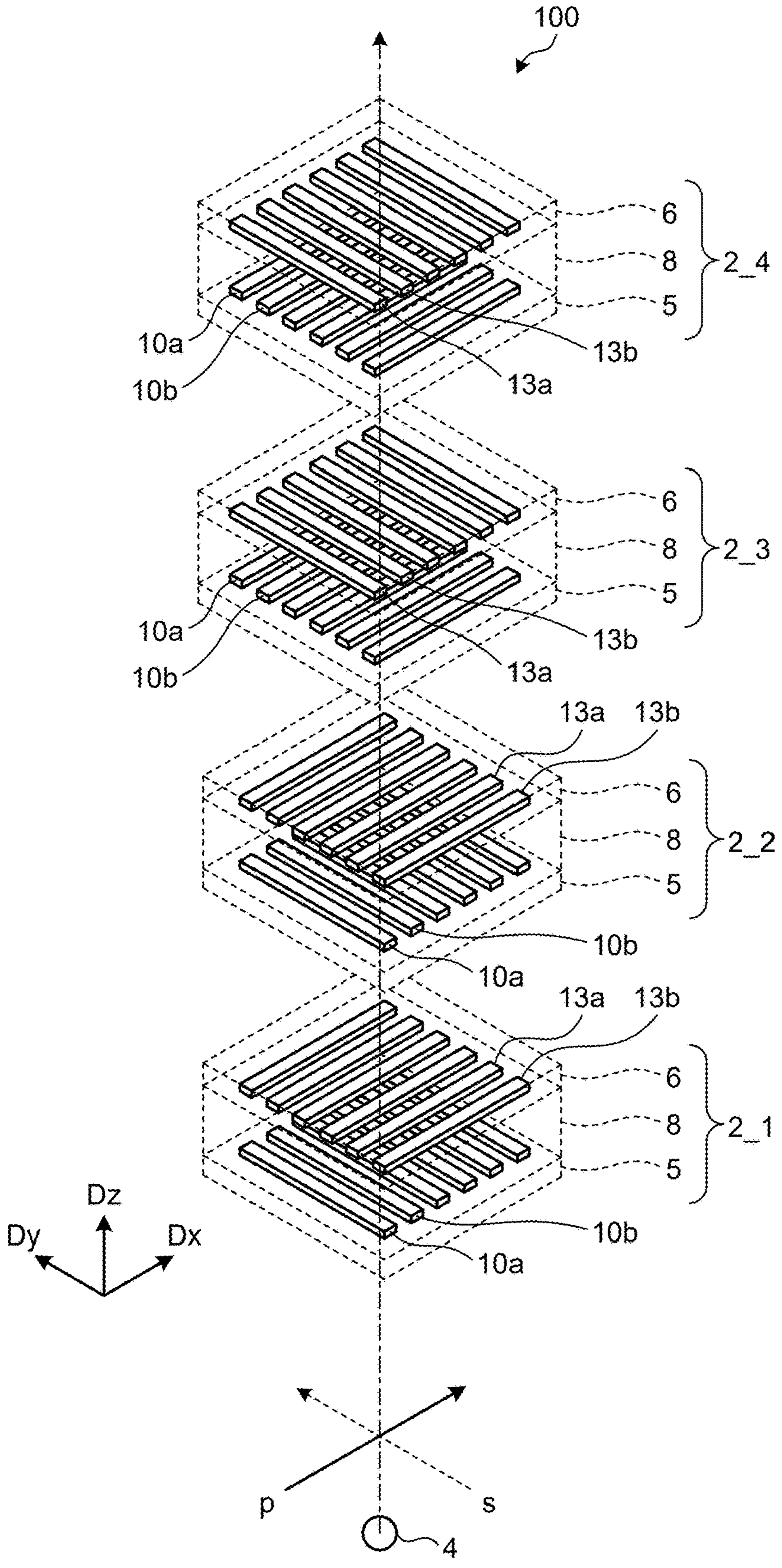
FIG. 7 is a multilayered structure diagram of the optical element according to the embodiment.

As illustrated in FIG. 2, the drive electrodes 10*a* and 10*b*, metal lines 11*a* and 11*b*, and metal lines 11*c* and 11*d* are provided on the liquid crystal layer 8 side of a base member 9 of the first substrate 5. The metal lines 11*a* and 11*b* supply drive voltage that is applied to the drive electrodes 10*a* and 10*b*, and the metal lines 11*c* and 11*d* supply drive voltage that is applied to the drive electrodes 13*a* and 13*b* (refer to FIG. 3) provided on the second substrate 6 to be described later. The metal lines 11*a*, 11*b*, 11*c*, and 11*d* are provided in a wiring layer of the first substrate 5. The metal lines 11*a*, 11*b*, 11*c*, and 11*d* are provided to be spaced apart in the wiring layer on the first substrate 5. Hereinafter, the drive electrodes 10*a* and 10*b* are simply referred to as "drive electrodes 10" in some cases. The metal lines 11*a*, 11*b*, 11*c*, and 11*d* are referred to as "first metal lines 11" in some cases. As illustrated in FIGS. 2 and 7, in the third liquid crystal cell 2_3 and the fourth liquid crystal cell 2_4, the drive electrodes 10 on the first substrate 5 extend in the Dx direction. In the first liquid crystal cell 2_1 and the second liquid crystal cell 2_2, the drive electrodes 10 on the first substrate 5 extend in the Dy direction.

As illustrated in FIG. 3, the drive electrodes 13*a* and 13*b*, and a plurality of metal lines 14*a* and 14*b* that supply drive voltage applied to the drive electrodes 13 are provided on the liquid crystal layer 8 side of a base member 12 of the second substrate 6 illustrated in FIG. 5. The metal lines 14*a* and 14*b* are provided in a wiring layer of the second substrate 6. The metal lines 14*a* and 14*b* are provided to be spaced apart in the wiring layer on the second substrate 6. Hereinafter, the drive electrodes 13*a* and 13*b* are simply referred to as "drive electrodes 13" in some cases. The metal lines 14*a* and 14*b* are referred to as "second metal lines 14" in some cases. As illustrated in FIGS. 3 and 7, in the third liquid crystal cell 2_3 and the fourth liquid crystal cell 2_4, the drive electrodes 13 on the second substrate 6 extend in the Dy direction. In the first liquid crystal cell 2_1 and the second liquid crystal cell 2_2, the drive electrodes 13 on the second substrate 6 extend in the Dx direction.

The drive electrodes 10 and the drive electrodes 13 are light-transmitting electrodes formed of a light-transmitting conductive material (light-transmitting conductive oxide) such as indium tin oxide (ITO). The first substrate 5 and the second substrate 6 are light-transmitting substrates such as glass or resin. The first metal lines 11 and the second metal lines 14 are formed of at least one metallic material selected from aluminum (Al), copper (Cu), silver (Ag), molybdenum (Mo), and alloys thereof. The first metal lines 11 and the second metal lines 14 may be stacked bodies of a plurality of layers using one or more of these metallic materials. At least one metallic material selected from aluminum (Al), copper (Cu), silver (Ag), molybdenum (Mo), and alloys thereof has lower resistance than light-transmitting conductive oxide such as ITO.

The metal line 11*c* of the first substrate 5 and the metal line 14*a* of the second substrate 6 are coupled by a conduction part 15*a* made of, for example, conductive paste. The metal line 11*d* of the first substrate 5 and the metal line 14*b* of the second substrate 6 are coupled by a conduction part 15*b* made of, for example, conductive paste.

Coupling (flex-on-board) terminal parts 16*a* and 16*b* that are coupled to non-illustrated flexible printed circuits (FPC) are provided in regions on the first substrate 5, which do not overlap the second substrate 6 when viewed in the Dz direction. The coupling terminal parts 16*a* and 16*b* each include four coupling terminals corresponding to the metal lines 11*a*, 11*b*, 11*c*, and 11*d*, respectively.

The coupling terminal parts 16*a* and 16*b* are provided in the wiring layer of the first substrate 5. Drive voltage to be applied to the drive electrodes 10*a* and 10*b* on the first substrate 5 and the drive electrodes 13*a* and 13*b* on the second substrate 6 is supplied to the liquid crystal cell 2 from an FPC coupled to the coupling terminal part 16*a* or the coupling terminal part 16*b*. Hereinafter, the coupling terminal parts 16*a* and 16*b* are simply referred to as "coupling terminal parts 16" in some cases.

As illustrated in FIG. 4, in the liquid crystal cell 2, the first substrate 5 and the second substrate 6 are stacked in the Dz direction (irradiation direction of light), and the drive electrodes 10 on the first substrate 5 intersect the drive electrodes 13 on the second substrate 6 when viewed in the Dz direction. In the liquid crystal cell 2 thus configured, the alignment direction of liquid crystal molecules 17 in the liquid crystal layer 8 can be controlled by supplying drive voltage to the drive electrodes 10 on the first substrate 5 and the drive electrodes 13 on the second substrate 6. A region in which the alignment direction of the liquid crystal molecules 17 in the liquid crystal layer 8 can be controlled is referred to as an "effective region AA". The refractive index distribution of the liquid crystal layer 8 is changed in the effective region AA, whereby the diffusion degree of light transmitted through the effective region AA of the liquid crystal cell 2 can be controlled. A region outside the effective region AA, where the liquid crystal layer 8 is sealed by the sealing member 7, is referred to as a "peripheral region GA" (refer to FIG. 5).

As illustrated in FIG. 5, the drive electrodes 10 (in FIG. 5, the drive electrode 10*a*) in the effective region AA of the first substrate 5 are covered by an alignment film 18. The drive electrodes 13 (in FIG. 5, the drive electrodes 13*a* and 13*b*) in the effective region AA of the second substrate 6 are covered by an alignment film 19. The alignment direction of the liquid crystal molecules is different between the alignment film 18 and the alignment film 19.

Figure 6A:
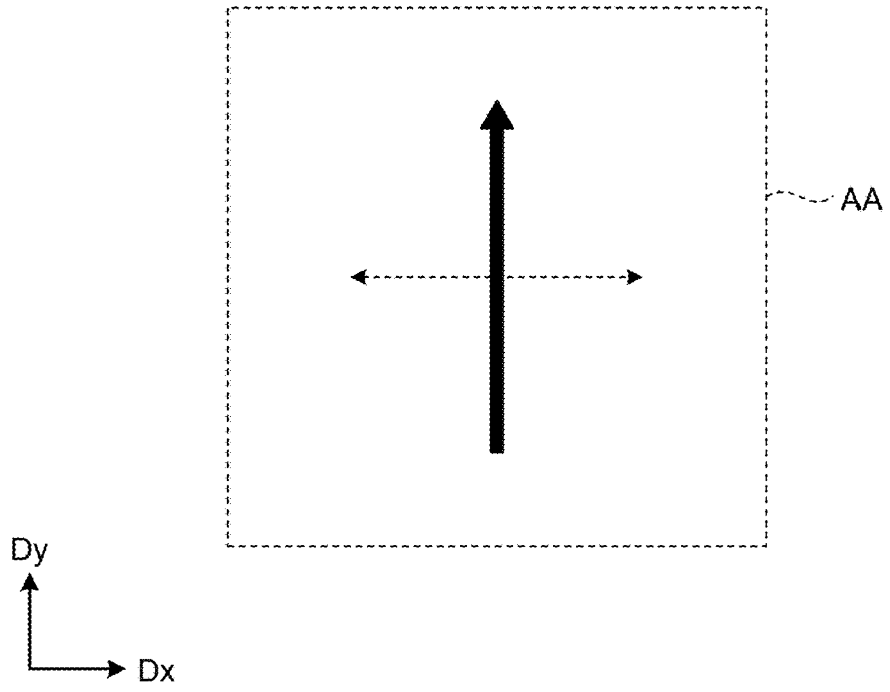
FIG. 6A is a diagram illustrating the alignment direction of an alignment film of the first substrate.
Figure 6B:
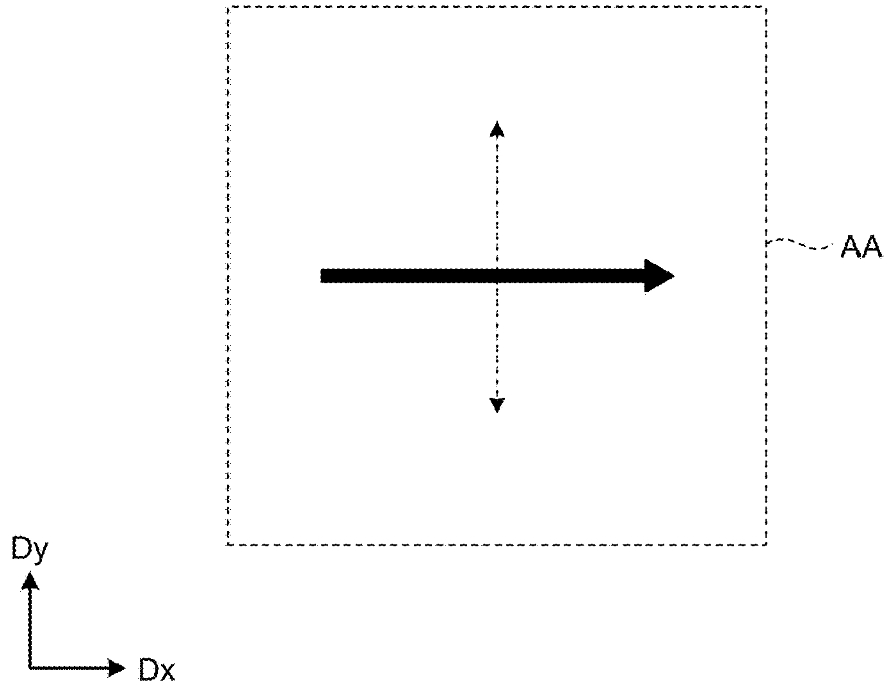
FIG. 6B is a diagram illustrating the alignment direction of an alignment film of the second substrate.

FIG. 6A is a diagram illustrating the alignment direction of the alignment film of the first substrate 5. FIG. 6B is a diagram illustrating the alignment direction of the alignment film of the second substrate 6.

As illustrated in FIGS. 6A and 6B, the alignment direction of the alignment film 18 of the first substrate 5 and the alignment direction of the alignment film 19 of the second substrate 6 are directions intersecting each other in plan view. Specifically, as illustrated with a solid arrow in FIG. 6A, the alignment direction of the alignment film 18 of the first substrate 5 is orthogonal to the extending direction of the drive electrodes 10*a* and 10*b*, which is illustrated with a dashed arrow in FIG. 6A. As illustrated with a solid arrow in FIG. 6B, the alignment direction of the alignment film 19 of the second substrate 6 is orthogonal to the extending direction of the drive electrodes 13*a* and 13*b*, which is illustrated with a dashed arrow in FIG. 6B. In the following description, the extending directions of the drive electrodes 10 and 13 are orthogonal to the alignment directions of the alignment films 18 and 19 covering them, but these may intersect at an angle other than being orthogonal, for example, in the angle range of 85° to 90°. The drive electrodes 10 on the first substrate 5 side and the drive electrodes 13 on the second substrate 6 side are preferably orthogonal to each other but may intersect, for example, in the angle range of 85° to 90°. The alignment directions of the alignment films 18 and 19 are formed by rubbing processing or light alignment processing.

A mechanism for changing the shape of light by using the liquid crystal cells 2 (the first liquid crystal cell 2_1, the second liquid crystal cell 2_2, the third liquid crystal cell 2_3, and the fourth liquid crystal cell 2_4) will be described below. FIG. 7 is a multilayered structure diagram of the optical element 100 according to the embodiment. FIGS. 8A, 8B, 8C, and 8D are conceptual diagrams for description of change in shape of light by the optical element 100 according to the embodiment. FIGS. 8A, 8B, 8C, and 8D illustrate examples in which potential difference is generated between the drive electrodes of hatched substrates of the liquid crystal cells 2.

As illustrated in FIG. 7, the optical element 100 is provided on the optical axis of the light source 4, which is illustrated with a dashed and single-dotted line, and as described above, the first liquid crystal cell 2_1, the second liquid crystal cell 2_2, the third liquid crystal cell 2_3, and the fourth liquid crystal cell 2_4 are sequentially stacked from the light source 4 side (lower side in FIG. 7). The third liquid crystal cell 2_3 and the fourth liquid crystal cell 2_4 are stacked in a state of being rotated by 90° relative to the first liquid crystal cell 2_1 and the second liquid crystal cell 2_2.

In each liquid crystal cell 2, the alignment direction of the alignment film on the first substrate 5 side and the second substrate 6 side intersect each other as illustrated in FIGS. 6A and 6B. Accordingly, from the first substrate 5 side toward the second substrate 6 side, the orientation of the liquid crystal molecules in the liquid crystal layer 8 gradually changes from the Dx direction to the Dy direction (or from the Dy direction to the Dx direction), and the polarized light component of transmitted light rotates along with the change. Specifically, in the liquid crystal cell 2, the polarized light component, which is a p-polarized light component on the first substrate 5 side, changes to an s-polarized light component as distance from the second substrate 6 decreases; and the polarized light component, which is an s-polarized light component on the first substrate 5 side, changes to a p-polarized light component as distance from the second substrate 6 decreases. This rotation of the polarized light component may be referred to as optical rotation.

FIG. 8A illustrates a state in which no potential is generated between adjacent electrodes in each liquid crystal cell 2. In this case, only optical rotation occurs in each liquid crystal cell 2 and no polarized light component is diffused.

As illustrated in FIG. 8B, for example, when potential difference is generated between the drive electrodes 10*a* and 10*b* on the first substrate 5 in the first liquid crystal cell 2_1 to induce a horizontal electric field, the liquid crystal molecules between the electrodes are aligned in a circular arc shape, and thus, refractive index distribution is formed in the Dx direction in the liquid crystal layer 8. As light from the light source 4 is transmitted in this state, the above-described refractive index distribution acts on the polarized light component (in FIG. 8B, p-polarized light component) parallel to the Dx direction, and therefore, the p-polarized light component diffuses in the Dx direction.

In addition, when potential difference is generated between the drive electrodes 13*a* and 13*b* on the second substrate 6 side in the first liquid crystal cell 2_1, refractive index distribution is formed in the Dy direction on the second substrate 6 side, and accordingly, the s-polarized light component diffuses in the Dy direction on the second substrate 6 side. Specifically, the polarized light component having changed from a p-polarized light component to an s-polarized light component during passing through the liquid crystal layer 8 in the first liquid crystal cell 2_1 diffuses in the Dy direction as well. However, the s-polarized light component at incidence on the first liquid crystal cell 2_1 optically rotates during passing through the liquid crystal layer 8 but intersects each refractive index distribution, and accordingly, only optically rotates without diffusing and passes through the first liquid crystal cell 2_1.

The s-polarized light component at incidence on the first liquid crystal cell 2_1 changes to a p-polarized light component after passing through the first liquid crystal cell 2_1, and the second liquid crystal cell 2_2 acts on this p-polarized light component. Specifically, as illustrated in FIGS. 8A and 8B, the first liquid crystal cell 2_1 acts on the p-polarized light component of light incident on the optical element 100, and the second liquid crystal cell 2_2 acts on the s-polarized light component thereof. Since the third liquid crystal cell 2_3 and the fourth liquid crystal cell 2_4 are provided with rotation by 90° relative to the first liquid crystal cell 2_1 and the second liquid crystal cell 2_2, polarized light components on which they act are switched by 90°. Specifically, the third liquid crystal cell 2_3 acts on the s-polarized light component at incidence on the optical element 100, and the fourth liquid crystal cell 2_4 acts on the p-polarized light component at incidence on the optical element 100.

As illustrated in FIG. 8C, in the optical element, it is possible to act on the p-polarized light component by providing potential difference between drive electrodes extending in the Dy direction in each liquid crystal cell 2 (between the drive electrodes 10*a* and 10*b* of the first substrate 5 in the first liquid crystal cell 2_1 and the second liquid crystal cell 2_2 and between the drive electrodes 13*a* and 13*b* of the second substrate 6 in the third liquid crystal cell 2_3 and the fourth liquid crystal cell 2_4), thereby increasing the shape of light mainly in the Dx direction. This effect may be referred to as horizontal diffusion.

As illustrated in FIG. 8D, it is possible to act on the s-polarized light component by providing potential difference between drive electrodes extending in the Dx direction in each liquid crystal cell 2 (between the drive electrodes 13*a* and 13*b* of the second substrate 6 in the first liquid crystal cell 2_1 and the second liquid crystal cell 2_2 and between the drive electrodes 10*a* and 10*b* of the first substrate 5 in the third liquid crystal cell 2_3 and the fourth liquid crystal cell 2_4), thereby increasing the shape of light mainly in the Dy direction. This effect may be referred to as vertical diffusion.

The diffusion degree of light in each direction depends on the potential difference between the drive electrodes 10*a* and 10*b* (or between the drive electrodes 13*a* and 13*b*) adjacent to each other. The spread of light in the direction is maximum (100%) in a case where the potential difference between the drive electrodes 10*a* and 10*b* (or between the drive electrodes 13*a* and 13*b*) is maximum potential difference (for example, 30 V) defined in advance, and no spread of light (0%) occurs in the direction in a case where no potential difference is generated. Alternatively, the spread of light in the direction is 50% in a case where the potential difference between the drive electrodes 10*a* and 10*b* (or between the drive electrodes 13*a* and 13*b*) is 50% (for example, 15 V) of the above-described maximum potential difference. In a case where the relation between voltage difference and light spread is not linear, it is possible to set another potential difference instead of 15 V.

In each liquid crystal cell 2, the interval (also referred to as a cell gap) between its substrates (between the first substrate 5 and the second substrate 6) is large and is 10 μm to 50 μm approximately, more preferably 15 μm to 35 μm approximately, and thus, influence of an electric field formed in one of the substrates on the other substrate side is reduced as much as possible. Drive voltage that generates potential difference between the drive electrodes 10*a* and 10*b* (or between the drive electrodes 13*a* and 13*b*) adjacent to each other is what is called an alternating-current square wave, thereby preventing burn-in of the liquid crystal molecules.

The alignment directions of the alignment films, the extending directions of the drive electrodes on the substrates, and the angle between them may be modified as appropriate for the entire optical element 100 or each liquid crystal cell 2 in accordance with the characteristics of liquid crystals to be employed and optical characteristics to be intentionally obtained.

In the present embodiment, description is made on the configuration of the optical element 100 in which the four liquid crystal cells of the first liquid crystal cell 2_1, the second liquid crystal cell 2_2, the third liquid crystal cell 2_3, and the fourth liquid crystal cell 2_4 are stacked, but the optical element 100 is not limited to this configuration and may employ, for example, a configuration in which two or three liquid crystal cells 2 are stacked or a configuration in which a plurality of liquid crystal cells 2, five or more liquid crystal cells 2, are stacked.

In the present disclosure, in the illumination device 1 with the above-described configuration, light incident on the optical element from the light source 4 is controlled in the two directions of the Dx direction (direction of horizontal diffusion) and the Dy direction (direction of vertical diffusion) by controlling drive voltage of each liquid crystal cell 2. The above-described vertical diffusion and horizontal diffusion may be collectively referred to as light diffusion. Accordingly, the shape of light emitted from the optical element is changed. The shape of light is a light shape that appears on a plane parallel to an emission surface of the optical element, and this may be referred to as a light distribution shape. The following describes control of the light diffusion degree in the present disclosure with reference to FIG. 9.

Figure 9:
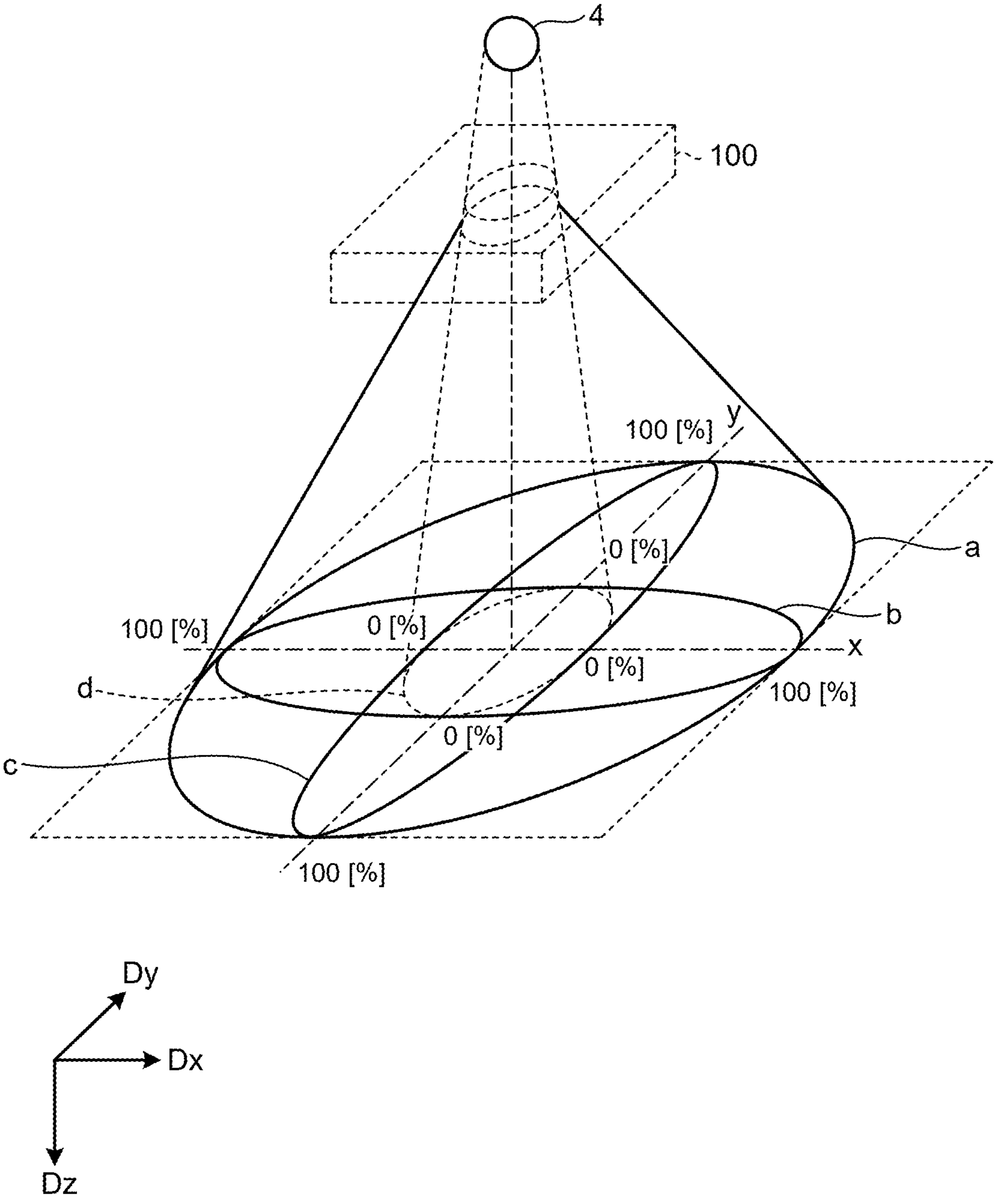
FIG. 9 is a conceptual diagram for conceptually describing control of the light diffusion degree of the illumination device according to the embodiment.

FIG. 9 is a conceptual diagram for conceptually describing control of the light diffusion degree of the illumination device 1 according to the embodiment. FIG. 9 illustrates an irradiation area of light on a virtual plane xy orthogonal to the Dz direction. The outline of the actual irradiation area is slightly unclear depending on the distance from the light source 4, a light diffraction phenomenon, and the like.

As described above, the drive voltage is supplied to the drive electrodes 10 and 13 of each liquid crystal cell 2 of the optical element 100 provided on the optical axis of the light source 4, whereby the alignment direction of the liquid crystal molecules 17 in the liquid crystal layer 8 is controlled. With this control, the light distribution shape of light emitted from the optical element 100 is controlled.

Specifically, for example, the light distribution shape in the Dx direction changes in accordance with the drive voltage applied to the drive electrodes 10 or drive electrodes 13 extending in the Dy direction in each liquid crystal cell 2 as described above (horizontal diffusion). The light distribution shape in the Dy direction changes in accordance with the drive voltage applied to the drive electrodes 10 or drive electrodes 13 extending in the Dx direction in the first to fourth liquid crystal cells (vertical diffusion).

In the present disclosure, the minimum diffusion degrees of the horizontal diffusion and the vertical diffusion are 0% and the maximum diffusion degrees thereof are 100%. More specifically, in a case where the horizontal diffusion degree is 0%, drive electrodes (for example, the drive electrodes 10 extending in the Dy direction on the first substrate 5 in the first liquid crystal cell 2_1) functioning to expand the light distribution state in the Dx direction do not act on the refractive index distribution of the liquid crystal layer 8. In this case, no potential difference is present between the adjacent drive electrodes 10*a* and 10*b* or no potential is supplied to the electrodes. On the other hand, in a case where the horizontal diffusion degree is 100%, drive electrodes (for example, the drive electrodes 10 extending in the Dy direction on the first substrate 5 in the first liquid crystal cell 2_1) functioning to expand the light distribution state in the Dx direction maximumly act on the refractive index distribution of the liquid crystal layer 8. In this case, the potential difference between the adjacent drive electrodes 10*a* and 10*b* is set to the maximum potential difference (for example, 30 V) in the optical element 100. In a case where the horizontal diffusion degree is larger than 0% and smaller than 100%, potential adjusted such that the potential difference between the adjacent drive electrodes 10*a* and 10*b* is larger than 0 V and smaller than the maximum potential difference (for example, 30 V) is applied to the electrodes. The same applies to the vertical diffusion.

Outline “a” illustrated in FIG. 9 exemplarily indicates the irradiation area on the virtual plane xy in a case where the horizontal diffusion degree and the vertical diffusion degree are both 100%. Outline “b” illustrated in FIG. 9 exemplarily indicates the irradiation area on the virtual plane xy in a case where the horizontal diffusion degree is 100% and the vertical diffusion degree is 0%. Outline “c” illustrated in FIG. 9 exemplarily indicates the irradiation area in a case where the horizontal diffusion degree is 0% and the vertical diffusion degree is 100%. Outline “d” illustrated in FIG. 9 exemplarily indicates the irradiation area on the virtual plane xy in a case where the horizontal diffusion degree and the vertical diffusion degree are both 0%. In other words, outline “d” indicates the light distribution state when light from the light source 4 is emitted without being controlled by the optical element 100 (or simply transmitted through the optical element 100).

In this manner, in the illumination device 1 with the above-described configuration, it is possible to control the horizontal and vertical diffusion degrees of emission light from the optical element 100 by performing drive voltage control of each liquid crystal cell 2.

Accordingly, it is possible to change, on the virtual plane xy, the light distribution shape of emission light from the illumination device 1. Hereinafter, control that changes the light distribution shape of light emitted onto the virtual plane xy by adjusting the horizontal and vertical diffusion degrees of emission light from the illumination device 1 is also referred to as “light distribution control”.

In the present disclosure, the illumination device 1 capable of light distribution control in the two directions of the Dx and Dy directions is exemplarily described, but the controllable parameters of the illumination device 1 are not limited to light distribution (light spread). For example, the illumination device 1 may be capable of light adjustment control. In this case, the controllable parameters of the illumination device 1 may include light adjustment (brightness).

Figure 10:
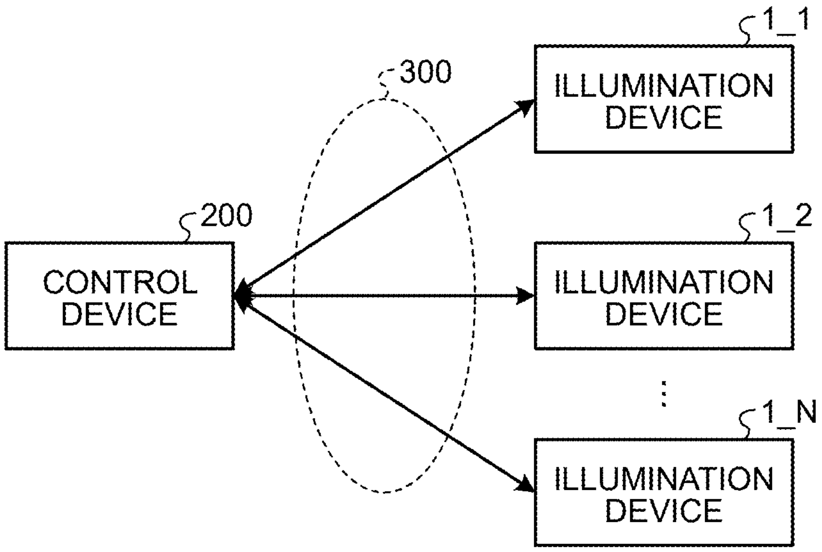
FIG. 10 is a schematic view illustrating an example of the configuration of an illumination system according to the embodiment.

FIG. 10 is a schematic view illustrating an example of the configuration of an illumination system according to the embodiment. The illumination system according to the embodiment includes a plurality of illumination devices 1_1, 1_2, . . . , and 1_N and a control device 200. The control device 200 is, for example, a portable communication terminal device such as a smartphone or a tablet. The illumination devices 1_1, 1_2, . . . , and 1_N are each registered in the control device 200 in advance as a control target device having a light diffusion degree controllable by the control device 200.

Data and various command signals are transmitted bidirectionally between the control device 200 and each of the illumination devices 1_1, 1_2, . . . , and 1_N through a communication means 300. In the present disclosure, the communication means 300 is a wireless communication means of, for example, Bluetooth (registered trademark) or WiFi (registered trademark). Wireless communication may be performed between the control device 200 and each of the illumination devices 1_1, 1_2, . . . , and 1_N through, for example, a predetermined network such as a mobile communication network. Alternatively, each of the illumination devices 1_1, 1_2, . . . , and 1_N and the control device 200 may be coupled in a wired manner to perform wired communication therebetween.

As illustrated in FIG. 10, N (N is a natural number equal to or larger than one) illumination devices 1_*n* (n is a natural number of 1 to N) are control target devices of the control device 200 in the present disclosure, but the present disclosure is not limited by the number of control target devices (illumination devices 1_*n*) of the control device 200. Furthermore, in the present disclosure, an aspect in which the light diffusion degree of each illumination device 1_*n* is controlled as a setting parameter of a control target device (illumination device 1_*n*) will be described below, but the setting parameter is not limited to the light diffusion degree.

Examples of setting parameters of a control target device (illumination device 1_n) may include the light quantity and color temperature of the illumination device 1_n.

In the present disclosure, it is sufficient that at least one illumination device 1 is registered as a control target device. Hereinafter, for sake of simplicity, processing between the control device 200 and one illumination device 1 will be described.

Figure 11:
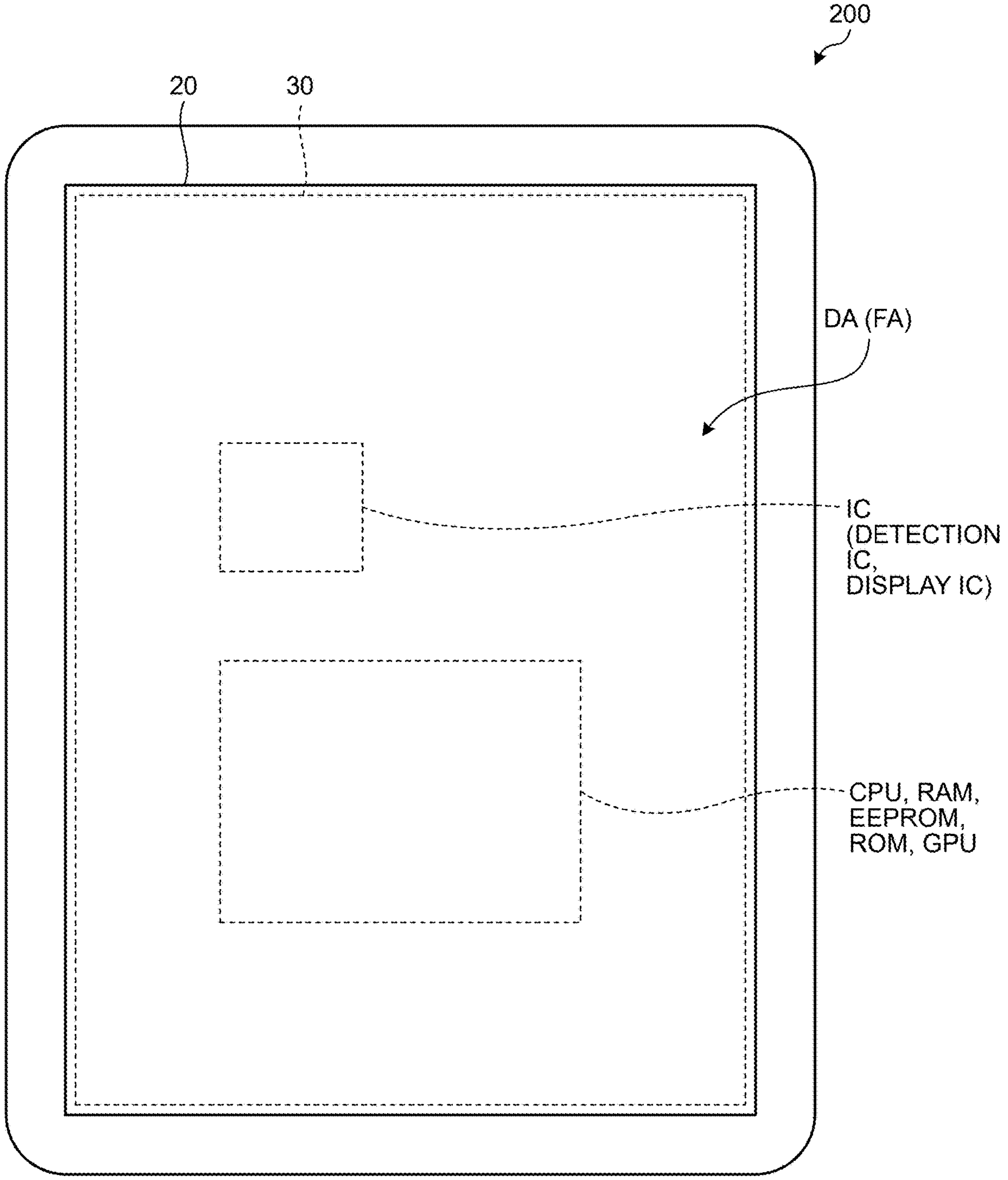
FIG. 11 is an exterior diagram illustrating an example of a control device according to the embodiment.

FIG. 11 is an exterior diagram illustrating an example of the control device 200 according to the embodiment. The control device 200 is a display device (touch screen) with a touch detection function in which a display panel 20 and a touch sensor 30 are integrated. The control device 200 includes, as internal constituent components, for example, various ICs such as a detection IC and a display IC, and a central processing unit (CPU), a random access memory (RAM), an electrically erasable programmable read only memory (EEPROM), a read only memory (ROM), and a graphics processing unit (GPU) of a smartphone, a tablet, or the like constituting the control device 200.

The display panel 20 is what is called an in-cell or hybrid device in which the touch sensor 30 is built and integrated. Building and integrating the touch sensor 30 in the display panel 20 includes, for example, sharing some members such as substrates and electrodes used as the display panel 20 and some members such as substrates and electrodes used as the touch sensor 30. The display panel 20 may be what is called an on-cell type device in which the touch sensor 30 is mounted on a display device.

The display panel 20 is, for example, a liquid crystal display panel including a liquid crystal display element. The display panel 20 is not limited thereto but may be, for example, an organic EL display panel (organic light emitting diode (OLED)) or an inorganic EL display panel (micro LED or mini LED).

The touch sensor 30 is, for example, a capacitive touch sensor. The touch sensor 30 is not limited thereto but may be, for example, a touch sensor of a resistance film scheme or a touch sensor of an ultrasonic wave scheme or an optical scheme.

Figure 12:
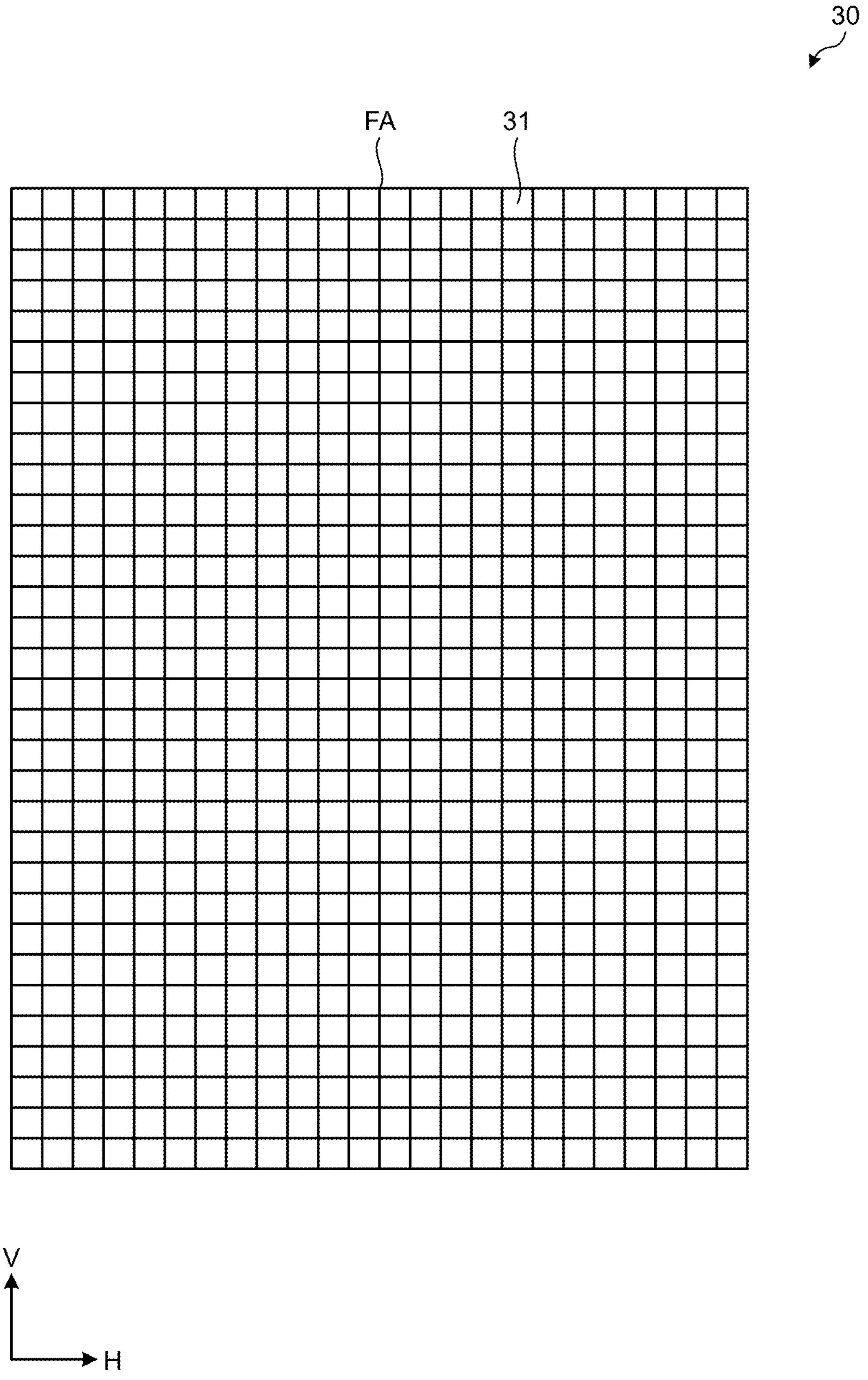
FIG. 12 is a conceptual diagram illustrating an example of a touch detection region of a touch sensor.

FIG. 12 is a conceptual diagram illustrating an example of a touch detection region of the touch sensor 30. A plurality of detection elements 31 are provided in a detection region FA of the touch sensor 30. The detection elements 31 in the detection region FA of the touch sensor 30 are arranged in an X direction and a Y direction orthogonal to the X direction and provided in a matrix of a row-column configuration. In other words, the touch sensor 30 has the detection region FA overlapping the detection elements 31 arranged in the X direction and the Y direction.

First Embodiment

Configurations and operation for controlling the light diffusion degree of the illumination device 1 in the control device 200 of an illumination system according to a first embodiment will be described below.

Figure 13:
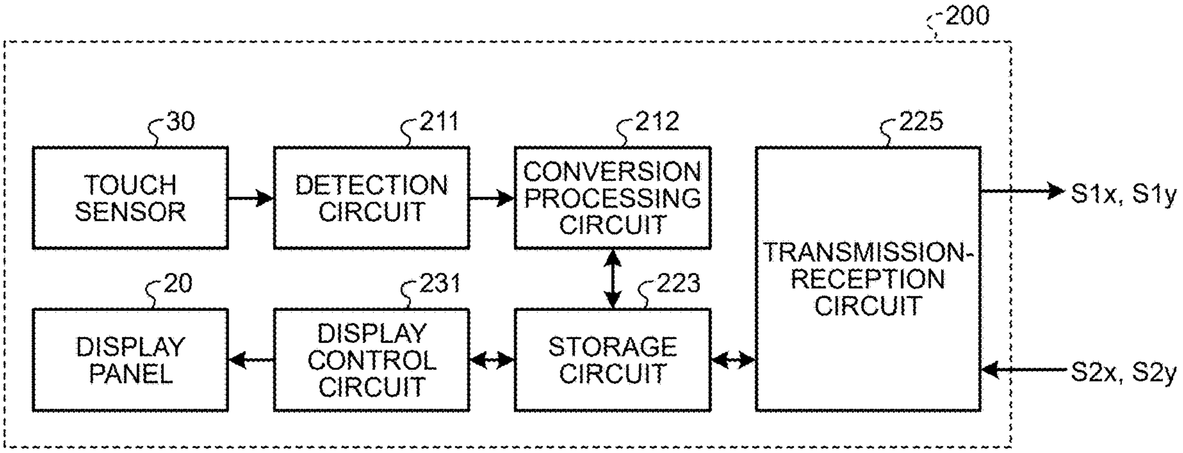
FIG. 13 is a diagram illustrating an example of a control block configuration of the control device according to a first embodiment.

FIG. 13 is a diagram illustrating an example of a control block configuration of the control device 200 according to the first embodiment. The following describes, first, a control block configuration for executing each processing to be described later.

As illustrated in FIG. 13, the control device 200 according to the first embodiment includes the display panel 20, the touch sensor 30, a detection circuit 211, a conversion processing circuit 212, a storage circuit (first storage circuit) 223, a transmission-reception circuit 225, and a display control circuit 231. The detection circuit 211 is configured with, for example, a detection IC. Alternatively, the detection circuit 211 and the display control circuit 231 may be mounted as one display IC on the display panel 20 or on an FPC coupled to the display panel 20. The conversion processing circuit 212 and the storage circuit 223 are each configured with, for example, the CPU, RAM, EEPROM, and ROM of a smartphone, a tablet, or the like constituting the control device 200. The display control circuit 231 may be a display IC mounted on the display panel 20 as described above, and moreover, may include, for example, the GPU of a smartphone, a tablet, or the like constituting the control device 200. The transmission-reception circuit 225 is configured with, for example, a wireless communication module of a smartphone, a tablet, or the like constituting the control device 200.

The detection circuit 211 is a circuit that detects existence of a touch on the touch sensor 30 based on a detection signal output from each detection element 31 of the touch sensor 30.

The conversion processing circuit 212 is a circuit that executes conversion processing of the position of touch detection by the detection circuit 211 into various setting values (in the present disclosure, light diffusion degrees) of the illumination device 1. In the present disclosure, the conversion processing circuit 212 has a function to execute conversion processing of the position of touch detection by the detection circuit 211, that is, a touched object (pictorial image) into operation states on various screens. The conversion processing circuit 212 is a component achieved by, for example, the CPU of a smartphone, a tablet, or the like constituting the control device 200.

The storage circuit 223 is configured with, for example, the RAM, EEPROM, and ROM of a smartphone, a tablet, or the like constituting the control device 200. In the present disclosure, various parameter values and various setting values that are necessary for operation of an illumination control application according to the first embodiment to be described later, are stored in a storage region of the storage circuit 223. The various parameter values and various setting values that are necessary for operation of the illumination control application according to the first embodiment will be described later.

The transmission-reception circuit 225 transmits and receives setting information to and from the illumination device 1. Specifically, the transmission-reception circuit 225 transmits a Dx-direction light diffusion degree $S1x$ and a Dy-direction light diffusion degree $S1y$ to the illumination device 1 as first setting information in each processing to be described later. The transmission-reception circuit 225 receives second light diffusion degree information (a Dx-direction light diffusion degree $S2x$ and a Dy-direction light diffusion degree $S2y$) transmitted from the illumination device 1.

The display control circuit 231 executes display control processing for displaying a coarse adjustment mode screen or a fine adjustment mode screen to be described later on the display panel 20. The display control circuit 231 in the present disclosure performs display control of the display panel 20 based on various kinds of setting information stored in a storage region of the storage circuit 223 and position information of pictorial images.

Figure 14:
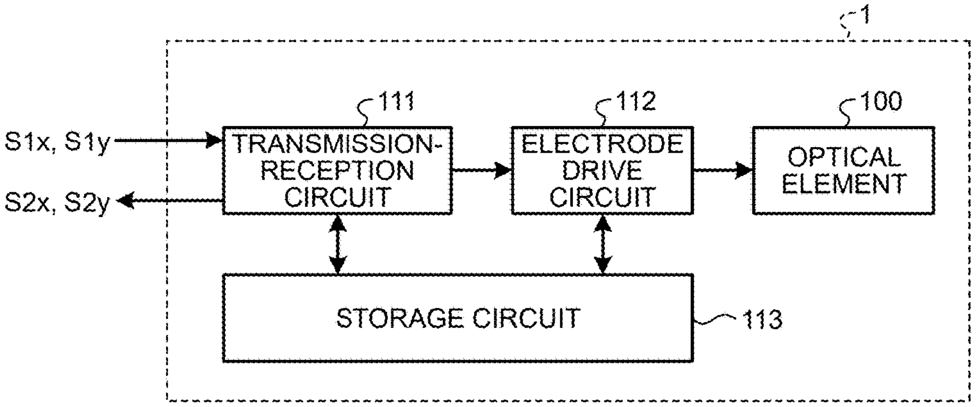
FIG. 14 is a diagram illustrating an example of a control block configuration of the illumination device according to the first embodiment.

FIG. 14 is a diagram illustrating an example of a control block configuration of the illumination device 1 according to the first embodiment. As illustrated in FIG. 14, the illumination device 1 according to the first embodiment includes a transmission-reception circuit 111, an electrode drive circuit 112, and a storage circuit (second storage circuit) 113 as control blocks for controlling the optical element 100 described above. The storage circuit 113 is configured with, for example, a RAM, an EEPROM, or a ROM.

The transmission-reception circuit 111 transmits and receives the light diffusion degree information to and from the control device 200. Specifically, the transmission-reception circuit 111 receives the first light diffusion degree information (the Dx-direction light diffusion degree S1$x$ and the Dy-direction light diffusion degree S1$y$) transmitted from the control device 200. The transmission-reception circuit 111 transmits, to the control device 200, the Dx-direction light diffusion degree S2$x$ and the Dy-direction light diffusion degree S2$y$ stored in the storage circuit 113 as the second light diffusion degree information.

In the present disclosure, upon activation of the illumination device 1, the transmission-reception circuit 111 transmits the Dx-direction light diffusion degree S2$x$ and the Dy-direction light diffusion degree S2$y$ stored in the storage circuit 113 to the control device 200 as the second light diffusion degree information and stores, in the storage circuit 113 as the new Dx-direction light diffusion degree S2$x$ and the new Dy-direction light diffusion degree S2$y$, the first light diffusion degree information (the Dx-direction light diffusion degree S1$x$ and the Dy-direction light diffusion degree S1$y$) transmitted from the control device 200 by each processing of the control device 200 to be described later. In other words, when the first light diffusion degree information is transmitted from the control device 200 to the illumination device 1, the second light diffusion degree information is updated to the first light diffusion degree information. The illumination device 1 initially does not store the second light diffusion degree information (0% for the vertical diffusion and the horizontal diffusion). In this case, the first light diffusion degree information is transmitted from the control device 200, whereby the second light diffusion degree information is stored.

The electrode drive circuit 112 supplies drive voltage in accordance with the Dx-direction light diffusion degree S2$x$ and the Dy-direction light diffusion degree S2$y$ stored in the storage circuit 113 to the drive electrodes 10 and 13 of each liquid crystal cell 2 of the optical element 100.

Specifically, upon activation of the illumination device 1, the electrode drive circuit 112 supplies drive voltage corresponding to the second setting information stored in the storage circuit 113 to the drive electrodes 10 and 13 of each liquid crystal cell 2 of the optical element 100.

The electrode drive circuit 112 also supplies, to the drive electrodes 10 and 13 of each liquid crystal cell 2 of the optical element 100, drive voltage corresponding to the second setting information updated based on the first setting information transmitted from the control device 200.

Processing of the illumination system in the present disclosure is executed by application software (hereinafter also referred to as an “illumination control application”) operating on the control device 200. The following describes specific examples of processing and display aspects of the illumination control application that operates on the control device 200 according to the first embodiment in detail.

Figure 15:
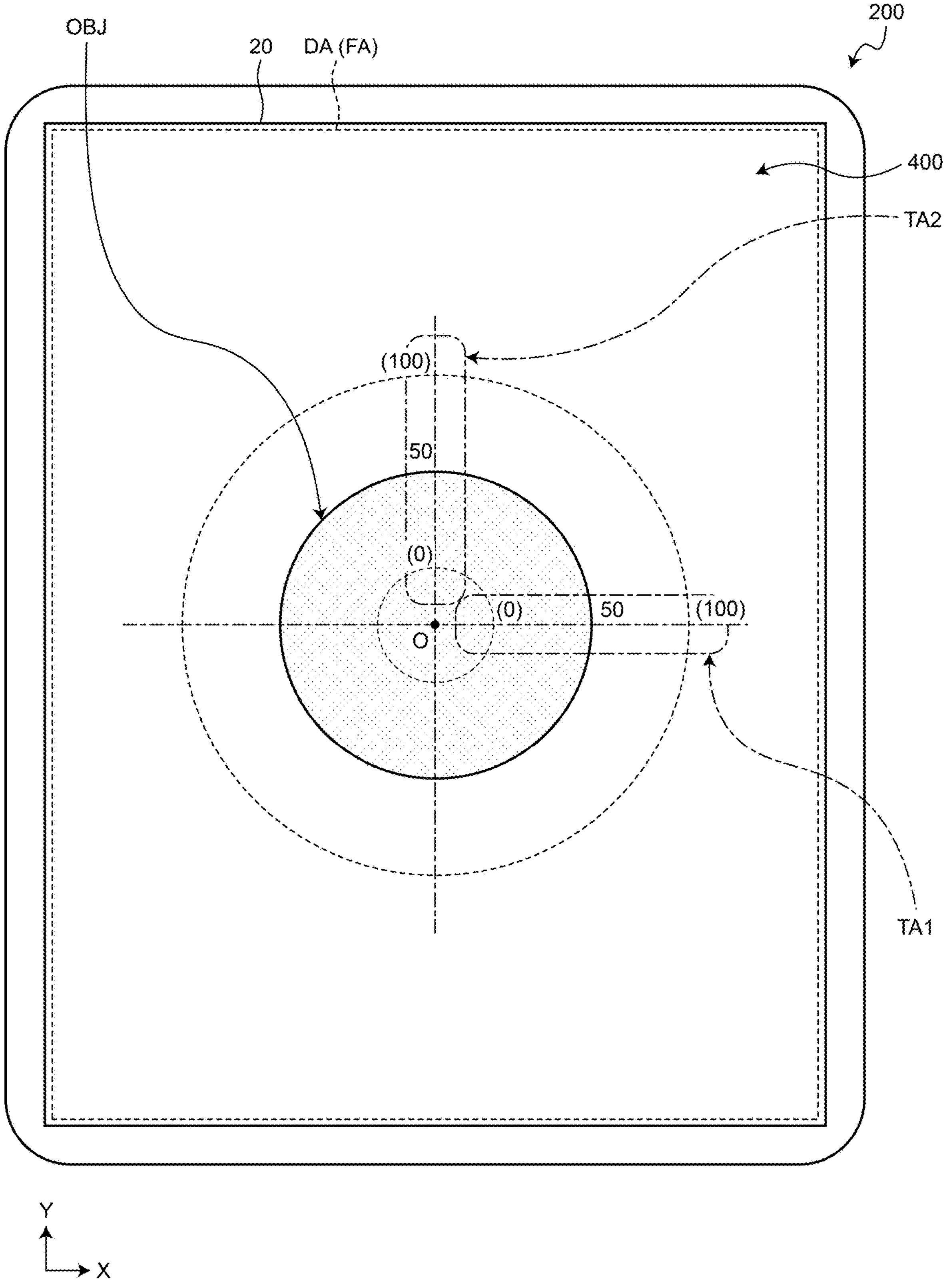
FIG. 15 is a conceptual diagram illustrating an example of the display aspect of an illumination control application screen on the control device according to the first embodiment.

FIG. 15 is a conceptual diagram illustrating an example of the display aspect of an illumination control application screen 400 on the control device 200 according to the first embodiment.

In description of the present disclosure, it is assumed that the illumination control application is installed on the control device 200 in advance.

When the illumination control application is activated, the illumination control application screen 400 (adjustment screen) illustrated in FIG. 15 is displayed and pairing processing is executed between the control device 200 and the illumination device 1 registered as a control target device of the control device 200 in advance. A pairing button (not illustrated) may be displayed on the illumination control application screen 400, and pairing processing may be executed between the control device 200 and the illumination device 1 when the pairing button is touched by a user. At initial activation of the illumination control application, for example, the illumination device 1 activated in a space where pairing is possible may be registered as a control target device.

On the illumination control application screen 400 illustrated in FIG. 15, the X direction is defined as the Dx direction (first direction) in light diffusion degree control of the illumination device 1, and the Y direction is defined as the Dy direction (second direction) in light diffusion degree control of the illumination device 1. An XY plane with an origin O(0, 0) at a predetermined position in a display region DA is defined on the illumination control application screen 400.

The display panel 20 is provided with the display region DA overlapping the detection region FA of the touch sensor 30 in plan view. In the example illustrated in FIG. 15, a light distribution shape object OBJ having a center point at the origin O(0, 0) of the XY plane on the illumination control application screen 400 is displayed.

The light distribution shape object OBJ is a pictorial image on the illumination control application screen 400, corresponding to the light distribution state of light emitted from the illumination device 1.

In the configuration according to the first embodiment, the shape of the light distribution shape object OBJ on the illumination control application screen 400 changes into a circular or elliptical shape in accordance with the horizontal and vertical diffusion degrees.

As illustrated in FIG. 9, in the illumination device 1 as a control target in the present disclosure, a predetermined substantially circular area corresponding to outline “d” is irradiated with light even in a case where the horizontal and vertical diffusion degrees of the illumination device 1 are both 0%. In the present disclosure, the light distribution shape object OBJ in a small circular shape overlapping the inner dashed line illustrated in FIG. 15 is displayed in a case where the horizontal and vertical diffusion degrees are both 0%. The light distribution shape object OBJ in a large circular shape overlapping the outer dashed line illustrated in FIG. 15, which corresponds to outline “a” in FIG. 9, is displayed in a case where the horizontal and vertical diffusion degrees of the illumination device 1 are both 100%.

In the first embodiment, as illustrated in FIG. 15, a first adjustment region TA1 is provided as a region in which the touch detection position in the X direction for setting the horizontal diffusion degree can be acquired. The first adjustment region TA1 is set as a region where the light distribution shape in the X direction is adjustable in the entire range of a minimum value (0%) to a maximum value (100%).

Touch position detection in the X direction is enabled in the first adjustment region TA1 between the position on the outline of the light distribution shape object OBJ in a case where the horizontal diffusion degree is 0% and the position on the outline of the light distribution shape object OBJ in a case where the horizontal diffusion degree is 100%. In the first embodiment, adjustment of the horizontal diffusion degree is enabled by detecting the touch position in the X direction in the first adjustment region TA1.

In the present disclosure, as illustrated in FIG. 15, a second adjustment region TA2 is provided as a region in which the touch detection position in the Y direction for setting the vertical diffusion degree can be acquired. The second adjustment region TA2 is set as a region where the light distribution shape in the Y direction is adjustable in the entire range of a minimum value (0%) to a maximum value (100%).

Touch position detection in the Y direction is enabled in the second adjustment region TA2 between the position on the outline of the light distribution shape object OBJ in a case where the vertical diffusion degree is 0% and the position on the outline of the light distribution shape object OBJ in a case where the vertical diffusion degree is 100%. In the first embodiment, adjustment of the vertical diffusion degree is enabled by detecting the touch position in the Y direction in the second adjustment region TA2.

Figure 16:
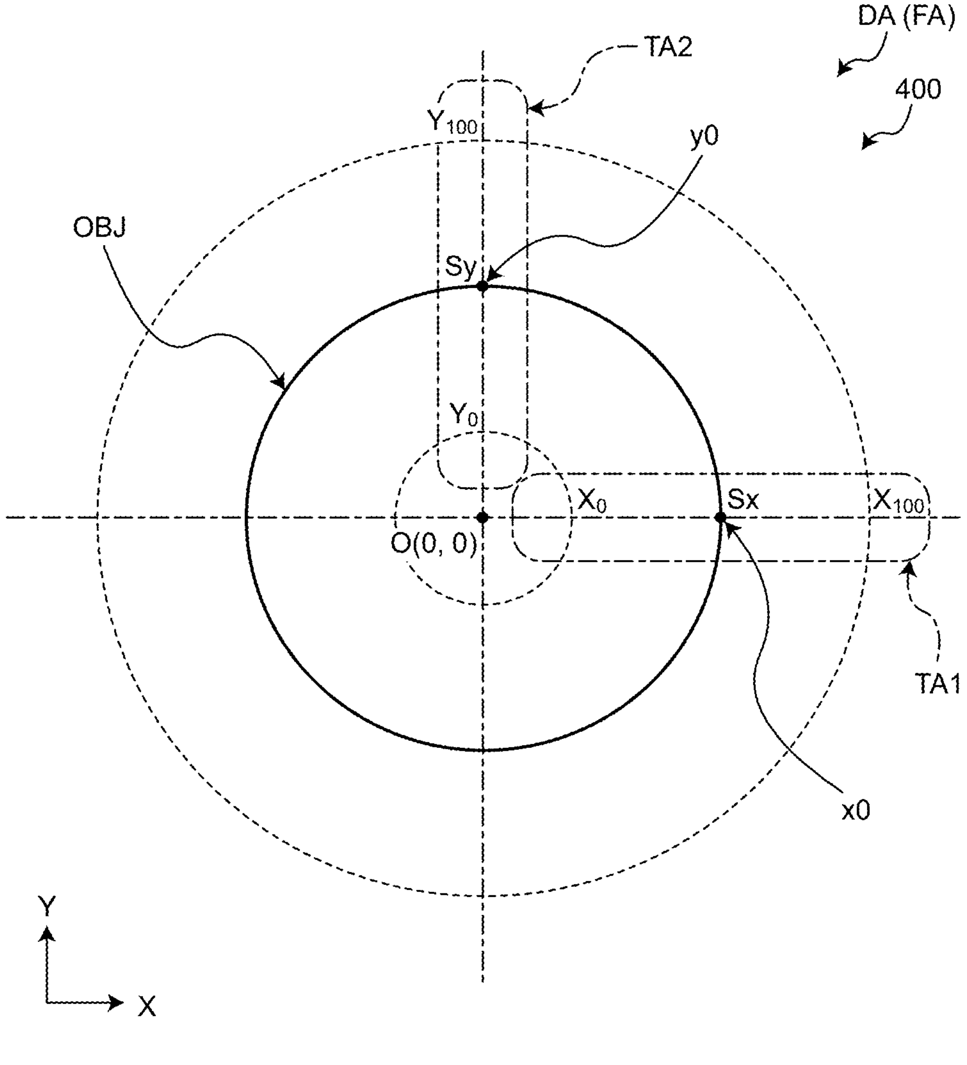
FIG. 16 is a diagram for description of the relation between a position on the illumination control application screen on the control device according to the first embodiment and the light diffusion degree.

FIG. 16 is a diagram for description of the relation between the position on the illumination control application on the control device 200 according to the first embodiment and the light diffusion degree. In the present disclosure, to facilitate description, the position (coordinate) in the display region DA of the display panel 20 and the position (coordinate) on the detection region FA of the touch sensor 30 are assumed to be equivalent.

On the illumination control application screen 400 of the control device 200 according to the first embodiment, the horizontal diffusion degree of the illumination device 1 can be set based on a position x0 of an intersection point of the X axis of the XY plane and the outline of the light distribution shape object OBJ.

In the first embodiment, the position x0 on the display region DA in the first adjustment region TA1 coincides with the position of the intersection point of the X axis and the outline of the light distribution shape object OBJ and corresponds to the horizontal diffusion degree of the illumination device 1. A pointer (pictorial image such as a slider) indicating the X-direction position of the light distribution shape object OBJ having a center point at the position x0 on the display region DA may be displayed at the position of the intersection point of the X axis and the outline of the light distribution shape object OBJ in the first adjustment region TA1. In FIG. 16, "Sx" displayed near the position x0 in the display region DA indicates the horizontal diffusion degree of the illumination device 1 (for example, "50"%). The X-direction shape of the light distribution shape object OBJ changes with movement of the position x0 on the display region DA in the first adjustment region TA1. The relation between the position x0 on the display region DA in the first adjustment region TA1 and the horizontal diffusion degree Sx can be expressed as described below.

A reference movement amount Px in the X direction on the XY plane in a case where the amount of one step change in the horizontal diffusion degree of the illumination device 1 is 1% is expressed by Expression (1) below, where $X_{100}$ represents the intersection point of the X axis and the outline of the light distribution shape object OBJ in a case where the horizontal diffusion degree Sx is 100%, and $X_0$ represents the intersection point of the X axis and the outline of the light distribution shape object OBJ in a case where the horizontal diffusion degree Sx is 0%.

$$Px=(X_{100}-X_0)/100 \tag{1}$$

The relation between the horizontal diffusion degree Sx and the position x0 in the display region DA on the XY plane is expressed by Expressions (2) and (3) below by using Expression (1) described above.

$$Sx=(x0-X_0)/Px \tag{2}$$

$$x0=Sx\times Px+X_0 \tag{3}$$

On the illumination control application screen 400 of the control device 200 according to the first embodiment, the vertical diffusion degree of the illumination device 1 can be set based on a position y0 of the intersection point of the Y axis of the XY plane and the outline of the light distribution shape object OBJ.

In the present disclosure, the position y0 in the display region DA in the second adjustment region TA2 coincides with the position of the intersection point of the Y axis and the outline of the light distribution shape object OBJ and corresponds to the vertical diffusion degree of the illumination device 1. A pointer (pictorial image such as a slider) indicating the Y-direction position of the light distribution shape object OBJ having a center point at the position y0 on the display region DA may be displayed at the position of the intersection point of the Y axis and the outline of the light distribution shape object OBJ in the second adjustment region TA2. In FIG. 16, "Sy" displayed near the position y0 on the display region DA indicates the vertical diffusion degree of the illumination device 1 (for example, "50"%). The shape of the light distribution shape object OBJ in the Y direction changes with movement of the position y0 in the display region DA in the second adjustment region TA2. The relation between the position y0 on the display region DA in the second adjustment region TA2 and the vertical diffusion degree Sy can be expressed as described below.

A reference movement amount Py in the Y direction on the XY plane in a case where the amount of one step change in the vertical diffusion degree of the illumination device 1 is 1% is expressed by Expression (4) below, where $Y_{100}$ represents the intersection point of the Y axis and the outline of the light distribution shape object OBJ in a case where the vertical diffusion degree Sy is 100%, and $Y_0$ represents the intersection point of the Y axis and the outline of the light distribution shape object OBJ in a case where the vertical diffusion degree Sy is 0%.

$$Py=(Y_{100}-Y_0)/100 \tag{4}$$

The relation between the vertical diffusion degree Sy and the position y0 in the display region DA on the XY plane is expressed by Expressions (5) and (6) below by using Expression (4) described above.

$$Sy=(y0-Y_0)/Py \tag{5}$$

$$y0=Sy\times Py+Y_0 \tag{6}$$

In the first embodiment, when having detected continuation of a touch in the first adjustment region TA1 or the second adjustment region TA2 on the illumination control application screen 400 described above, the control device 200 transitions to diffusion degree adjustment processing.

Hereinafter, continuation of a touch in the first adjustment region TA1 or the second adjustment region TA2 is also referred to as a "long tap state".

In the first embodiment, the "long tap state" means a state in which a continuation time T1 of a touch in the first adjustment region TA1 or the second adjustment region TA2 has exceeded a predetermined long tap detection time (first time threshold) T1*th* (for example, 2 sec).

FIG. 17 is a conceptual diagram illustrating an example of a first storage region of the storage circuit 223 in the control device 200 for the illumination device 1 according to the first embodiment. FIG. 18 is a conceptual diagram illustrating an example of a second storage region of the storage circuit 223 in the control device 200 for the illumination device 1 according to the first embodiment. The first storage region stores various parameter values (variables) that are necessary for operation of the illumination control application. The second storage region of the storage circuit 223 stores various setting values of the illumination control application.

In the first embodiment, as illustrated in FIG. 17, the first storage region of the storage circuit 223 stores a horizontal diffusion degree display value Sx, a vertical diffusion degree display value Sy, an X-direction position display value x0 of the light distribution shape object OBJ, and a Y-direction position display value y0 of the light distribution shape object OBJ on the illumination control application screen 400. The horizontal diffusion degree display value Sx indicates a current horizontal diffusion degree of the illumination device 1, which is defined by the X-direction position display value x0 of the light distribution shape object OBJ. The vertical diffusion degree display value Sy indicates a current vertical diffusion degree of the illumination device 1, which is defined by the Y-direction position display value y0 of the light distribution shape object OBJ. The first storage region also stores an X-direction touch position detection value x'0 in the first adjustment region TA1 and a Y-direction touch position detection value y'0 in the second adjustment region TA2, which are detected in illumination control processing according to the first embodiment to be described later, a target horizontal diffusion degree Sx' calculated based on the X-direction touch position detection value x'0, a target vertical diffusion degree Sy' calculated based on the Y-direction touch position detection value y'0, a horizontal diffusion degree difference value ΔSx that is the difference value between the target horizontal diffusion degree Sx' and the horizontal diffusion degree display value Sx, and a vertical diffusion degree difference value ΔSy that is the difference value between the target vertical diffusion degree Sy' and the vertical diffusion degree display value Sy. The target horizontal diffusion degree Sx' is a value calculated from the X-direction touch position detection value x'0 in the first adjustment region TA1. In other words, the target horizontal diffusion degree Sx' is a value defined by the X-direction touch position detection value x'0 in the first adjustment region TA1. The target vertical diffusion degree Sy' is a value calculated from the Y-direction touch position detection value y'0 in the second adjustment region TA2. In other words, the target vertical diffusion degree Sy' is a value defined by the Y-direction touch position detection value y'0 in the second adjustment region TA2.

The horizontal diffusion degree of the illumination device 1 is changed at different adjustment scales depending on the magnitude of the horizontal diffusion degree difference value ΔSx, which is calculated at intervals of a predetermined setting value change time (second time threshold) T2*th* (for example, 0.5 sec) in the illumination control processing according to the first embodiment to be described later. The vertical diffusion degree of the illumination device 1 is changed at different adjustment scales (change steps) depending on the magnitude of the vertical diffusion degree difference value ΔSy, which is calculated at intervals of the predetermined setting value change time (second time threshold) T2*th* in the illumination control processing according to the first embodiment to be described later.

In the first embodiment, as illustrated in FIG. 18, the second storage region of the storage circuit 223 stores a horizontal diffusion degree coarse adjustment scale setting value LSCx (first adjustment interval), a vertical diffusion degree coarse adjustment scale setting value LSCy (first adjustment interval), a horizontal diffusion degree fine adjustment scale setting value SSCx (second adjustment interval), and a vertical diffusion degree fine adjustment scale setting value SSCy (second adjustment interval).

The horizontal diffusion degree coarse adjustment scale setting value LSCx and the vertical diffusion degree coarse adjustment scale setting value LSCy are set to, for example, 20%. The horizontal diffusion degree fine adjustment scale setting value SSCx and the vertical diffusion degree fine adjustment scale setting value SSCy are set to, for example, 1%. These adjustment scales are exemplary and not limited to the above description. For example, the horizontal diffusion degree coarse adjustment scale setting value LSCx and the vertical diffusion degree coarse adjustment scale setting value LSCy may be set to, for example, 10% or 30%, and the horizontal diffusion degree fine adjustment scale setting value SSCx and the vertical diffusion degree fine adjustment scale setting value SSCy may be set to, for example, 0.5% or 2%. In the first embodiment, the horizontal diffusion degree fine adjustment scale setting value SSCx (second adjustment interval) only needs to be an interval (step size) smaller than the horizontal diffusion degree coarse adjustment scale setting value LSCx (first adjustment interval), and the vertical diffusion degree fine adjustment scale setting value SSCy (second adjustment interval) only needs to be an interval (step size) smaller than the vertical diffusion degree coarse adjustment scale setting value LSCy (first adjustment interval). The horizontal diffusion degree coarse adjustment scale setting value LSCx, the vertical diffusion degree coarse adjustment scale setting value LSCy, the horizontal diffusion degree fine adjustment scale setting value SSCx, and the vertical diffusion degree fine adjustment scale setting value SSCy may be values that the user can set on the illumination control application.

The following describes specific examples of processing by the control device 200 for the illumination device 1 according to the first embodiment described above.

Figure 19:
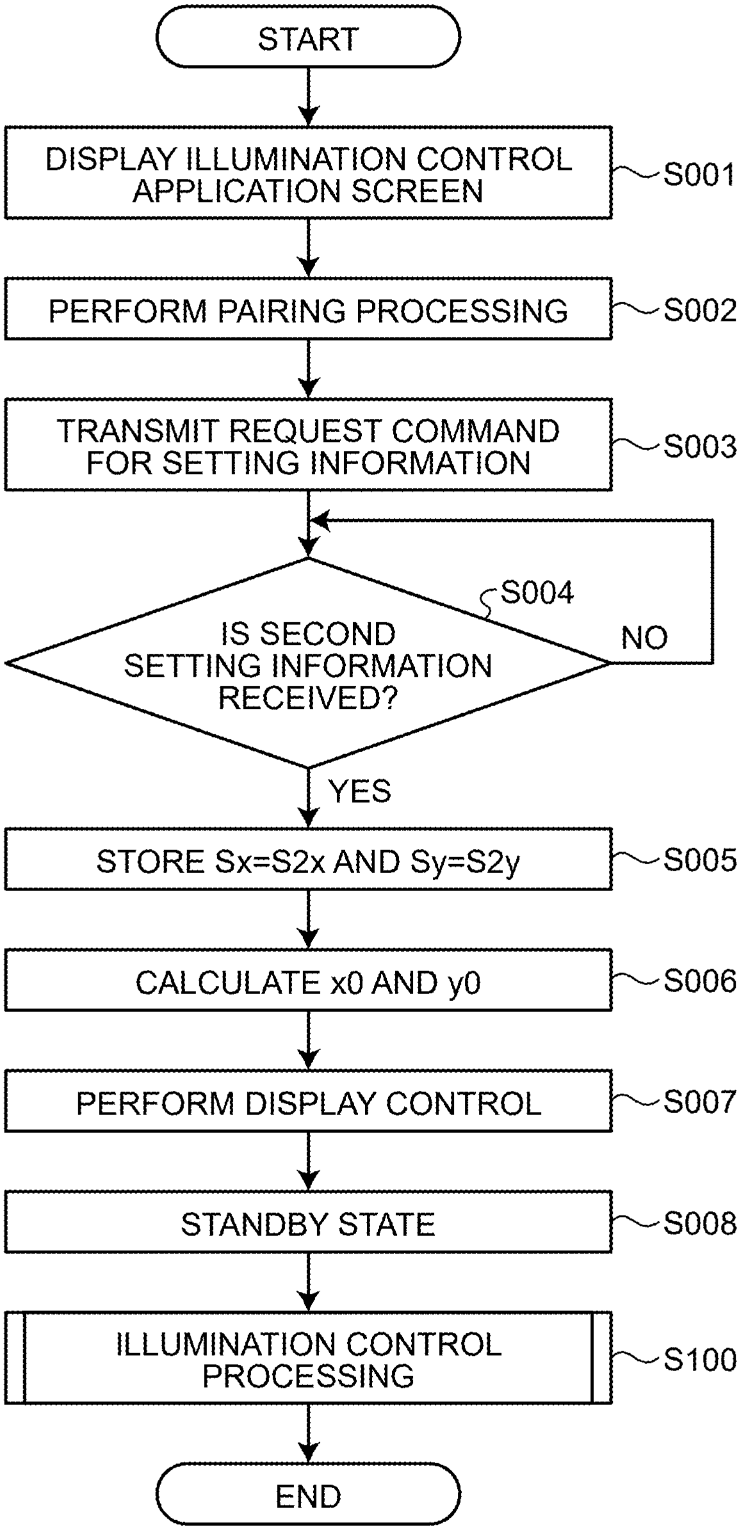
FIG. 19 is a flowchart illustrating an example of initial setting processing by the control device for an illumination device according to the first embodiment.

Processing during execution of the above-described illumination control application is achieved by application software executed by, for example, the CPU of a smartphone, a tablet, or the like constituting the control device 200. FIG. 19 is a flowchart illustrating an example of initial setting processing by the control device 200 for the illumination device 1 according to the first embodiment.

When the illumination control application is activated on the control device 200, the illumination control application screen 400 illustrated in FIG. 15 is displayed on the display region DA (step S001).

Before activation of the illumination control application, the illumination device 1 registered in advance in a space where pairing with the control device 200 is possible, is activated.

The transmission-reception circuit 225 of the control device 200 executes pairing processing with the illumination device 1 registered as a control target device in advance and activated in a space where pairing with the control device 200 is possible (step S002), and transmits a request command for the second setting information to the control target device (illumination device 1) (step S003).

The transmission-reception circuit 111 of the illumination device 1 reads the second setting information stored in the storage circuit 113 and transmits the second setting information to the control device 200. The electrode drive circuit 112 of the illumination device 1 supplies drive voltage corresponding to the second setting information to the drive electrodes 10 and 13 of each liquid crystal cell 2 of the optical element 100.

The transmission-reception circuit 225 of the control device 200 determines whether the second setting information is received from the illumination device 1 (step S004). If the second setting information is not received from the illumination device 1 (No at step S004), the processing at step S004 is re-executed.

If the second setting information is received from the illumination device 1 (Yes at step S004), the transmission-reception circuit 225 stores, in the first storage region of the storage circuit 223 illustrated in FIG. 17, the Dx-direction light diffusion degree S2*x* in the second setting information of the illumination device 1 as the horizontal diffusion degree display value Sx, and the Dy-direction light diffusion degree S2*y* therein as the vertical diffusion degree display value Sy (step S005).

A horizontal diffusion degree initial value Sx_ini (for example, 50%) and a vertical diffusion degree initial value Sy_ini (for example, 50%) are stored in the first storage region. For example, after the initial activation of the illumination device 1 or after the illumination device 1 activated in a space where pairing is possible is registered as a control target device, the following processing may be performed in which, in place of the above-described processing at steps S003 to S005, the horizontal diffusion degree initial value Sx_ini (for example, 50% illustrated in FIG. 17) is set as the horizontal diffusion degree display value Sx, the vertical diffusion degree initial value Sy_ini (for example, 50% illustrated in FIG. 17) is set as the vertical diffusion degree display value Sy, and the horizontal diffusion degree display value Sx and the vertical diffusion degree display value Sy may be transmitted as the first setting information (S1*x* and S1*y*) to the registered illumination device 1. In this case, the transmission-reception circuit 111 of the illumination device 1 stores, in the storage circuit 113, the first setting information (S1*x* and S1*y*) received from the control device 200 as the second setting information (S2*x* and S2*y*). In addition, the electrode drive circuit 112 of the illumination device 1 supplies drive voltage corresponding to the second setting information to the drive electrodes 10 and 13 of each liquid crystal cell 2 of the optical element 100.

The control device 200 calculates the X-direction position display value x0 of the light distribution shape object OBJ by using Expression (3) described above based on the horizontal diffusion degree display value Sx stored in the first storage region of the storage circuit 223, calculates the Y-direction position display value y0 of the light distribution shape object OBJ by using Expression (6) described above based on the vertical diffusion degree display value Sy stored in the first storage region (step S006), and stores the display values x0 and y0 in the first storage region.

The display control circuit 231 of the control device 200 reflects the horizontal diffusion degree display value Sx, the X-direction position display value x0 of the light distribution shape object OBJ, the vertical diffusion degree display value Sy, and the Y-direction position display value y0 of the light distribution shape object OBJ, which are acquired in the above-described processing and stored in the first storage region of the storage circuit 223, to display control on the illumination control application screen 400 (step S007).

Figure 20:
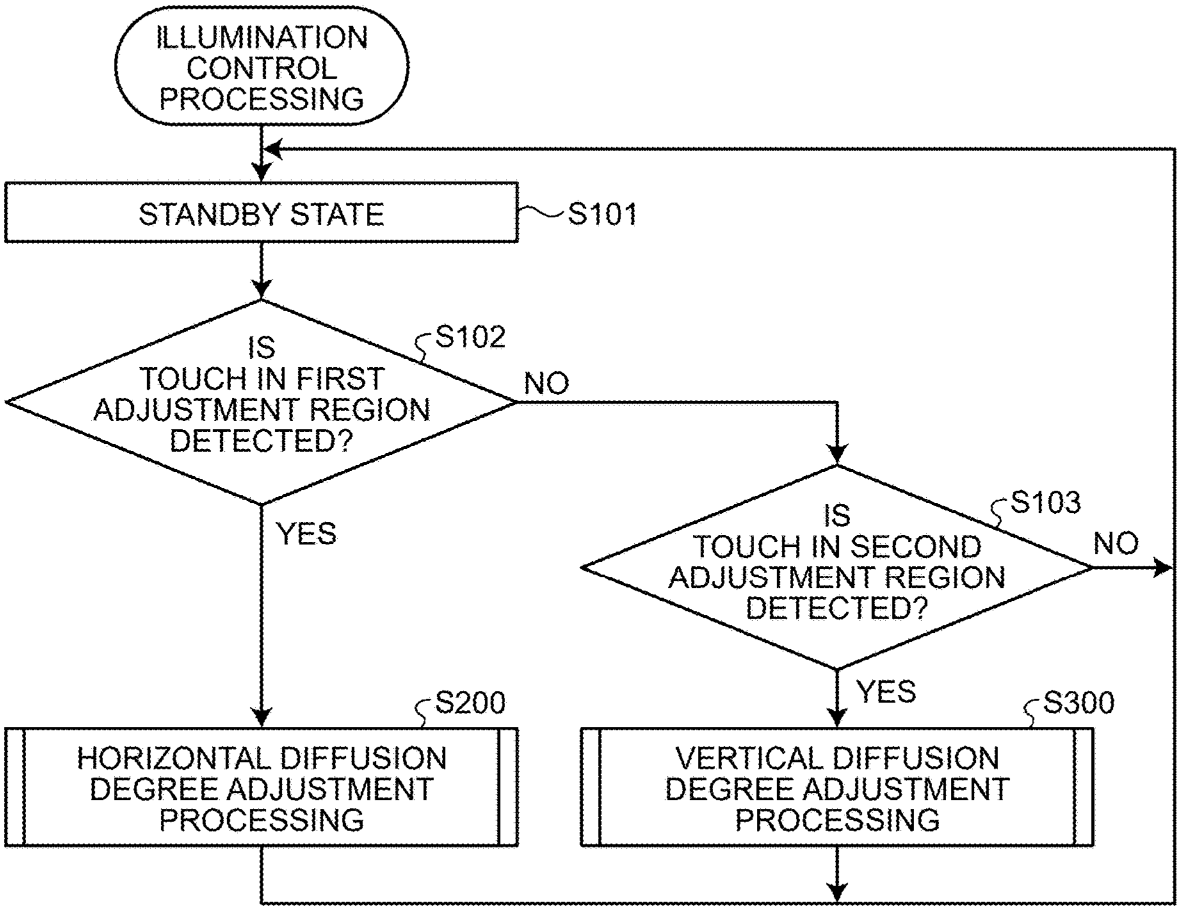
FIG. 20 is a flowchart illustrating an example of the overall flow of illumination control processing by the control device for an illumination device according to the first embodiment.

After the processing up to step S007 ends, the process transitions to a standby state (step S008), thereby transitioning to illumination control processing illustrated in FIG. 20 (step S100). FIG. 20 is a flowchart illustrating an example of the overall flow of the illumination control processing by the control device 200 for the illumination device 1 according to the first embodiment.

In the standby state illustrated in FIG. 20 (step S101), the control device 200 executes touch detection processing for the first adjustment region TA1 and the second adjustment region TA2 (steps S102 and S103).

Specifically, for example, if no touch is detected in the first adjustment region TA1 (No at step S102), the control device 200 executes touch detection in the second adjustment region TA2 (step S103). The present disclosure is not limited thereto and the control device 200 may execute touch detection in the first adjustment region TA1 when no touch is detected in the second adjustment region TA2.

If no touch is detected in the first adjustment region TA1 nor the second adjustment region TA2 (No at step S102 or No at step S103), the process returns to the standby state at step S101 to re-execute the processing at steps S101 to S103. The execution interval of the processing at steps S101 to S103 is, for example, 10 ms.

If a touch is detected in the first adjustment region TA1 (Yes at step S102), the control device 200 executes horizontal diffusion degree adjustment processing (step S200). FIG. 21 is a flowchart illustrating an example of the horizontal diffusion degree adjustment processing by the control device 200 for the illumination device 1 according to the first embodiment.

After having transitioned to the horizontal diffusion degree adjustment processing illustrated in FIG. 21, the control device 200 resets a count value T1 of a first timer that counts the continuation time of a touch in the first adjustment region TA1 (T1=0; step S201).

Subsequently, the control device 200 determines whether the count value T1 of the first timer has exceeded the predetermined long tap detection time (first time threshold) T1*th* (for example, 2 sec) (step S202). The long tap detection time (first time threshold) T1*th* is set to, for example, 200 counts (T1*th*=200) when 10 ms is defined as one count. The long tap detection time (first time threshold) T1*th* is not limited to 2 sec (=200).

If the count value T1 of the first timer is smaller than the predetermined long tap detection time T1*th* (T1<T1*th*; No at step S202), the control device 200 subsequently determines whether the touch state in the first adjustment region TA1 is continuous (step S203). If the touch state in the first adjustment region TA is not continuous (No at step S203), in other words, if a user's finger is released from the screen or if the touch detection position is out of the first adjustment region TA1, the process returns to the illumination control processing illustrated in FIG. 20, thereby transitioning to a standby state without adjustment of the control state of the horizontal diffusion degree of the illumination device 1 (step S101).

If the touch state in the first adjustment region TA1 is continuous (Yes at step S203), the processing at steps S202 to S203 is repeatedly executed until the count value T1 of the first timer exceeds the predetermined long tap detection time T1*th* (Yes at step S202).

If the count value T1 of the first timer exceeds the predetermined long tap detection time T1*th* (Yes at step S202), the control device 200 determines that the touch state is the long tap state (step S204), resets a count value T2 of a second timer that counts the predetermined setting value change time (second time threshold) T2*th* (T2=0; step S205), and executes processing of calculating the horizontal diffusion degree difference value ΔSx (hereinafter also simply referred to as "horizontal diffusion degree difference value calculation processing"). Specifically, the control device 200 detects the touch position in the X direction in the first adjustment region TA1 and stores the detected touch position in the first storage region of the storage circuit 223 illustrated in FIG. 17 as the X-direction touch position detection value x'0 (step S206). In addition, the control device 200 calculates the target horizontal diffusion degree Sx' corresponding to the detected X-direction touch position detection value x'0 (step S207) and stores the target horizontal diffusion degree Sx' in the first storage region illustrated in FIG. 17. The X-direction touch position detection value x'0 in the first adjustment region TA1 is different from the X-direction position display value x0 of the light distribution shape object OBJ.

Then, the control device 200 reads the horizontal diffusion degree display value Sx and the target horizontal diffusion degree Sx' from the first storage region, calculates the horizontal diffusion degree difference value ΔSx (ΔSx=Sx'−Sx; step S208), and determines whether the magnitude |ΔSx| of the horizontal diffusion degree difference value ΔSx is smaller than the magnitude |SSCx| of the horizontal diffusion degree fine adjustment scale setting value SSCx (second adjustment interval) (step S209).

If the magnitude |ΔSx| of the horizontal diffusion degree difference value ΔSx is equal to or larger than the magnitude |SSCx| of the horizontal diffusion degree fine adjustment scale setting value SSCx (No at step S209), the control device 200 subsequently determines whether the magnitude |ΔSx| of the horizontal diffusion degree difference value ΔSx exceeds the magnitude |LSCx| of the horizontal diffusion degree coarse adjustment scale setting value LSCx (step S211).

Figure 22:
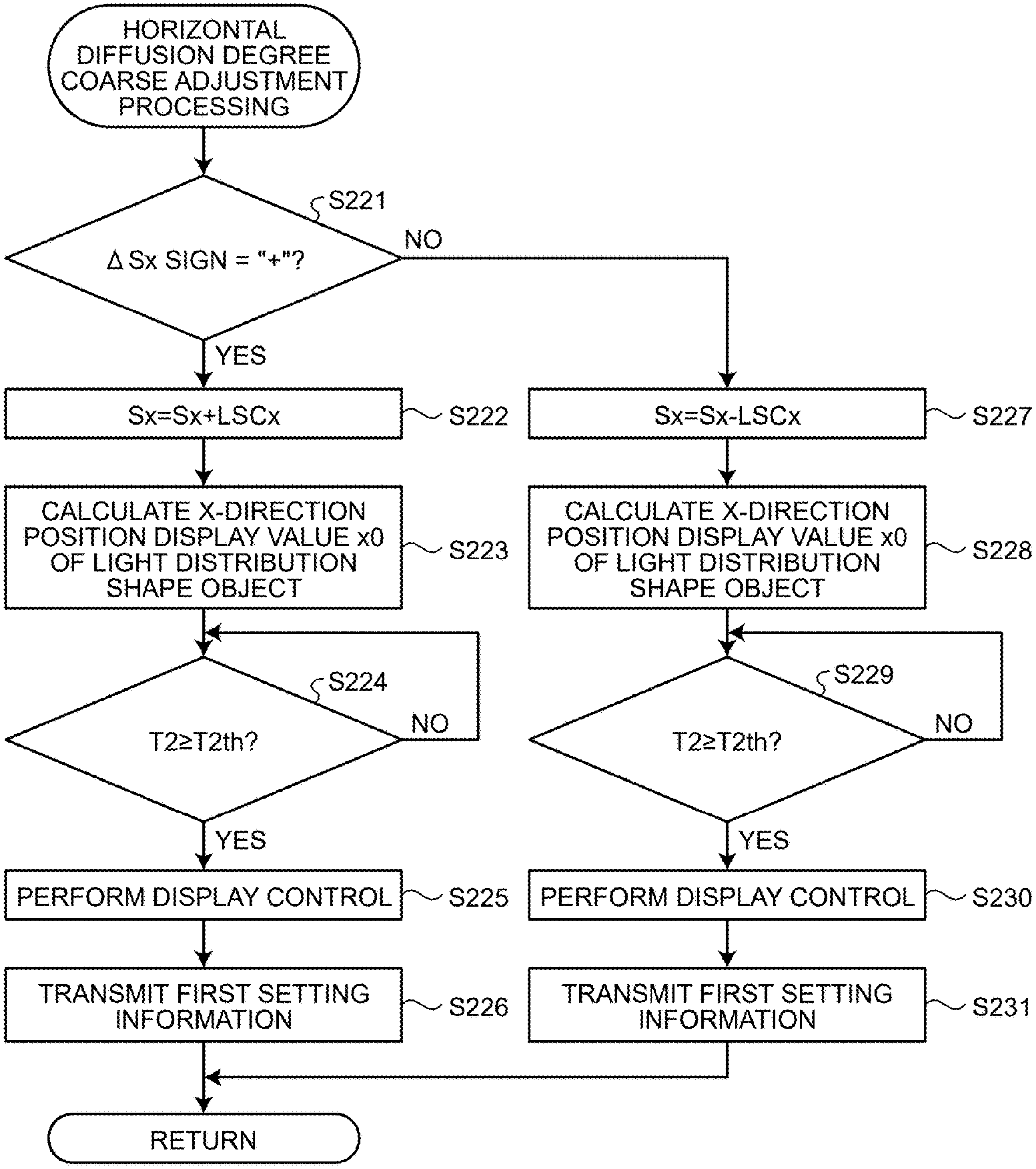
FIG. 22 is a flowchart illustrating an example of horizontal diffusion degree coarse adjustment processing by the control device for an illumination device according to the first embodiment.

If the magnitude |ΔSx| of the horizontal diffusion degree difference value ΔSx exceeds the magnitude |LSCx| of the horizontal diffusion degree coarse adjustment scale setting value LSCx (Yes at step S211), the control device 200 executes horizontal diffusion degree coarse adjustment processing (step S220). FIG. 22 is a flowchart illustrating an example of the horizontal diffusion degree coarse adjustment processing by the control device 200 for the illumination device 1 according to the first embodiment.

The control device 200 reads the sign of the horizontal diffusion degree difference value ΔSx and determines the adjustment direction of the horizontal diffusion degree display value Sx with respect to the target horizontal diffusion degree Sx'. Specifically, the control device 200 determines whether the sign of the horizontal diffusion degree difference value ΔSx is "+ (positive value)" (step S221).

If the sign of the horizontal diffusion degree difference value ΔSx is "+ (positive value)" (Yes at step S221), it is indicated that the adjustment direction of the horizontal diffusion degree display value Sx with respect to the target horizontal diffusion degree Sx' is a direction in which the horizontal diffusion degree of the illumination device 1 increases. In this case, the control device 200 adds the horizontal diffusion degree coarse adjustment scale setting value LSCx (first adjustment interval) to the horizontal diffusion degree display value Sx (step S222), thereby updating the horizontal diffusion degree display value Sx. In addition, the control device 200 calculates the X-direction position display value x0 of the light distribution shape object OBJ, which corresponds to the horizontal diffusion degree display value Sx (step S223), and stores the X-direction position display value x0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S224). The setting value change time (second time threshold) T2*th* is set to, for example, 50 counts (T2*th*=50) when 10 ms is defined as one count. The setting value change time (second time threshold) T2*th* is not limited to 0.5 sec (=50).

If the count value T2 of the second timer is smaller than the predetermined setting value change time T2*th* (T2<T2*th*; No at step S224), the processing at step S224 is repeatedly executed until the count value T2 of the second timer becomes equal to or larger than the predetermined setting value change time T2*th* (T2≥T2*th*; Yes at step S224). If the count value T2 of the second timer becomes equal to or larger than the predetermined setting value change time T2*th* (T2≥T2*th*; Yes at step S224), the display control circuit 231 of the control device 200 reflects the horizontal diffusion degree display value Sx and the X-direction position display value x0 of the light distribution shape object OBJ, which are acquired in the above-described processing and stored in the first storage region of the storage circuit 223, to display control on the illumination control application screen 400 (step S225). In addition, the transmission-reception circuit 225 of the control device 200 reads the horizontal diffusion degree display value Sx stored in the first storage region and transmits the read horizontal diffusion degree display value Sx as the first setting information (S1*x*=Sx) to the illumination device 1 (step S226).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 21, the control device 200 determines whether the long tap state is continuous (step S210). If the long tap state is not continuous (No at step S210), in other words, if a user's finger is released from the screen or if the touch detection position is out of the first adjustment region TA1, the process returns to the illumination control processing illustrated in FIG. 20, thereby transitioning to a standby state (step S101). Accordingly, the current horizontal diffusion degree display value Sx is finalized with the current horizontal diffusion degree display value Sx being reflected in the control state of the horizontal diffusion degree of the illumination device 1.

If the long tap state is continuous (Yes at step S210), the process returns to the processing at step S205. When the following conditions are satisfied: the long tap state is continuous (Yes at step S210), the magnitude |ΔSx| of the horizontal diffusion degree difference value ΔSx exceeds the magnitude |LSCx| of the horizontal diffusion degree coarse adjustment scale setting value LSCx (Yes at step S211), and the sign of the horizontal diffusion degree difference value ΔSx is "+ (positive value)" (Yes at step S221 in FIG. 22), the processing at steps S205 to S210 including the above-described horizontal diffusion degree coarse adjustment processing (step S220; FIG. 22) is repeatedly executed at intervals of the predetermined setting value change time (second time threshold) T2*th* until the magnitude |ΔSx| of the horizontal diffusion degree difference value ΔSx becomes equal to or smaller than the magnitude |LSCx| of the horizontal diffusion degree coarse adjustment scale setting value LSCx (No at step S211). Accordingly, the horizontal diffusion degree display value Sx is coarsely adjusted in steps of the horizontal diffusion degree coarse adjustment scale setting value LSCx (first adjustment interval) in a direction in which the horizontal diffusion degree display value Sx increases.

Referring back to FIG. 22, if the sign of the horizontal diffusion degree difference value ΔSx is "– (negative value)" (No at step S221), it is indicated that the adjustment direction of the horizontal diffusion degree display value Sx with respect to the target horizontal diffusion degree Sx' is a direction in which the horizontal diffusion degree of the illumination device 1 decreases. In this case, the control device 200 subtracts the horizontal diffusion degree coarse adjustment scale setting value LSCx (first adjustment interval) from the horizontal diffusion degree display value Sx (step S227), thereby updating the horizontal diffusion degree display value Sx. In addition, the control device 200 calculates the X-direction position display value x0 of the light distribution shape object OBJ, which corresponds to the horizontal diffusion degree display value Sx (step S228), and stores the X-direction position display value x0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S229).

If the count value T2 of the second timer is smaller than the predetermined setting value change time T2*th* (T2<T2*th*; No at step S229), the processing at step S229 is repeatedly executed until the count value T2 of the second timer becomes equal to or larger than the predetermined setting value change time T2*th* (T2≥T2*th*; Yes at step S229). If the count value T2 of the second timer becomes equal to or larger than the predetermined setting value change time T2*th* (T2≥T2*th*; Yes at step S229), the display control circuit 231 of the control device 200 reflects the horizontal diffusion degree display value Sx and the X-direction position display value x0 of the light distribution shape object OBJ, which are acquired in the above-described processing and stored in the first storage region of the storage circuit 223, to display control on the illumination control application screen 400 (step S230). In addition, the transmission-reception circuit 225 of the control device 200 reads the horizontal diffusion degree display value Sx stored in the first storage region and transmits the read horizontal diffusion degree display value Sx as the first setting information (S1*x*=Sx) to the illumination device 1 (step S231).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 21, the control device 200 determines whether the long tap state is continuous (step S210). If the long tap state is not continuous (No at step S210), in other words, if a user's finger is released from the screen or if the touch detection position is out of the first adjustment region TA1, the process returns to the illumination control processing illustrated in FIG. 20, thereby transitioning to a standby state (step S101). Accordingly, the current horizontal diffusion degree display value Sx is finalized with the current horizontal diffusion degree display value Sx being reflected in the control state of the horizontal diffusion degree of the illumination device 1.

If the long tap state is continuous (Yes at step S210), the process returns to the processing at step S205. When the following conditions are satisfied: the long tap state is continuous (Yes at step S210), the magnitude |ΔSx| of the horizontal diffusion degree difference value ΔSx exceeds the magnitude |LSCx| of the horizontal diffusion degree coarse adjustment scale setting value LSCx (Yes at step S211), and the sign of the horizontal diffusion degree difference value ΔSx is "– (negative value)" (No at step S221 in FIG. 22), the processing at steps S205 to S210 including the above-described horizontal diffusion degree coarse adjustment processing (step S220; FIG. 22) is repeatedly executed at intervals of the predetermined setting value change time (second time threshold) T2*th* until the magnitude |ΔSx| of the horizontal diffusion degree difference value ΔSx becomes equal to or smaller than the magnitude |LSCx| of the horizontal diffusion degree coarse adjustment scale setting value LSCx (No at step S211). Accordingly, the horizontal diffusion degree display value Sx is coarsely adjusted in steps of the horizontal diffusion degree coarse adjustment scale setting value LSCx (first adjustment interval) in a direction in which the horizontal diffusion degree display value Sx decreases.

Figure 23:
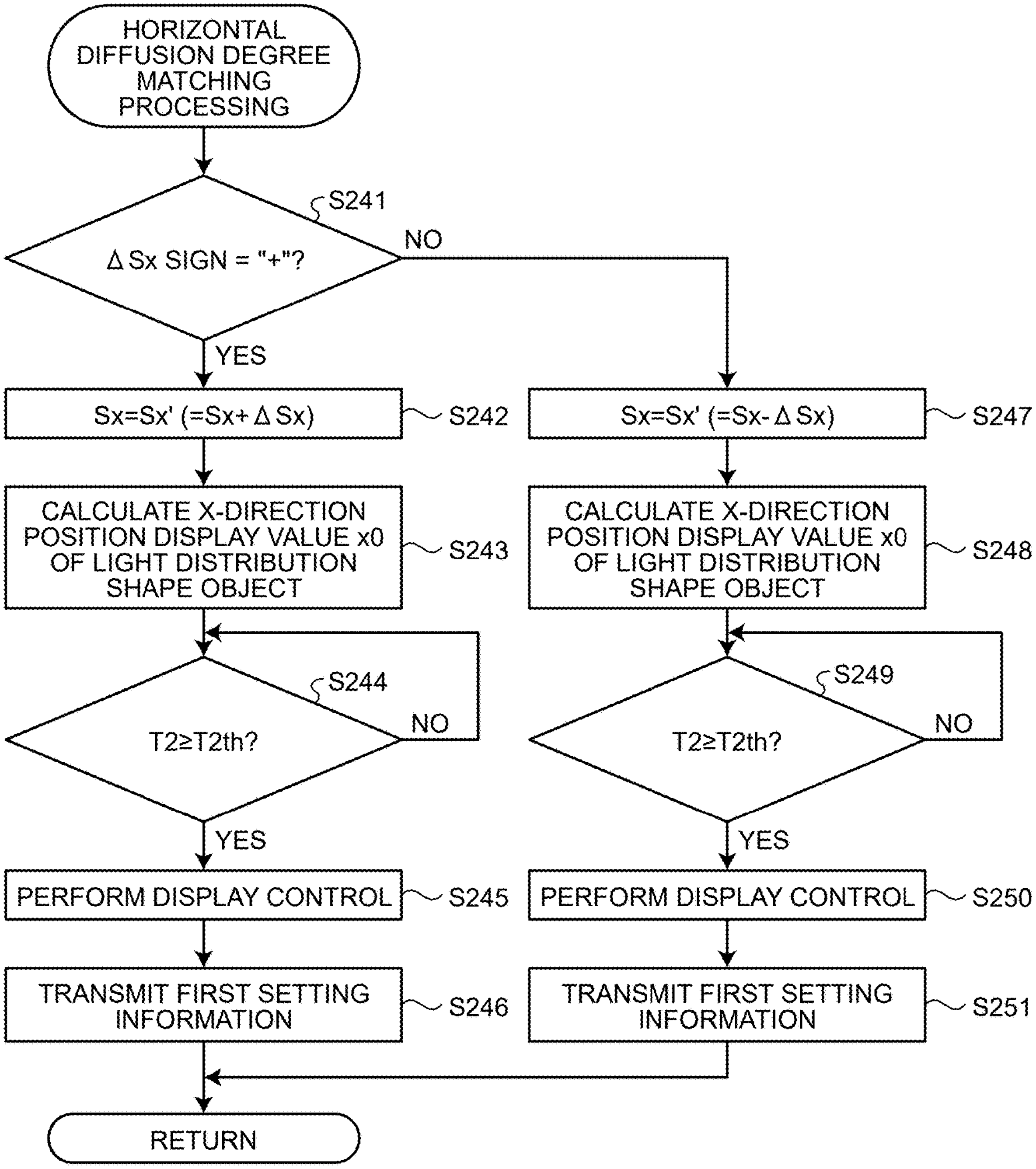
FIG. 23 is a flowchart illustrating an example of horizontal diffusion degree matching processing by the control device for an illumination device according to the first embodiment.

If the magnitude |ΔSx| of the horizontal diffusion degree difference value ΔSx becomes equal to or smaller than the magnitude |LSCx| of the horizontal diffusion degree coarse adjustment scale setting value LSCx (No at step S211), the control device 200 executes horizontal diffusion degree matching processing (step S240). FIG. 23 is a flowchart illustrating an example of the horizontal diffusion degree matching processing by the control device 200 for the illumination device 1 according to the first embodiment.

The control device 200 reads the sign of the horizontal diffusion degree difference value ΔSx and determines the adjustment direction of the horizontal diffusion degree display value Sx with respect to the target horizontal diffusion degree Sx'. Specifically, the control device 200 determines whether the sign of the horizontal diffusion degree difference value ΔSx is "+ (positive value)" (step S241).

If the sign of the horizontal diffusion degree difference value ΔSx is "+ (positive value)" (Yes at step S241), it is indicated that the adjustment direction of the horizontal diffusion degree display value Sx with respect to the target horizontal diffusion degree Sx' is a direction in which the horizontal diffusion degree of the illumination device 1 increases. In this case, the control device 200 performs processing of matching the horizontal diffusion degree display value Sx to the target horizontal diffusion degree Sx' (step S242). Specifically, the horizontal diffusion degree display value Sx is updated by adding the horizontal diffusion degree difference value ΔSx to the horizontal diffusion degree display value Sx. In addition, the control device 200 calculates the X-direction position display value x0 of the light distribution shape object OBJ, which corresponds to the horizontal diffusion degree display value Sx (step S243), and stores the X-direction position display value x0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S244).

If the count value T2 of the second timer is smaller than the predetermined setting value change time T2*th* (T2<T2*th*; No at step S244), the processing at step S244 is repeatedly executed until the count value T2 of the second timer becomes equal to or larger than the predetermined setting value change time T2*th* (T2≥T2*th*; Yes at step S244). If the count value T2 of the second timer becomes equal to or larger than the predetermined setting value change time T2*th* (T2≥T2*th*; Yes at step S244), the display control circuit 231 of the control device 200 reflects the horizontal diffusion degree display value Sx and the X-direction position display value x0 of the light distribution shape object OBJ, which are acquired in the above-described processing and stored in the first storage region of the storage circuit 223, to display control on the illumination control application screen 400 (step S245). Accordingly, the X-direction touch position detection value x'0 corresponding to the target horizontal diffusion degree Sx' and the X-direction position display value x0 of the light distribution shape object OBJ become identical or substantially identical (x'0≈x0). In addition, the transmission-reception circuit 225 of the control device 200 reads the horizontal diffusion degree display value Sx stored in the first storage region and transmits the read horizontal diffusion degree display value Sx as the first setting information (S1*x*=Sx) to the illumination device 1 (step S246).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100. Accordingly, the horizontal diffusion degree display value Sx corresponding to the X-direction touch detection position in the long tap state in the first adjustment region TA1 is reflected in the control state of the horizontal diffusion degree of the illumination device 1.

If the sign of the horizontal diffusion degree difference value ΔSx is "− (negative value)" (No at step S241), it is indicated that the adjustment direction of the horizontal diffusion degree display value Sx with respect to the target horizontal diffusion degree Sx' is a direction in which the horizontal diffusion degree of the illumination device 1 decreases. In this case, the control device 200 performs processing of matching the horizontal diffusion degree display value Sx to the target horizontal diffusion degree Sx' (step S247). Specifically, the horizontal diffusion degree display value Sx is updated by subtracting the horizontal diffusion degree difference value ΔSx from the horizontal diffusion degree display value Sx. In addition, the control device 200 calculates the X-direction position display value x0 of the light distribution shape object OBJ, which corresponds to the horizontal diffusion degree display value Sx (step S248), and stores the X-direction position display value x0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S249).

If the count value T2 of the second timer is smaller than the predetermined setting value change time T2*th* (T2<T2*th*; No at step S249), the processing at step S249 is repeatedly executed until the count value T2 of the second timer becomes equal to or larger than the predetermined setting value change time T2*th* (T2≥T2*th*; Yes at step S249). If the count value T2 of the second timer becomes equal to or larger than the predetermined setting value change time T2*th* (T2≥T2*th*; Yes at step S249), the display control circuit 231 of the control device 200 reflects the horizontal diffusion degree display value Sx and the X-direction position display value x0 of the light distribution shape object OBJ, which are acquired in the above-described processing and stored in the first storage region of the storage circuit 223, to display control on the illumination control application screen 400 (step S250). Accordingly, the X-direction touch position detection value x'0 corresponding to the target horizontal diffusion degree Sx' and the X-direction position display value x0 of the light distribution shape object OBJ become identical or substantially identical (x'0≈x0). In addition, the transmission-reception circuit 225 of the control device 200 reads the horizontal diffusion degree display value Sx stored in the first storage region and transmits the read horizontal diffusion degree display value Sx as the first setting information (S1*x*=Sx) to the illumination device 1 (step S251).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100. Accordingly, the horizontal diffusion degree display value Sx corresponding to the X-direction touch detection position in the long tap state in the first adjustment region TA1 is reflected in the control state of the horizontal diffusion degree of the illumination device 1.

Referring back to FIG. 21, the control device 200 resets the count value T2 of the second timer (T2=0; step S212) and executes the horizontal diffusion degree difference value calculation processing. Specifically, the control device 200 detects the touch position in the X direction in the first adjustment region TA1 and stores the detected touch position in the first storage region of the storage circuit 223 illustrated in FIG. 17 as the X-direction touch position detection value x'0 (step S213). In addition, the control device 200 calculates the target horizontal diffusion degree Sx' corresponding to the detected X-direction touch position detection value x'0 (step S214) and stores the target horizontal diffusion degree Sx' in the first storage region illustrated in FIG. 17.

Then, the control device 200 reads the horizontal diffusion degree display value Sx and the target horizontal diffusion degree Sx' from the first storage region, calculates the horizontal diffusion degree difference value ΔSx (ΔSx=Sx'−Sx; step S215), and determines whether the magnitude |ΔSx| of the horizontal diffusion degree difference value ΔSx is smaller than the magnitude |SSCx| of the horizontal diffusion degree fine adjustment scale setting value SSCx (second adjustment interval) (step S216).

If the magnitude |ΔSx| of the horizontal diffusion degree difference value ΔSx is equal to or larger than the magnitude |SSCx| of the horizontal diffusion degree fine adjustment scale setting value SSCx (No at step S216), the control device 200 subsequently determines whether the magnitude |ΔSx| of the horizontal diffusion degree difference value ΔSx is smaller than the magnitude |LSCx| of the horizontal diffusion degree coarse adjustment scale setting value LSCx (step S218).

If the magnitude |ΔSx| of the horizontal diffusion degree difference value ΔSx is equal to or larger than the magnitude |LSCx| of the horizontal diffusion degree coarse adjustment scale setting value LSCx (No at step S218), the process returns to the processing at step S211. If the magnitude |ΔSx| of the horizontal diffusion degree difference value ΔSx exceeds the magnitude |LSCx| of the horizontal diffusion degree coarse adjustment scale setting value LSCx (Yes at step S211), the control device 200 executes horizontal diffusion degree coarse adjustment processing (step S220). If the magnitude |ΔSx| of the horizontal diffusion degree difference value ΔSx is equal to or smaller than the magnitude |LSCx| of the horizontal diffusion degree coarse adjustment scale setting value LSCx (No at step S211), the control device 200 executes the horizontal diffusion degree matching processing (step S240).

Figure 24:
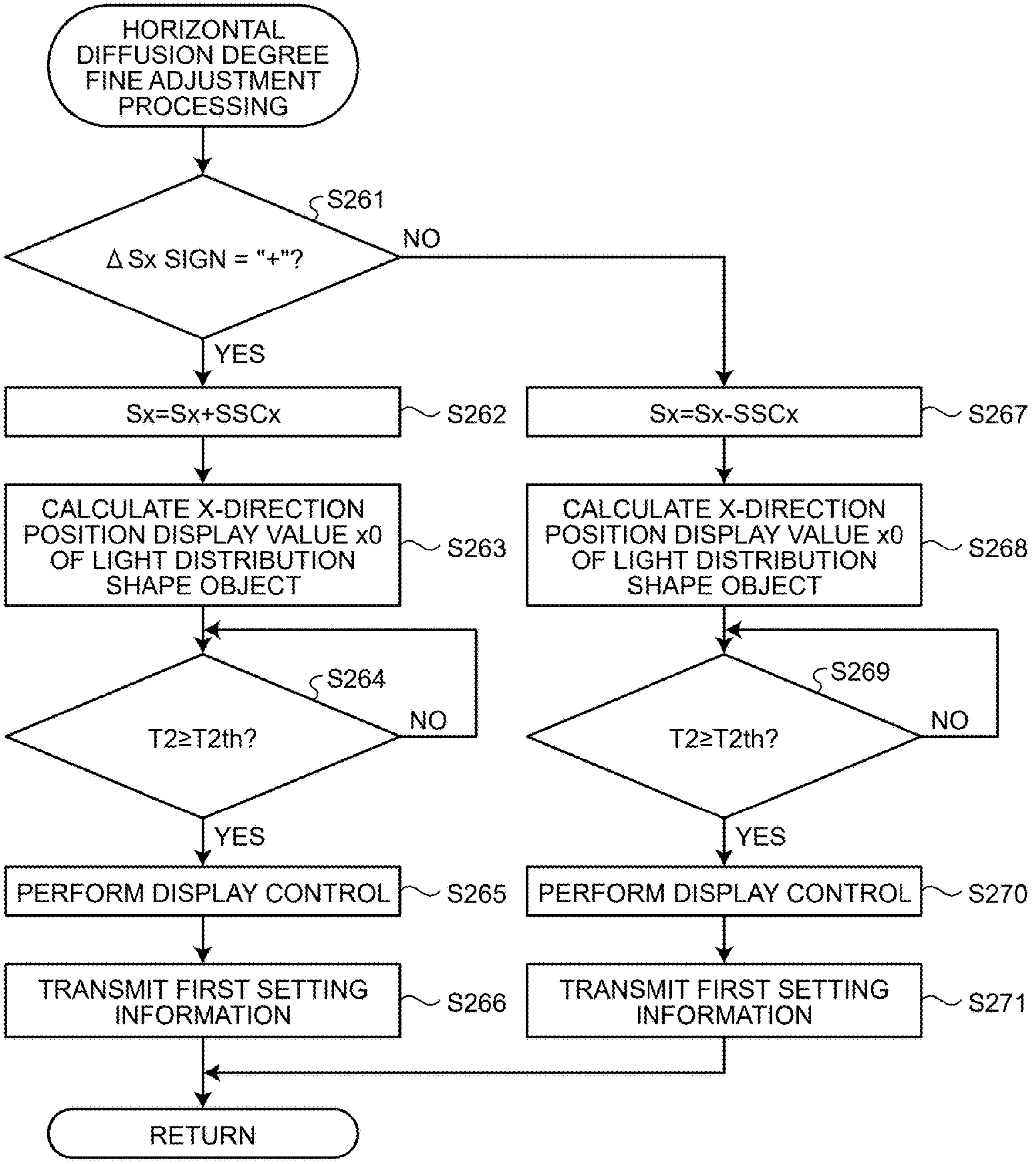
FIG. 24 is a flowchart illustrating an example of horizontal diffusion degree fine adjustment processing by the control device for an illumination device according to the first embodiment.

If the magnitude |ΔSx| of the horizontal diffusion degree difference value ΔSx is equal to or larger than the magnitude |LSCx| of the horizontal diffusion degree coarse adjustment scale setting value LSCx (Yes at step S218), the control device 200 executes horizontal diffusion degree fine adjustment processing (step S260). FIG. 24 is a flowchart illustrating an example of the horizontal diffusion degree fine adjustment processing by the control device 200 for the illumination device 1 according to the first embodiment.

The control device 200 reads the sign of the horizontal diffusion degree difference value ΔSx and determines the adjustment direction of the horizontal diffusion degree display value Sx with respect to the target horizontal diffusion degree Sx'. Specifically, the control device 200 determines whether the sign of the horizontal diffusion degree difference value ΔSx is "+ (positive value)" (step S261).

If the sign of the horizontal diffusion degree difference value ΔSx is "+ (positive value)" (Yes at step S261), it is indicated that the adjustment direction of the horizontal diffusion degree display value Sx with respect to the target horizontal diffusion degree Sx' is a direction in which the horizontal diffusion degree of the illumination device 1 increases. In this case, the control device 200 adds the horizontal diffusion degree fine adjustment scale setting value SSCx (second adjustment interval) to the horizontal diffusion degree display value Sx (step S262), thereby updating the horizontal diffusion degree display value Sx. In addition, the control device 200 calculates the X-direction position display value x0 of the light distribution shape object OBJ, which corresponds to the horizontal diffusion degree display value Sx (step S263), and stores the X-direction position display value x0 in the first storage region of the storage circuit 223 illustrated in FIG. 17.

Subsequently, the control device 200 determines whether the count value T2 of the second timer has exceeded the predetermined setting value change time (second time threshold) $T2th$ (for example, 0.5 sec) (step S264).

If the count value T2 of the second timer is smaller than the predetermined setting value change time $T2th$ ($T2<T2th$; No at step S264), the processing at step S264 is repeatedly executed until the count value T2 of the second timer becomes equal to or larger than the predetermined setting value change time $T2th$ ($T2\geq T2th$; Yes at step S264). If the count value T2 of the second timer becomes equal to or larger than the predetermined setting value change time $T2th$ ($T2\geq T2th$; Yes at step S264), the display control circuit 231 of the control device 200 reflects the horizontal diffusion degree display value Sx and the X-direction position display value x0 of the light distribution shape object OBJ, which are acquired in the above-described processing and stored in the first storage region of the storage circuit 223, to display control on the illumination control application screen 400 (step S265). In addition, the transmission-reception circuit 225 of the control device 200 reads the horizontal diffusion degree display value Sx stored in the first storage region and transmits the read horizontal diffusion degree display value Sx as the first setting information ($S1x=Sx$) to the illumination device 1 (step S266).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 21, the control device 200 determines whether the long tap state is continuous (step S217). If the long tap state is not continuous (No at step S217), in other words, if a user's finger is released from the screen or if the touch detection position is out of the first adjustment region TA1, the process returns to the illumination control processing illustrated in FIG. 20, thereby transitioning to a standby state (step S101). Accordingly, the current horizontal diffusion degree display value Sx is finalized with the current horizontal diffusion degree display value Sx being reflected in the control state of the horizontal diffusion degree of the illumination device 1.

If the long tap state is continuous (Yes at step S217), the process returns to the processing at step S212. When the following conditions are satisfied: the long tap state is continuous (Yes at step S217), the magnitude |ΔSx| of the horizontal diffusion degree difference value ΔSx is smaller than the magnitude |LSCx| of the horizontal diffusion degree coarse adjustment scale setting value LSCx (Yes at step S218), and the sign of the horizontal diffusion degree difference value ΔSx is "+ (positive value)" (Yes at step S261 in FIG. 24), the processing at steps S212 to S217 including the above-described horizontal diffusion degree fine adjustment processing (step S260; FIG. 24) is repeatedly executed at intervals of the predetermined setting value change time (second time threshold) $T2th$. Accordingly, the horizontal diffusion degree display value Sx is finely adjusted in steps of the horizontal diffusion degree fine adjustment scale setting value SSCx (second adjustment interval) in a direction in which the horizontal diffusion degree display value Sx increases.

Thereafter, if the magnitude |ΔSx| of the horizontal diffusion degree difference value ΔSx becomes smaller than the magnitude |SSCx| of the horizontal diffusion degree fine adjustment scale setting value SSCx (Yes at step S209) and the long tap state is canceled (No at step S210), the current horizontal diffusion degree display value Sx is finalized with the current horizontal diffusion degree display value Sx being reflected in the control state of the horizontal diffusion degree of the illumination device 1 in a state in which the X-direction touch position detection value x'0 in the first adjustment region TA1 substantially matches the X-direction position display value x0 of the light distribution shape object OBJ ($x'0\approx x0$).

Referring back to FIG. 24, if the sign of the horizontal diffusion degree difference value ΔSx is "− (negative value)" (No at step S261), it is indicated that the adjustment direction of the horizontal diffusion degree display value Sx with respect to the target horizontal diffusion degree Sx' is a direction in which the horizontal diffusion degree of the illumination device 1 decreases. In this case, the control device 200 subtracts the horizontal diffusion degree fine adjustment scale setting value SSCx (second adjustment interval) from the horizontal diffusion degree display value Sx (step S267), thereby updating the horizontal diffusion degree display value Sx. In addition, the control device 200 calculates the X-direction position display value x0 of the light distribution shape object OBJ, which corresponds to the horizontal diffusion degree display value Sx (step S268), and stores the X-direction position display value x0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S269).

If the count value T2 of the second timer is smaller than the predetermined setting value change time T2*th* (T2<T2*th*; No at step S269), the processing at step S269 is repeatedly executed until the count value T2 of the second timer becomes equal to or larger than the predetermined setting value change time T2*th* (T2≥T2*th*; Yes at step S269). If the count value T2 of the second timer becomes equal to or larger than the predetermined setting value change time T2*th* (T2≥T2*th*; Yes at step S269), the display control circuit 231 of the control device 200 reflects the horizontal diffusion degree display value Sx and the X-direction position display value x0 of the light distribution shape object OBJ, which are acquired in the above-described processing and stored in the first storage region of the storage circuit 223, to display control on the illumination control application screen 400 (step S270). In addition, the transmission-reception circuit 225 of the control device 200 reads the horizontal diffusion degree display value Sx stored in the first storage region and transmits the read horizontal diffusion degree display value Sx as the first setting information (S1*x*=Sx) to the illumination device 1 (step S271).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 21, the control device 200 determines whether the long tap state is continuous (step S217). If the long tap state is not continuous (No at step S217), in other words, if a user's finger is released from the screen or if the touch detection position is out of the first adjustment region TA1, the process returns to the illumination control processing illustrated in FIG. 20, thereby transitioning to a standby state (step S101). Accordingly, the current horizontal diffusion degree display value Sx is finalized with the current horizontal diffusion degree display value Sx being reflected in the control state of the horizontal diffusion degree of the illumination device 1.

If the long tap state is continuous (Yes at step S217), the process returns to the processing at step S212. When the following conditions are satisfied: the long tap state is continuous (Yes at step S217), the magnitude |ΔSx| of the horizontal diffusion degree difference value ΔSx is smaller than the magnitude |LSCx| of the horizontal diffusion degree coarse adjustment scale setting value LSCx (Yes at step S218), and the sign of the horizontal diffusion degree difference value ΔSx is "– (negative value)" (step S261 in FIG. 24; No), the processing at steps S212 to S217 including the above-described horizontal diffusion degree fine adjustment processing (step S260; FIG. 24) is repeatedly executed at intervals of the predetermined setting value change time (second time threshold) T2*th*. Accordingly, the horizontal diffusion degree display value Sx is finely adjusted in steps of the horizontal diffusion degree fine adjustment scale setting value SSCx (second adjustment interval) in a direction in which the horizontal diffusion degree display value Sx decreases.

Thereafter, if the magnitude |ΔSx| of the horizontal diffusion degree difference value ΔSx becomes smaller than the magnitude |SSCx| of the horizontal diffusion degree fine adjustment scale setting value SSCx (Yes at step S209 or Yes at step S216) and the long tap state is canceled (No at step S210 or No at step S217), the current horizontal diffusion degree display value Sx is finalized with the current horizontal diffusion degree display value Sx being reflected in the control state of the horizontal diffusion degree of the illumination device 1.

In the horizontal diffusion degree adjustment processing by the control device 200 according to the first embodiment, as described above, the horizontal diffusion degree coarse adjustment processing (step S220 in FIG. 21; FIG. 22), the horizontal diffusion degree matching processing (step S240 in FIG. 21; FIG. 23), or the horizontal diffusion degree fine adjustment processing (step S260 in FIG. 21; FIG. 24) is executed depending on the movement amount of the X-direction touch detection position in the long tap state in the first adjustment region TA1.

Specifically, after the user touches within the first adjustment region TA1 (Yes at step S102 in FIG. 20) and it is determined that the long tap state (step S204 in FIG. 21) is detected, the horizontal diffusion degree coarse adjustment processing (FIG. 22) is executed if the horizontal diffusion degree difference value ΔSx exceeds a horizontal diffusion degree coarse adjustment scale (first adjustment interval) (Yes at step S211 in FIG. 21), or the horizontal diffusion degree matching processing (FIG. 23) is executed if the horizontal diffusion degree difference value ΔSx is equal to or smaller than the horizontal diffusion degree coarse adjustment scale (first adjustment interval). The horizontal diffusion degree difference value ΔSx is the difference between the target horizontal diffusion degree Sx' corresponding to the movement amount of the X-direction touch detection position in the long tap state in the first adjustment region TA1 and the horizontal diffusion degree display value Sx. Accordingly, the X-direction touch position detection value x'0 corresponding to the target horizontal diffusion degree Sx' and the X-direction position display value x0 of the light distribution shape object OBJ become identical or substantially identical (x'0≈x0), and the horizontal diffusion degree display value Sx corresponding to the X-direction touch detection position in the long tap state in the first adjustment region TA1 is reflected in the control state of the horizontal diffusion degree of the illumination device 1.

After the X-direction touch position detection value x'0 corresponding to the target horizontal diffusion degree Sx' and the X-direction position display value x0 of the light distribution shape object OBJ become identical or substantially identical through the horizontal diffusion degree matching processing (FIG. 23) (x'0≈x0), the horizontal diffusion degree fine adjustment processing (FIG. 24) is executed if the user performs a swipe operation (operation in which the finger is slid while touching the screen) while maintaining the long tap state in the first adjustment region TA1 on the illumination control application screen 400 and if the horizontal diffusion degree difference value ΔSx is smaller than the horizontal diffusion degree coarse adjustment scale (first adjustment interval) (Yes at step S218 in FIG. 21). The horizontal diffusion degree coarse adjustment processing (FIG. 22) is executed if the horizontal diffusion degree difference value ΔSx exceeds the horizontal diffusion degree coarse adjustment scale (first adjustment interval)

(Yes at step S211 in FIG. 21), and thereafter, the horizontal diffusion degree matching processing (FIG. 23) is executed if the horizontal diffusion degree difference value ΔSx becomes equal to or smaller than the horizontal diffusion degree coarse adjustment scale (first adjustment interval) (No at step S211 in FIG. 21).

In this manner, through the horizontal diffusion degree adjustment processing by the control device 200 according to the first embodiment described above, the horizontal diffusion degree coarse adjustment processing illustrated in FIG. 22, the horizontal diffusion degree matching processing illustrated in FIG. 23, and the horizontal diffusion degree fine adjustment processing illustrated in FIG. 24 seamlessly transition to each other depending on the movement amount of the X-direction touch detection position in the long tap state in the first adjustment region TA1.

More specifically, if the magnitude |ΔSx| of the horizontal diffusion degree difference value ΔSx exceeds the magnitude |LSCx| of the horizontal diffusion degree coarse adjustment scale setting value LSCx (|ΔSx|>|LSCx|; Yes at step S211 in FIG. 21), the horizontal diffusion degree coarse adjustment processing (step S220 in FIG. 21; FIG. 22) is executed. Accordingly, the horizontal diffusion degree display value Sx corresponding to the X-direction position display value x0 of the light distribution shape object OBJ is coarsely adjusted in a direction toward the target horizontal diffusion degree Sx' corresponding to the X-direction touch position detection value x'0.

The horizontal diffusion degree matching processing (step S240 in FIG. 21; FIG. 23) is executed in both cases: when the magnitude |ΔSx| of the horizontal diffusion degree difference value ΔSx upon transition to the long tap state is equal to or larger than the magnitude |SSCx| of the horizontal diffusion degree fine adjustment scale setting value SSCx (|ΔSx|≥|SSCx|; No at step S209 in FIG. 21) and is equal to or smaller than the magnitude |LSCx| of the horizontal diffusion degree coarse adjustment scale setting value LSCx (|ΔSx|≤|LSCx|; No at step S211 in FIG. 21); and when the magnitude |ΔSx| of the horizontal diffusion degree difference value ΔSx after the horizontal diffusion degree coarse adjustment processing becomes equal to or larger than the magnitude |SSCx| of the horizontal diffusion degree fine adjustment scale setting value SSCx (|ΔSx|≥|SSCx|; No at step S209 in FIG. 21) and becomes equal to or smaller than the magnitude |LSCx| of the horizontal diffusion degree coarse adjustment scale setting value LSCx (|ΔSx|≤|LSCx|; No at step S211 in FIG. 21). Accordingly, the horizontal diffusion degree display value Sx corresponding to the X-direction position display value x0 of the light distribution shape object OBJ matches the target horizontal diffusion degree Sx' corresponding to the X-direction touch position detection value x'0.

After the horizontal diffusion degree matching processing is executed, the horizontal diffusion degree fine adjustment processing (step S260 in FIG. 21; FIG. 24) is executed if the magnitude |ΔSx| of the horizontal diffusion degree difference value ΔSx is equal to or larger than the magnitude |SSCx| of the horizontal diffusion degree fine adjustment scale setting value SSCx (|ΔSx|≥|SSCx|; No at step S209 in FIG. 21) and is smaller than the magnitude |LSCx| of the horizontal diffusion degree coarse adjustment scale setting value LSCx (|ΔSx|<|LSCx|; Yes at step S218 in FIG. 21). Accordingly, the horizontal diffusion degree display value Sx corresponding to the X-direction position display value x0 of the light distribution shape object OBJ is finely adjusted in a direction toward the target horizontal diffusion degree Sx' corresponding to the X-direction touch position detection value x'0.

After the horizontal diffusion degree matching processing or the horizontal diffusion degree fine adjustment processing is executed, the process starting at step S211 in FIG. 21 is re-executed if the magnitude |ΔSx| of the horizontal diffusion degree difference value ΔSx becomes equal to or larger than the magnitude |LSCx| of the horizontal diffusion degree coarse adjustment scale setting value LSCx (|ΔSx|≥|LSCx|; No at step S218 in FIG. 21).

Specifically, after the horizontal diffusion degree matching processing or the horizontal diffusion degree fine adjustment processing is executed, the horizontal diffusion degree matching processing (step S240 in FIG. 21; FIG. 23) is executed if the magnitude |ΔSx| of the horizontal diffusion degree difference value ΔSx becomes equal to the magnitude |LSCx| of the horizontal diffusion degree coarse adjustment scale setting value LSCx (|ΔSx|=|LSCx|; No at step S218 in FIG. 21 and Yes at step S111 in FIG. 21). Accordingly, the horizontal diffusion degree display value Sx corresponding to the X-direction position display value x0 of the light distribution shape object OBJ matches again the target horizontal diffusion degree Sx' corresponding to the X-direction touch position detection value x'0.

After the horizontal diffusion degree matching processing or the horizontal diffusion degree fine adjustment processing is executed, the horizontal diffusion degree coarse adjustment processing (step S220 in FIG. 21; FIG. 22) is executed if the magnitude |ΔSx| of the horizontal diffusion degree difference value ΔSx exceeds the magnitude |LSCx| of the horizontal diffusion degree coarse adjustment scale setting value LSCx (|ΔSx|>|LSCx|; No at step S218 in FIG. 21 and Yes at step S211 in FIG. 21). Accordingly, the horizontal diffusion degree display value Sx corresponding to the X-direction position display value x0 of the light distribution shape object OBJ is again coarsely adjusted in a direction toward the target horizontal diffusion degree Sx' corresponding to the X-direction touch position detection value x'0. Then, if the magnitude |ΔSx| of the horizontal diffusion degree difference value ΔSx becomes equal to or larger than the magnitude |SSCx| of the horizontal diffusion degree fine adjustment scale setting value SSCx (|ΔSx|≥|SSCx|; No at step S209 in FIG. 21) and becomes equal to or smaller than the magnitude |LSCx| of the horizontal diffusion degree coarse adjustment scale setting value LSCx (|ΔSx|≤|LSCx|; No at step S211 in FIG. 21), the horizontal diffusion degree matching processing (step S240 in FIG. 21; FIG. 23) is executed. Accordingly, the horizontal diffusion degree display value Sx corresponding to the X-direction position display value x0 of the light distribution shape object OBJ matches again the target horizontal diffusion degree Sx' corresponding to the X-direction touch position detection value x'0.

Referring back to FIG. 20, if a touch is detected in the second adjustment region TA2 (Yes at step S103), the control device 200 executes vertical diffusion degree adjustment processing (step S300). FIG. 25 is a flowchart illustrating an example of the vertical diffusion degree adjustment processing by the control device 200 for the illumination device 1 according to the first embodiment.

After having transitioned to the vertical diffusion degree adjustment processing illustrated in FIG. 25, the control device 200 resets a count value T1 of a first timer that counts the continuation time of a touch in the second adjustment region TA2 (T1=0; step S301).

Subsequently, the control device 200 determines whether the count value T1 of the first timer has exceeded the predetermined long tap detection time (first time threshold) T1*th* (for example, 2 sec) (step S302). The long tap detection time (first time threshold) T1*th* is set to, for example, 200 counts (T1*th*=200) when 10 ms is defined as one count. The long tap detection time (first time threshold) T1*th* is not limited to 2 sec (=200).

If the count value T1 of the first timer is smaller than the predetermined long tap detection time T1*th* (T1<T1*th*; No at step S302), the control device 200 subsequently determines whether the touch state in the second adjustment region TA2 is continuous (step S303). If the touch state in the second adjustment region TA2 is not continuous (No at step S303), in other words, if a user's finger is released from the screen or if the touch detection position is out of the second adjustment region TA2, the process returns to the illumination control processing illustrated in FIG. 20, thereby transitioning to a standby state without adjustment of the control state of the vertical diffusion degree of the illumination device 1 (step S101).

If the touch state in the second adjustment region TA2 is continuous (Yes at step S303), the processing at steps S302 to S303 is repeatedly executed until the count value T1 of the first timer exceeds the predetermined long tap detection time T1*th* (Yes at step S302).

If the count value T1 of the first timer exceeds the predetermined long tap detection time T1*th* (Yes at step S302), the control device 200 determines that the touch state is the long tap state (step S304), resets the count value T2 of the second timer that counts the predetermined setting value change time (second time threshold) T2*th* (T2=0; step S305), and executes processing of calculating the vertical diffusion degree difference value ΔSy (hereinafter also simply referred to as "vertical diffusion degree difference value calculation processing"). Specifically, the control device 200 detects the touch position in the Y direction in the second adjustment region TA2 and stores the detected touch position in the first storage region of the storage circuit 223 illustrated in FIG. 17 as a Y-direction touch position detection value y'0 (step S306). In addition, the control device 200 calculates the target vertical diffusion degree Sy' corresponding to the detected Y-direction touch position detection value y'0 (step S307) and stores the target vertical diffusion degree Sy' in the first storage region illustrated in FIG. 17. The Y-direction touch position detection value y'0 in the second adjustment region TA2 is different from the Y-direction position display value y0 of the light distribution shape object OBJ.

Then, the control device 200 reads the vertical diffusion degree display value Sy and the target vertical diffusion degree Sy' from the first storage region, calculates the vertical diffusion degree difference value ΔSy (ΔSy=Sy'−Sy; step S308), and determines whether the magnitude |ΔSy| of the vertical diffusion degree difference value ΔSy is smaller than the magnitude |SSCy| of the vertical diffusion degree fine adjustment scale setting value SSCy (second adjustment interval) (step S309).

If the magnitude |ΔSy| of the vertical diffusion degree difference value ΔSy is equal to or larger than the magnitude |SSCy| of the vertical diffusion degree fine adjustment scale setting value SSCy (No at step S309), the control device 200 subsequently determines whether the magnitude |ΔSy| of the vertical diffusion degree difference value ΔSy exceeds the magnitude |LSCy| of the vertical diffusion degree coarse adjustment scale setting value LSCy (step S311).

Figure 26:
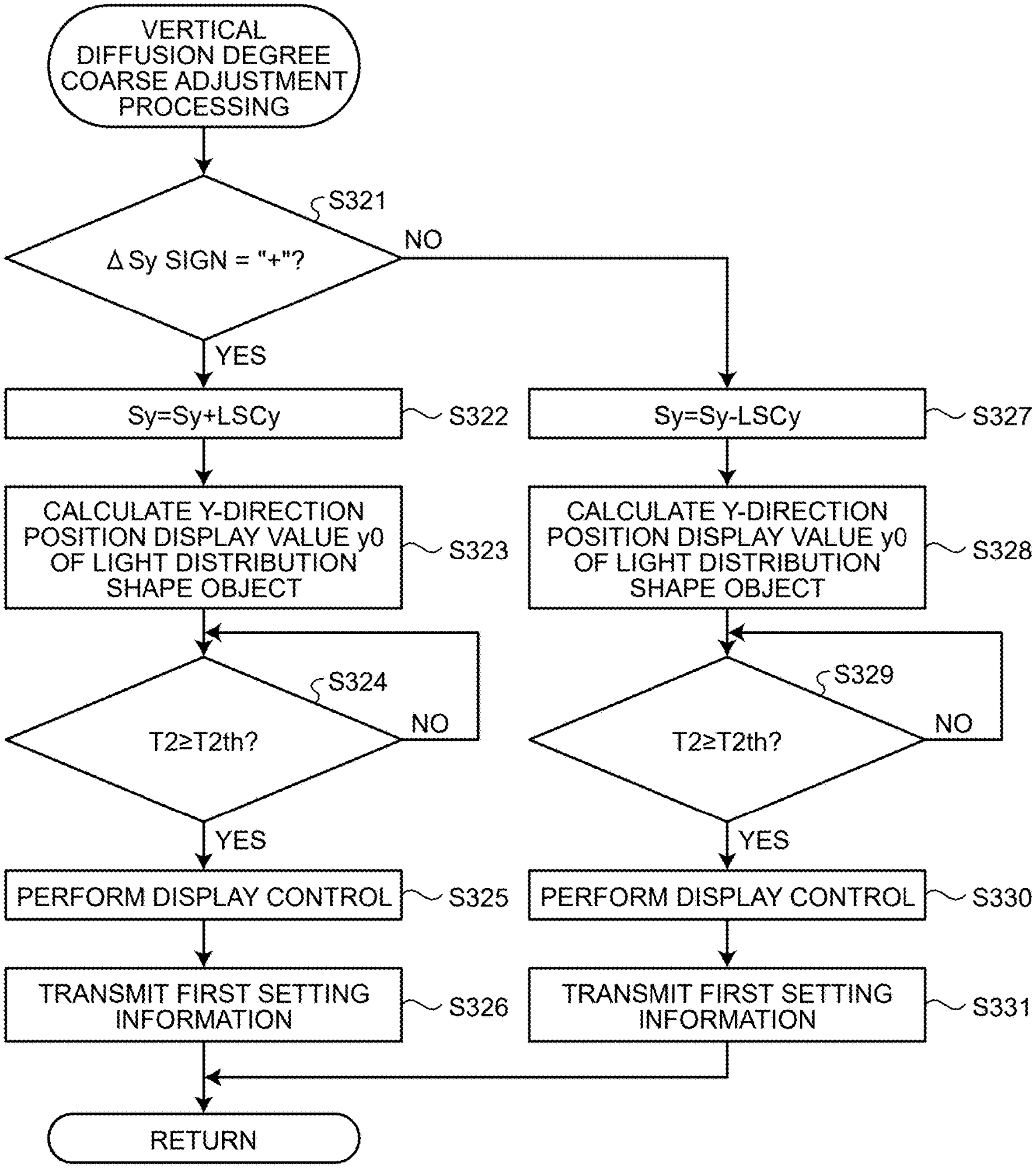
FIG. 26 is a flowchart illustrating an example of vertical diffusion degree coarse adjustment processing by the control device for an illumination device according to the first embodiment.

If the magnitude |ΔSy| of the vertical diffusion degree difference value ΔSy exceeds the magnitude |LSCy| of the vertical diffusion degree coarse adjustment scale setting value LSCy (Yes at step S311), the control device 200 executes vertical diffusion degree coarse adjustment processing (step S320). The vertical diffusion degree coarse adjustment processing illustrated in FIG. 26 is executed. FIG. 26 is a flowchart illustrating an example of the vertical diffusion degree coarse adjustment processing by the control device 200 for the illumination device 1 according to the first embodiment.

The control device 200 reads the sign of the vertical diffusion degree difference value ΔSy and determines the adjustment direction of the vertical diffusion degree display value Sy with respect to the target vertical diffusion degree Sy'. Specifically, the control device 200 determines whether the sign of the vertical diffusion degree difference value ΔSy is "+ (positive value)" (step S321).

If the sign of the vertical diffusion degree difference value ΔSy is "+ (positive value)" (Yes at step S321), it is indicated that the adjustment direction of the vertical diffusion degree display value Sy with respect to the target vertical diffusion degree Sy' is a direction in which the vertical diffusion degree of the illumination device 1 increases. In this case, the control device 200 adds the vertical diffusion degree coarse adjustment scale setting value LSCy (first adjustment interval) to the vertical diffusion degree display value Sy (step S322), thereby updating the vertical diffusion degree display value Sy. In addition, the control device 200 calculates the Y-direction position display value y0 of the light distribution shape object OBJ, which corresponds to the vertical diffusion degree display value Sy (step S323), and stores the Y-direction position display value y0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S324). The setting value change time (second time threshold) T2*th* is set to, for example, 50 counts (T2*th*=50) when 10 ms is defined as one count. Note that the setting value change time (second time threshold) T2*th* is not limited to 0.5 sec (=50).

If the count value T2 of the second timer is smaller than the predetermined setting value change time T2*th* (T2<T2*th*; No at step S324), the processing at step S324 is repeatedly executed until the count value T2 of the second timer becomes equal to or larger than the predetermined setting value change time T2*th* (T2≥T2*th*; Yes at step S324). If the count value T2 of the second timer becomes equal to or larger than the predetermined setting value change time T2*th* (T2≥T2*th*; Yes at step S324), the display control circuit 231 of the control device 200 reflects the vertical diffusion degree display value Sy and the Y-direction position display value y0 of the light distribution shape object OBJ, which are acquired in the above-described processing and stored in the first storage region of the storage circuit 223, to display control on the illumination control application screen 400 (step S325). In addition, the transmission-reception circuit 225 of the control device 200 reads the vertical diffusion degree display value Sy stored in the first storage region and transmits the read vertical diffusion degree display value Sy as the first setting information (S1*y*=Sy) to the illumination device 1 (step S326).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 25, the control device 200 determines whether the long tap state is continuous (step S310). If the long tap state is not continuous (No at step S310), in other words, if a user's finger is released from the screen or if the touch detection position is out of the second adjustment region TA2, the process returns to the illumination control processing illustrated in FIG. 20, thereby transitioning to a standby state (step S101). Accordingly, the current vertical diffusion degree display value Sy is finalized with the current vertical diffusion degree display value Sy being reflected in the control state of the vertical diffusion degree of the illumination device 1.

If the long tap state is continuous (Yes at step S310), the process returns to the processing at step S305. When the following conditions are satisfied: the long tap state is continuous (Yes at step S310), the magnitude |ΔSy| of the vertical diffusion degree difference value ΔSy exceeds the magnitude |LSCy| of the vertical diffusion degree coarse adjustment scale setting value LSCy (Yes at step S311), and the sign of the vertical diffusion degree difference value ΔSy is "+ (positive value)" (Yes at step S321), the processing at steps S305 to S310 including the above-described vertical diffusion degree coarse adjustment processing (step S320; FIG. 26) is repeatedly executed at intervals of the predetermined setting value change time (second time threshold) T2*th* until the magnitude |ΔSy| of the vertical diffusion degree difference value ΔSy becomes equal to or smaller than the magnitude |LSCy| of the vertical diffusion degree coarse adjustment scale setting value LSCy (No at step S311). Accordingly, the vertical diffusion degree display value Sy is coarsely adjusted in steps of the vertical diffusion degree coarse adjustment scale setting value LSCy (first adjustment interval) in a direction in which the vertical diffusion degree display value Sy increases.

Referring back to FIG. 26, if the sign of the vertical diffusion degree difference value ΔSy is "− (negative value)" (No at step S321), it is indicated that the adjustment direction of the vertical diffusion degree display value Sy with respect to the target vertical diffusion degree Sy' is a direction in which the vertical diffusion degree of the illumination device 1 decreases. In this case, the control device 200 subtracts the vertical diffusion degree coarse adjustment scale setting value LSCy (first adjustment interval) from the vertical diffusion degree display value Sy (step S327), thereby updating the vertical diffusion degree display value Sy. In addition, the control device 200 calculates the Y-direction position display value y0 of the light distribution shape object OBJ, which corresponds to the vertical diffusion degree display value Sy (step S328), and stores the Y-direction position display value y0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S329).

If the count value T2 of the second timer is smaller than the predetermined setting value change time T2*th* (T2<T2*th*; No at step S329), the processing at step S329 is repeatedly executed until the count value T2 of the second timer becomes equal to or larger than the predetermined setting value change time T2*th* (T2≥T2*th*; Yes at step S329). If the count value T2 of the second timer becomes equal to or larger than the predetermined setting value change time T2*th* (T2≥T2*th*; Yes at step S329), the display control circuit 231 of the control device 200 reflects the vertical diffusion degree display value Sy and the Y-direction position display value y0 of the light distribution shape object OBJ, which are acquired in the above-described processing and stored in the first storage region of the storage circuit 223, to display control on the illumination control application screen 400 (step S330). In addition, the transmission-reception circuit 225 of the control device 200 reads the vertical diffusion degree display value Sy stored in the first storage region and transmits the read vertical diffusion degree display value Sy as the first setting information (S1*y*=Sy) to the illumination device 1 (step S331).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 25, the control device 200 determines whether the long tap state is continuous (step S310). If the long tap state is not continuous (No at step S310), in other words, if a user's finger is released from the screen or if the touch detection position is out of the second adjustment region TA2, the process returns to the illumination control processing illustrated in FIG. 20, thereby transitioning to a standby state (step S101). Accordingly, the current vertical diffusion degree display value Sy is finalized with the current vertical diffusion degree display value Sy being reflected in the control state of the vertical diffusion degree of the illumination device 1.

If the long tap state is continuous (Yes at step S310), the process returns to the processing at step S305. When the following conditions are satisfied: the long tap state is continuous (Yes at step S310), the magnitude |ΔSy| of the vertical diffusion degree difference value ΔSy exceeds the magnitude |LSCy| of the vertical diffusion degree coarse adjustment scale setting value LSCy (Yes at step S311), and the sign of the vertical diffusion degree difference value ΔSy is "− (negative value)" (No at step S321 in FIG. 26), the processing at steps S305 to S310 including the above-described vertical diffusion degree coarse adjustment processing (step S320; FIG. 26) is repeatedly executed at intervals of the predetermined setting value change time (second time threshold) T2*th* until the magnitude |ΔSy| of the vertical diffusion degree difference value ΔSy becomes equal to or smaller than the magnitude |LSCy| of the vertical diffusion degree coarse adjustment scale setting value LSCy (No at step S311). Accordingly, the vertical diffusion degree display value Sy is coarsely adjusted in steps of the vertical diffusion degree coarse adjustment scale setting value LSCy (first adjustment interval) in a direction in which the vertical diffusion degree display value Sy decreases.

Figure 27:
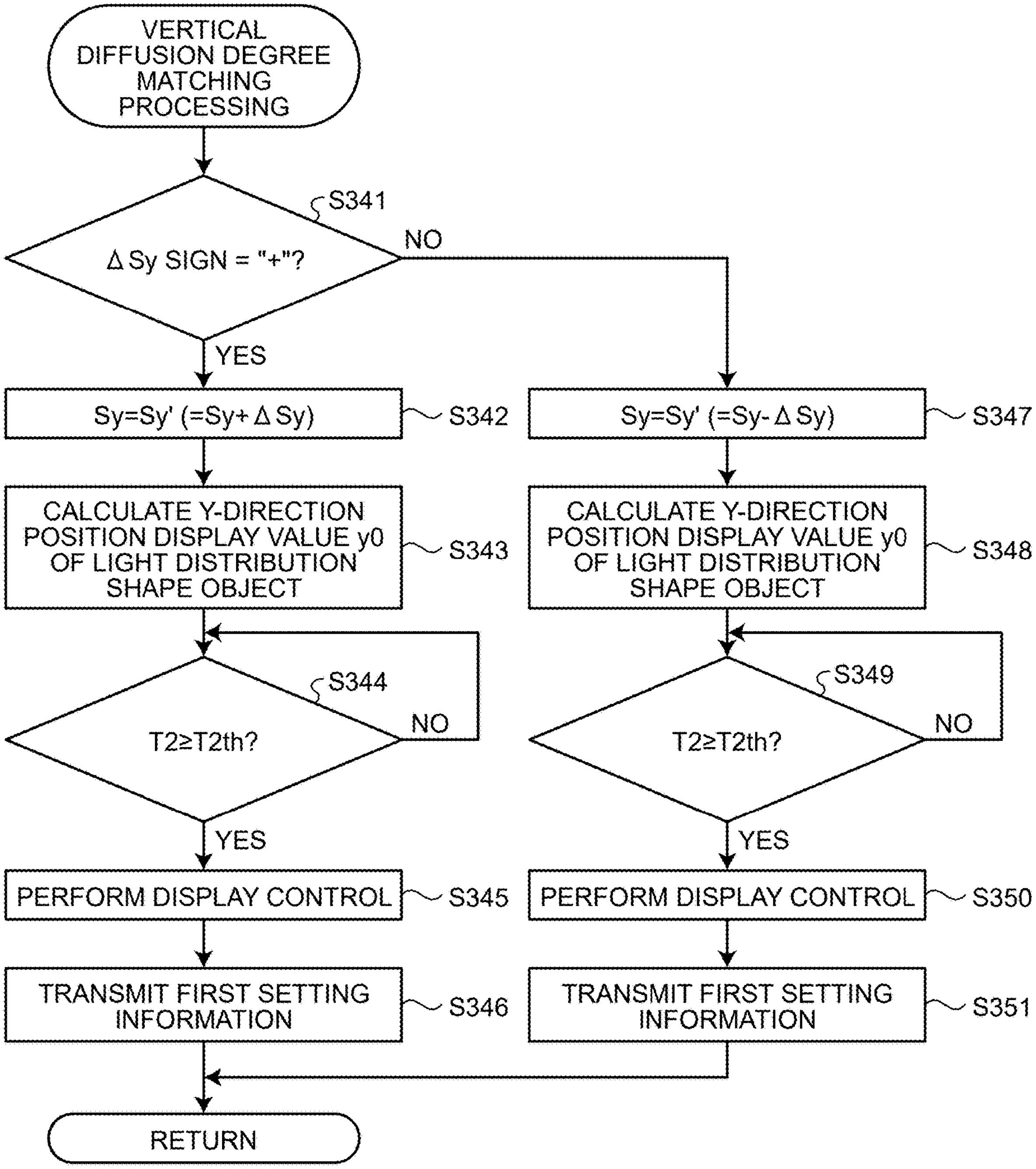
FIG. 27 is a flowchart illustrating an example of vertical diffusion degree matching processing by the control device for an illumination device according to the first embodiment.

If the magnitude |ΔSy| of the vertical diffusion degree difference value ΔSy becomes equal to or smaller than the magnitude |LSCy| of the vertical diffusion degree coarse adjustment scale setting value LSCy (No at step S311), the control device 200 executes vertical diffusion degree matching processing (step S340). FIG. 27 is a flowchart illustrating an example of the vertical diffusion degree matching processing by the control device 200 for the illumination device 1 according to the first embodiment.

The control device 200 reads the sign of the vertical diffusion degree difference value ΔSy and determines the adjustment direction of the vertical diffusion degree display value Sy with respect to the target vertical diffusion degree Sy'. Specifically, the control device 200 determines whether the sign of the vertical diffusion degree difference value ΔSy is "+ (positive value)" (step S341).

If the sign of the vertical diffusion degree difference value ΔSy is "+ (positive value)" (Yes at step S341), it is indicated that the adjustment direction of the vertical diffusion degree display value Sy with respect to the target vertical diffusion degree Sy' is a direction in which the vertical diffusion degree of the illumination device 1 increases. In this case, the control device 200 performs processing of matching the vertical diffusion degree display value Sy to the target vertical diffusion degree Sy' (step S342). Specifically, the vertical diffusion degree display value Sy is updated by adding the vertical diffusion degree difference value ΔSy to the vertical diffusion degree display value Sy. In addition, the control device 200 calculates the Y-direction position display value y0 of the light distribution shape object OBJ, which corresponds to the vertical diffusion degree display value Sy (step S343), and stores the Y-direction position display value y0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S344).

If the count value T2 of the second timer is smaller than the predetermined setting value change time T2*th* (T2<T2*th*; No at step S344), the processing at step S344 is repeatedly executed until the count value T2 of the second timer becomes equal to or larger than the predetermined setting value change time T2*th* (T2≥T2*th*; Yes at step S344). If the count value T2 of the second timer becomes equal to or larger than the predetermined setting value change time T2*th* (T2≥T2*th*; Yes at step S344), the display control circuit 231 of the control device 200 reflects the vertical diffusion degree display value Sy and the Y-direction position display value y0 of the light distribution shape object OBJ, which are acquired in the above-described processing and stored in the first storage region of the storage circuit 223, to display control on the illumination control application screen 400 (step S345). Accordingly, the Y-direction touch position detection value y'0 corresponding to the target vertical diffusion degree Sy' and the Y-direction position display value y0 of the light distribution shape object OBJ become identical or substantially identical (y'0≈y0). In addition, the transmission-reception circuit 225 of the control device 200 reads the vertical diffusion degree display value Sy stored in the first storage region and transmits the read vertical diffusion degree display value Sy as the first setting information (S1*y*=Sy) to the illumination device 1 (step S346).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100. Accordingly, the vertical diffusion degree display value Sy corresponding to the Y-direction touch detection position in the long tap state in the second adjustment region TA2 is reflected in the control state of the vertical diffusion degree of the illumination device 1.

If the sign of the vertical diffusion degree difference value ΔSy is "− (negative value)" (No at step S341), it is indicated that the adjustment direction of the vertical diffusion degree display value Sy with respect to the target vertical diffusion degree Sy' is a direction in which the vertical diffusion degree of the illumination device 1 decreases. In this case, the control device 200 performs processing of matching the vertical diffusion degree display value Sy to the target vertical diffusion degree Sy' (step S347). Specifically, the vertical diffusion degree display value Sy is updated by subtracting the vertical diffusion degree difference value ΔSy from the vertical diffusion degree display value Sy. In addition, the control device 200 calculates the Y-direction position display value y0 of the light distribution shape object OBJ, which corresponds to the vertical diffusion degree display value Sy (step S348), and stores the Y-direction position display value y0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S349).

If the count value T2 of the second timer is smaller than the predetermined setting value change time T2*th* (T2<T2*th*; No at step S349), the processing at step S349 is repeatedly executed until the count value T2 of the second timer becomes equal to or larger than the predetermined setting value change time T2*th* (T2≥T2*th*; Yes at step S349). If the count value T2 of the second timer becomes equal to or larger than the predetermined setting value change time T2*th* (T2≥T2*th*; Yes at step S349), the display control circuit 231 of the control device 200 reflects the vertical diffusion degree display value Sy and the Y-direction position display value y0 of the light distribution shape object OBJ, which are acquired in the above-described processing and stored in the first storage region of the storage circuit 223, to display control on the illumination control application screen 400 (step S350). Accordingly, the Y-direction touch position detection value y'0 corresponding to the target vertical diffusion degree Sy' and the Y-direction position display value y0 of the light distribution shape object OBJ become identical or substantially identical (y'0≈y0). In addition, the transmission-reception circuit 225 of the control device 200 reads the vertical diffusion degree display value Sy stored in the first storage region and transmits the read vertical diffusion degree display value Sy as the first setting information (S1*y*=Sy) to the illumination device 1 (step S351).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100. Accordingly, the vertical diffusion degree display value Sy corresponding to the Y-direction touch detection position in the long tap state in the second adjustment region TA2 is reflected in the control state of the vertical diffusion degree of the illumination device 1.

Referring back to FIG. 25, the control device 200 resets the count value T2 of the second timer (T2=0; step S312) and executes the vertical diffusion degree difference value calculation processing. Specifically, the control device 200 detects the touch position in the Y direction in the second adjustment region TA2 and stores the detected touch position in the first storage region of the storage circuit 223 illustrated in FIG. 17 as a Y-direction touch position detection value y'0 (step S313). In addition, the control device 200 calculates the target vertical diffusion degree Sy' corresponding to the detected Y-direction touch position detection value y'0 (step S314) and stores the target vertical diffusion degree Sy' in the first storage region illustrated in FIG. 17.

Then, the control device 200 reads the vertical diffusion degree display value Sy and the target vertical diffusion degree Sy' from the first storage region, calculates the vertical diffusion degree difference value ΔSy (ΔSy=Sy'−Sy; step S315), and determines whether the magnitude |ΔSy| of the vertical diffusion degree difference value ΔSy is smaller than the magnitude |SSCy| of the vertical diffusion degree fine adjustment scale setting value SSCy (second adjustment interval) (step S316).

If the magnitude |ΔSy| of the vertical diffusion degree difference value ΔSy is equal to or larger than the magnitude |SSCy| of the vertical diffusion degree fine adjustment scale setting value SSCy (No at step S316), the control device 200 subsequently determines whether the magnitude |ΔSy| of the vertical diffusion degree difference value ΔSy is smaller than the magnitude |LSCy| of the vertical diffusion degree coarse adjustment scale setting value LSCy (step S318).

If the magnitude |ΔSy| of the vertical diffusion degree difference value ΔSy is equal to or larger than the magnitude |LSCy| of the vertical diffusion degree coarse adjustment scale setting value LSCy (No at step S318), the process returns to the processing at step S311. If the magnitude |ΔSy| of the vertical diffusion degree difference value ΔSy exceeds the magnitude |LSCy| of the vertical diffusion degree coarse adjustment scale setting value LSCy (Yes at step S311), the control device 200 executes vertical diffusion degree coarse adjustment processing (step S320). If the magnitude |ΔSy| of the vertical diffusion degree difference value ΔSy is equal to or smaller than the magnitude |LSCy| of the vertical diffusion degree coarse adjustment scale setting value LSCy (No at step S311), the control device 200 executes the vertical diffusion degree matching processing (step S340).

Figure 28:
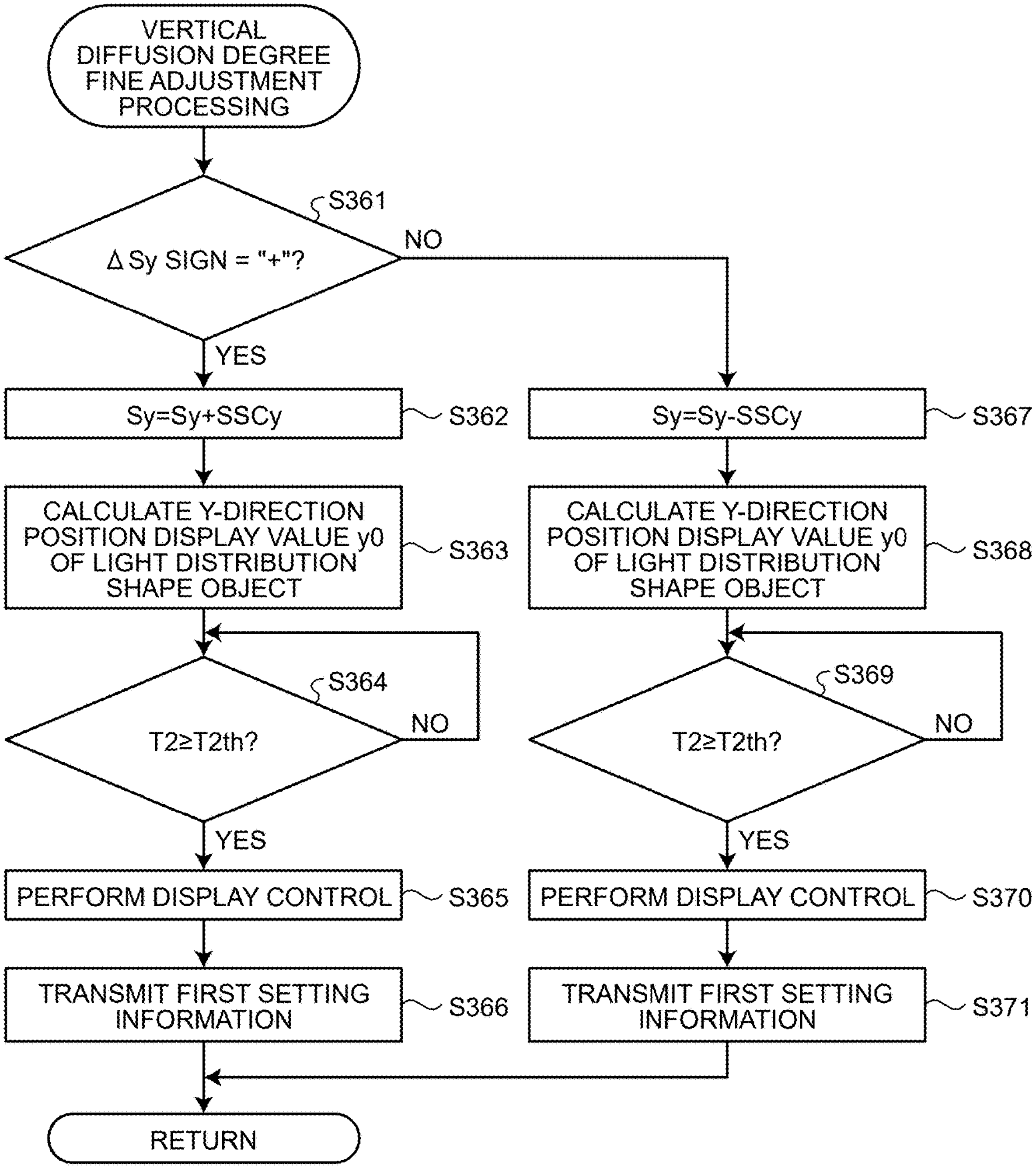
FIG. 28 is a flowchart illustrating an example of vertical diffusion degree fine adjustment processing by the control device for an illumination device according to the first embodiment.

If the magnitude |ΔSx| of the horizontal diffusion degree difference value ΔSx is equal to or larger than the magnitude |LSCx| of the horizontal diffusion degree coarse adjustment scale setting value LSCx (Yes at step S218), the control device 200 executes vertical diffusion degree fine adjustment processing (step S360). FIG. 28 is a flowchart illustrating an example of the vertical diffusion degree fine adjustment processing by the control device 200 for the illumination device 1 according to the first embodiment.

The control device 200 reads the sign of the vertical diffusion degree difference value ΔSy and determines the adjustment direction of the vertical diffusion degree display value Sy with respect to the target vertical diffusion degree Sy'. Specifically, the control device 200 determines whether the sign of the vertical diffusion degree difference value ΔSy is "+ (positive value)" (step S361).

If the sign of the vertical diffusion degree difference value ΔSy is "+ (positive value)" (Yes at step S361), it is indicated that the adjustment direction of the vertical diffusion degree display value Sy with respect to the target vertical diffusion degree Sy' is a direction in which the vertical diffusion degree of the illumination device 1 increases. In this case, the control device 200 adds the vertical diffusion degree fine adjustment scale setting value SSCy (second adjustment interval) to the vertical diffusion degree display value Sy (step S362), thereby updating the vertical diffusion degree display value Sy. In addition, the control device 200 calculates the Y-direction position display value y0 of the light distribution shape object OBJ, which corresponds to the vertical diffusion degree display value Sy (step S363), and stores the Y-direction position display value y0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S364).

If the count value T2 of the second timer is smaller than the predetermined setting value change time T2*th* (T2<T2*th*; No at step S364), the processing at step S364 is repeatedly executed until the count value T2 of the second timer becomes equal to or larger than the predetermined setting value change time T2*th* (T2≥T2*th*; Yes at step S364). If the count value T2 of the second timer becomes equal to or larger than the predetermined setting value change time T2*th* (T2≥T2*th*; Yes at step S364), the display control circuit 231 of the control device 200 reflects the vertical diffusion degree display value Sy and the Y-direction position display value y0 of the light distribution shape object OBJ, which are acquired in the above-described processing and stored in the first storage region of the storage circuit 223, to display control on the illumination control application screen 400 (step S365). In addition, the transmission-reception circuit 225 of the control device 200 reads the vertical diffusion degree display value Sy stored in the first storage region and transmits the read vertical diffusion degree display value Sy as the first setting information (S1*y*=Sy) to the illumination device 1 (step S366).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

FIG. 25, the control device 200 determines whether the long tap state is continuous (step S317). If the long tap state is not continuous (No at step S317), in other words, if a user's finger is released from the screen or if the touch detection position is out of the second adjustment region TA2, the process returns to the illumination control processing illustrated in FIG. 20, thereby transitioning to a standby state (step S101). Accordingly, the current vertical diffusion degree display value Sy is finalized with the current vertical diffusion degree display value Sy being reflected in the control state of the vertical diffusion degree of the illumination device 1.

If the long tap state is continuous (Yes at step S317), the process returns to the processing at step S312. When the following conditions are satisfied: the long tap state is continuous (Yes at step S317), the magnitude |ΔSy| of the vertical diffusion degree difference value ΔSy is smaller than the magnitude |LSCy| of the vertical diffusion degree coarse adjustment scale setting value LSCy (Yes at step S318), and the sign of the vertical diffusion degree difference value ΔSy is "+ (positive value)" (Yes at step S361 in FIG. 28), the processing at steps S312 to S317 including the above-described vertical diffusion degree fine adjustment processing (step S360; FIG. 28) is repeatedly executed at intervals of the predetermined setting value change time (second time threshold) T2*th*. Accordingly, the vertical diffusion degree display value Sy is finely adjusted in steps of the vertical diffusion degree fine adjustment scale setting value SSCy (second adjustment interval) in a direction in which the vertical diffusion degree display value Sy increases.

Thereafter, if the magnitude |ΔSy| of the vertical diffusion degree difference value ΔSy becomes smaller than the magnitude |SSCy| of the vertical diffusion degree fine adjustment scale setting value SSCy (Yes at step S309) and the long tap state is canceled (No at step S310), the current vertical diffusion degree display value Sy is finalized with the current vertical diffusion degree display value Sy being reflected in the control state of the vertical diffusion degree of the illumination device 1 in a state in which the Y-direction touch position detection value y'0 in the second adjustment region TA2 substantially matches the Y-direction position display value y0 of the light distribution shape object OBJ (y'0≈y0).

Referring back to FIG. 28, if the sign of the vertical diffusion degree difference value ΔSy is "− (negative value)" (No at step S361), it is indicated that the adjustment direction of the vertical diffusion degree display value Sy with respect to the target vertical diffusion degree Sy' is a direction in which the vertical diffusion degree of the illumination device 1 decreases. In this case, the control device 200 subtracts the vertical diffusion degree fine adjustment scale setting value SSCy (second adjustment interval) from the vertical diffusion degree display value Sy (step S367), thereby updating the vertical diffusion degree display value Sy. In addition, the control device 200 calculates the Y-direction position display value y0 of the light distribution shape object OBJ, which corresponds to the vertical diffusion degree display value Sy (step S368), and stores the Y-direction position display value y0 in the first storage region of the storage circuit 223 illustrated in FIG. 17.

Subsequently, the control device 200 determines whether the count value T2 of the second timer has exceeded the predetermined setting value change time (second time threshold) T2*th* (for example, 0.5 sec) (step S369).

If the count value T2 of the second timer is smaller than the predetermined setting value change time T2*th* (T2<T2*th*; No at step S369), the processing at step S369 is repeatedly executed until the count value T2 of the second timer becomes equal to or larger than the predetermined setting value change time T2*th* (T2≥T2*th*; Yes at step S369). If the count value T2 of the second timer becomes equal to or larger than the predetermined setting value change time T2*th* (T2≥T2*th*; Yes at step S369), the display control circuit 231 of the control device 200 reflects the vertical diffusion degree display value Sy and the Y-direction position display value y0 of the light distribution shape object OBJ, which are acquired in the above-described processing and stored in the first storage region of the storage circuit 223, to display control on the illumination control application screen 400 (step S370). In addition, the transmission-reception circuit 225 of the control device 200 reads the vertical diffusion degree display value Sy stored in the first storage region and transmits the read vertical diffusion degree display value Sy as the first setting information (S1*y*=Sy) to the illumination device 1 (step S371).

The transmission-reception circuit 111 of the illumination device 1 stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 25, the control device 200 determines whether the long tap state is continuous (step S317). If the long tap state is not continuous (No at step S310), in other words, if a user's finger is released from the screen or if the touch detection position is out of the second adjustment region TA2, the process returns to the illumination control processing illustrated in FIG. 20, thereby transitioning to a standby state (step S101). Accordingly, the current vertical diffusion degree display value Sy is finalized with the current vertical diffusion degree display value Sy being reflected in the control state of the vertical diffusion degree of the illumination device 1.

If the long tap state is continuous (Yes at step S317), the process returns to the processing at step S312. When the following conditions are satisfied: the long tap state is continuous (Yes at step S317), the magnitude |ΔSy| of the vertical diffusion degree difference value ΔSy is smaller than the magnitude |LSCy| of the vertical diffusion degree coarse adjustment scale setting value LSCy (Yes at step S318), and the sign of the vertical diffusion degree difference value ΔSy is "− (negative value)" (No at step S341 in FIG. 28), the processing at steps S312 to S317 including the above-described vertical diffusion degree fine adjustment processing (step S360; FIG. 28) is repeatedly executed at intervals of the predetermined setting value change time (second time threshold) T2*th*. Accordingly, the vertical diffusion degree display value Sy is finely adjusted in steps of the vertical diffusion degree fine adjustment scale setting value SSCy (second adjustment interval) in a direction in which the vertical diffusion degree display value Sy decreases.

Thereafter, if the magnitude |ΔSy| of the vertical diffusion degree difference value ΔSy becomes smaller than the magnitude |SSCy| of the vertical diffusion degree fine adjustment scale setting value SSCy (Yes at step S309 or Yes at step S316) and the long tap state is canceled (No at step S310 or No at step S317), the current vertical diffusion degree display value Sy is finalized with the current vertical diffusion degree display value Sy being reflected in the control state of the vertical diffusion degree of the illumination device 1.

In the vertical diffusion degree adjustment processing by the control device 200 according to the first embodiment, as described above, the vertical diffusion degree coarse adjustment processing (step S320 in FIG. 25; FIG. 26), the vertical diffusion degree matching processing (step S340 in FIG. 25; FIG. 27), or the vertical diffusion degree fine adjustment processing (step S360 in FIG. 25; FIG. 28) is executed depending on the movement amount of the Y-direction touch detection position in the long tap state in the second adjustment region TA2.

Specifically, after the user touches within the second adjustment region TA2 (Yes at step S103 in FIG. 20) and it is determined that the long tap state (step S304 in FIG. 24) is detected, the vertical diffusion degree coarse adjustment processing (FIG. 26) is executed if the difference (vertical diffusion degree difference value ΔSy) between the target vertical diffusion degree Sy' corresponding to the movement amount of the Y-direction touch detection position in the long tap state in the second adjustment region TA2 and the vertical diffusion degree display value Sy exceeds a vertical diffusion degree coarse adjustment scale (first adjustment interval) (Yes at step S311 in FIG. 25), or the vertical diffusion degree matching processing (FIG. 27) is executed if the vertical diffusion degree difference value ΔSy becomes equal to or smaller than the vertical diffusion degree coarse adjustment scale (first adjustment interval). Accordingly, the Y-direction touch position detection value y' 0 corresponding to the target vertical diffusion degree Sy' and the Y-direction position display value y0 of the light distribution shape object OBJ become identical or substantially identical (y'0≈y0), and the vertical diffusion degree display value Sy corresponding to the Y-direction touch detection position in the long tap state in the second adjustment region TA2 is reflected in the control state of the vertical diffusion degree of the illumination device 1.

After the Y-direction touch position detection value y' 0 corresponding to the target vertical diffusion degree Sy' and the Y-direction position display value y0 of the light distribution shape object OBJ become identical or substantially identical through the vertical diffusion degree matching processing (FIG. 27) (y'0≈y0), the vertical diffusion degree fine adjustment processing (FIG. 28) is executed if the user performs a swipe operation while maintaining the long tap state in the second adjustment region TA2 on the illumination control application screen 400 and the vertical diffusion degree difference value ΔSy is smaller than the vertical diffusion degree coarse adjustment scale (first adjustment interval) (Yes at step S318 in FIG. 25). If the vertical diffusion degree difference value ΔSy exceeds the vertical diffusion degree coarse adjustment scale (first adjustment interval) (Yes at step S311 in FIG. 25), the vertical diffusion degree coarse adjustment processing (FIG. 26) is executed, and thereafter, the vertical diffusion degree matching processing (FIG. 27) is executed if the vertical diffusion degree difference value ΔSy becomes equal to or smaller than the vertical diffusion degree coarse adjustment scale (first adjustment interval) (No at step S311 in FIG. 25).

In this manner, through the vertical diffusion degree adjustment processing by the control device 200 according to the first embodiment described above, the vertical diffusion degree coarse adjustment processing illustrated in FIG. 26, the vertical diffusion degree matching processing illustrated in FIG. 27, and the vertical diffusion degree fine adjustment processing illustrated in FIG. 28 seamlessly transition to each other depending on the movement amount of the Y-direction touch detection position in the long tap state in the second adjustment region TA2.

More specifically, if the magnitude |ΔSy| of the vertical diffusion degree difference value ΔSy exceeds the magnitude |LSCy| of the vertical diffusion degree coarse adjustment scale setting value LSCy (|ΔSy|>|LSCy|; Yes at step S311 in FIG. 25), the vertical diffusion degree coarse adjustment processing (step S320 in FIG. 25; FIG. 26) is executed. Accordingly, the vertical diffusion degree display value Sy corresponding to the Y-direction position display value y0 of the light distribution shape object OBJ is coarsely adjusted in a direction toward the target vertical diffusion degree Sy' corresponding to the Y-direction touch position detection value y'0.

The vertical diffusion degree matching processing (step S340 in FIG. 25; FIG. 27) is executed in both cases: when the magnitude |ΔSy| of the vertical diffusion degree difference value ΔSy upon transition to the long tap state is equal to or larger than the magnitude |SSCy| of the vertical diffusion degree fine adjustment scale setting value SSCy (|ΔSy|≥|SSCy|; No at step S309 in FIG. 25) and is equal to or smaller than the magnitude |LSCy| of the vertical diffusion degree coarse adjustment scale setting value LSCy (|ΔSy|≤|LSCy|; No at step S311 in FIG. 25); and when the magnitude |ΔSy| of the vertical diffusion degree difference value ΔSy after the vertical diffusion degree coarse adjustment processing becomes equal to or larger than the magnitude |SSCy| of the vertical diffusion degree fine adjustment scale setting value SSCy (|ΔSy|≥|SSCy|; No at step S309 in FIG. 25) and becomes equal to or smaller than the magnitude |LSCy| of the vertical diffusion degree coarse adjustment scale setting value LSCy (|ΔSy|≤|LSCy|; No at step S311 in FIG. 25). Accordingly, the vertical diffusion degree display value Sy corresponding to the Y-direction position display value y0 of the light distribution shape object OBJ matches the target vertical diffusion degree Sy' corresponding to the Y-direction touch position detection value y'0.

After the vertical diffusion degree matching processing is executed, the vertical diffusion degree fine adjustment processing (step S360 in FIG. 25; FIG. 28) is executed if the magnitude |ΔSy| of the vertical diffusion degree difference value ΔSy becomes equal to or larger than the magnitude |SSCy| of the vertical diffusion degree fine adjustment scale setting value SSCy (|ΔSy|≥|SSCy|; No at step S309 in FIG. 25) and becomes smaller than the magnitude |LSCy| of the vertical diffusion degree coarse adjustment scale setting value LSCy (|ΔSy|<|LSCy|; Yes at step S318 in FIG. 25). Accordingly, the vertical diffusion degree display value Sy corresponding to the Y-direction position display value y0 of the light distribution shape object OBJ is finely adjusted in a direction toward the target vertical diffusion degree Sy' corresponding to the Y-direction touch position detection value y'0.

After the vertical diffusion degree matching processing or the vertical diffusion degree fine adjustment processing is executed, the process starting at step S311 in FIG. 25 is re-executed if the magnitude |ΔSy| of the vertical diffusion degree difference value ΔSy becomes equal to or larger than the magnitude |LSCy| of the vertical diffusion degree coarse adjustment scale setting value LSCy (|ΔSy|≥|LSCy|; No at step S318 in FIG. 25).

Specifically, after the vertical diffusion degree matching processing or the vertical diffusion degree fine adjustment processing is executed, the vertical diffusion degree matching processing (step S340 in FIG. 25; FIG. 27) is executed if the magnitude |ΔSy| of the vertical diffusion degree difference value ΔSy becomes equal to the magnitude |LSCy| of the vertical diffusion degree coarse adjustment scale setting value LSCy (|ΔSy|=|LSCy|; No at step S318 in FIG. 25 and Yes at step S311 in FIG. 25). Accordingly, the vertical diffusion degree display value Sy corresponding to the Y-direction position display value y0 of the light distribution shape object OBJ matches again the target vertical diffusion degree Sy' corresponding to the Y-direction touch position detection value y'0.

After the vertical diffusion degree matching processing or the vertical diffusion degree fine adjustment processing is executed, the vertical diffusion degree coarse adjustment processing (step S320 in FIG. 25; FIG. 26) is executed if the magnitude |ΔSy| of the vertical diffusion degree difference value ΔSy exceeds the magnitude |LSCy| of the vertical diffusion degree coarse adjustment scale setting value LSCy (|ΔSy|>|LSCy|; No at step S318 in FIG. 25 and Yes at step S311 in FIG. 25). Accordingly, the vertical diffusion degree display value Sy corresponding to the Y-direction position display value y0 of the light distribution shape object OBJ is again coarsely adjusted in a direction toward the target vertical diffusion degree Sy' corresponding to the Y-direction touch position detection value y'0.

Then, if the magnitude |ΔSy| of the vertical diffusion degree difference value ΔSy becomes equal to or larger than the magnitude |SSCy| of the vertical diffusion degree fine adjustment scale setting value SSCy (|ΔSy|≥|SSCy|; No at step S309 in FIG. 25) and becomes equal to or smaller than the magnitude |LSCy| of the vertical diffusion degree coarse adjustment scale setting value LSCy (|ΔSy|≤|LSCy|; No at step S311 in FIG. 25), the vertical diffusion degree matching processing (step S340 in FIG. 25; FIG. 27) is executed. Accordingly, the vertical diffusion degree display value Sy corresponding to the Y-direction position display value y0 of the light distribution shape object OBJ matches again the target vertical diffusion degree Sy' corresponding to the Y-direction touch position detection value y'0.

The following describes specific examples of operation on the illumination control application screen 400 of the control device 200 according to the first embodiment. FIGS. 29A, 29B, 29C, 29D, 29E, 29F, 29G, 29H, and 29I are diagrams illustrating specific operation examples on the illumination control application screen 400 of the control device 200 according to the first embodiment. Operation of the horizontal diffusion degree adjustment processing is exemplarily described below.

Figure 29A:
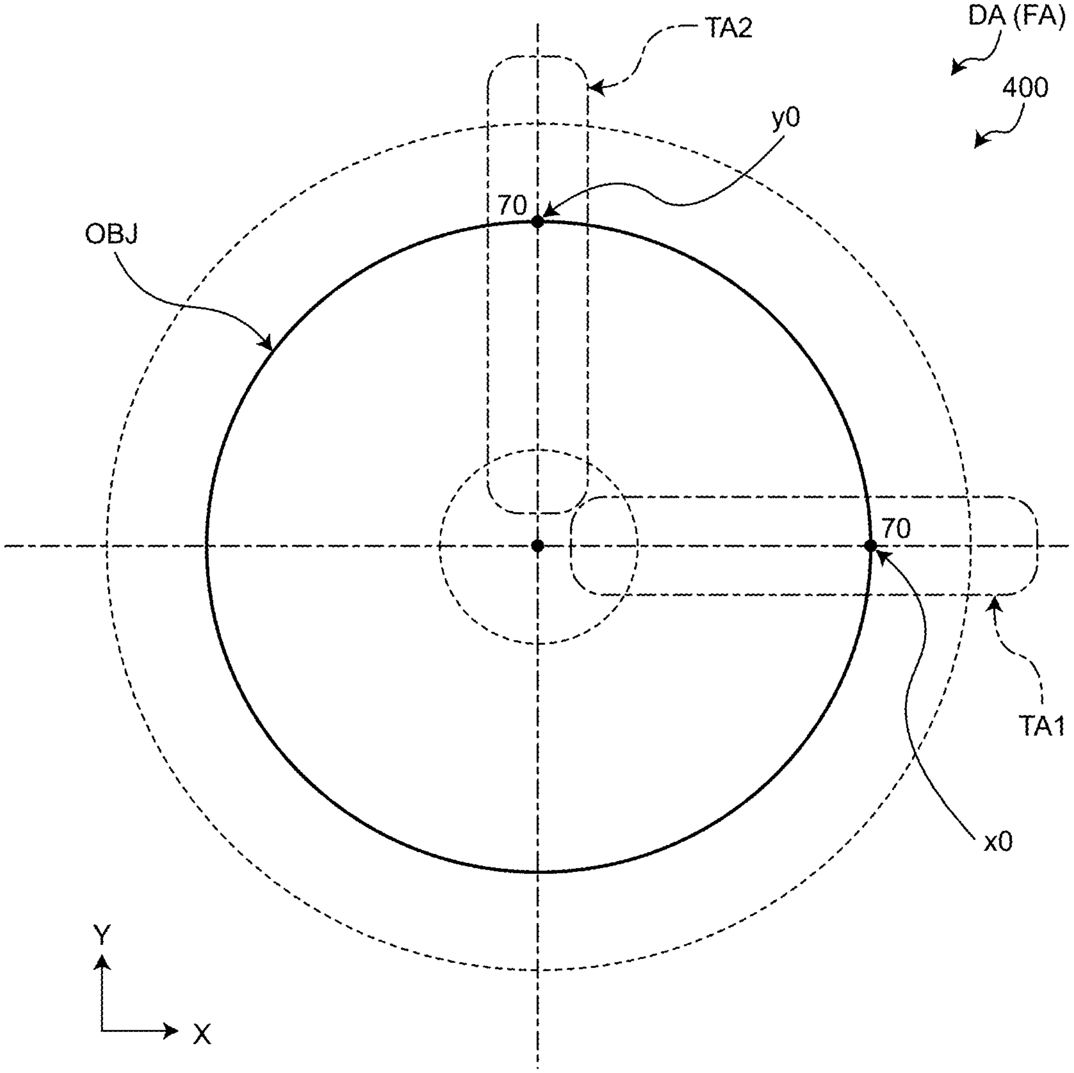
FIG. 29A is a diagram illustrating a specific operation example on the illumination control application screen on the control device according to the first embodiment.
Figure 29B:
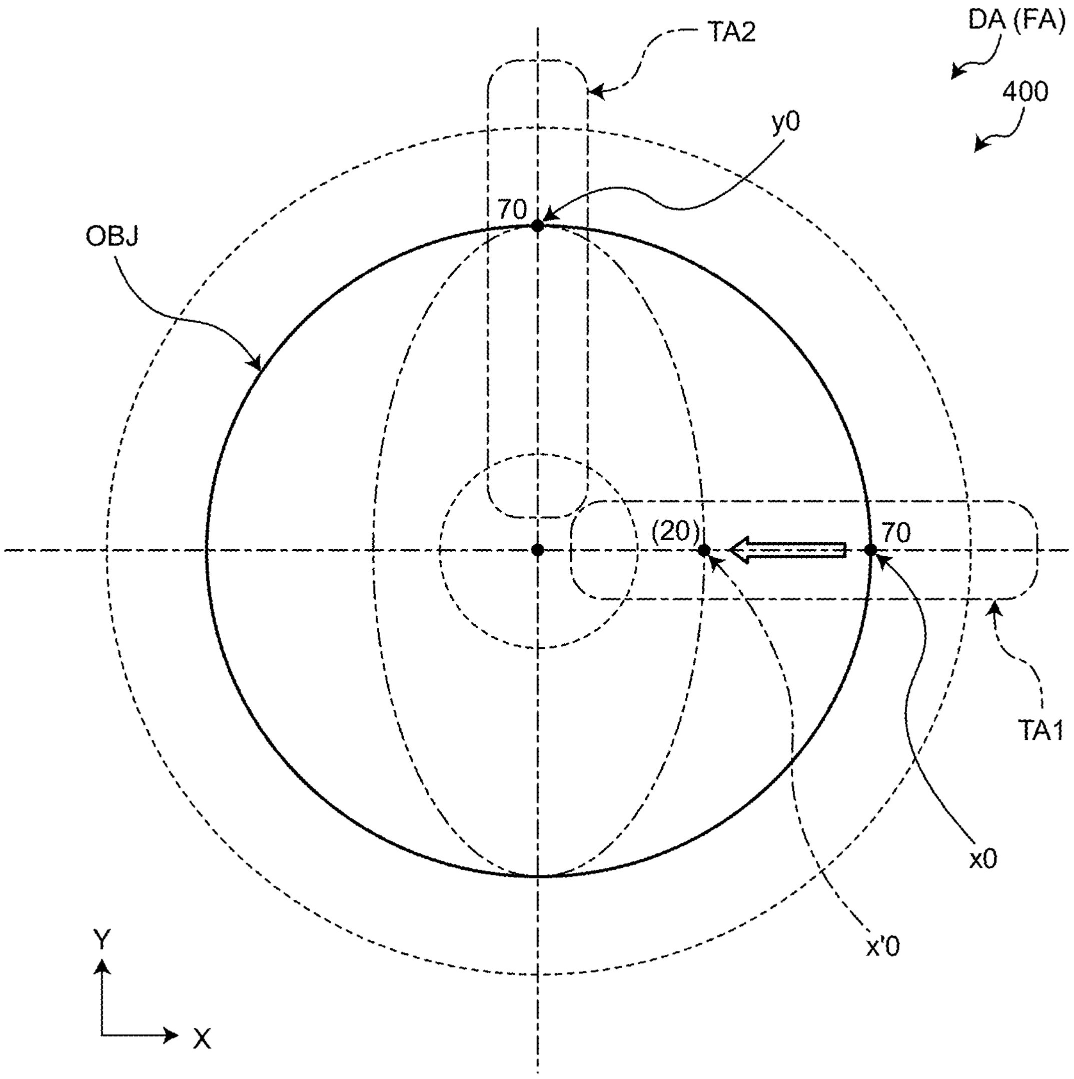
FIG. 29B is a diagram illustrating a specific operation example on the illumination control application screen on the control device according to the first embodiment.

FIG. 29A illustrates an example in which the horizontal diffusion degree display value Sx and the vertical diffusion degree display value Sy are both 70% in the standby state (step S101) in FIG. 20. FIG. 29B illustrates an example in which in the standby state illustrated in FIG. 29A, a touch in the first adjustment region TA1 is detected (Yes at step S102 in FIG. 20), transition is made to the horizontal diffusion degree adjustment processing illustrated in FIG. 21 and the long tap state is reached (step S204), and the X-direction touch position detection value x'0 corresponding to the target horizontal diffusion degree Sx'=20% is detected in the first adjustment region TA1.

In this case, the horizontal diffusion degree difference value ΔSx is −50% (ΔSx=Sx' (=20%)−Sx (=70%)=−50%), and the magnitude |ΔSx| (=50%) of the horizontal diffusion degree difference value ΔSx exceeds the magnitude |LSCx| of the horizontal diffusion degree coarse adjustment scale setting value LSCx (=20%) (|ΔSx|>|LSCx|; Yes at step S211 in FIG. 21). Accordingly, the horizontal diffusion degree coarse adjustment processing illustrated in FIG. 22 is executed.

In this case, the sign of the horizontal diffusion degree difference value ΔSx (=−50%) is "− (negative value)" (No at step S221 in FIG. 22). Accordingly, the horizontal diffusion degree of the illumination device 1 is coarsely adjusted in a direction (arrow direction illustrated in FIG. 29B) in which the horizontal diffusion degree decreases until the magnitude |ΔSx| of the horizontal diffusion degree difference value ΔSx becomes equal to or smaller than the magnitude |LSCx (=20%)| of the horizontal diffusion degree coarse adjustment scale setting value LSCx (No at step S211 in FIG. 21).

Figure 29C:
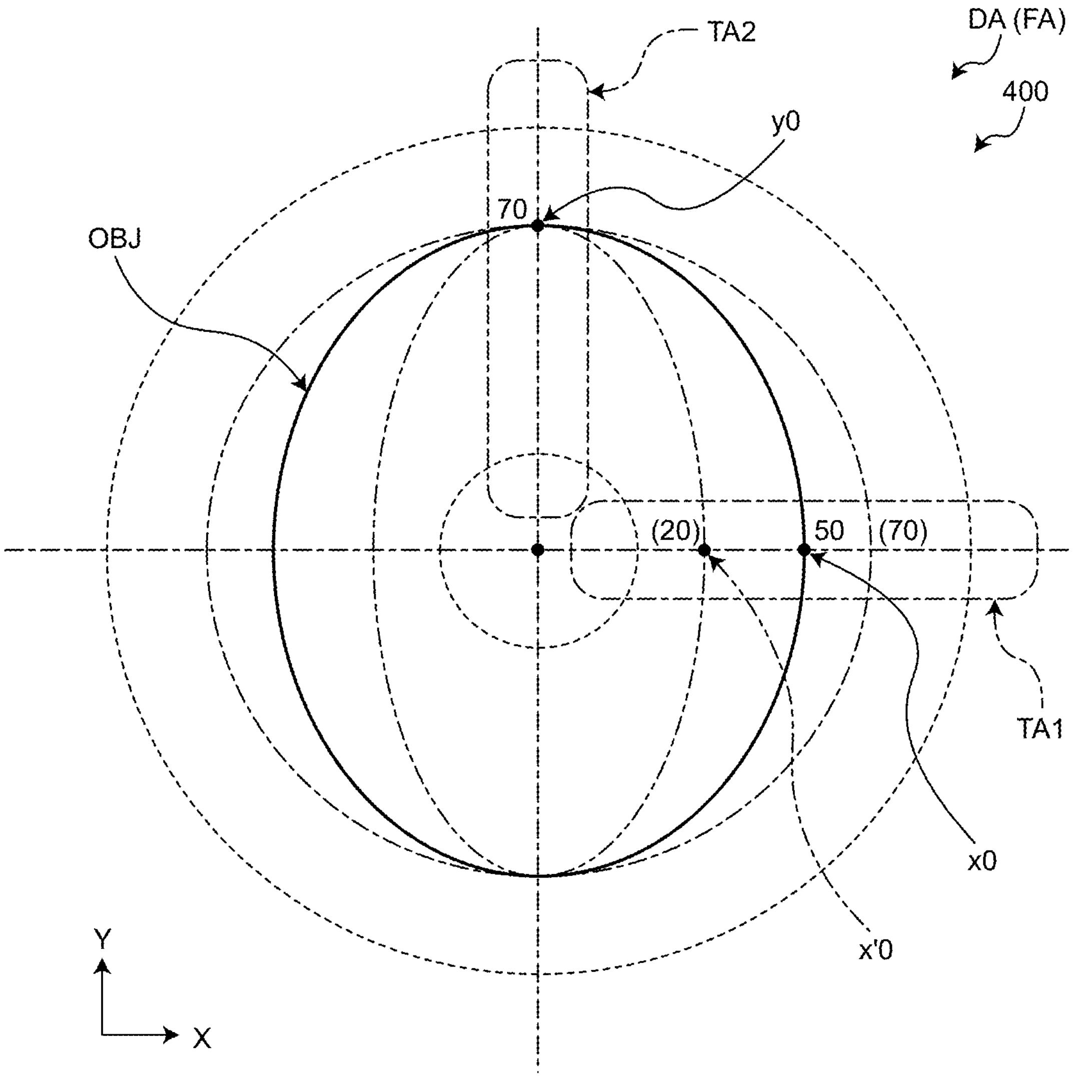
FIG. 29C is a diagram illustrating a specific operation example on the illumination control application screen on the control device according to the first embodiment.
Figure 29D:
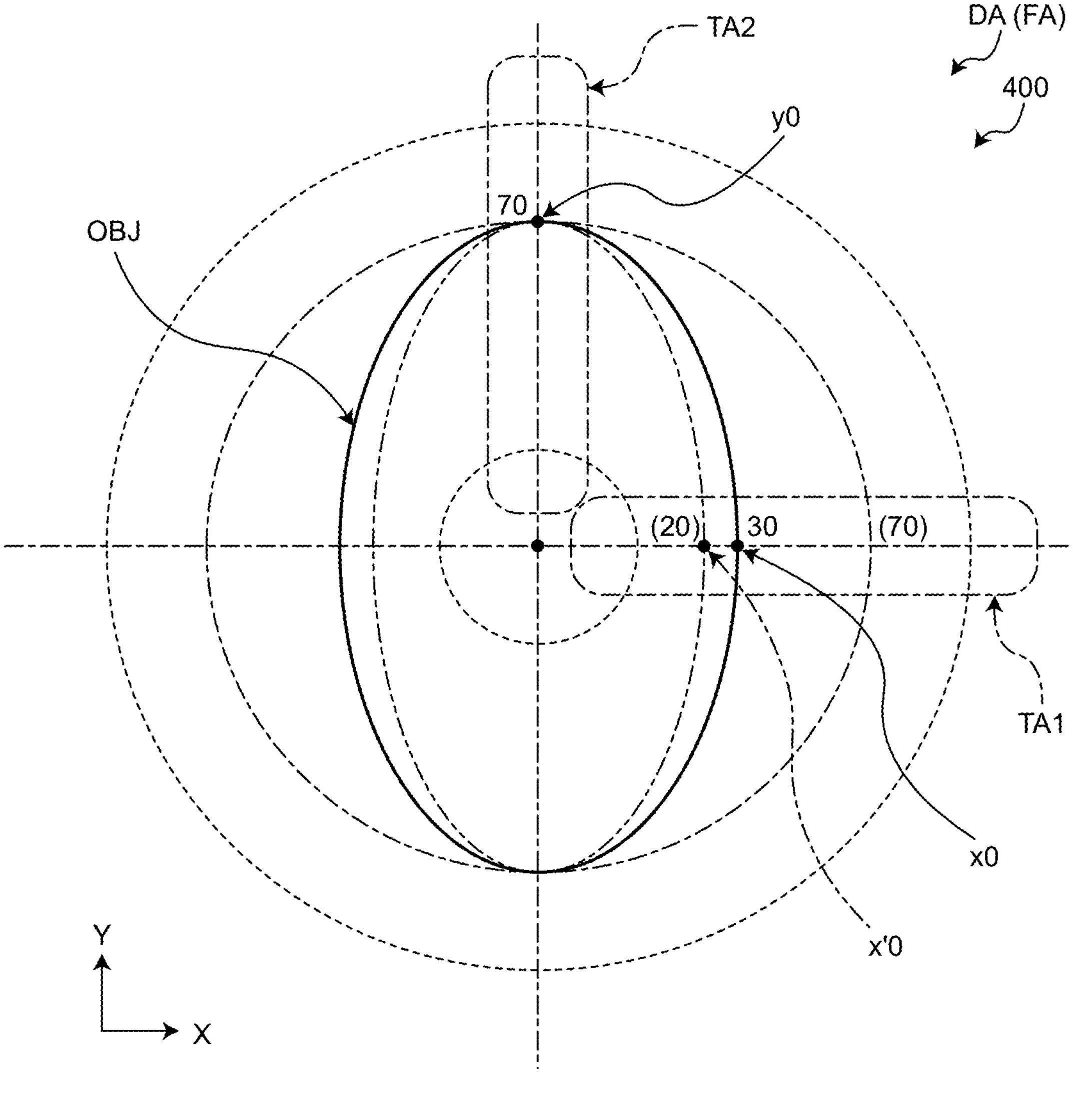
FIG. 29D is a diagram illustrating a specific operation example on the illumination control application screen on the control device according to the first embodiment.

Specifically, first, in the processing at steps S205 to S210 in the horizontal diffusion degree adjustment processing illustrated in FIG. 21, if the count value T2 of the second timer exceeds the predetermined setting value change time (second time threshold) T2*th* (for example, 0.5 sec) (Yes at step S229 in FIG. 22), the horizontal diffusion degree coarse adjustment processing illustrated in FIG. 22 is executed and the X-direction position display value x0 of the light distribution shape object OBJ becomes a position corresponding to the horizontal diffusion degree display value Sx=50% as illustrated in FIG. 29C. In the subsequent processing at steps S205 to S210, the horizontal diffusion degree coarse adjustment processing illustrated in FIG. 22 is executed in the same manner and the X-direction position display value x0 of the light distribution shape object OBJ becomes a position corresponding to the horizontal diffusion degree display value Sx=30% as illustrated in FIG. 29D.

Figure 29E:
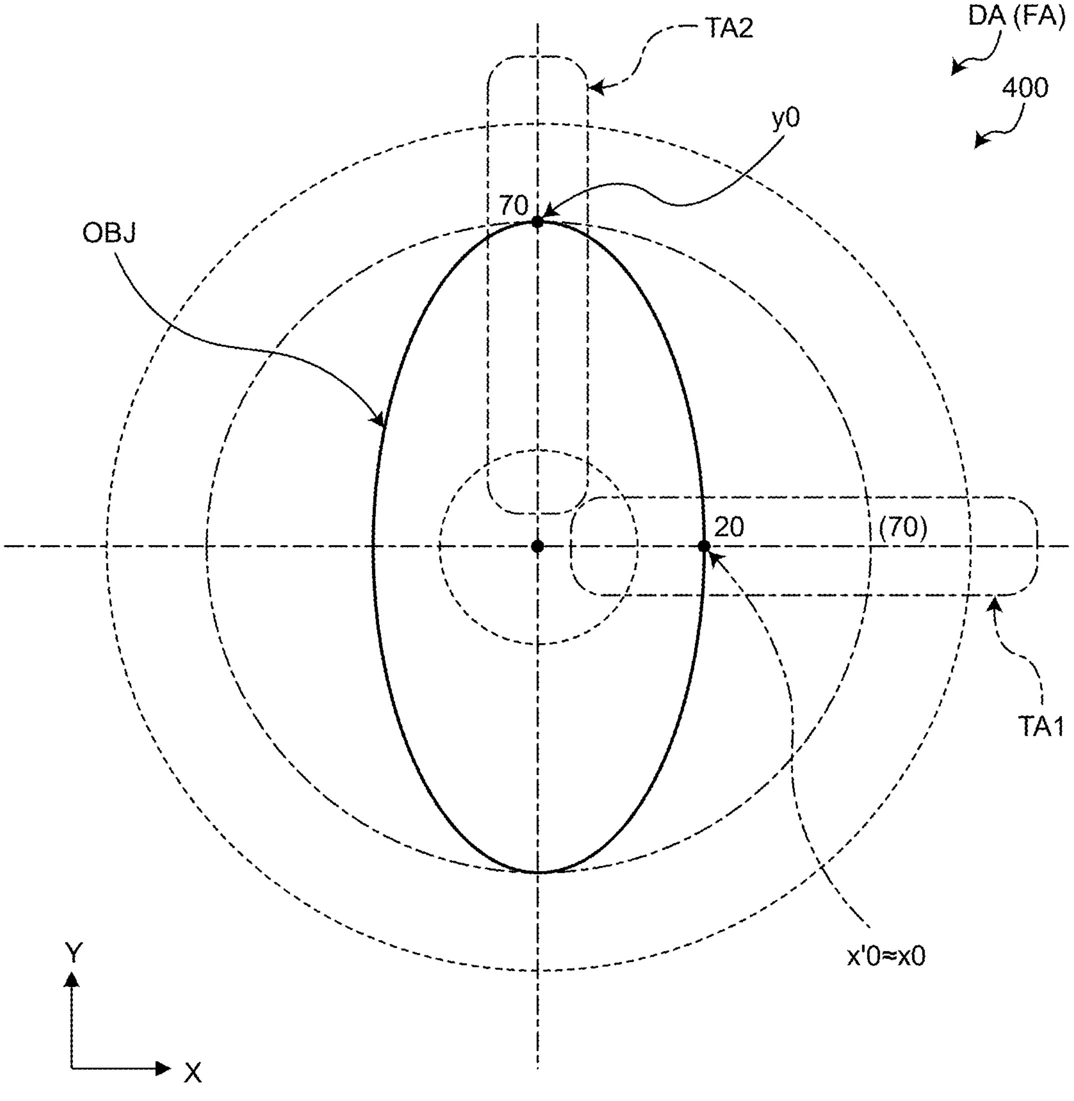
FIG. 29E is a diagram illustrating a specific operation example on the illumination control application screen on the control device according to the first embodiment.

Then, in the further subsequent processing at steps S205 to S210, if the horizontal diffusion degree difference value ΔSx becomes −10% (ΔSx=Sx' (=20%)−Sx (=30%)=−10%) and the magnitude |ΔSx| (=10%) of the horizontal diffusion degree difference value ΔSx becomes equal to or smaller than the magnitude |LSCx| of the horizontal diffusion degree coarse adjustment scale setting value LSCx (=20%) (|ΔSx|≤|LSCx|; No at step S211 in FIG. 21), the horizontal diffusion degree matching processing illustrated in FIG. 23 is executed. Accordingly, the horizontal diffusion degree display value Sx matches the target horizontal diffusion degree Sx', and the X-direction touch position detection value x'0 corresponding to the target horizontal diffusion degree Sx' and the X-direction position display value x0 of the light distribution shape object OBJ become identical or substantially identical (x'0≈x0) as illustrated in FIG. 29E.

Through the above-described processing, the horizontal diffusion degree display value Sx of the light distribution shape object OBJ on the illumination control application screen 400 and the horizontal diffusion degree of the illumination device 1, the initial diffusion degree of which is 70%, are coarsely adjusted from 70% to 50% and from 50% to 30% in units of 20% and finally adjusted from 30% to 20%. In other words, in this coarse adjustment phase, the control device 200 first adjusts the diffusion degree of the light distribution shape object OBJ on the illumination control application screen 400 and the diffusion degree of the illumination device 1 from the initial diffusion degree toward the target horizontal diffusion degree Sx' (target vertical diffusion degree Sy') in units of an integral multiple of the horizontal diffusion degree coarse adjustment scale setting value LSCx (vertical diffusion degree coarse adjustment scale setting value LSCy), wherein the target horizontal diffusion degree Sx' (target vertical diffusion degree Sy') is indicated by the user touching the first adjustment region TA1 (or the second adjustment region TA2) on the illumination control application screen 400. Accordingly, the diffusion degree is changed in stages until the horizontal diffusion degree difference value ΔSx (vertical diffusion degree difference value ΔSy) becomes equal to or smaller than the magnitude of the horizontal diffusion degree coarse adjustment scale setting value LSCx (vertical diffusion degree coarse adjustment scale setting value LSCy), wherein the horizontal diffusion degree difference value ΔSx (vertical diffusion degree difference value ΔSy) is the difference between the target horizontal diffusion degree Sx' (target vertical diffusion degree Sy') and the horizontal diffusion degree display value Sx (vertical diffusion degree display value Sy) after coarse adjustment. Thereafter, the control device 200 reduces the horizontal diffusion degree difference value ΔSx (vertical diffusion degree difference value ΔSy) at once and matches the diffusion degree of the light distribution shape object OBJ and the diffusion degree of the illumination device 1 to the target horizontal diffusion degree Sx' (target vertical diffusion degree Sy'). Accordingly, the user can visually recognize that the light distribution shape object OBJ on the illumination control application screen 400 is being changed in stages in relatively large units, and can visually recognize and physically perceive that the diffusion degree of the illumination device 1 is being changed in stages in relatively large units.

Figure 29F:
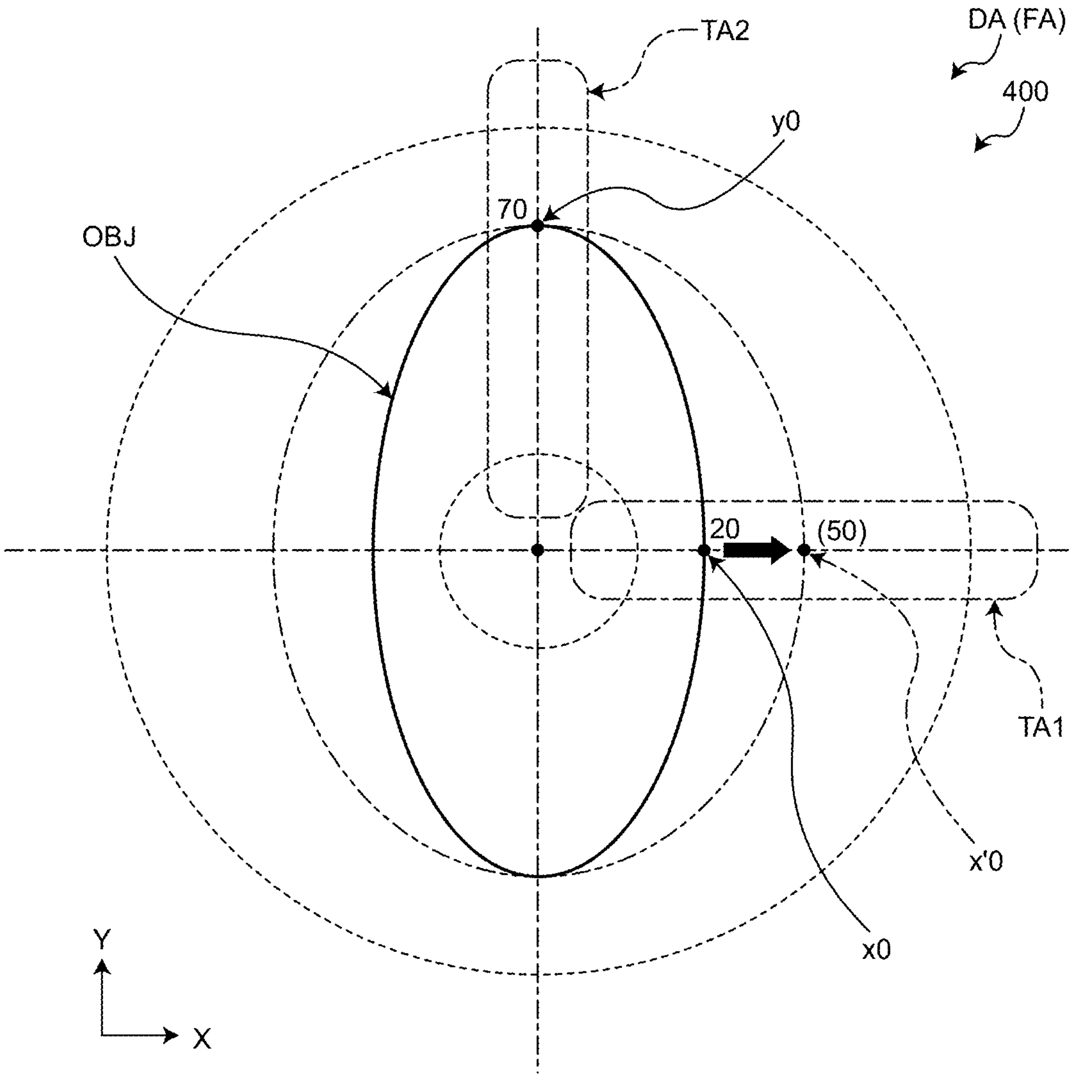
FIG. 29F is a diagram illustrating a specific operation example on the illumination control application screen on the control device according to the first embodiment.

FIG. 29F illustrates an example in which, thereafter, the user performs a swipe operation in the first adjustment region TA1 while the long tap state is maintained. More specifically, FIG. 29F illustrates an example in which the X-direction touch position detection value x'0 in the first adjustment region TA1 is updated through the swipe operation, the magnitude |ΔSx| of the horizontal diffusion degree difference value ΔSx exceeds the magnitude |LSCx| of the horizontal diffusion degree coarse adjustment scale setting value LSCx (=20%) (|ΔSx|>|LSCx|; Yes at step S211 in FIG. 21), and the X-direction touch position detection value x'0 corresponding to the target horizontal diffusion degree Sx'=50% is detected in the first adjustment region TA1 (the swipe operation by the user has stopped at the X-direction touch position detection value x' 0).

In this case, the horizontal diffusion degree difference value ΔSx is 30% (ΔSx=Sx' (=50%)−Sx (=20%)=30%), and the magnitude |ΔSx| (=30%) of the horizontal diffusion degree difference value ΔSx exceeds the magnitude |LSCx| of the horizontal diffusion degree coarse adjustment scale setting value LSCx (=20%) (|ΔSx|>|LSCx|; Yes at step S211 in FIG. 21). Accordingly, the horizontal diffusion degree coarse adjustment processing illustrated in FIG. 22 is executed.

In this case, the sign of the horizontal diffusion degree difference value ΔSx (=30%) is "+ (positive value)" (Yes at step S221 in FIG. 22). Accordingly, the horizontal diffusion degree of the illumination device 1 is coarsely adjusted in a direction in which the horizontal diffusion degree increases (arrow direction illustrated in FIG. 29F) until the magnitude |ΔSx| of the horizontal diffusion degree difference value ΔSx becomes equal to or smaller than the magnitude |LSCx| of the horizontal diffusion degree coarse adjustment scale setting value LSCx (=20%) (No at step S211 in FIG. 21).

Figure 29G:
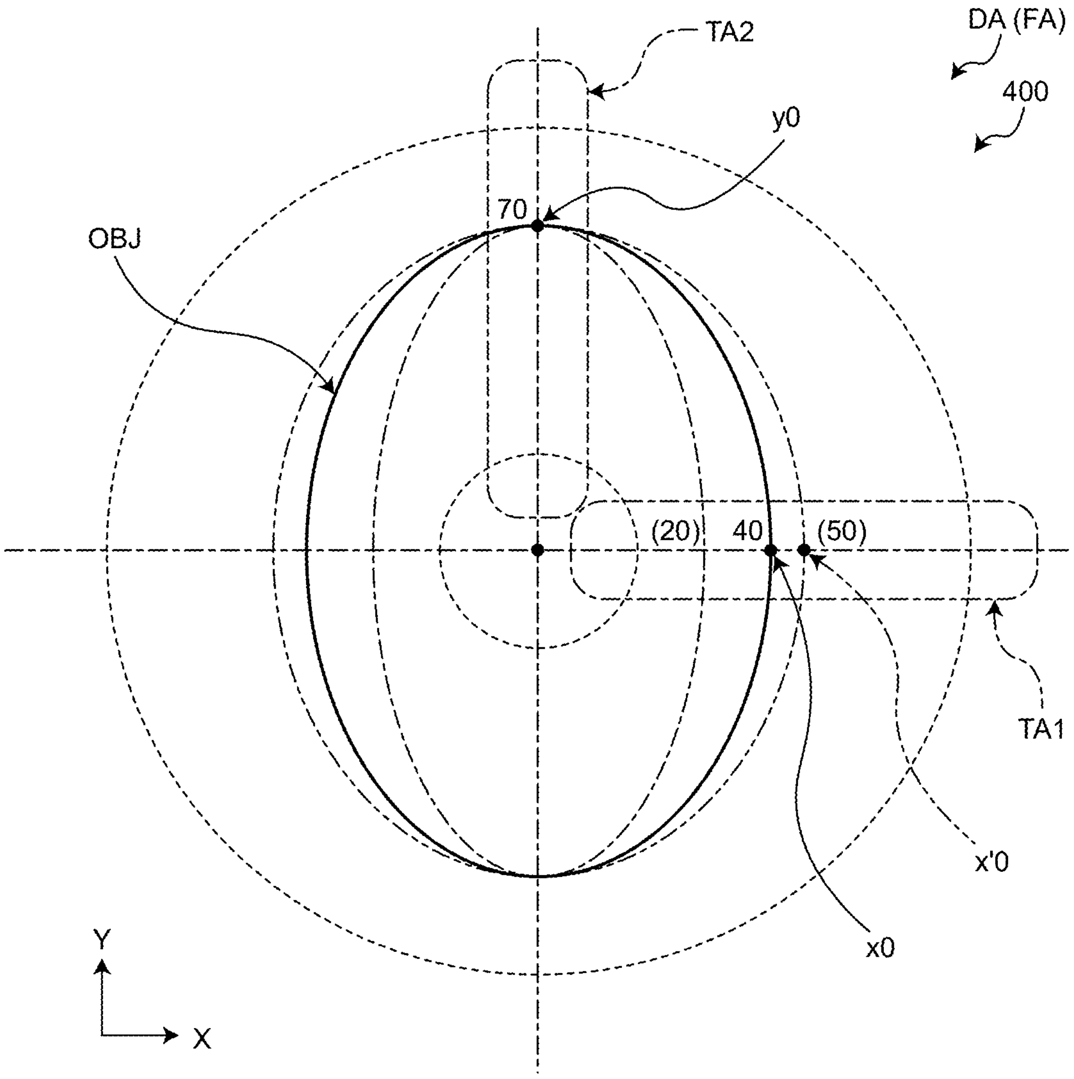
FIG. 29G is a diagram illustrating a specific operation example on the illumination control application screen on the control device according to the first embodiment.

Specifically, in the processing at steps S205 to S217 in the horizontal diffusion degree adjustment processing illustrated in FIG. 21, if the count value T2 of the second timer exceeds the predetermined setting value change time (second time threshold) T2*th* (for example, 0.5 sec) (Yes at step S244 in FIG. 21), the horizontal diffusion degree coarse adjustment processing illustrated in FIG. 22 is executed and the X-direction position display value x0 of the light distribution shape object OBJ becomes a position corresponding to the horizontal diffusion degree display value Sx=40% as illustrated in FIG. 29G.

Figure 29H:
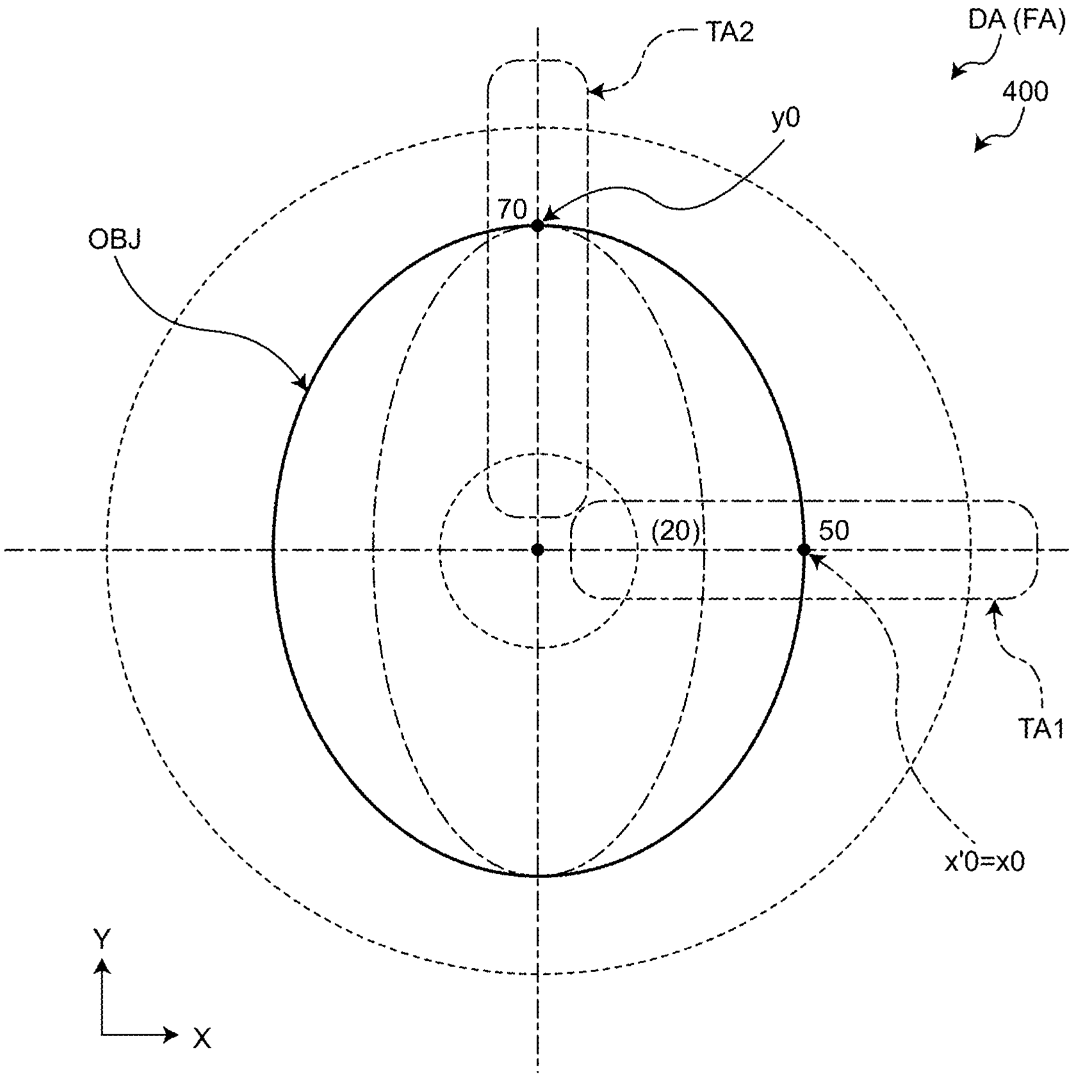
FIG. 29H is a diagram illustrating a specific operation example on the illumination control application screen on the control device according to the first embodiment.

Then, in the subsequent processing at steps S205 to S217, if the horizontal diffusion degree difference value ΔSx becomes 10% (ΔSx=Sx' (=50%)−Sx (=40%)=10%) and the magnitude |ΔSx| (=10%) of the horizontal diffusion degree difference value ΔSx becomes equal to or smaller than the magnitude |LSCx| of the horizontal diffusion degree coarse adjustment scale setting value LSCx (=20%) (|ΔSx|≤|LSCx|; No at step S211 in FIG. 21), the horizontal diffusion degree matching processing illustrated in FIG. 23 is executed. Accordingly, the horizontal diffusion degree display value Sx matches the target horizontal diffusion degree Sx', and the X-direction touch position detection value x'0 corresponding to the target horizontal diffusion degree Sx' and the X-direction position display value x0 of the light distribution shape object OBJ become identical or substantially identical (x'0≈x0) as illustrated in FIG. 29H.

Figure 29I:
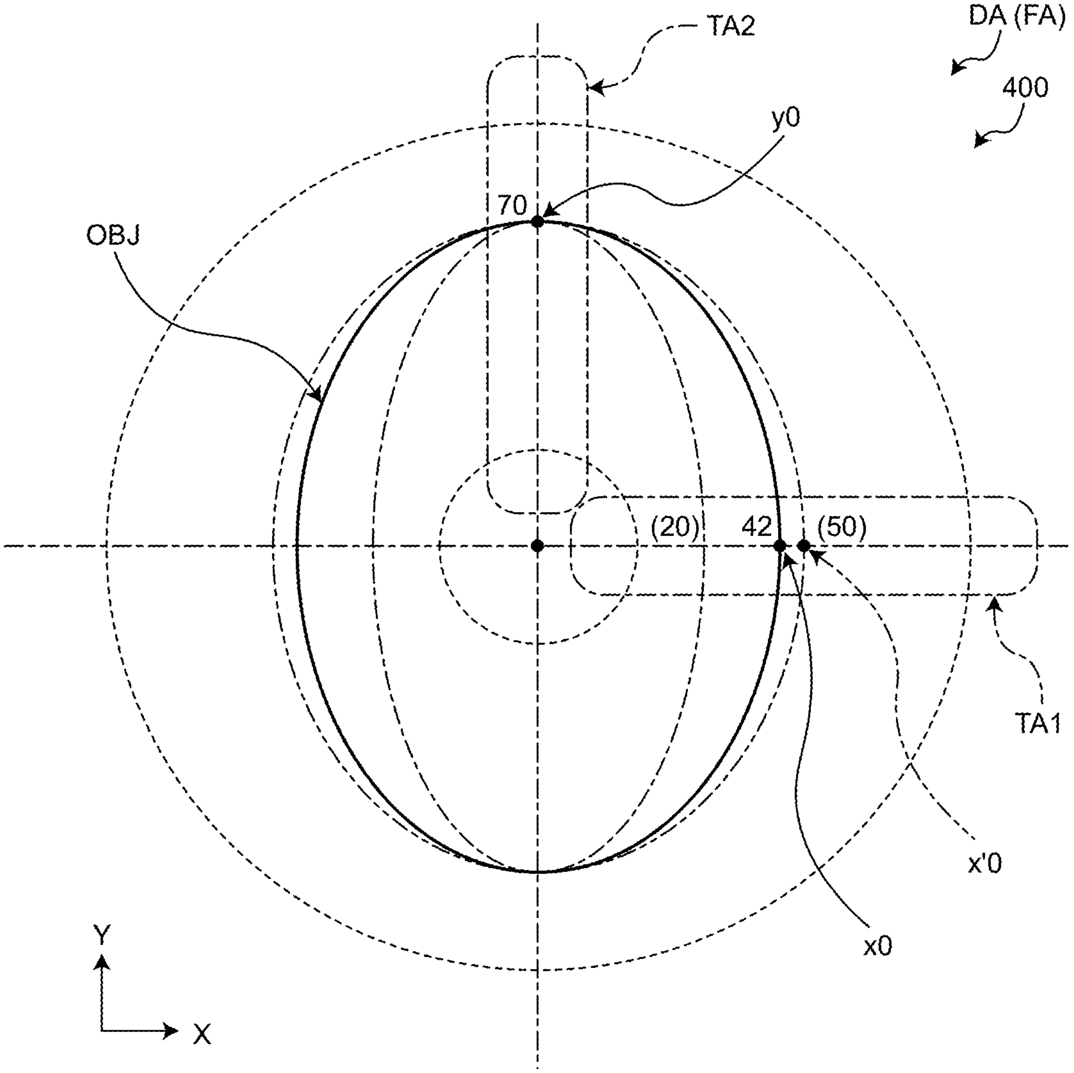
FIG. 29I is a diagram illustrating a specific operation example on the illumination control application screen on the control device according to the first embodiment.

FIG. 29I illustrates an example in which, thereafter, the user further performs a swipe operation in the first adjustment region TA1 while the long tap state is maintained. More specifically, FIG. 29I illustrates an example in which the X-direction touch position detection value x'0 in the first adjustment region TA1 is updated through the swipe operation, the magnitude |ΔSx| of the horizontal diffusion degree difference value ΔSx becomes smaller than the magnitude |LSCx (=20%)| of the horizontal diffusion degree coarse adjustment scale setting value LSCx (|ΔSx|<|LSCx|; Yes at step S218 in FIG. 21), and the X-direction touch position detection value x'0 corresponding to the target horizontal diffusion degree Sx'=42% is detected in the first adjustment region TA1 (the swipe operation by the user has stopped at the X-direction touch position detection value x'0).

In this case, the horizontal diffusion degree difference value ΔSx is −8% (ΔSx=Sx' (=42%)−Sx (=50%)=−8%), and the magnitude |ΔSx| (=8%) of the horizontal diffusion degree difference value ΔSx is smaller than the magnitude |LSCx| of the horizontal diffusion degree coarse adjustment scale setting value LSCx (=20%) (|ΔSx|<|LSCx|; Yes at step S218 in FIG. 21). Accordingly, the horizontal diffusion degree fine adjustment processing illustrated in FIG. 24 is executed.

In this case, the sign of the horizontal diffusion degree difference value ΔSx (=−8%) is "− (negative value)" (No at step S261 in FIG. 24). Accordingly, the horizontal diffusion degree of the illumination device 1 is finely adjusted in a direction in which the horizontal diffusion degree decreases.

FIG. 29I illustrates an example in which the user has released a finger from the screen when the X-direction position display value x0 of the light distribution shape object OBJ becomes a position corresponding to the horizontal diffusion degree display value Sx=42% (No at step S217 in FIG. 21). Accordingly, the current horizontal diffusion degree display value Sx=42% is finalized with the current horizontal diffusion degree display value Sx being reflected in the control state of the horizontal diffusion degree of the illumination device 1.

Through the above-described processing, the horizontal diffusion degree display value Sx of the light distribution shape object OBJ on the illumination control application screen 400 and the horizontal diffusion degree of the illumination device 1, the initial diffusion degree of which is 50%, are adjusted from 50% to 42% in units of 1%. In other words, in this fine adjustment phase, the control device 200 adjusts the diffusion degree of the light distribution shape object OBJ on the illumination control application screen 400 and the diffusion degree of the illumination device 1 from the initial diffusion degree to the target horizontal diffusion degree Sx' (target vertical diffusion degree Sy') in units of the horizontal diffusion degree fine adjustment scale setting value SSCx (vertical diffusion degree fine adjustment scale setting value SSCy), wherein the target horizontal diffusion degree Sx' (target vertical diffusion degree Sy') is indicated by the user touching the first adjustment region TA1 (or the second adjustment region TA2) on the illumination control application screen 400. Accordingly, the user can visually recognize that the light distribution shape object OBJ on the illumination control application screen 400 is being changed in significantly smaller units as compared to the above-described coarse adjustment phase, and can visually recognize and physically perceive that the diffusion degree of the illumination device 1 is being changed in the smaller units.

In the control device 200 for the illumination device 1 according to the first embodiment described above, after transition to the long tap state in the first adjustment region TA1, the target horizontal diffusion degree Sx' corresponding to the X-direction touch position detection value x'0 in the first adjustment region TA1 is acquired, and processing of calculating the horizontal diffusion degree difference value ΔSx, which is the difference between the acquired target horizontal diffusion degree Sx' and the horizontal diffusion degree display value Sx corresponding to the current horizontal diffusion degree of the illumination device 1, is executed. Then, if the horizontal diffusion degree difference value ΔSx calculated in the horizontal diffusion degree difference value calculation processing exceeds the horizontal diffusion degree coarse adjustment scale setting value LSCx (first adjustment interval), the horizontal diffusion degree display value Sx is adjusted in steps of the horizontal diffusion degree coarse adjustment scale setting value LSCx (first adjustment interval). Accordingly, the horizontal diffusion degree display value Sx corresponding to the X-direction position display value x0 of the light distribution shape object OBJ is coarsely adjusted in a direction toward the target horizontal diffusion degree Sx' corresponding to the X-direction touch position detection value x'0.

The horizontal diffusion degree display value Sx is matched to the target horizontal diffusion degree Sx' are matched in both cases: when the horizontal diffusion degree difference value ΔSx calculated in the horizontal diffusion degree difference value calculation processing after transition to the long tap state in the first adjustment region TA1 is equal to or larger than the horizontal diffusion degree fine adjustment scale setting value SSCx (second adjustment interval) and equal to or smaller than the horizontal diffusion degree coarse adjustment scale setting value LSCx (first adjustment interval); and when the horizontal diffusion degree difference value ΔSx calculated in the horizontal diffusion degree difference value calculation processing after the horizontal diffusion degree display value Sx is adjusted in steps of the horizontal diffusion degree coarse adjustment scale setting value LSCx (first adjustment interval) becomes equal to or larger than the horizontal diffusion degree fine adjustment scale setting value SSCx (second adjustment interval) and equal to or smaller than the horizontal diffusion degree coarse adjustment scale setting value LSCx (first adjustment interval). Accordingly, the horizontal diffusion degree display value Sx corresponding to the X-direction position display value x0 of the light distribution shape object OBJ matches the target horizontal diffusion degree Sx' corresponding to the X-direction touch position detection value x'0.

When the horizontal diffusion degree difference value ΔSx calculated in the horizontal diffusion degree difference value calculation processing after the horizontal diffusion degree display value Sx is matched to the target horizontal diffusion degree Sx' becomes equal to or larger than the horizontal diffusion degree fine adjustment scale setting value SSCx (second adjustment interval) and smaller than the horizontal diffusion degree coarse adjustment scale setting value LSCx (first adjustment interval), the horizontal diffusion degree display value Sx is adjusted in steps of the horizontal diffusion degree fine adjustment scale setting value SSCx (second adjustment interval), which is smaller than the horizontal diffusion degree coarse adjustment scale setting value LSCx (first adjustment interval). Accordingly, the horizontal diffusion degree display value Sx corresponding to the X-direction position display value x0 of the light distribution shape object OBJ is finely adjusted in a direction toward the target horizontal diffusion degree Sx' corresponding to the X-direction touch position detection value x'0.

When the horizontal diffusion degree difference value ΔSx calculated in the horizontal diffusion degree difference value calculation processing after the horizontal diffusion degree display value Sx is matched to the target horizontal diffusion degree Sx' or after the horizontal diffusion degree display value Sx is adjusted in steps of the horizontal diffusion degree fine adjustment scale setting value SSCx (second adjustment interval) becomes equal to the horizontal diffusion degree coarse adjustment scale setting value LSCx (first adjustment interval), the horizontal diffusion degree display value Sx is matched to the target horizontal diffusion degree Sx'. Accordingly, the horizontal diffusion degree display value Sx corresponding to the X-direction position display value x0 of the light distribution shape object OBJ matches again the target horizontal diffusion degree Sx' corresponding to the X-direction touch position detection value x'0.

When the horizontal diffusion degree difference value ΔSx calculated in the horizontal diffusion degree difference value calculation processing after the horizontal diffusion degree display value Sx is matched to the target horizontal diffusion degree Sx' or after the horizontal diffusion degree display value Sx is adjusted in steps of the horizontal diffusion degree fine adjustment scale setting value SSCx (second adjustment interval) exceeds the horizontal diffusion degree coarse adjustment scale setting value LSCx (first adjustment interval), the horizontal diffusion degree display value Sx is adjusted in steps of the horizontal diffusion degree coarse adjustment scale setting value LSCx (first adjustment interval). Accordingly, the horizontal diffusion degree display value Sx corresponding to the X-direction position display value x0 of the light distribution shape object OBJ is again coarsely adjusted in a direction toward the target horizontal diffusion degree Sx' corresponding to the X-direction touch position detection value x'0. Thereafter, when the horizontal diffusion degree difference value ΔSx calculated in the horizontal diffusion degree difference value calculation processing becomes equal to or larger than the horizontal diffusion degree fine adjustment scale setting value SSCx (second adjustment interval) and equal to or smaller than the horizontal diffusion degree coarse adjustment scale setting value LSCx (first adjustment interval), the horizontal diffusion degree display value Sx is matched to the target horizontal diffusion degree Sx'. Accordingly, the horizontal diffusion degree display value Sx corresponding to the X-direction position display value x0 of the light distribution shape object OBJ matches again the target horizontal diffusion degree Sx' corresponding to the X-direction touch position detection value x'0.

Detection of the X-direction touch position detection value x'0 for defining the target horizontal diffusion degree Sx' is started when the continuation time T1 of a touch in the first adjustment region TA1 has exceeded the predetermined long tap detection time (first time threshold) T1*th*. The horizontal diffusion degree difference value calculation processing is executed at intervals of the predetermined setting value change time (second time threshold) T2*th* while the touch in the first adjustment region TA1 is continuous.

Accordingly, for example, the current horizontal diffusion degree display value Sx is finalized with the current horizontal diffusion degree display value Sx being reflected in the control state of the horizontal diffusion degree of the illumination device 1 when the user releases a finger from the screen at a timing at which a desired horizontal diffusion degree display value Sx is obtained. Thus, a desired horizontal diffusion degree display value Sx can be easily obtained, which facilitates fine adjustment of the horizontal diffusion degree display value Sx.

In the control device 200 for the illumination device 1 according to the first embodiment described above, after transition to the long tap state in the second adjustment region TA2, the target vertical diffusion degree Sy' corresponding to the Y-direction touch position detection value y'0 in the second adjustment region TA2 is acquired, and processing of calculating the vertical diffusion degree difference value ΔSy, which is the difference between the acquired target vertical diffusion degree Sy' and the vertical diffusion degree display value Sy corresponding to the current vertical diffusion degree of the illumination device 1, is executed. Then, if the vertical diffusion degree difference value ΔSy calculated in the vertical diffusion degree difference value calculation processing exceeds the vertical diffusion degree coarse adjustment scale setting value LSCy (first adjustment interval), the control device 200 adjusts the vertical diffusion degree display value Sy in steps of the vertical diffusion degree coarse adjustment scale setting value LSCy (first adjustment interval). Accordingly, the vertical diffusion degree display value Sy corresponding to the Y-direction position display value y0 of the light distribution shape object OBJ is coarsely adjusted in a direction toward the target vertical diffusion degree Sy' corresponding to the Y-direction touch position detection value y'0.

The vertical diffusion degree display value Sy is matched to the target vertical diffusion degree Sy', in both cases: when the vertical diffusion degree difference value ΔSy calculated in the vertical diffusion degree difference value calculation processing after transition to the long tap state in the second adjustment region TA2 is equal to or larger than the vertical diffusion degree fine adjustment scale setting value SSCy (second adjustment interval) and equal to or smaller than the vertical diffusion degree coarse adjustment scale setting value LSCy (first adjustment interval); and when the vertical diffusion degree difference value ΔSy calculated in the vertical diffusion degree difference value calculation processing after the vertical diffusion degree display value Sy is adjusted in steps of the vertical diffusion degree coarse adjustment scale setting value LSCy (first adjustment interval) becomes equal to or larger than the vertical diffusion degree fine adjustment scale setting value SSCy (second adjustment interval) and equal to or smaller than the horizontal diffusion degree coarse adjustment scale setting value LSCx (first adjustment interval). Accordingly, the vertical diffusion degree display value Sy corresponding to the Y-direction position display value y0 of the light distribution shape object OBJ matches the target vertical diffusion degree Sy' corresponding to the Y-direction touch position detection value y'0.

When the vertical diffusion degree difference value ΔSy calculated in the vertical diffusion degree difference value calculation processing after the vertical diffusion degree display value Sy is matched to the target vertical diffusion degree Sy' becomes equal to or larger than the vertical diffusion degree fine adjustment scale setting value SSCy (second adjustment interval) and smaller than the vertical diffusion degree coarse adjustment scale setting value LSCy (first adjustment interval), the vertical diffusion degree display value Sy is adjusted in steps of the vertical diffusion degree fine adjustment scale setting value SSCy (second adjustment interval), which is smaller than the vertical diffusion degree coarse adjustment scale setting value LSCy (first adjustment interval). Accordingly, the vertical diffusion degree display value Sy corresponding to the Y-direction position display value y0 of the light distribution shape object OBJ is finely adjusted in a direction toward the target vertical diffusion degree Sy' corresponding to the Y-direction touch position detection value y'0.

When the vertical diffusion degree difference value ΔSy calculated in the vertical diffusion degree difference value calculation processing after the vertical diffusion degree display value Sy is matched to the target vertical diffusion degree Sy' or after the vertical diffusion degree display value Sy is adjusted in steps of the vertical diffusion degree fine adjustment scale setting value SSCy (second adjustment interval) becomes equal to the vertical diffusion degree coarse adjustment scale setting value LSCy (first adjustment interval), the vertical diffusion degree display value Sy is matched to the target vertical diffusion degree Sy'. Accordingly, the vertical diffusion degree display value Sy corresponding to the Y-direction position display value y0 of the light distribution shape object OBJ matches again the target vertical diffusion degree Sy' corresponding to the Y-direction touch position detection value y'0.

When the vertical diffusion degree difference value ΔSy calculated in the vertical diffusion degree difference value calculation processing after the vertical diffusion degree display value Sy is matched to the target vertical diffusion degree Sy' or after the vertical diffusion degree display value Sy is adjusted in steps of the vertical diffusion degree fine adjustment scale setting value SSCy (second adjustment interval) exceeds the vertical diffusion degree coarse adjustment scale setting value LSCy (first adjustment interval), the vertical diffusion degree display value Sy is adjusted in steps of the vertical diffusion degree coarse adjustment scale setting value LSCy (first adjustment interval). Accordingly, the vertical diffusion degree display value Sy corresponding to the Y-direction position display value y0 of the light distribution shape object OBJ is again coarsely adjusted in a direction toward the target vertical diffusion degree Sy' corresponding to the Y-direction touch position detection value y'0. Thereafter, when the vertical diffusion degree difference value ΔSy calculated in the vertical diffusion degree difference value calculation processing becomes equal to or larger than the vertical diffusion degree fine adjustment scale setting value SSCy (second adjustment interval) and equal to or smaller than the vertical diffusion degree coarse adjustment scale setting value LSCy (first adjustment interval), the vertical diffusion degree display value Sy is matched to the target vertical diffusion degree Sy'. Accordingly, the vertical diffusion degree display value Sy corresponding to the Y-direction position display value y0 of the light distribution shape object OBJ matches again the target vertical diffusion degree Sy' corresponding to the Y-direction touch position detection value y'0.

Detection of the Y-direction touch position detection value y'0 for defining the target vertical diffusion degree Sy' is started when the continuation time T1 of a touch in the second adjustment region TA2 has exceeded the predetermined long tap detection time (first time threshold) T1*th*. The vertical diffusion degree difference value calculation processing is executed at intervals of the predetermined setting value change time (second time threshold) T2*th* while the touch in the second adjustment region TA2 is continuous.

Accordingly, for example, the current vertical diffusion degree display value Sy is finalized with the current vertical diffusion degree display value Sy being reflected in the control state of the horizontal diffusion degree of the illumination device 1 when the user releases a finger from the screen at a timing at which a desired vertical diffusion degree display value Sy is obtained. Thus, a desired vertical diffusion degree display value Sy can be easily obtained, which facilitates fine adjustment of the vertical diffusion degree display value Sy. More specifically, in the control device 200 for the illumination device 1 of the present embodiment, the above-described coarse adjustment and fine adjustment are selected as appropriate based on the magnitude of the swipe amount of a user finger touching the screen (magnitude of the movement amount of the finger touching the screen), thereby improving operability. As a result, the user can obtain a desired diffusion degree through more intuitive operations.

Second Embodiment

Configurations and operation for controlling the light diffusion degree of an illumination device 1*a* in a control device 200*a* of an illumination system according to a second embodiment will be described below. The following description will be made on configurations and operation different from those in the first embodiment, and duplicate description is omitted in some cases.

Figure 30:
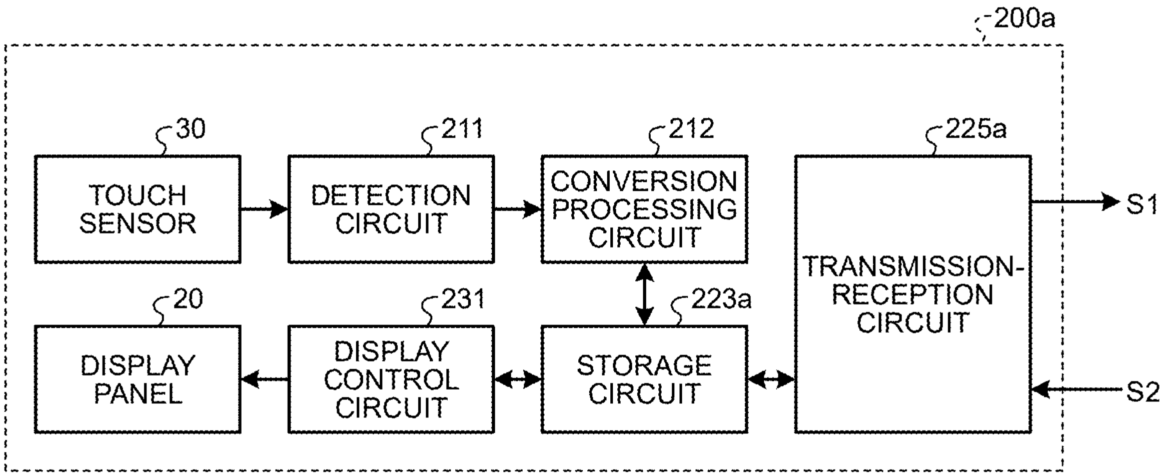
FIG. 30 is a diagram illustrating an example of a control block configuration of a control device according to a second embodiment.

FIG. 30 is a diagram illustrating an example of a control block configuration of the control device 200*a* according to the second embodiment.

Various parameter values and various setting values that are necessary for operation of an illumination control application according to the second embodiment to be described later are stored in a storage region of a storage circuit 223*a* according to the second embodiment. The various parameter values and various setting values that are necessary for operation of the illumination control application according to the second embodiment will be described later.

A transmission-reception circuit 225*a* transmits and receives setting information to and from the illumination device 1*a*. Specifically, the transmission-reception circuit 225*a* transmits a light diffusion degree S1 to the illumination device 1*a* as first setting information in each processing to be described later. The transmission-reception circuit 225*a* receives second light diffusion degree information (light diffusion degree S2) transmitted from the illumination device 1*a*.

Figure 31:
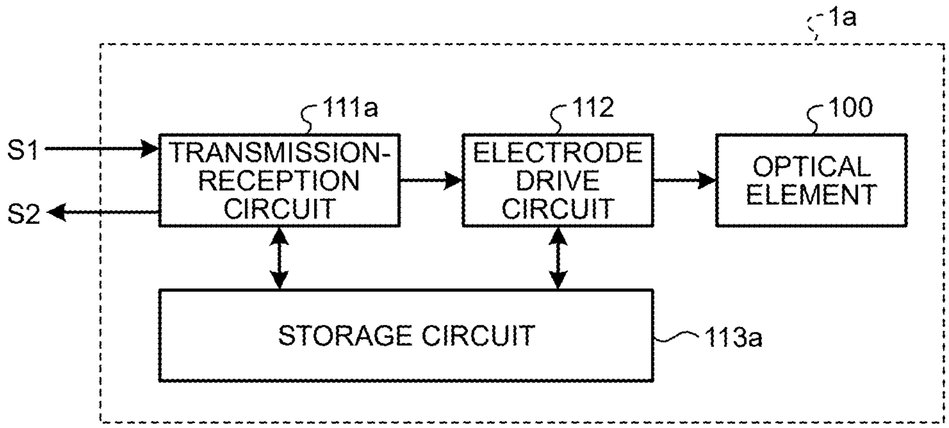
FIG. 31 is a diagram illustrating an example of a control block configuration of an illumination device according to the second embodiment.

FIG. 31 is a diagram illustrating an example of a control block configuration of the illumination device 1*a* according to the second embodiment.

A transmission-reception circuit 111*a* transmits and receives light diffusion degree information to and from the control device 200*a*. Specifically, the transmission-reception circuit 111*a* receives first light diffusion degree information (light diffusion degree S1) transmitted from the control device 200*a*. The transmission-reception circuit 111*a* transmits the light diffusion degree S2 stored in a storage circuit 113*a* to the control device 200*a* as the second light diffusion degree information.

In the present disclosure, upon activation of the illumination device 1*a*, the transmission-reception circuit 111*a* transmits the light diffusion degree S2 stored in the storage circuit 113*a* to the control device 200*a* as the second light diffusion degree information and stores, in the storage circuit 113*a* as the new light diffusion degree S2, the first light diffusion degree information (light diffusion degree S1) transmitted from the control device 200*a* by each processing of the control device 200*a* to be described later. In other words, when the first light diffusion degree information is transmitted from the control device 200*a* to the illumination device 1*a*, the second light diffusion degree information is updated to the first light diffusion degree information. The illumination device 1*a* initially does not store the second light diffusion degree information. In this case, the first light diffusion degree information is transmitted from the control device 200*a*, whereby the second light diffusion degree information is stored.

The following describes specific examples of processing and display aspects of the illumination control application that operates on the control device 200*a* according to the second embodiment in detail.

Figure 32:
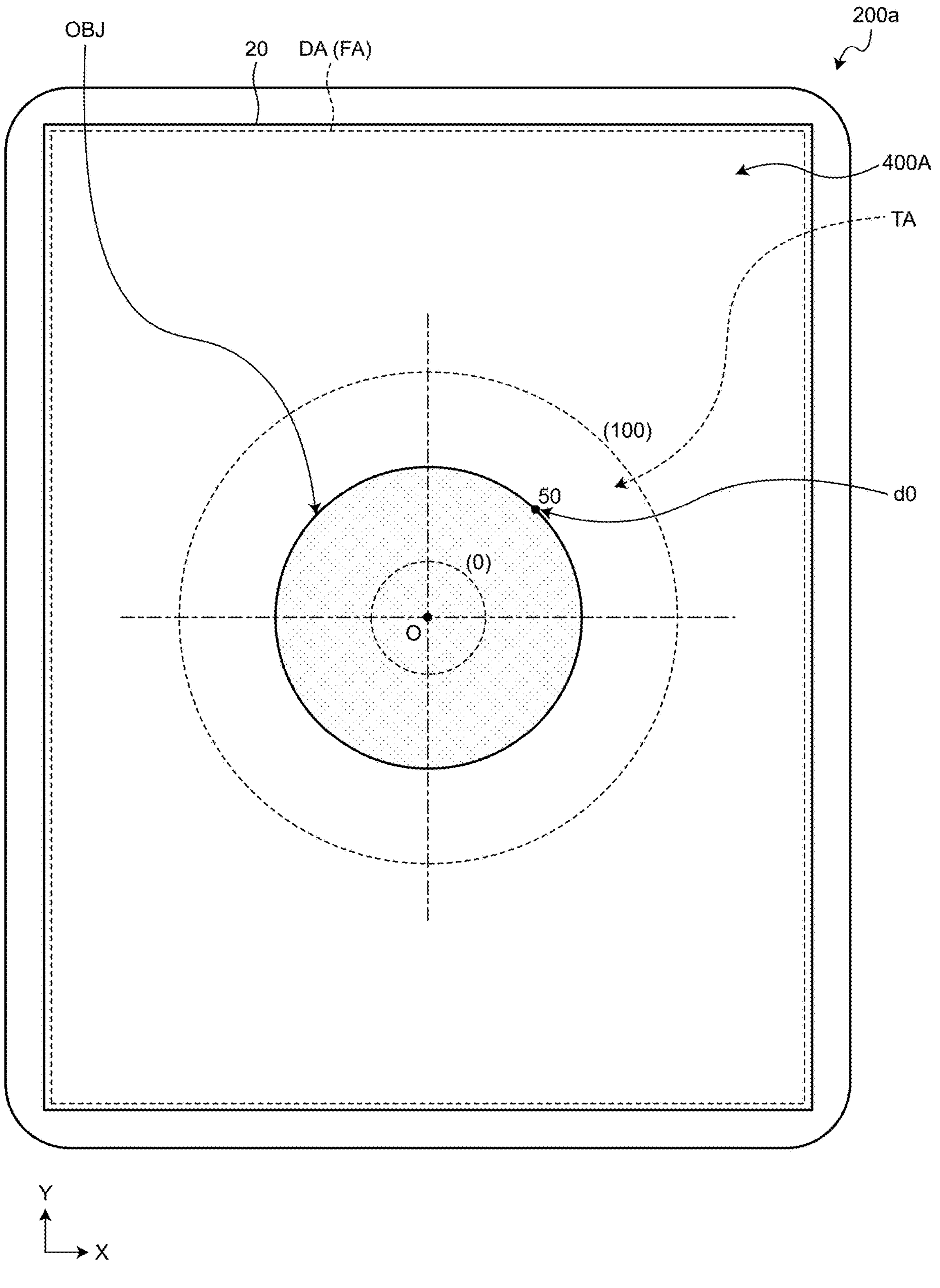
FIG. 32 is a conceptual diagram illustrating an example of the display aspect of an illumination control application screen on the control device according to the second embodiment.

FIG. 32 is a conceptual diagram illustrating an example of the display aspect of an illumination control application screen 400A on the control device 200*a* according to the second embodiment.

When the illumination control application is activated, the illumination control application screen 400A (adjustment screen) illustrated in FIG. 32 is displayed and pairing processing is executed between the control device 200*a* and the illumination device 1*a* registered as a control target device of the control device 200*a* in advance. A pairing button (not illustrated) may be displayed on the illumination control application screen 400A, and pairing processing may be executed between the control device 200*a* and the illumination device 1*a* when the pairing button is touched by a user. At initial activation of the illumination control application, for example, the illumination device 1*a* activated in a space where pairing is possible may be registered as a control target device.

On the illumination control application screen 400A illustrated in FIG. 32, the X direction is defined as the Dx direction (first direction) in light diffusion degree control of the illumination device 1*a*, and the Y direction is defined as the Dy direction (second direction) in light diffusion degree control of the illumination device 1*a*. An XY plane with an origin O(0, 0) at a predetermined position in the display region DA is defined on the illumination control application screen 400A.

The display panel 20 is provided with the display region DA overlapping the detection region FA of the touch sensor 30 in plan view. In the example illustrated in FIG. 32, a light distribution shape object OBJ having a substantially circular shape with a center point at the origin O(0, 0) of the XY plane on the illumination control application screen 400A is displayed.

In the configuration according to the second embodiment, the shape of the light distribution shape object OBJ on the illumination control application screen 400A changes concentrically in accordance with the diffusion degree.

In the second embodiment, as illustrated in FIG. 32, an adjustment region TA is provided as a region in which the touch detection position for setting the diffusion degree can be acquired. The adjustment region TA is set as a region where the circular light distribution shape is adjustable in the entire range of a minimum value (0%) to a maximum value (100%). Specifically, in the second embodiment, the adjustment region TA is set to a region between the small and large circles, which is constituted with dotted lines in FIG. 32.

Touch position detection is enabled in the adjustment region TA between the position on the outline of the light distribution shape object OBJ in a case where the diffusion degree is 0% (small dotted circle in the drawing) and the position on the outline of the light distribution shape object OBJ in a case where the diffusion degree is 100% (large dotted circle in the drawing). In the second embodiment, the diffusion degree in the X and Y directions can be simultaneously adjusted to values that are identical to each other, by detecting the touch position in the adjustment region TA.

On the illumination control application screen 400A of the control device 200*a* according to the second embodiment, the diffusion degree of the illumination device 1*a* can be set by a virtual position do on the outline of the substantially circular light distribution shape object OBJ.

In the second embodiment, the position do on the display region DA in the adjustment region TA is a virtual position on the outline of the light distribution shape object OBJ and corresponding to the diffusion degree of the illumination device 1*a* in the X and Y directions. In FIG. 32, "50" displayed near the virtual position do on the display region DA indicates the diffusion degree (50%) of the illumination device 1*a* in the X and Y directions. The shape of the light distribution shape object OBJ concentrically changes with movement of the virtual position do in the display region DA in the adjustment region TA. The virtual position do on the display region DA in the adjustment region TA is defined by, for example, distance from the origin O of the XY plane. The relation between the virtual position do on the display region DA in the adjustment region TA and a diffusion degree S may be calculated by using an expression, or the correspondence relation between the virtual position do and the diffusion degree S may be stored in the storage circuit 223*a*. The following exemplarily describes an aspect in which the virtual position do and the diffusion degree S are mutually calculated by using an expression.

In the present embodiment, the diffusion degree S is a value corresponding to the distance from the origin O(0, 0) of the XY plane on the illumination control application screen 400A to the virtual position do on the display region DA in the adjustment region TA. The user can change the size of the light distribution shape by touching the screen with a finger in the adjustment region TA, and the size of the light distribution shape object OBJ is determined based on a distance $\sqrt{(Xa^2+Ya^2)}$ from the origin O(0, 0) to the touch detection position, where the coordinate of the finger is represented by (Xa, Ya). For example, in a case where the distance $\sqrt{(Xa^2+Ya^2)}$ from the origin O(0, 0) to the touch detection position corresponds to a diffusion degree equivalent to 50%, the light distribution shape is a circular shape corresponding to a diffusion degree equivalent to 50% when the touch detection position on the detection region FA and the virtual position do on the display region DA coincide with each other through by diffusion degree adjustment processing according to the second embodiment.

In the second embodiment, when having detected continuation of a touch in the adjustment region TA on the illumination control application screen 400A described above, the control device 200*a* transitions to diffusion degree adjustment processing. Hereinafter, continuation of a touch in the adjustment region TA is also referred to as a "long tap state".

In the second embodiment, the "long tap state" means a state in which a continuation time T1 of a touch in the adjustment region TA has exceeded a predetermined long tap detection time (first time threshold) T1*th* (for example, 2 sec).

FIG. 33 is a conceptual diagram illustrating an example of a first storage region of the storage circuit 223*a* in the control device 200*a* for the illumination device 1*a* according to the second embodiment. FIG. 34 is a conceptual diagram illustrating an example of a second storage region of the storage circuit 223*a* in the control device 200*a* for the illumination device 1*a* according to the second embodiment. The first storage region stores various parameter values (variables) that are necessary for operation of the illumination control application. The second storage region of the storage circuit 223*a* stores various setting values of the illumination control application.

In the second embodiment, as illustrated in FIG. 33, the first storage region of the storage circuit 223*a* stores a diffusion degree display value S on the illumination control application screen 400A, and a virtual position display value d0 of the light distribution shape object OBJ. The diffusion degree display value S indicates a current diffusion degree of the illumination device 1*a*, which is defined by the virtual position display value d0 of the light distribution shape object OBJ. The first storage region also stores a touch position detection value d'0 in the adjustment region TA, which is detected in illumination control processing according to the second embodiment to be described later, a target diffusion degree S' calculated based on the touch position detection value d'0, and a diffusion degree difference value ΔS that is the difference value between the target diffusion degree S' and the diffusion degree display value S. The target diffusion degree S' is a value calculated from the touch position detection value d'0 in the adjustment region TA or derived based on the correspondence relation. In other words, the target diffusion degree S' is a value defined by the touch position detection value d'0 in the adjustment region TA.

The horizontal diffusion degree of the illumination device 1*a* is changed at different adjustment scales depending on the magnitude of the diffusion degree difference value ΔS, which is calculated at intervals of the predetermined setting value change time (second time threshold) T2*th* (for example, 0.5 sec) in the illumination control processing according to the second embodiment to be described later.

In the second embodiment, as illustrated in FIG. 34, the second storage region of the storage circuit 223*a* stores a diffusion degree coarse adjustment scale setting value LSC (first adjustment interval) and a diffusion degree fine adjustment scale setting value SSC (second adjustment interval).

The diffusion degree coarse adjustment scale setting value LSC is set to, for example, 20%. The diffusion degree fine adjustment scale setting value SSC is set to, for example, 1%. These adjustment scales are exemplary and not limited to the above description. For example, the diffusion degree coarse adjustment scale setting value LSC may be set to, for example, 10% or 30%, and the diffusion degree fine adjustment scale setting value SSC may be set to, for example, 0.5% or 2%. In the second embodiment, the diffusion degree fine adjustment scale setting value SSC (second adjustment interval) only needs to be an interval (step size) smaller than the diffusion degree coarse adjustment scale setting value LSC (first adjustment interval). The diffusion degree coarse adjustment scale setting value LSC and the diffusion degree fine adjustment scale setting value SSC may be values that the user can set on the illumination control application.

The following describes specific examples of processing by the control device 200*a* for the illumination device 1*a* according to the second embodiment described above.

Figure 35:
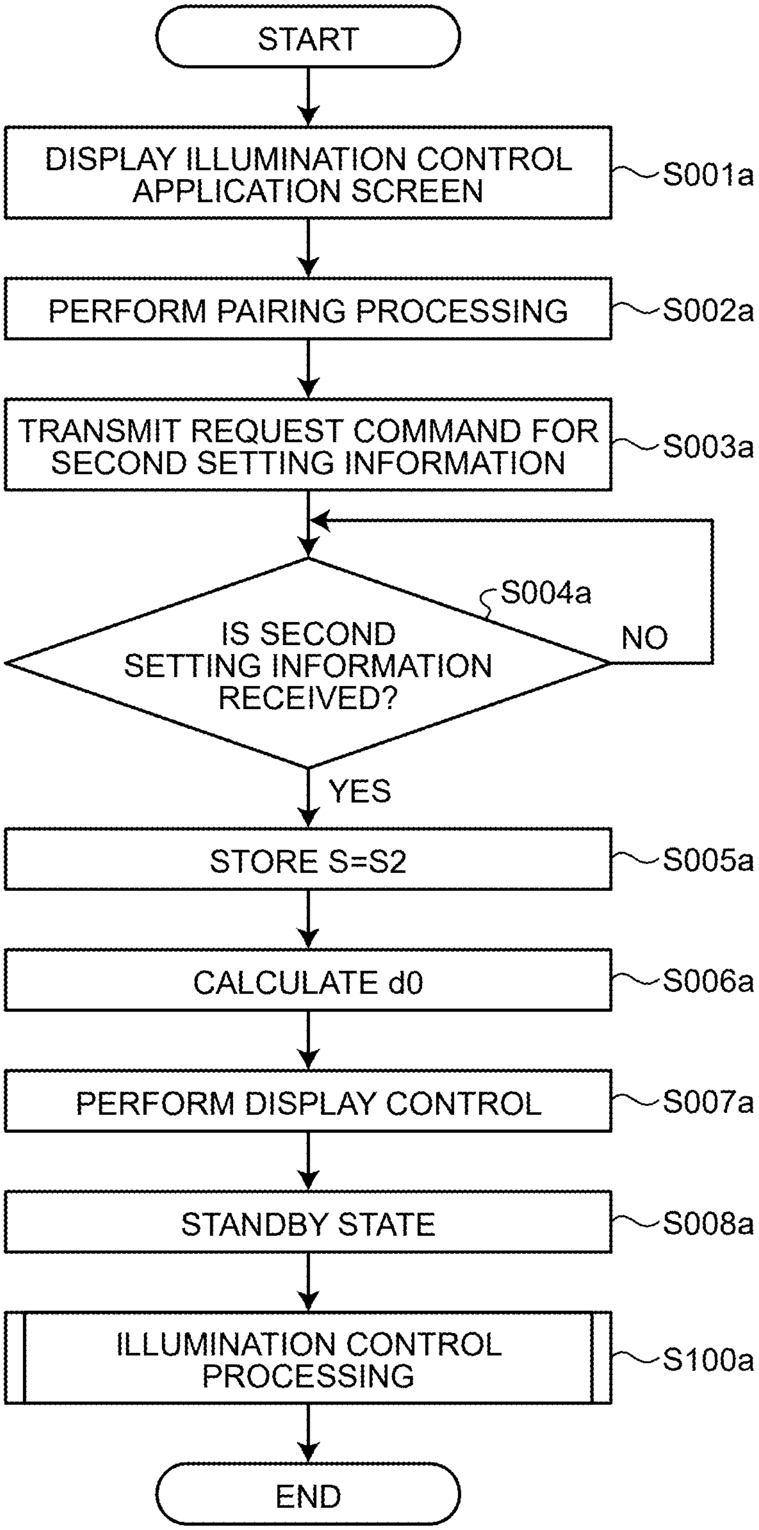
FIG. 35 is a flowchart illustrating an example of initial setting processing by the control device for an illumination device according to the second embodiment.

Processing during execution of the above-described illumination control application is achieved by application software executed by, for example, the CPU of a smartphone, a tablet, or the like constituting the control device 200*a*. FIG. 35 is a flowchart illustrating an example of initial setting processing by the control device 200*a* for the illumination device 1*a* according to the second embodiment.

When the illumination control application is activated on the control device 200*a*, an illumination control application screen 400A illustrated in FIG. 32 is displayed on the display region DA (step S001*a*).

Before activation of the illumination control application, the illumination device 1*a* registered in advance in a space where pairing with the control device 200*a* is possible, is activated.

The transmission-reception circuit 225 of the control device 200*a* executes pairing processing with the illumination device 1*a* registered as a control target device in advance and activated in a space where pairing with the control device 200*a* is possible (step S002*a*), and transmits a request command for the second setting information to the control target device (illumination device 1) (step S003*a*).

The transmission-reception circuit 111*a* of the illumination device 1*a* reads the second setting information stored in the storage circuit 113*a* and transmits the second setting information to the control device 200*a*. The electrode drive circuit 112 of the illumination device 1*a* supplies drive voltage corresponding to the second setting information to the drive electrodes 10 and 13 of each liquid crystal cell 2 of the optical element 100.

The transmission-reception circuit 225*a* of the control device 200*a* determines whether the second setting information is received from the illumination device 1*a* (step S004*a*). If the second setting information is not received from the illumination device 1*a* (No at step S004*a*), the processing at step S004*a* is repeatedly executed.

If the second setting information is received from the illumination device 1*a* (Yes at step S004*a*), the transmission-reception circuit 225*a* stores the light diffusion degree S2 in the second setting information of the illumination device 1*a* in the first storage region of the storage circuit 223*a* illustrated in FIG. 33 as the diffusion degree display value S (step S005*a*).

A diffusion degree initial value S_ini (for example, 50%) is stored in the first storage region. For example, after the initial activation of the illumination device 1*a* or after the illumination device 1*a* activated in a space where pairing is possible is registered as a control target device, the following processing may be performed in which, in place of the above-described processing at steps S003*a* to S005*a*, the diffusion degree initial value S_ini (for example, 50% illustrated in FIG. 33) is set as the diffusion degree display value S, and the diffusion degree display value S is transmitted as the first setting information (S1) to the registered illumination device 1*a*. In this case, the transmission-reception circuit 111*a* of the illumination device 1*a* stores, in the storage circuit 113*a*, the first setting information (S1) received from the control device 200*a* as the second setting information (S2). In addition, the electrode drive circuit 112 of the illumination device 1*a* supplies drive voltage corresponding to the second setting information to the drive electrodes 10 and 13 of each liquid crystal cell 2 of the optical element 100.

The control device 200*a* calculates the virtual position display value d0 on the outline of the light distribution shape object OBJ based on the diffusion degree display value S stored in the first storage region of the storage circuit 223*a* (step S006*a*), and stores the virtual position display value d0 in the first storage region.

The display control circuit 231 of the control device 200*a* reflects the diffusion degree display value S and the virtual position display value d0 on the outline of the light distribution shape object OBJ, which are acquired in the above-described processing and stored in the first storage region of the storage circuit 223*a*, to display control on the illumination control application screen 400A (step S007*a*).

Figure 36:
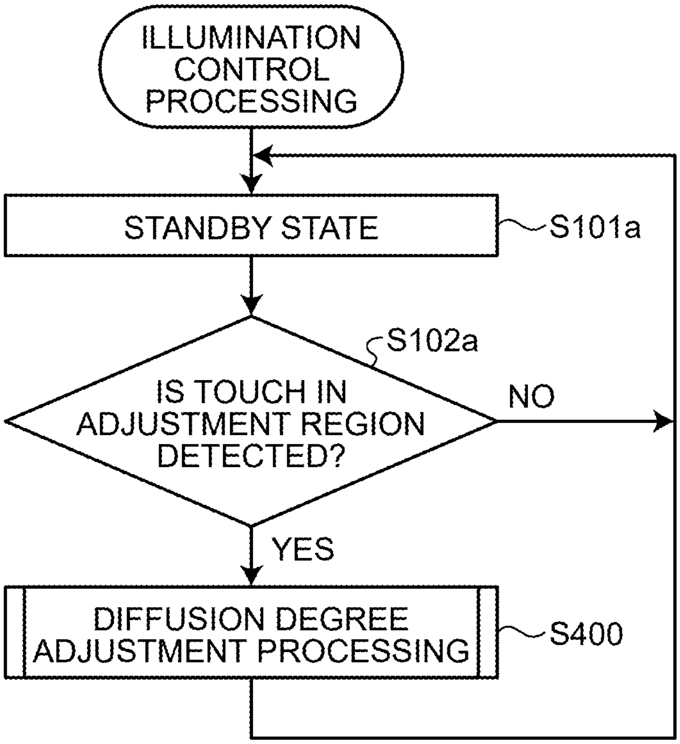
FIG. 36 is a flowchart illustrating an example of the overall flow of illumination control processing by the control device for an illumination device according to the second embodiment.

After the processing up to step S007*a* ends, the process transitions to a standby state (step S008*a*), thereby transitioning the illumination control processing illustrated in FIG. 36 (step S100*a*). FIG. 36 is a flowchart illustrating an example of the overall flow of the illumination control processing by the control device 200*a* for the illumination device 1*a* according to the second embodiment.

In the standby state illustrated in FIG. 36 (step S101*a*), the control device 200*a* executes touch detection processing in the adjustment region TA (step S102*a*).

Specifically, for example, if no touch is detected in the adjustment region TA (No at step S102*a*), the control device 200*a* returns to the standby state at step S101*a* to repeatedly execute the processing at steps S101*a* to S102*a*. The execution interval of the processing at steps S101*a* to S102*a* is, for example, 10 ms.

If a touch is detected in the adjustment region TA (Yes at step S102*a*), the control device 200*a* executes the diffusion degree adjustment processing (step S400). FIG. 37 is a flowchart illustrating an example of the diffusion degree adjustment processing by the control device 200*a* for the illumination device 1*a* according to the second embodiment.

After having transitioned to the diffusion degree adjustment processing illustrated in FIG. 37, the control device 200*a* resets a count value T1 of a first timer that counts the continuation time of a touch in the adjustment region TA (T1=0; step S401).

Subsequently, the control device 200*a* determines whether the count value T1 of the first timer has exceeded a predetermined long tap detection time (first time threshold) T1*th* (for example, 2 sec) (step S402). The long tap detection time (first time threshold) T1*th* is set to, for example, 200 counts (T1*th*=200) when 10 ms is defined as one count. The long tap detection time (first time threshold) T1*th* is not limited to 2 sec (=200).

If the count value T1 of the first timer is smaller than the predetermined long tap detection time T1*th* (T1<T1*th*; No at step S402), the control device 200*a* subsequently determines whether the touch state in the adjustment region TA is continuous (step S403). If the touch state in the adjustment region TA is not continuous (No at step S403), in other words, if a user's finger is released from the screen or if the touch detection position is out of the adjustment region TA, the process returns to the illumination control processing illustrated in FIG. 36, thereby transitioning to a standby state without adjustment of the control state of the diffusion degree of the illumination device 1*a* (step S101*a*).

If the touch state in the adjustment region TA is continuous (Yes at step S403), the processing at steps S402 to S403 is repeatedly executed until the count value T1 of the first timer exceeds the predetermined long tap detection time T1*th* (Yes at step S402).

If the count value T1 of the first timer exceeds the predetermined long tap detection time T1*th* (Yes at step S402), the control device 200*a* determines that the touch state is the long tap state (step S404), resets the count value T2 of the second timer that counts the predetermined setting value change time (second time threshold) T2*th* (T2=0; step S405), and executes processing of calculating the diffusion degree difference value ΔS (hereinafter also simply referred to as "diffusion degree difference value calculation processing"). Specifically, the control device 200*a* detects the touch position in the adjustment region TA and stores the detected touch position in the first storage region of the storage circuit 223*a* illustrated in FIG. 17 as the touch position detection value d'0 (step S406). In addition, the control device 200*a* calculates the target diffusion degree S' corresponding to the detected touch position detection value d'0 (step S407) and stores the target diffusion degree S' in the first storage region illustrated in FIG. 17. The touch position detection value d'0 in the adjustment region TA is different from the position display value d0 of the light distribution shape object OBJ.

Then, the control device 200*a* reads the diffusion degree display value S and the target diffusion degree S' from the first storage region, calculates the diffusion degree difference value ΔS (ΔS=S'−S; step S408), and determines whether the magnitude |ΔS| of the diffusion degree difference value ΔS is smaller than the magnitude |SSC| of the diffusion degree fine adjustment scale setting value SSC (second adjustment interval) (step S409).

If the magnitude |ΔS| of the diffusion degree difference value ΔS is equal to or larger than the magnitude |SSC| of the diffusion degree fine adjustment scale setting value SSC (No at step S409), the control device 200*a* subsequently determines whether the magnitude |ΔS| of the diffusion degree difference value ΔS exceeds the magnitude |LSC| of the diffusion degree coarse adjustment scale setting value LSC (step S411).

Figure 38:
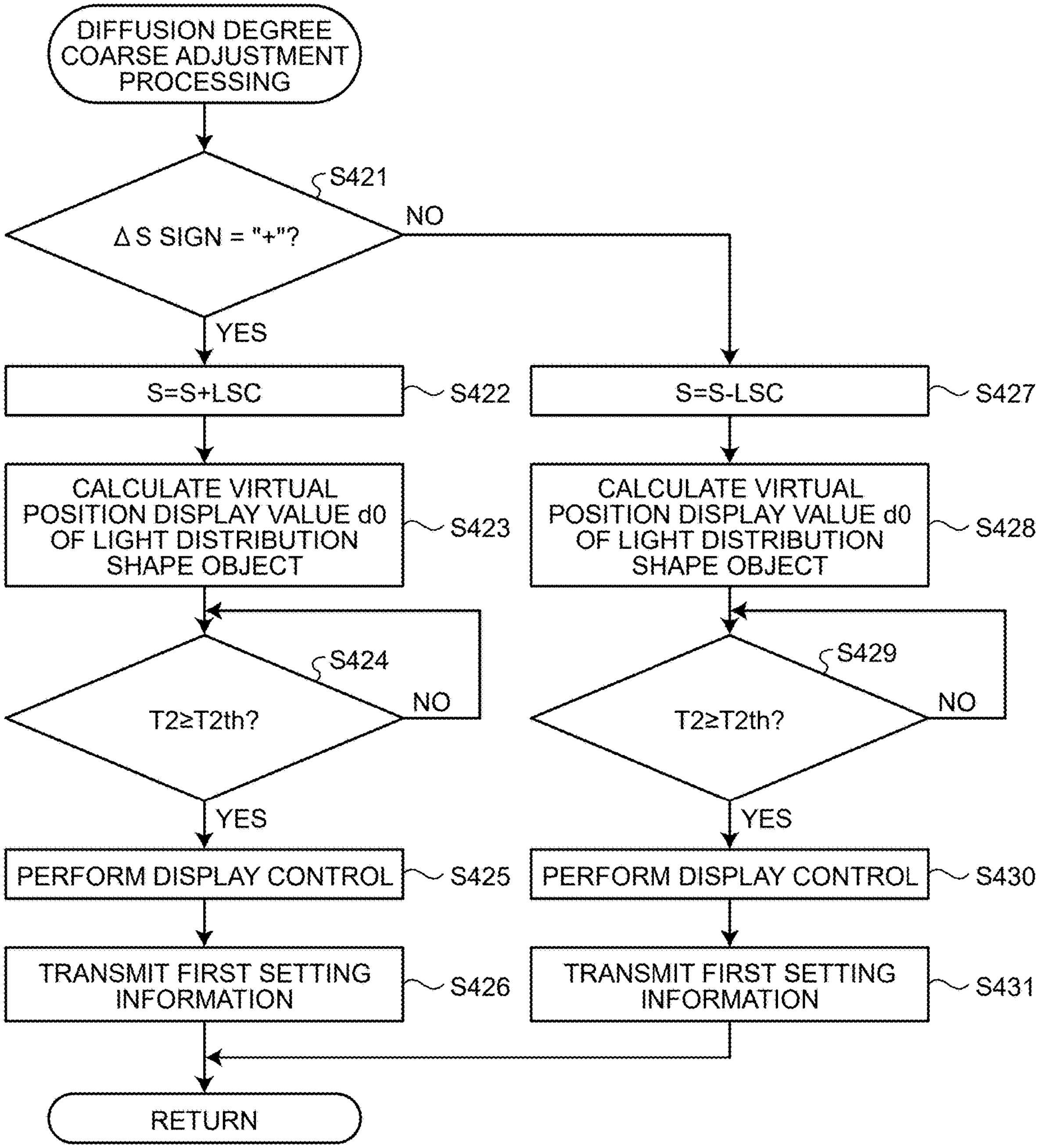
FIG. 38 is a flowchart illustrating an example of diffusion degree coarse adjustment processing by the control device for an illumination device according to the second embodiment.

If the magnitude |ΔS| of the diffusion degree difference value ΔS exceeds the magnitude |LSC| of the diffusion degree coarse adjustment scale setting value LSC (Yes at step S411), the control device 200*a* executes diffusion degree coarse adjustment processing (step S420). FIG. 38 is a flowchart illustrating an example of the diffusion degree coarse adjustment processing by the control device 200 of the illumination device 1*a* according to the second embodiment.

The control device 200*a* reads the sign of the diffusion degree difference value ΔS and determines the adjustment direction of the diffusion degree display value S with respect to the target diffusion degree S'. Specifically, the control device 200*a* determines whether the sign of the diffusion degree difference value ΔS is "+ (positive value)" (step S421).

If the sign of the diffusion degree difference value ΔS is "+ (positive value)" (Yes at step S421), it is indicated that the adjustment direction of the diffusion degree display value S with respect to the target diffusion degree S' is a direction in which the diffusion degree of the illumination device 1*a* increases. In this case, the control device 200*a* adds the diffusion degree coarse adjustment scale setting value LSC (first adjustment interval) to the diffusion degree display value S (step S422), thereby updating the diffusion degree display value S. In addition, the control device 200*a* calculates the virtual position display value d0 of the light distribution shape object OBJ, which corresponds to the diffusion degree display value S (step S423), and stores the virtual position display value d0 in the first storage region of the storage circuit 223*a* illustrated in FIG. 17.

Subsequently, the control device 200*a* determines whether the count value T2 of the second timer has exceeded the predetermined setting value change time (second time threshold) T2*th* (for example, 0.5 sec) (step S424). The setting value change time (second time threshold) T2*th* is set to, for example, 50 counts (T2*th*=50) when 10 ms is defined as one count. The setting value change time (second time threshold) T2*th* is not limited to 0.5 sec (=50).

If the count value T2 of the second timer is smaller than the predetermined setting value change time T2*th* (T2<T2*th*; No at step S424), the processing at step S424 is repeatedly executed until the count value T2 of the second timer becomes equal to or larger than the predetermined setting value change time T2*th* (T2≥T2*th*; Yes at step S424). If the count value T2 of the second timer becomes equal to or larger than the predetermined setting value change time T2*th* (T2≥T2*th*; Yes at step S424), the display control circuit 231 of the control device 200*a* reflects the diffusion degree display value S and the virtual position display value d0 of the light distribution shape object OBJ, which are acquired in the above-described processing and stored in the first storage region of the storage circuit 223*a*, to display control on the illumination control application screen 400A (step S425). In addition, the transmission-reception circuit 225*a* of the control device 200*a* reads the diffusion degree display value S stored in the first storage region and transmits the read diffusion degree display value S as the first setting information (S1=S) to the illumination device 1*a* (step S426).

The transmission-reception circuit 111 of the illumination device 1*a* stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 37, the control device 200*a* determines whether the long tap state is continuous (step S410). If the long tap state is not continuous (No at step S410), in other words, if a user's finger is released from the screen or if the touch detection position is out of the adjustment region TA, the process returns to the illumination control processing illustrated in FIG. 36, thereby transitioning to a standby state (step S101*a*). Accordingly, the current diffusion degree display value S is finalized with the current diffusion degree display value S being reflected in the control state of the diffusion degree of the illumination device 1*a*.

If the long tap state is continuous (Yes at step S410), the process returns to the processing at step S405. When the following conditions are satisfied: the long tap state is continuous (Yes at step S410), the magnitude |ΔS| of the diffusion degree difference value ΔS exceeds the magnitude |LSC| of the diffusion degree coarse adjustment scale setting value LSC (Yes at step S411), and the sign of the diffusion degree difference value ΔS is "+ (positive value)" (Yes at step S421), the processing at steps S405 to S410 including the above-described diffusion degree coarse adjustment processing (step S420; FIG. 38) is repeatedly executed at intervals of the predetermined setting value change time (second time threshold) T2*th* until the magnitude |ΔS| of the diffusion degree difference value ΔS becomes equal to or smaller than the magnitude |LSC| of the diffusion degree coarse adjustment scale setting value LSC (No at step S411). Accordingly, the diffusion degree display value S is coarsely adjusted in steps of the diffusion degree coarse adjustment scale setting value LSC (first adjustment interval) in a direction in which the diffusion degree display value S increases.

Referring back to FIG. 38, if the sign of the diffusion degree difference value ΔS is "− (negative value)" (No at step S421), it is indicated that the adjustment direction of the diffusion degree display value S with respect to the target diffusion degree S' is a direction in which the diffusion degree of the illumination device 1*a* decreases. In this case, the control device 200*a* subtracts the diffusion degree coarse adjustment scale setting value LSC (first adjustment interval) from the diffusion degree display value S (step S427), thereby updating the diffusion degree display value S. In addition, the control device 200*a* calculates the virtual position display value d0 of the light distribution shape object OBJ, which corresponds to the diffusion degree display value S (step S428), and stores the virtual position display value d0 in the first storage region of the storage circuit 223*a* illustrated in FIG. 17.

Subsequently, the control device 200*a* determines whether the count value T2 of the second timer has exceeded the predetermined setting value change time (second time threshold) T2*th* (for example, 0.5 sec) (step S429).

If the count value T2 of the second timer is smaller than the predetermined setting value change time T2*th* (T2<T2*th*; No at step S429), the processing at step S429 is repeatedly executed until the count value T2 of the second timer becomes equal to or larger than the predetermined setting value change time T2*th* (T2≥T2*th*; Yes at step S429). If the count value T2 of the second timer becomes equal to or larger than the predetermined setting value change time T2*th* (T2≥T2*th*; Yes at step S429), the display control circuit 231 of the control device 200*a* reflects the diffusion degree display value S and the virtual position display value d0 of the light distribution shape object OBJ, which are acquired in the above-described processing and stored in the first storage region of the storage circuit 223*a*, to display control on the illumination control application screen 400A (step S430). In addition, the transmission-reception circuit 225*a* of the control device 200*a* reads the diffusion degree display value S stored in the first storage region and transmits the read diffusion degree display value S as the first setting information (S1=S) to the illumination device 1*a* (step S431).

The transmission-reception circuit 111 of the illumination device 1*a* stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 37, the control device 200*a* determines whether the long tap state is continuous (step S410). If the long tap state is not continuous (No at step S410), in other words, if a user's finger is released from the screen or if the touch detection position is out of the adjustment region TA, the process returns to the illumination control processing illustrated in FIG. 36, thereby transitioning to a standby state (step S101*a*). Accordingly, the current diffusion degree display value S is finalized with the current diffusion degree display value S being reflected in the control state of the diffusion degree of the illumination device 1*a*.

If the long tap state is continuous (Yes at step S410), the process returns to the processing at step S405. When the following conditions are satisfied: the long tap state is continuous (Yes at step S410), the magnitude |ΔS| of the diffusion degree difference value ΔS exceeds the magnitude |LSC| of the diffusion degree coarse adjustment scale setting value LSC (Yes at step S411), and the sign of the diffusion degree difference value ΔS is "− (negative value)" (No at step S421 in FIG. 38), the processing at steps S405 to S410 including the above-described diffusion degree coarse adjustment processing (step S420; FIG. 38) is repeatedly executed at intervals of the predetermined setting value change time (second time threshold) T2*th* until the magnitude |ΔS| of the diffusion degree difference value ΔS becomes equal to or smaller than the magnitude |LSC| of the diffusion degree coarse adjustment scale setting value LSC (No at step S411). Accordingly, the diffusion degree display value S is coarsely adjusted in steps of the diffusion degree coarse adjustment scale setting value LSC (first adjustment interval) in a direction in which the diffusion degree display value S decreases.

Figure 39:
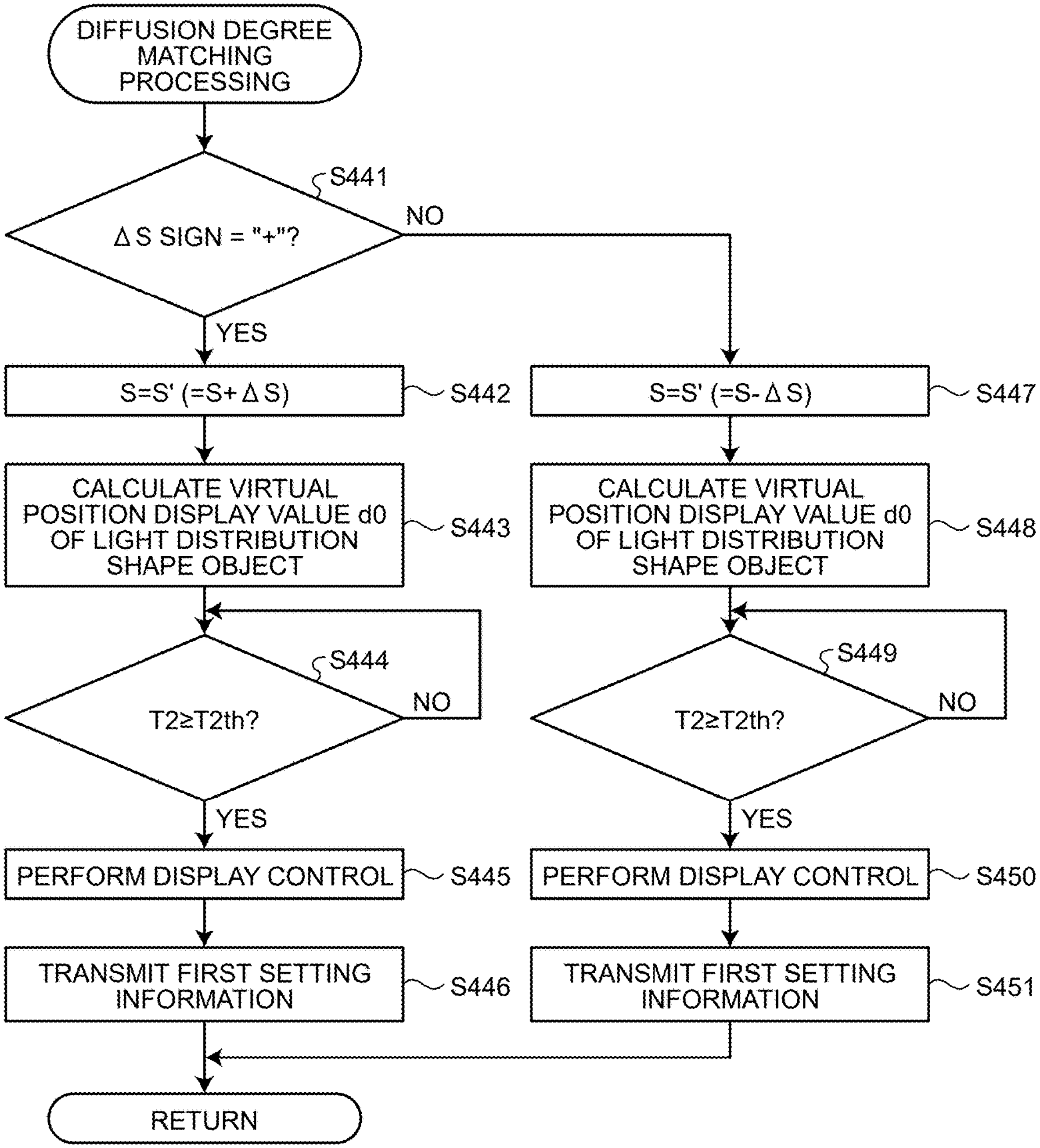
FIG. 39 is a flowchart illustrating an example of diffusion degree matching processing by the control device for an illumination device according to the second embodiment.

If the magnitude |ΔS| of the diffusion degree difference value ΔS becomes equal to or smaller than the magnitude |LSC| of the diffusion degree coarse adjustment scale setting value LSC (No at step S411), the control device 200 executes diffusion degree matching processing (step S440). FIG. 39 is a flowchart illustrating an example of the diffusion degree matching processing by the control device 200*a* for the illumination device 1*a* according to the second embodiment.

The control device 200*a* reads the sign of the diffusion degree difference value ΔS and determines the adjustment direction of the diffusion degree display value S with respect to the target diffusion degree S'. Specifically, the control device 200*a* determines whether the sign of the diffusion degree difference value ΔS is "+ (positive value)" (step S441).

If the sign of the diffusion degree difference value ΔS is "+ (positive value)" (Yes at step S441), it is indicated that the adjustment direction of the diffusion degree display value S with respect to the target diffusion degree S' is a direction in which the diffusion degree of the illumination device 1*a* increases. In this case, the control device 200*a* performs processing of matching the diffusion degree display value S to the target diffusion degree S' (step S442). Specifically, the diffusion degree display value S is updated by adding the diffusion degree difference value ΔS to the diffusion degree display value S. In addition, the control device 200*a* calculates the virtual position display value d0 of the light distribution shape object OBJ, which corresponds to the diffusion degree display value S (step S443), and stores the virtual position display value d0 in the first storage region of the storage circuit 223*a* illustrated in FIG. 17.

Subsequently, the control device 200*a* determines whether the count value T2 of the second timer has exceeded the predetermined setting value change time (second time threshold) T2*th* (for example, 0.5 sec) (step S444).

If the count value T2 of the second timer is smaller than the predetermined setting value change time T2*th* (T2<T2*th*; No at step S444), the processing at step S444 is repeatedly executed until the count value T2 of the second timer becomes equal to or larger than the predetermined setting value change time T2*th* (T2≥T2*th*; Yes at step S444). If the count value T2 of the second timer becomes equal to or larger than the predetermined setting value change time T2*th* (T2≥T2*th*; Yes at step S444), the display control circuit 231 of the control device 200*a* reflects the diffusion degree display value S and the virtual position display value d0 of the light distribution shape object OBJ, which are acquired in the above-described processing and stored in the first storage region of the storage circuit 223*a*, to display control on the illumination control application screen 400A (step S445). Accordingly, the touch position detection value d' corresponding to the target diffusion degree S' and the virtual position display value d0 of the light distribution shape object OBJ become identical or substantially identical (d'0≈d0). In addition, the transmission-reception circuit 225*a* of the control device 200*a* reads the diffusion degree display value S stored in the first storage region of the storage circuit 223*a* and transmits the read diffusion degree display value S as the first setting information (S1=S) to the illumination device 1*a* (step S446).

The transmission-reception circuit 111 of the illumination device 1*a* stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100. Accordingly, the diffusion degree display value S corresponding to the touch detection position in the long tap state in the adjustment region TA is reflected in the control state of the diffusion degree of the illumination device 1*a*.

If the sign of the diffusion degree difference value ΔS is "− (negative value)" (No at step S441), it is indicated that the adjustment direction of the diffusion degree display value S with respect to the target diffusion degree S' is a direction in which the diffusion degree of the illumination device 1*a* decreases. In this case, the control device 200*a* performs processing of matching the diffusion degree display value S to the target diffusion degree S' (step S447). Specifically, the diffusion degree display value S is updated by subtracting the diffusion degree difference value ΔS from the diffusion degree display value S. In addition, the control device 200*a* calculates the virtual position display value d0 of the light distribution shape object OBJ, which corresponds to the diffusion degree display value S (step S448), and stores the virtual position display value d0 in the first storage region of the storage circuit 223*a* illustrated in FIG. 17.

Subsequently, the control device 200*a* determines whether the count value T2 of the second timer has exceeded the predetermined setting value change time (second time threshold) T2*th* (for example, 0.5 sec) (step S449).

If the count value T2 of the second timer is smaller than the predetermined setting value change time T2*th* (T2<T2*th*; No at step S449), the processing at step S449 is repeatedly executed until the count value T2 of the second timer becomes equal to or larger than the predetermined setting value change time T2*th* (T2≥T2*th*; Yes at step S449). If the count value T2 of the second timer becomes equal to or larger than the predetermined setting value change time T2*th* (T2≥T2*th*; Yes at step S449), the display control circuit 231 of the control device 200*a* reflects the diffusion degree display value S and the virtual position display value d0 of the light distribution shape object OBJ, which are acquired in the above-described processing and stored in the first storage region of the storage circuit 223*a*, to display control on the illumination control application screen 400A (step S450). Accordingly, the touch position detection value d'0 corresponding to the target diffusion degree S' and the virtual position display value d0 of the light distribution shape object OBJ become identical or substantially identical (d'0≈d0). In addition, the transmission-reception circuit 225*a* of the control device 200*a* reads the diffusion degree display value S stored in the first storage region and transmits the read diffusion degree display value S as the first setting information (S1=S) to the illumination device 1*a* (step S451).

The transmission-reception circuit 111 of the illumination device 1*a* stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100. Accordingly, the diffusion degree display value S corresponding to the touch detection position in the long tap state in the adjustment region TA is reflected in the control state of the diffusion degree of the illumination device 1*a*.

Referring back to FIG. 37, the control device 200*a* resets the count value T2 of the second timer (T2=0; step S412) and executes the diffusion degree difference value calculation processing. Specifically, the control device 200*a* detects the touch position in the adjustment region TA and stores the detected touch position in the first storage region of the storage circuit 223*a* illustrated in FIG. 33 as the touch position detection value d'0 (step S413). In addition, the control device 200*a* calculates the target diffusion degree S' corresponding to the detected touch position detection value d'0 (step S414) and stores the target diffusion degree S' in the first storage region illustrated in FIG. 33.

Then, the control device 200*a* reads the diffusion degree display value S and the target diffusion degree S' from the first storage region, calculates the diffusion degree difference value ΔS (ΔS=S'−S; step S415), and determines whether the magnitude |ΔS| of the diffusion degree difference value ΔS is smaller than the magnitude |SSC| of the diffusion degree fine adjustment scale setting value SSC (second adjustment interval) (step S416).

If the magnitude |ΔS| of the diffusion degree difference value ΔS is equal to or larger than the magnitude |SSC| of the diffusion degree fine adjustment scale setting value SSC (No at step S416), the control device 200*a* subsequently determines whether the magnitude |ΔS| of the diffusion degree difference value ΔS is smaller than the magnitude |LSC| of the diffusion degree coarse adjustment scale setting value LSC (step S418).

If the magnitude |ΔS| of the diffusion degree difference value ΔS is equal to or larger than the magnitude |LSC| of the diffusion degree coarse adjustment scale setting value LSC (No at step S418), the process returns to the processing at step S411. If the magnitude |ΔS| of the diffusion degree difference value ΔS exceeds the magnitude |LSC| of the diffusion degree coarse adjustment scale setting value LSC (Yes at step S411), the control device 200*a* executes diffusion degree coarse adjustment processing (step S420). If the magnitude |ΔS| of the diffusion degree difference value ΔS is equal to or smaller than the magnitude |LSC| of the diffusion degree coarse adjustment scale setting value LSC (No at step S411), the control device 200*a* executes the diffusion degree matching processing (step S440).

Figure 40:
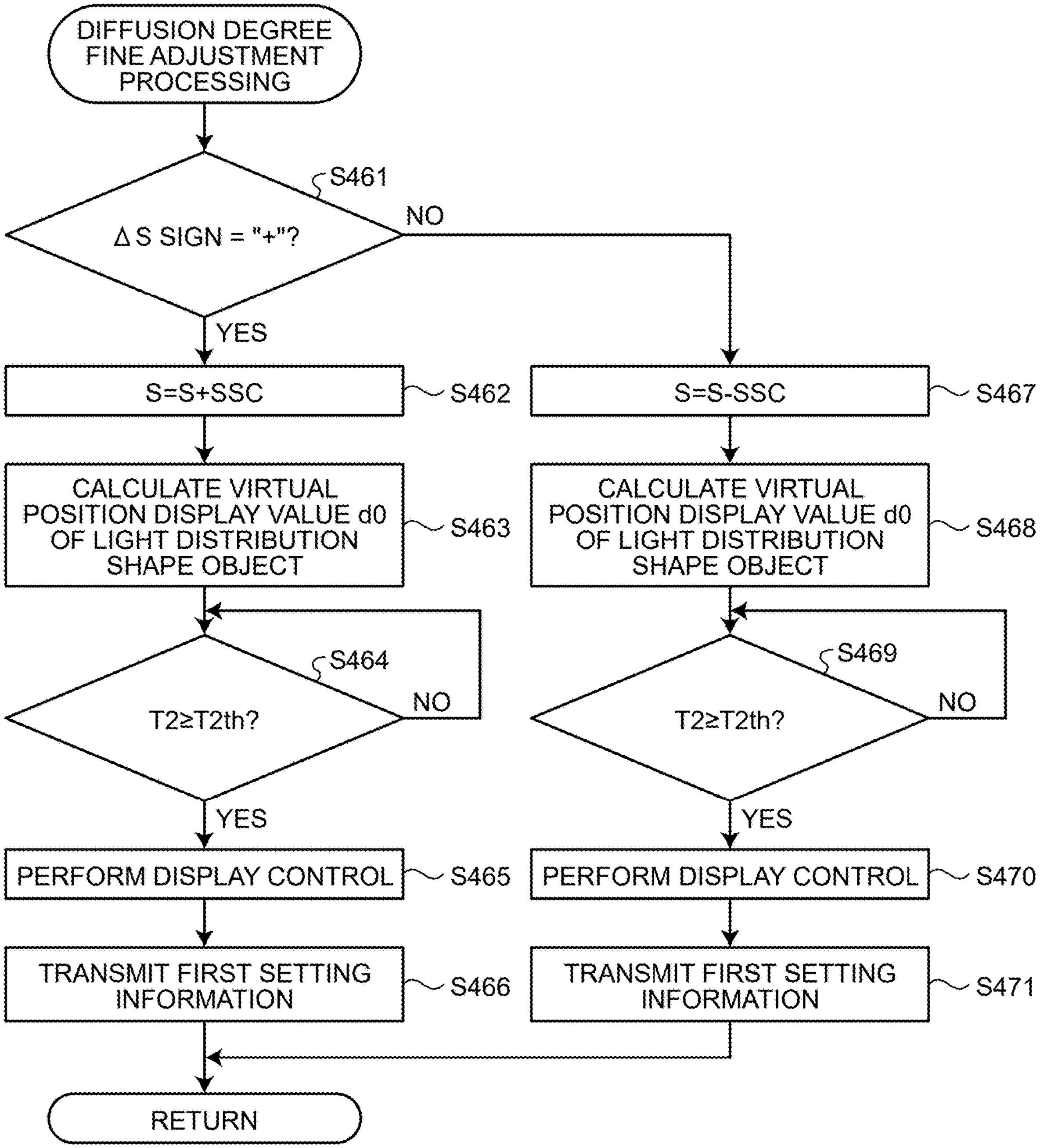
FIG. 40 is a flowchart illustrating an example of diffusion degree fine adjustment processing by the control device for an illumination device according to the second embodiment.

If the magnitude |ΔS| of the diffusion degree difference value ΔS is equal to or larger than the magnitude |LSC| of the diffusion degree coarse adjustment scale setting value LSC (Yes at step S418), the control device 200*a* executes diffusion degree fine adjustment processing (step S460). FIG. 40 is a flowchart illustrating an example of the diffusion degree fine adjustment processing by the control device 200*a* for the illumination device 1*a* according to the second embodiment.

The control device 200*a* reads the sign of the diffusion degree difference value ΔS and determines the adjustment direction of the diffusion degree display value S with respect to the target diffusion degree S'. Specifically, the control device 200*a* determines whether the sign of the diffusion degree difference value ΔS is "+ (positive value)" (step S461).

If the sign of the diffusion degree difference value ΔS is "+ (positive value)" (Yes at step S461), it is indicated that the adjustment direction of the diffusion degree display value S with respect to the target diffusion degree S' is a direction in which the diffusion degree of the illumination device 1*a* increases. In this case, the control device 200*a* adds the diffusion degree fine adjustment scale setting value SSC (second adjustment interval) to the diffusion degree display value S (step S462), thereby updating the diffusion degree display value S. In addition, the control device 200*a* calculates the virtual position display value d0 of the light distribution shape object OBJ, which corresponds to the diffusion degree display value S (step S463), and stores the virtual position display value d0 in the first storage region of the storage circuit 223*a* illustrated in FIG. 17.

Subsequently, the control device 200*a* determines whether the count value T2 of the second timer has exceeded the predetermined setting value change time (second time threshold) T2*th* (for example, 0.5 sec) (step S464).

If the count value T2 of the second timer is smaller than the predetermined setting value change time T2*th* (T2<T2*th*; No at step S464), the processing at step S464 is repeatedly executed until the count value T2 of the second timer becomes equal to or larger than the predetermined setting value change time T2*th* (T2≥T2*th*; Yes at step S464). If the count value T2 of the second timer becomes equal to or larger than the predetermined setting value change time T2*th* (T2≥T2*th*; Yes at step S464), the display control circuit 231 of the control device 200*a* reflects the diffusion degree display value S and the virtual position display value d0 of the light distribution shape object OBJ, which are acquired in the above-described processing and stored in the first storage region of the storage circuit 223*a*, to display control on the illumination control application screen 400A (step S465). In addition, the transmission-reception circuit 225*a* of the control device 200*a* reads the diffusion degree display value S stored in the first storage region of the storage circuit 223*a* and transmits the read diffusion degree display value S as the first setting information (S1=S) to the illumination device 1*a* (step S466).

The transmission-reception circuit 111 of the illumination device 1*a* stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 37, the control device 200*a* determines whether the long tap state is continuous (step S410). If the long tap state is not continuous (No at step S410), in other words, if a user's finger is released from the screen or if the touch detection position is out of the adjustment region TA, the process returns to the illumination control processing illustrated in FIG. 36, thereby transitioning to a standby state (step S101*a*). Accordingly, the current diffusion degree display value S is finalized with the current diffusion degree display value S being reflected in the control state of the diffusion degree of the illumination device 1*a*.

If the long tap state is continuous (Yes at step S417), the process returns to the processing at step S412. When the following conditions are satisfied: the long tap state is continuous (Yes at step S417), the magnitude |ΔS| of the diffusion degree difference value ΔS is smaller than the magnitude |LSC| of the diffusion degree coarse adjustment scale setting value LSC (Yes at step S418), and the sign of the diffusion degree difference value ΔS is "+ (positive value)" (Yes at step S461 in FIG. 38), the processing at steps S412 to S417 including the above-described diffusion degree fine adjustment processing (step S460; FIG. 40) is repeatedly executed at intervals of the predetermined setting value change time (second time threshold) T2*th*. Accordingly, the diffusion degree display value S is finely adjusted in steps of the diffusion degree fine adjustment scale setting value SSC (second adjustment interval) in a direction in which the diffusion degree display value S increases.

Thereafter, if the magnitude |ΔS| of the diffusion degree difference value ΔS becomes smaller than the magnitude |SSC| of the diffusion degree fine adjustment scale setting value SSC (Yes at step S409) and the long tap state is canceled (No at step S410), the current diffusion degree display value S is finalized with the current diffusion degree display value S being reflected in the control state of the diffusion degree of the illumination device 1*a* in a state in which the touch position detection value d'0 in the adjustment region TA substantially matches the virtual position display value d0 of the light distribution shape object OBJ (d'0≈d0).

Referring back to FIG. 40, if the sign of the diffusion degree difference value ΔS is "− (negative value)" (No at step S461), it is indicated that the adjustment direction of the diffusion degree display value S with respect to the target diffusion degree S' is a direction in which the diffusion degree of the illumination device 1*a* decreases. In this case, the control device 200*a* subtracts the diffusion degree fine adjustment scale setting value SSC (second adjustment interval) from the diffusion degree display value S (step S467), thereby updating the diffusion degree display value S. In addition, the control device 200*a* calculates the virtual position display value d0 of the light distribution shape object OBJ, which corresponds to the diffusion degree display value S (step S468), and stores the virtual position display value d0 in the first storage region of the storage circuit 223*a* illustrated in FIG. 33.

Subsequently, the control device 200*a* determines whether the count value T2 of the second timer has exceeded the predetermined setting value change time (second time threshold) T2*th* (for example, 0.5 sec) (step S469).

If the count value T2 of the second timer is smaller than the predetermined setting value change time T2*th* (T2<T2*th*; No at step S469), the processing at step S469 is repeatedly executed until the count value T2 of the second timer becomes equal to or larger than the predetermined setting value change time T2*th* (T2≥T2*th*; Yes at step S469). If the count value T2 of the second timer becomes equal to or larger than the predetermined setting value change time T2*th* (T2≥T2*th*; Yes at step S469), the display control circuit 231 of the control device 200*a* reflects the diffusion degree display value S and the virtual position display value d0 of the light distribution shape object OBJ, which are acquired in the above-described processing and stored in the first storage region of the storage circuit 223*a*, to display control on the illumination control application screen 400A (step S470). In addition, the transmission-reception circuit 225*a* of the control device 200*a* reads the diffusion degree display value S stored in the first storage region and transmits the read diffusion degree display value S as the first setting information (S1=S) to the illumination device 1*a* (step S471).

The transmission-reception circuit 111 of the illumination device 1*a* stores the received first setting information as the second setting information in the storage circuit 113, reads the second setting information stored in the storage circuit 113, and supplies drive voltage corresponding to the second setting information to the drive electrodes 10 and 13 of each liquid crystal cell 2 of the optical element 100.

Referring back to FIG. 37, the control device 200*a* determines whether the long tap state is continuous (step S417). If the long tap state is not continuous (No at step S417), in other words, if a user's finger is released from the screen or if the touch detection position is out of the adjustment region TA, the process returns to the illumination control processing illustrated in FIG. 36, thereby transitioning to a standby state (step S101*a*). Accordingly, the current diffusion degree display value S is finalized with the current diffusion degree display value S being reflected in the control state of the diffusion degree of the illumination device 1*a*.

If the long tap state is continuous (Yes at step S410), the process returns to the processing at step S412. When the following conditions are satisfied: the long tap state is continuous (Yes at step S417), the magnitude |ΔS| of the diffusion degree difference value ΔS is smaller than the magnitude |LSC| of the diffusion degree coarse adjustment scale setting value LSC (Yes at step S418), and the sign of the diffusion degree difference value ΔS is "− (negative value)" (No at step S461 in FIG. 40), the processing at steps S412 to S417 including the above-described diffusion degree fine adjustment processing (step S460; FIG. 40) is repeatedly executed at intervals of the predetermined setting value change time (second time threshold) T2*th*. Accordingly, the diffusion degree display value S is finely adjusted in steps of the diffusion degree fine adjustment scale setting value SSC (second adjustment interval) in a direction in which the diffusion degree display value S decreases.

Thereafter, if the magnitude |ΔS| of the diffusion degree difference value ΔS becomes smaller than the magnitude |SSC| of the diffusion degree fine adjustment scale setting value SSC (Yes at step S409 or Yes at step S416) and the long tap state is canceled (No at step S410 or No at step S417), the current diffusion degree display value S is finalized with the current diffusion degree display value S being reflected in the control state of the diffusion degree of the illumination device 1*a*.

In the diffusion degree adjustment processing by the control device 200*a* according to the second embodiment, as described above, the diffusion degree coarse adjustment processing (step S420 in FIG. 37; FIG. 38), the diffusion degree matching processing (step S440 in FIG. 37; FIG. 39), or the diffusion degree fine adjustment processing (step S460 in FIG. 37; FIG. 40) is executed depending on the movement amount of the touch detection position in the long tap state in the adjustment region TA.

Specifically, after the user touches within the adjustment region TA (Yes at step S102 in FIG. 20) and it is determined that the long tap state (step S404 in FIG. 37) is detected, the diffusion degree coarse adjustment processing (FIG. 38) is executed if the difference (diffusion degree difference value ΔS) between the target diffusion degree S' corresponding to the movement amount of the X-direction touch detection position in the long tap state in the adjustment region TA and the diffusion degree display value S exceeds a diffusion degree coarse adjustment scale (first adjustment interval) (Yes at step S411 in FIG. 37), or the diffusion degree matching processing (FIG. 39) is executed if the diffusion degree difference value ΔS becomes equal to or smaller than the diffusion degree coarse adjustment scale (first adjustment interval). Accordingly, the touch position detection value d'0 corresponding to the target diffusion degree S' and the virtual position display value d0 of the light distribution shape object OBJ become identical or substantially identical (d'0≈d0), and the diffusion degree display value S corresponding to the touch detection position in the long tap state in the adjustment region TA is reflected in the control state of the diffusion degree of the illumination device 1*a*.

After the touch position detection value d'0 corresponding to the target diffusion degree S' and the virtual position display value d0 of the light distribution shape object OBJ become identical or substantially identical (d'0≈d0) through the diffusion degree matching processing (FIG. 39), the diffusion degree fine adjustment processing (FIG. 40) is executed if the user performs a swipe operation while maintaining the long tap state in the adjustment region TA on the illumination control application screen 400A and the diffusion degree difference value ΔS is smaller than the diffusion degree coarse adjustment scale (first adjustment interval) (Yes at step S418 in FIG. 37). The diffusion degree coarse adjustment processing (FIG. 38) is executed if the diffusion degree difference value ΔS exceeds the diffusion degree coarse adjustment scale (first adjustment interval) (No at step S418 in FIG. 37 and Yes at step S411 in FIG. 37), or the diffusion degree matching processing (FIG. 39) is executed if the diffusion degree difference value ΔS becomes equal to the diffusion degree coarse adjustment scale (first adjustment interval) (No at step S418 in FIG. 37 and No at step S411 in FIG. 37).

In this manner, through the diffusion degree adjustment processing by the control device 200*a* according to the second embodiment described above, the diffusion degree coarse adjustment processing illustrated in FIG. 38, the diffusion degree matching processing illustrated in FIG. 39, and the diffusion degree fine adjustment processing illustrated in FIG. 40 seamlessly transition to each other depending on the movement amount of the touch detection position in the long tap state in the adjustment region TA.

More specifically, if the magnitude |ΔS| of the diffusion degree difference value ΔS exceeds the magnitude |LSC| of the diffusion degree coarse adjustment scale setting value LSC (|ΔS|>|LSC|; Yes at step S411 in FIG. 37), the diffusion degree coarse adjustment processing (step S420 in FIG. 37; FIG. 38) is executed. Accordingly, the diffusion degree display value S corresponding to the virtual position display value d0 of the light distribution shape object OBJ is coarsely adjusted in a direction toward the target diffusion degree S' corresponding to the touch position detection value d'0.

The diffusion degree matching processing (step S440 in FIG. 37; FIG. 39) is executed in both cases: when the magnitude |ΔS| of the diffusion degree difference value ΔS upon transition to the long tap state is equal to or larger than the magnitude |SSC| of the diffusion degree fine adjustment scale setting value SSC (|ΔS|≥ |SSC|; No at step S409 in FIG. 37) and is equal to or smaller than the magnitude |LSC| of the diffusion degree coarse adjustment scale setting value LSC (|ΔS|≤|LSC|; No at step S411 in FIG. 37); and when the magnitude |ΔS| of the diffusion degree difference value ΔS after the diffusion degree coarse adjustment processing becomes equal to or larger than the magnitude |SSC| of the diffusion degree fine adjustment scale setting value SSC (|ΔS|≥|SSC|; No at step S409 in FIG. 37) and becomes equal to or smaller than the magnitude |LSC| of the diffusion degree coarse adjustment scale setting value LSC (|ΔS|≤|LSC|; No at step S411 in FIG. 37). Accordingly, the diffusion degree display value S corresponding to the position display value do of the light distribution shape object OBJ matches the target diffusion degree S' corresponding to the touch position detection value d'0.

After the diffusion degree matching processing is executed, the diffusion degree fine adjustment processing (step S460 in FIG. 37; FIG. 40) is executed when the magnitude |ΔS| of the diffusion degree difference value ΔS becomes equal to or larger than the magnitude |SSC| of the diffusion degree fine adjustment scale setting value SSC (|ΔS|≥|SSC|; No at step S409 in FIG. 37) and becomes smaller than (|ΔS|<|LSC|; Yes at step S418 in FIG. 37) the magnitude |LSC| of the diffusion degree coarse adjustment scale setting value LSC. Accordingly, the diffusion degree display value S corresponding to the virtual position display value d0 of the light distribution shape object OBJ is finely adjusted in a direction toward the target diffusion degree S' corresponding to the touch position detection value d'0.

After the diffusion degree matching processing or the diffusion degree fine adjustment processing is executed, the process starting at step S411 in FIG. 37 is re-executed if the magnitude |ΔS| of the diffusion degree difference value ΔS becomes equal to or larger than the magnitude |LSC| of the diffusion degree coarse adjustment scale setting value LSC (|ΔS|≥|LSC|; No at step S418 in FIG. 37).

Specifically, after the diffusion degree matching processing or the diffusion degree fine adjustment processing is executed, the diffusion degree matching processing (step S440 in FIG. 37; FIG. 39) is executed if the magnitude |ΔS| of the diffusion degree difference value ΔS becomes equal to the magnitude |LSC| of the diffusion degree coarse adjustment scale setting value LSC (|ΔS|=|LSC|; No at step S418 in FIG. 37 and Yes at step S411 in FIG. 37). Accordingly, the diffusion degree display value S corresponding to the virtual position display value d0 of the light distribution shape object OBJ matches again the target diffusion degree S' corresponding to the touch position detection value d'0.

After the diffusion degree matching processing or the diffusion degree fine adjustment processing is executed, the diffusion degree coarse adjustment processing (step S420 in FIG. 37; FIG. 38) is executed if the magnitude |ΔS| of the diffusion degree difference value ΔS exceeds the magnitude |LSC| of the diffusion degree coarse adjustment scale setting value LSC (|ΔS|>|LSC|; No at step S418 in FIG. 37 and Yes at step S411 in FIG. 37). Accordingly, the diffusion degree display value S corresponding to the virtual position display value d0 of the light distribution shape object OBJ is again coarsely adjusted in a direction toward the target diffusion degree S' corresponding to the touch position detection value d'0.

Then, if the magnitude |ΔS| of the diffusion degree difference value ΔS becomes equal to or larger than the magnitude |SSC| of the diffusion degree fine adjustment scale setting value SSC (|ΔS|≥|SSC|; No at step S409 in FIG. 37) and becomes equal to or smaller than the magnitude |LSC| of the diffusion degree coarse adjustment scale setting value LSC (|ΔS|≤|LSC|; No at step S411 in FIG. 37), the diffusion degree matching processing (step S440 in FIG. 37; FIG. 39) is executed. Accordingly, the diffusion degree display value S corresponding to the virtual position display value d0 of the light distribution shape object OBJ matches again the target diffusion degree S' corresponding to the touch position detection value d'0.

The following describes specific examples of operation on the illumination control application screen 400A of the control device 200*a* according to the second embodiment. FIGS. 41A, 41B, 41C, 41D, 41E, 41F, 41G, 41H, and 41I are diagrams illustrating specific operation examples on the illumination control application screen 400A of the control device 200*a* according to the second embodiment.

Figure 41A:
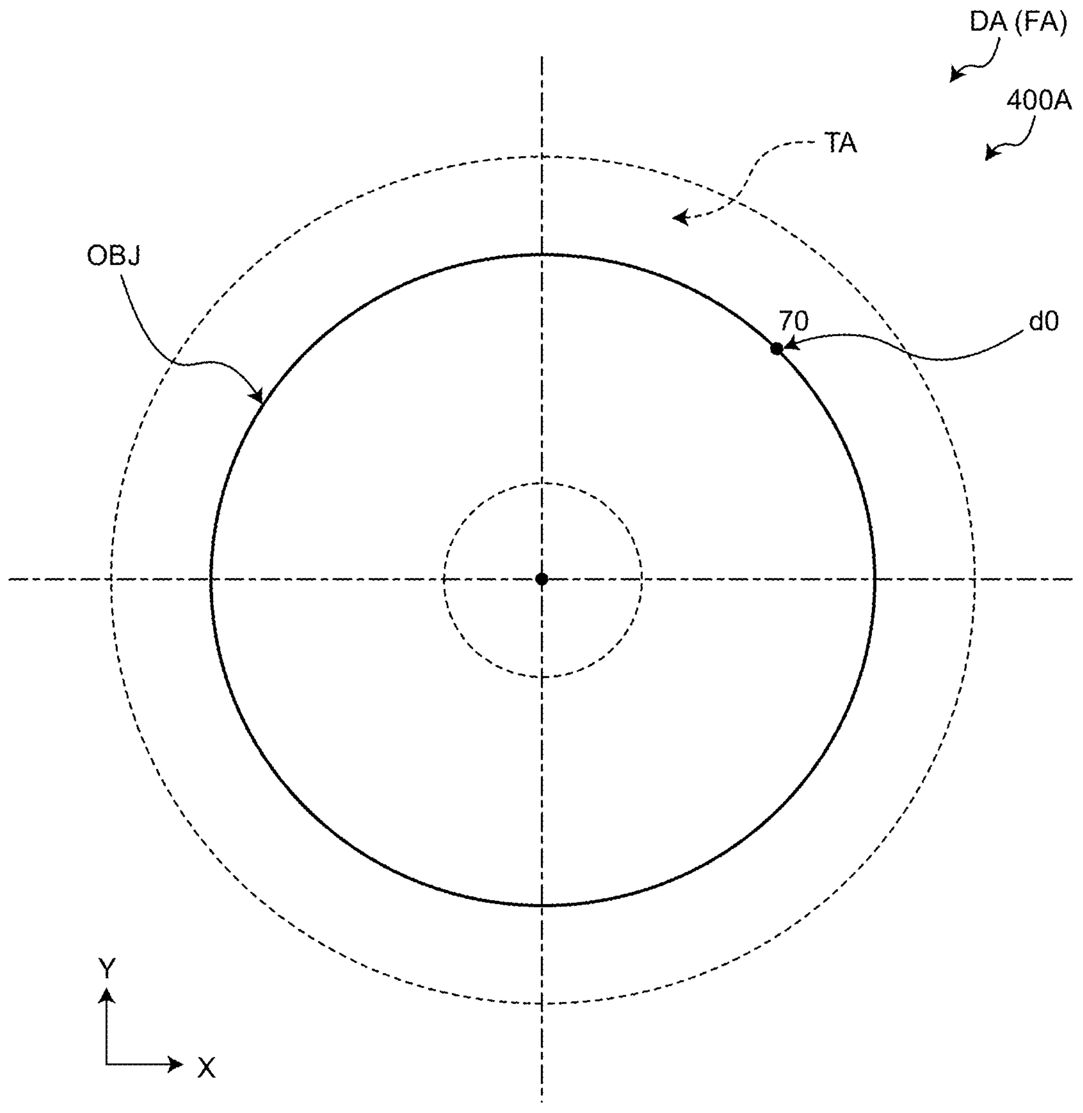
FIG. 41A is a diagram illustrating a specific operation example on the illumination control application screen on the control device according to the second embodiment.
Figure 41B:
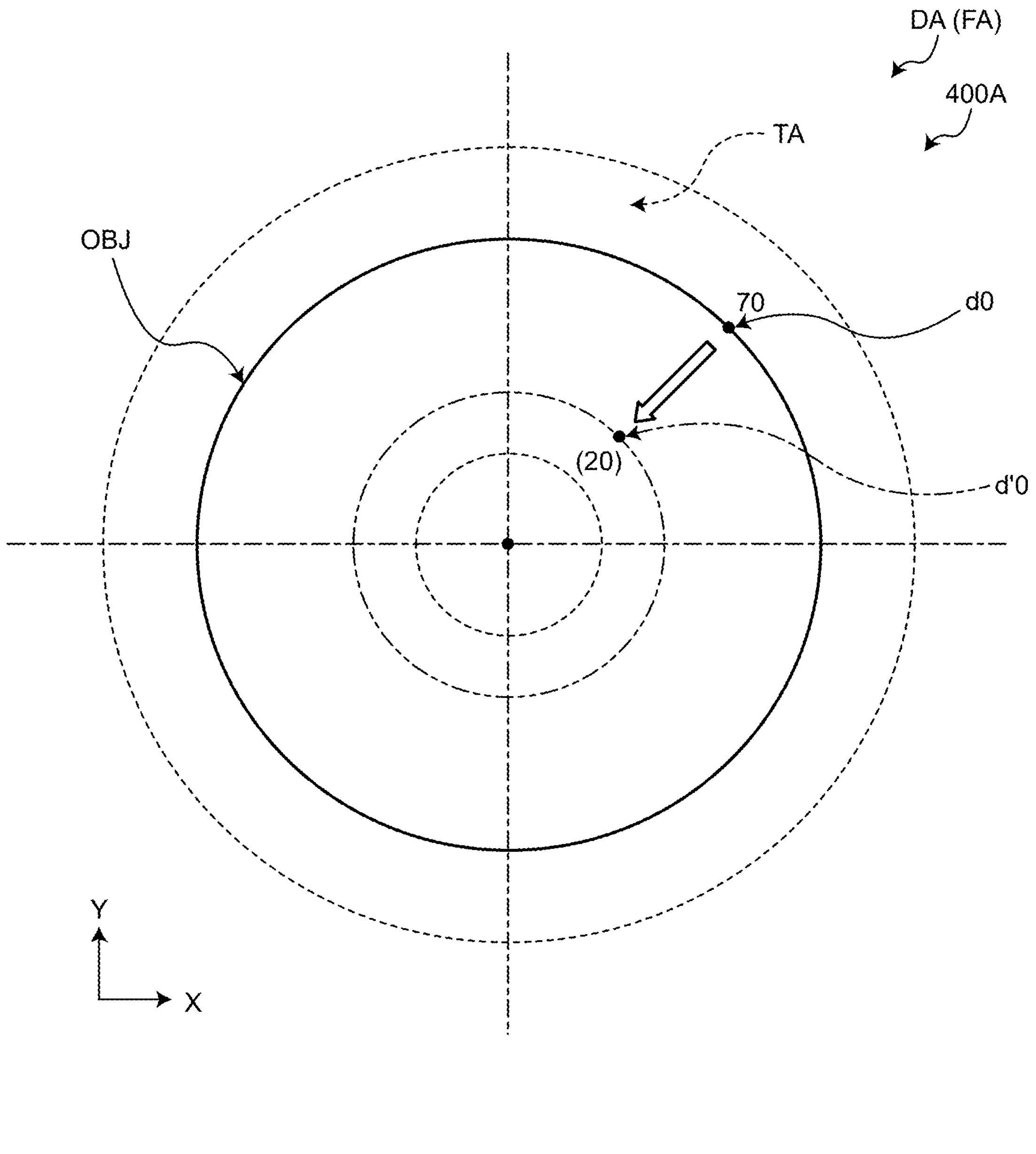
FIG. 41B is a diagram illustrating a specific operation example on the illumination control application screen on the control device according to the second embodiment.

FIG. 41A illustrates an example in which the diffusion degree display value S is 70% in the standby state (step S101*a*) in FIG. 36. FIG. 41B illustrates an example in which in the standby state illustrated in FIG. 41A, a touch in the adjustment region TA is detected (Yes at step S102*a* in FIG. 36), transition is made to the diffusion degree adjustment processing illustrated in FIG. 37 and the long tap state is reached (step S404), and the touch position detection value d'0 corresponding to the target diffusion degree S'=20% is detected in the adjustment region TA.

In this case, the diffusion degree difference value ΔS is −50% (ΔS=S' (=20)−S (=70%)=−50%), and the magnitude |ΔS| (=50%) of the diffusion degree difference value ΔS exceeds the magnitude |LSC| of the diffusion degree coarse adjustment scale setting value LSC (=20%) (|ΔS|>|LSC|; Yes at step S411 in FIG. 37). Accordingly, the diffusion degree coarse adjustment processing illustrated in FIG. 38 is executed.

In this case, the sign of the diffusion degree difference value ΔS (=−50%) is "− (negative value)" (No at step S421 in FIG. 38). Accordingly, the diffusion degree of the illumination device 1*a* is coarsely adjusted in a direction (arrow direction illustrated in FIG. 41B) in which the diffusion degree decreases until the magnitude |ΔS| of the diffusion degree difference value ΔS becomes equal to or smaller than the magnitude |LSC| (=20%) of the diffusion degree coarse adjustment scale setting value LSC (No at step S411 in FIG. 37).

Figure 41C:
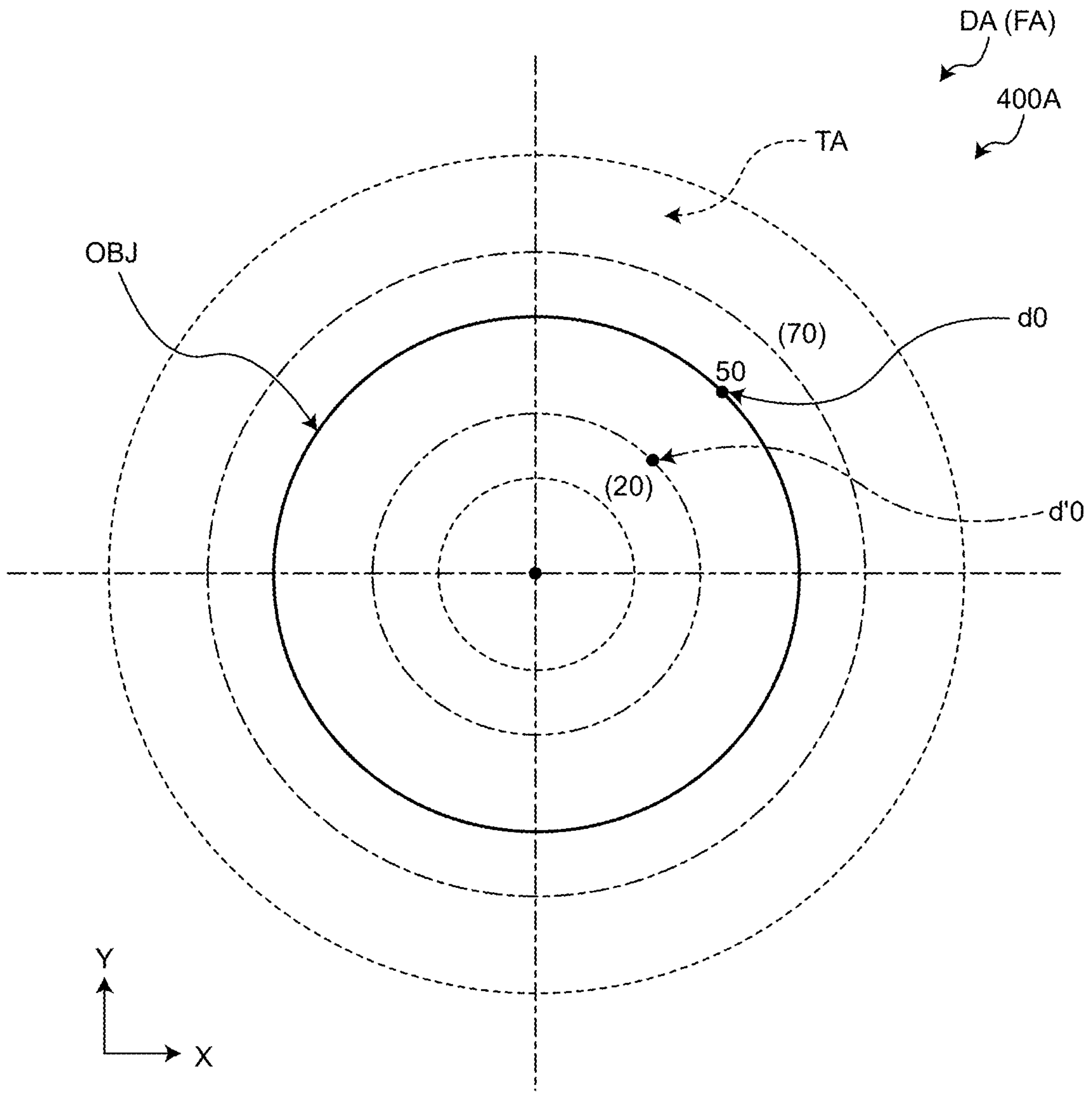
FIG. 41C is a diagram illustrating a specific operation example on the illumination control application screen on the control device according to the second embodiment.
Figure 41D:
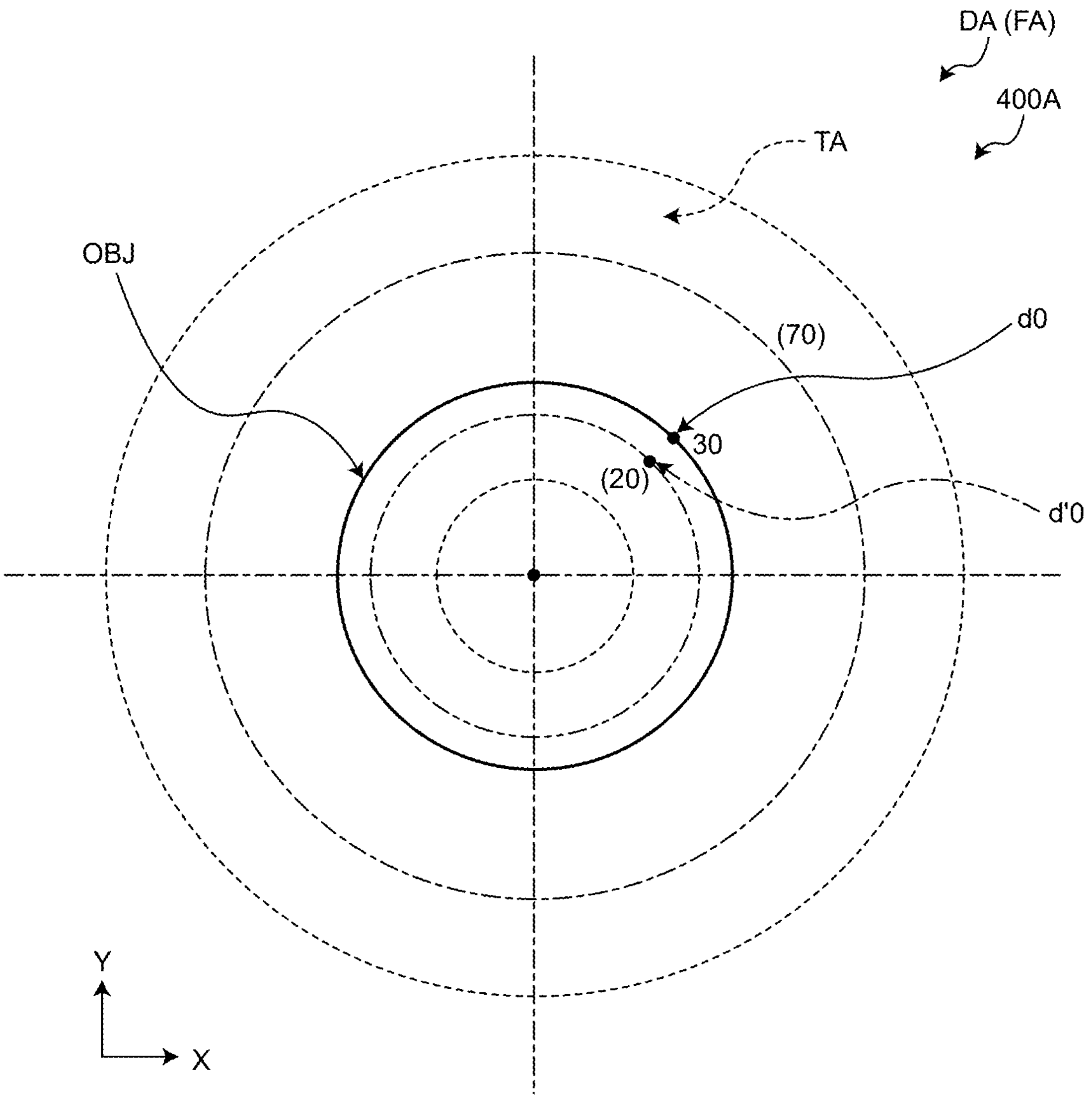
FIG. 41D is a diagram illustrating a specific operation example on the illumination control application screen on the control device according to the second embodiment.

Specifically, first, in the processing at steps S405 to S410 in the diffusion degree adjustment processing illustrated in FIG. 37, if the count value T2 of the second timer exceeds the predetermined setting value change time (second time threshold) T2*th* (for example, 0.5 sec) (Yes at step S429 in FIG. 38), the diffusion degree coarse adjustment processing illustrated in FIG. 38 is executed and the virtual position display value d0 of the light distribution shape object OBJ becomes a position corresponding to the diffusion degree display value S=50% as illustrated in FIG. 41C. In the subsequent processing at steps S405 to S410, the diffusion degree coarse adjustment processing illustrated in FIG. 38 is executed in the same manner, and the virtual position display value d0 of the light distribution shape object OBJ becomes a position corresponding to the diffusion degree display value S=30% as illustrated in FIG. 41D.

Figure 41E:
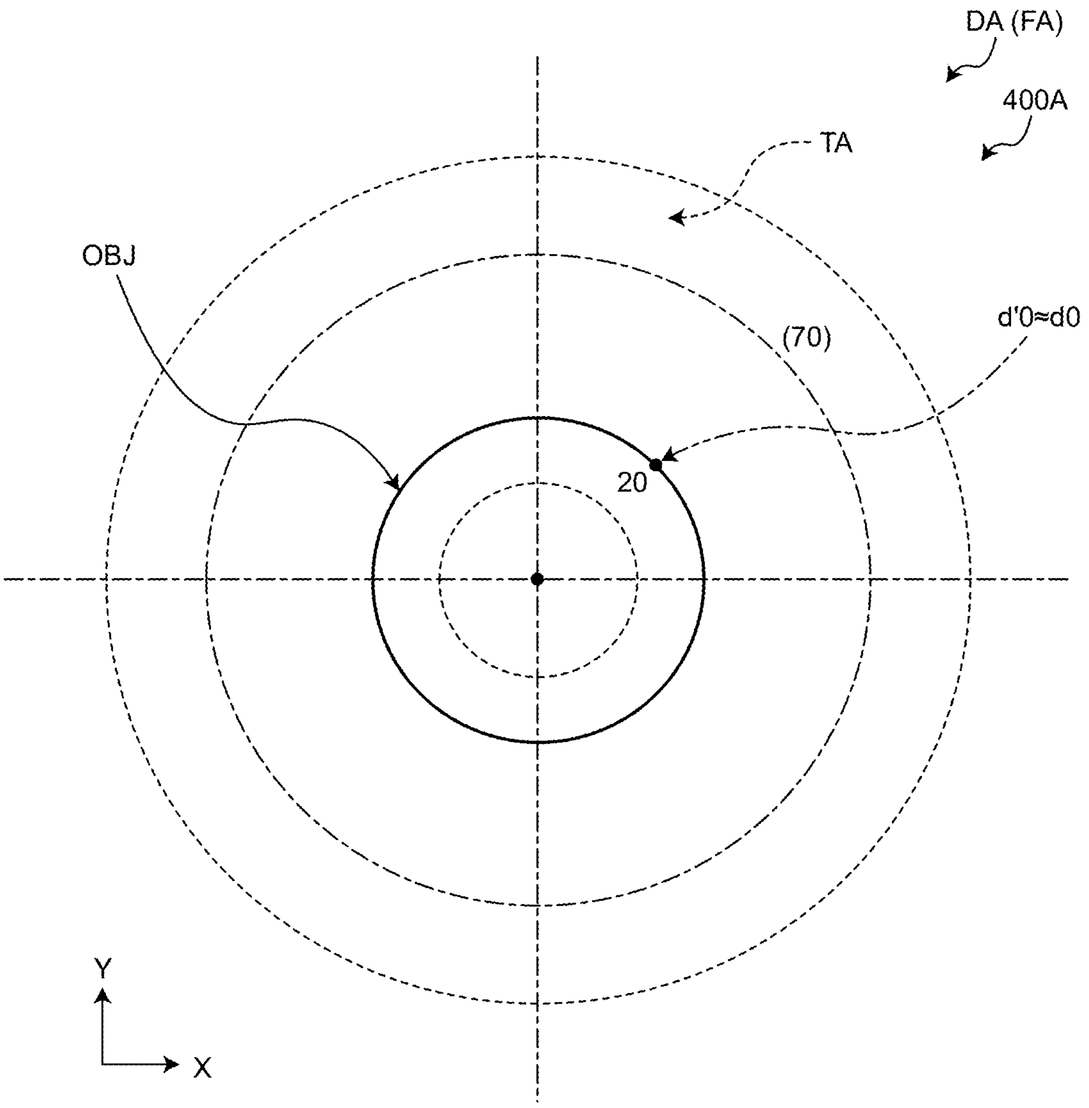
FIG. 41E is a diagram illustrating a specific operation example on the illumination control application screen on the control device according to the second embodiment.

Then, in the subsequent processing at steps S405 to S410, if the diffusion degree difference value ΔS becomes-10% (ΔS=S' (=20%)−S (=30%)=−10%) and the magnitude |ΔS| (=10%) of the diffusion degree difference value ΔS becomes equal to or smaller than the magnitude |LSC| (=20%) of the diffusion degree coarse adjustment scale setting value LSC (|ΔS|≤|LSC|; No at step S411 in FIG. 37), the diffusion degree matching processing illustrated in FIG. 39 is executed. Accordingly, the diffusion degree display value S matches the target diffusion degree S', and the touch position detection value d'0 corresponding to the target diffusion degree S' and the virtual position display value d0 of the light distribution shape object OBJ become identical or substantially identical (d'0≈d0) as illustrated in FIG. 41E.

Through the above-described processing, the diffusion degree display value S of the light distribution shape object OBJ on the illumination control application screen 400A and the diffusion degree of the illumination device 1*a*, the initial diffusion degree of which is 70%, are coarsely adjusted from 70% to 50% and from 50% to 30% in units of 20% and finally adjusted from 30% to 20%. In other words, in this coarse adjustment phase, the control device 200*a* first adjusts the diffusion degree of the light distribution shape object OBJ on the illumination control application screen 400A and the diffusion degree of the illumination device 1*a* from the initial diffusion degree toward the target diffusion degree S' in units of an integral multiple of the diffusion degree coarse adjustment scale setting value LSC, wherein the target diffusion degree is indicated by the user touching the adjustment region TA on the illumination control application screen 400A. Accordingly, the diffusion degree is changed in stages until the diffusion degree difference value ΔS, which is the difference between the target diffusion degree S' and the diffusion degree display value S after coarse adjustment, becomes equal to or smaller than the magnitude of the diffusion degree coarse adjustment scale setting value LSC. Thereafter, the control device 200*a* reduces the diffusion degree difference value ΔS at once and matches the diffusion degree of the light distribution shape object OBJ and the diffusion degree of the illumination device 1*a* to the target diffusion degree S'. Accordingly, the user can visually recognize that the light distribution shape object OBJ on the illumination control application screen 400A is being changed in stages in relatively large units, and can visually recognize and physically perceive that the diffusion degree of the illumination device 1*a* is being changed in stages in relatively large units.

Figure 41F:
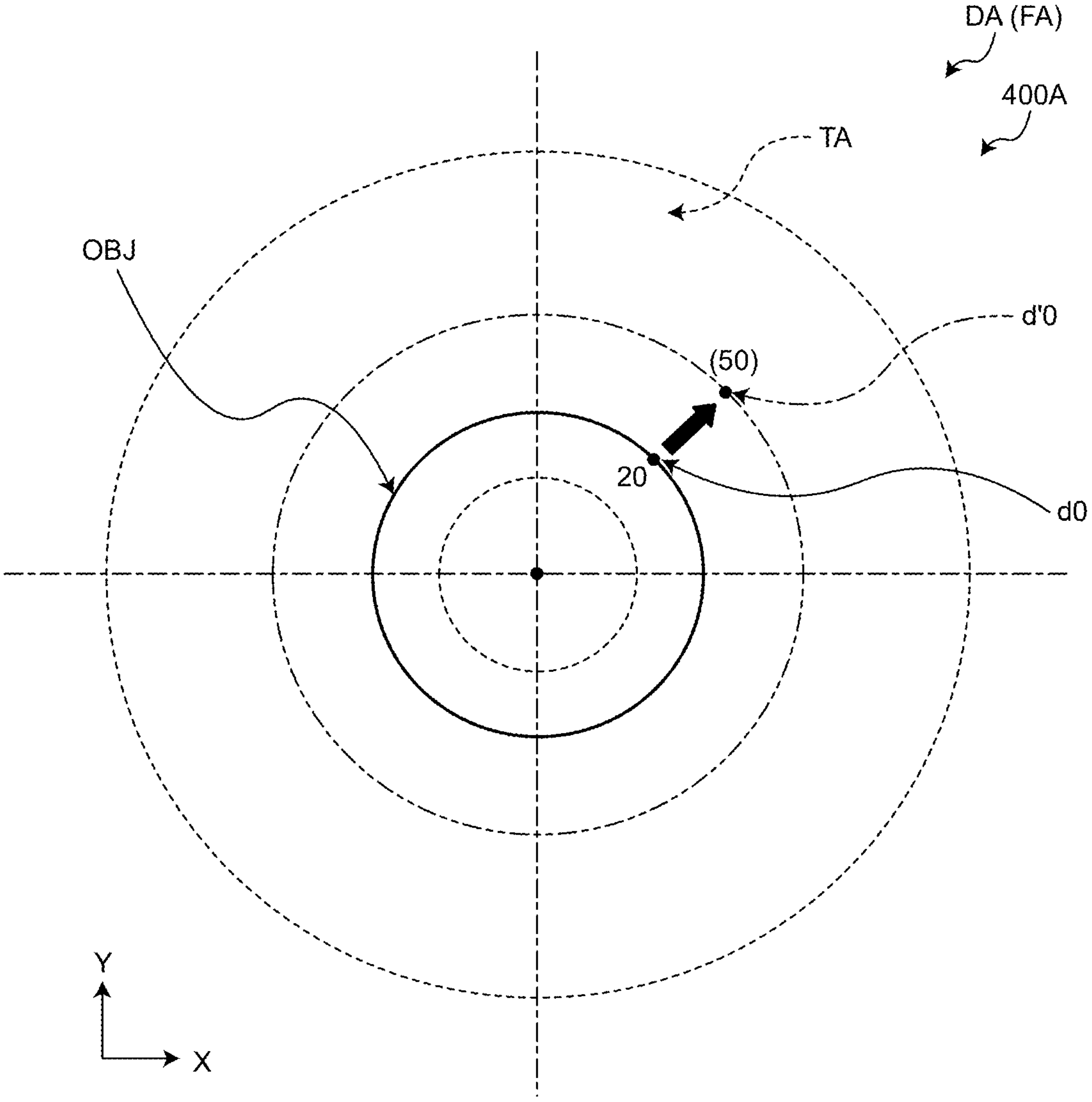
FIG. 41F is a diagram illustrating a specific operation example on the illumination control application screen on the control device according to the second embodiment.

FIG. 41F illustrates an example in which, thereafter, the user performs a swipe operation in the adjustment region TA while the long tap state is maintained (Yes at step S410 in FIG. 37). More specifically, FIG. 41F illustrates an example in which the touch position detection value d'0 in the adjustment region TA is updated through the swipe operation, the magnitude |ΔS| of the diffusion degree difference value ΔS exceeds the magnitude |LSC| (=20%) of the diffusion degree coarse adjustment scale setting value LSC (|ΔS|>|LSC|; Yes at step S411 in FIG. 37), and the touch position detection value d'0 corresponding to the target diffusion degree S'=50% is detected in the adjustment region TA (the swipe operation by the user has stopped at the touch position detection value d'0).

In this case, the diffusion degree difference value ΔS is 30% (ΔS=S' (=50%)−S (=20%)=30%), and the magnitude |ΔS| (=30%) of the diffusion degree difference value ΔS exceeds the magnitude |LSC| of the diffusion degree coarse adjustment scale setting value LSC (=20%) (|ΔS|>|LSC|; Yes at step S411 in FIG. 37). Accordingly, the diffusion degree coarse adjustment processing illustrated in FIG. 38 is executed.

In this case, the sign of the diffusion degree difference value ΔS (=30%) is "+ (positive value)" (Yes at step S421 in FIG. 38). Accordingly, the diffusion degree of the illumination device 1*a* is coarsely adjusted in a direction in which the diffusion degree increases (arrow direction illustrated in FIG. 41F) until the magnitude |ΔS| of the diffusion degree difference value ΔS becomes equal to or smaller than the magnitude |LSC| (=20%) of the diffusion degree coarse adjustment scale setting value LSC (No at step S411 in FIG. 37).

Figure 41G:
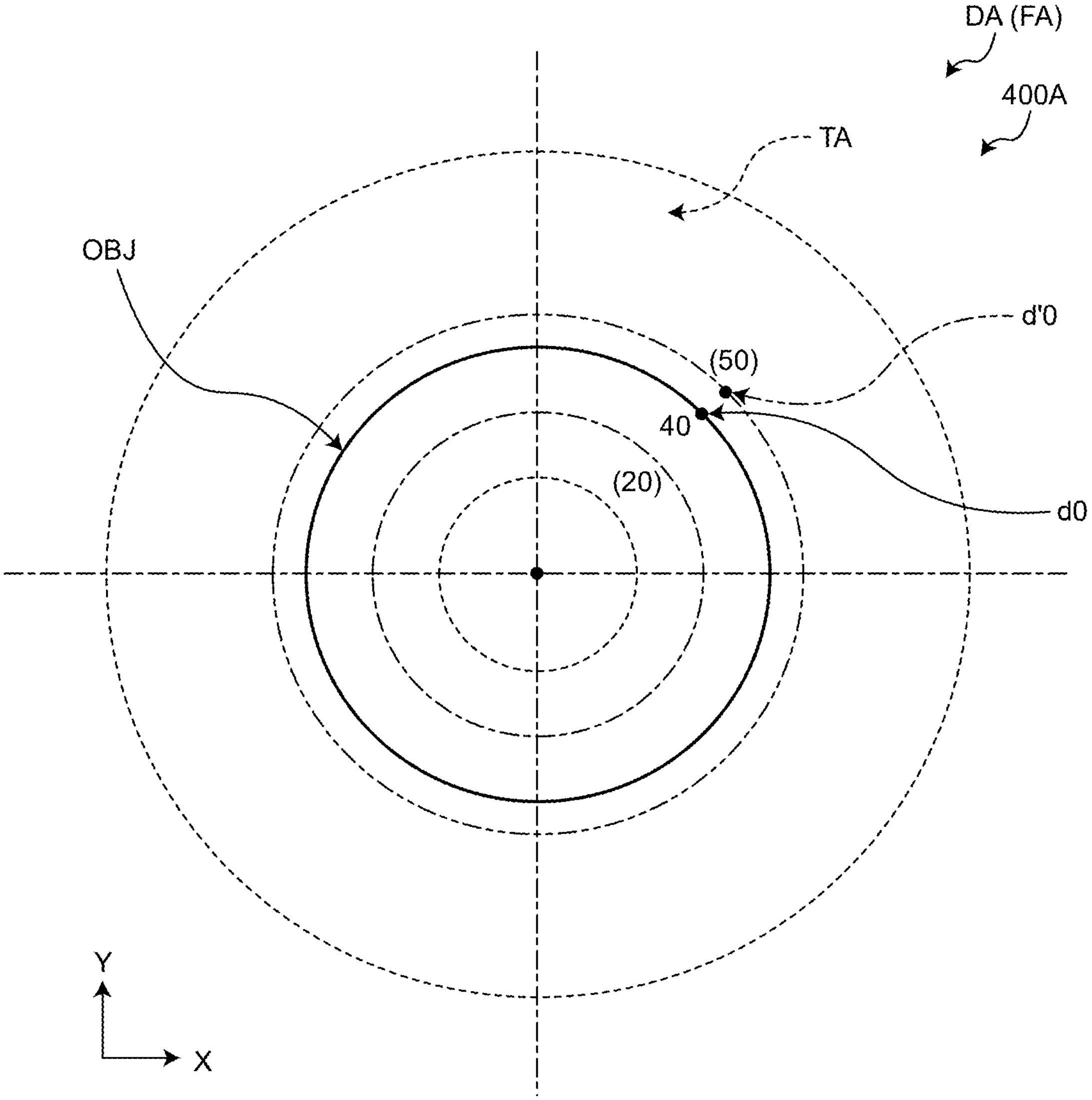
FIG. 41G is a diagram illustrating a specific operation example on the illumination control application screen on the control device according to the second embodiment.

Specifically, in the processing at steps S405 to S417 in the diffusion degree adjustment processing illustrated in FIG. 37, when the count value T2 of the second timer exceeds the predetermined setting value change time (second time threshold) T2*th* (for example, 0.5 sec) (Yes at step S424 in FIG. 38), the diffusion degree coarse adjustment processing illustrated in FIG. 38 is executed, and the virtual position display value d0 of the light distribution shape object OBJ becomes a position corresponding to the diffusion degree display value S=40% as illustrated in FIG. 41G.

Figure 41H:
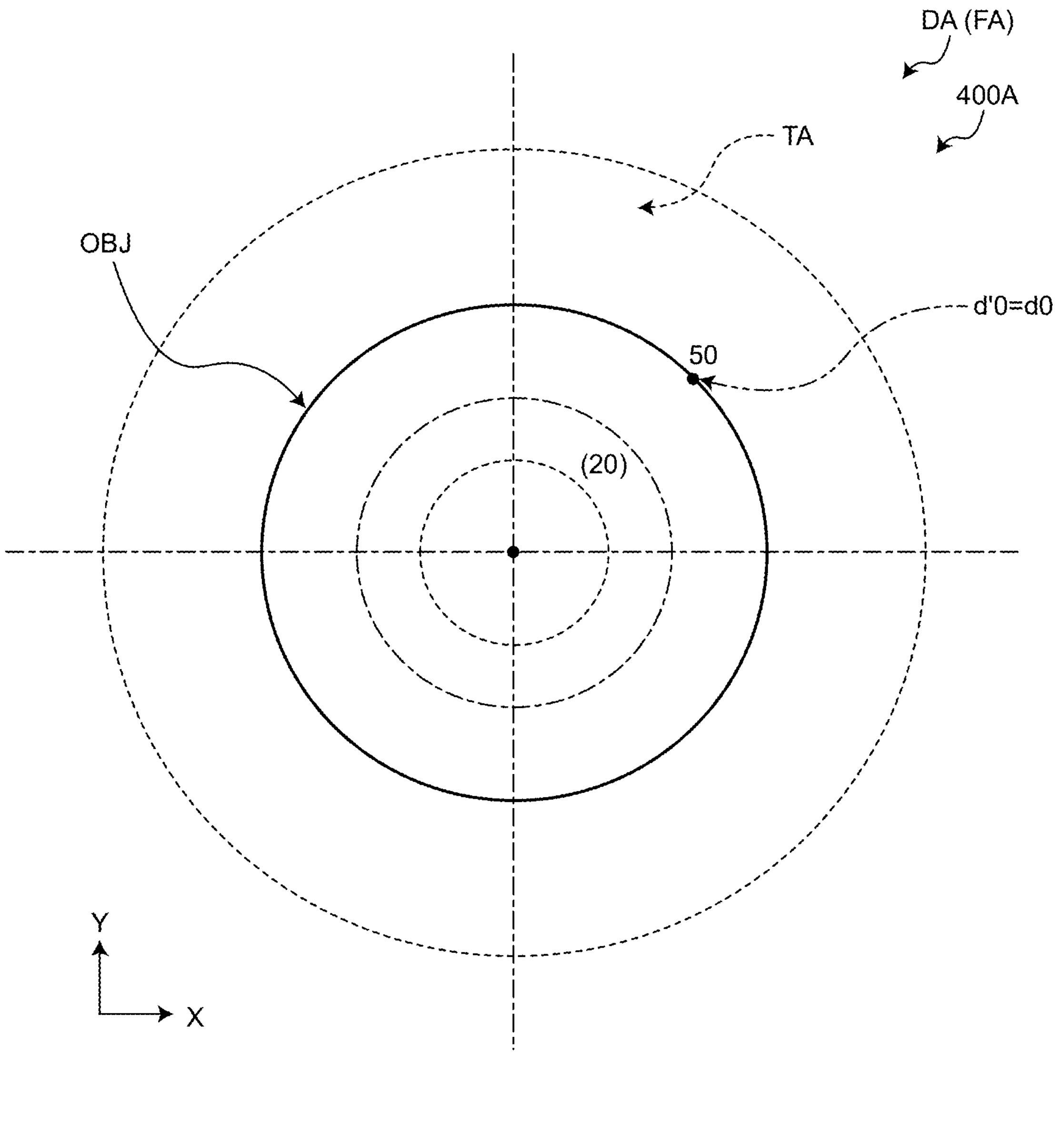
FIG. 41H is a diagram illustrating a specific operation example on the illumination control application screen on the control device according to the second embodiment.

Then, in the subsequent processing at steps S405 to S417, when the diffusion degree difference value ΔS becomes 10% (ΔS=S' (=50%)−S (=40%)=10%) and the magnitude |ΔS| (=10%) of the diffusion degree difference value ΔS becomes equal to or smaller than the magnitude |LSC| (=20%) of the diffusion degree coarse adjustment scale setting value LSC (|ΔS|≤|LSC|; No at step S411 in FIG. 37), the diffusion degree matching processing illustrated in FIG. 39 is executed. Accordingly, the diffusion degree display value S matches the target diffusion degree S', and the touch position detection value d'0 corresponding to the target diffusion degree S' and the virtual position display value d0 of the light distribution shape object OBJ become identical or substantially identical (d'0≈d0) as illustrated in FIG. 41H.

Figure 41I:
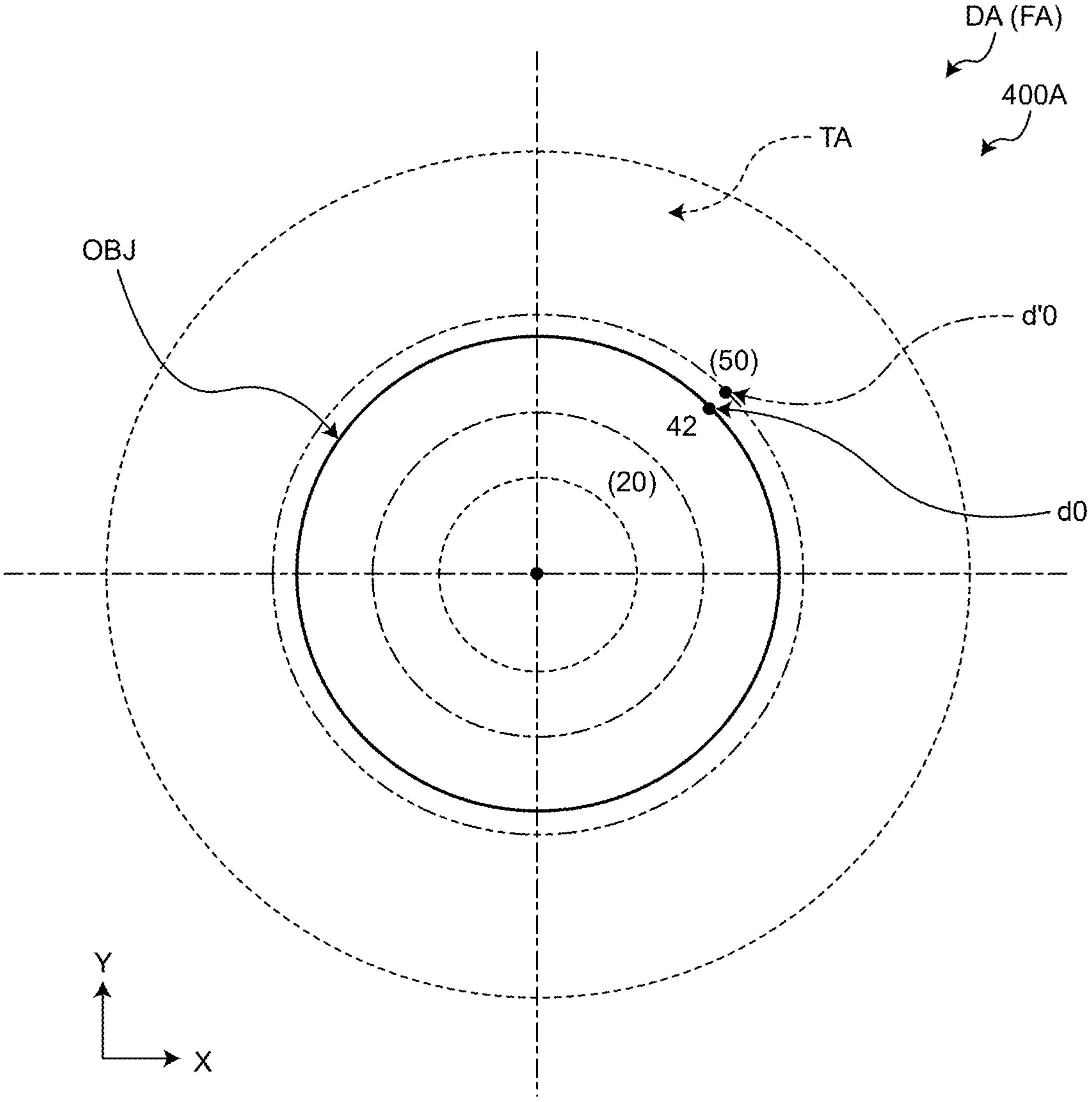
FIG. 41I is a diagram illustrating a specific operation example on the illumination control application screen on the control device according to the second embodiment.

FIG. 41I illustrates an example in which, thereafter, the user further performs a swipe operation in the adjustment region TA while the long tap state is maintained. More specifically, FIG. 41I illustrates an example in which the touch position detection value d'0 in the adjustment region TA is updated through the swipe operation, the magnitude |ΔS| of the diffusion degree difference value ΔS becomes smaller than the magnitude |LSC| (=20%) of the diffusion degree coarse adjustment scale setting value LSC (|ΔS|<|LSC|; Yes at step S418 in FIG. 37), and the touch position detection value d'0 corresponding to the target diffusion degree S'=42% is detected in the adjustment region TA (the swipe operation by the user has stopped at the touch position detection value d'0).

In this case, the diffusion degree difference value ΔS is −8% (ΔS=S' (=42%)−S (=50%)=−8%), and the magnitude |ΔS| (=8%) of the diffusion degree difference value ΔS is smaller than the magnitude |LSC| (=20%) of the diffusion degree coarse adjustment scale setting value LSC (|ΔS|<|LSC|; Yes at step S418 in FIG. 37). Accordingly, the diffusion degree fine adjustment processing illustrated in FIG. 40 is executed.

In this case, the sign of the diffusion degree difference value ΔS (=−8%) is "− (negative value)" (No at step S461 in FIG. 40). Accordingly, the diffusion degree of the illumination device 1*a* is finely adjusted in a direction in which the diffusion degree decreases.

FIG. 41I illustrates an example in which the user releases a finger from the screen at the point in time when the virtual position display value d0 of the light distribution shape object OBJ becomes a position corresponding to the diffusion degree display value S=42% (No at step S417 in FIG. 37). Accordingly, the current diffusion degree display value S=42% is finalized with the current diffusion degree display value S being reflected in the control state of the diffusion degree of the illumination device 1*a*.

Through the above-described processing, the diffusion degree display value S of the light distribution shape object OBJ on the illumination control application screen 400A and the diffusion degree of the illumination device 1*a*, the initial diffusion degree of which is 50%, are adjusted from 50% to 42% in units of 1%. In other words, in this fine adjustment phase, the control device 200*a* adjusts the diffusion degree of the light distribution shape object OBJ on the illumination control application screen 400A and the diffusion degree of the illumination device 1*a* from the initial diffusion degree to the target diffusion degree S' in units of the diffusion degree fine adjustment scale setting value SSC, wherein the target diffusion degree S' is indicated by the user touching the adjustment region TA on the illumination control application screen 400A. Accordingly, the user can visually recognize that the light distribution shape object OBJ on the illumination control application screen 400A is being changed in significantly smaller units as compared to the above-described coarse adjustment phase, and can visually recognize and physically perceive that the diffusion degree of the illumination device 1*a* is being changed in the smaller units.

In the control device 200*a* for the illumination device 1*a* according to the second embodiment described above, after transition to the long tap state in the adjustment region TA, the target diffusion degree S' corresponding to the touch position detection value d'0 in the adjustment region TA is acquired, and processing of calculating the diffusion degree difference value ΔS, which is the difference between the acquired target diffusion degree S' and the diffusion degree display value S corresponding to the current diffusion degree of the illumination device 1*a*, is executed. Then, if the diffusion degree difference value ΔS calculated in the diffusion degree difference value calculation processing exceeds the diffusion degree coarse adjustment scale setting value LSC (first adjustment interval), the diffusion degree display value S is adjusted in steps of the diffusion degree coarse adjustment scale setting value LSC (first adjustment interval). Accordingly, the diffusion degree display value S corresponding to the virtual position display value d0 of the light distribution shape object OBJ is coarsely adjusted in a direction toward the target diffusion degree S' corresponding to the touch position detection value d'0.

The diffusion degree display value S is matched to the target diffusion degree S' in both cases: when the diffusion degree difference value ΔS calculated in the diffusion degree difference value calculation processing after transition to the long tap state in the adjustment region TA is equal to or larger than the diffusion degree fine adjustment scale setting value SSC (second adjustment interval) and equal to or smaller than the diffusion degree coarse adjustment scale setting value LSC (first adjustment interval); and when the diffusion degree difference value ΔS calculated in the diffusion degree difference value calculation processing after the diffusion degree display value S is adjusted in steps of the diffusion degree coarse adjustment scale setting value LSC (first adjustment interval) becomes equal to or larger than the diffusion degree fine adjustment scale setting value SSC (second adjustment interval) and equal to or smaller than the diffusion degree coarse adjustment scale setting value LSC (first adjustment interval). Accordingly, the diffusion degree display value S corresponding to the position display value d0 of the light distribution shape object OBJ matches the target diffusion degree S' corresponding to the touch position detection value d'0.

When the diffusion degree difference value ΔS calculated in the diffusion degree difference value calculation processing after the diffusion degree display value S is matched to the target diffusion degree S' becomes equal to or larger than the diffusion degree fine adjustment scale setting value SSC (second adjustment interval) and smaller than the diffusion degree coarse adjustment scale setting value LSC (first adjustment interval), the diffusion degree display value S is adjusted in steps of the diffusion degree fine adjustment scale setting value SSC (second adjustment interval), which is smaller than the diffusion degree coarse adjustment scale setting value LSC (first adjustment interval). Accordingly, the diffusion degree display value S corresponding to the virtual position display value d0 of the light distribution shape object OBJ is finely adjusted in a direction toward the target diffusion degree S' corresponding to the touch position detection value d'0.

When the diffusion degree difference value ΔS calculated in the diffusion degree difference value calculation processing after the diffusion degree display value S is matched to the target diffusion degree S' or after the diffusion degree display value S is adjusted in steps of the diffusion degree fine adjustment scale setting value SSC (second adjustment interval) becomes equal to the diffusion degree coarse adjustment scale setting value LSC (first adjustment interval), the diffusion degree display value S is matched to the target diffusion degree S'. Accordingly, the diffusion degree display value S corresponding to the virtual position display value d0 of the light distribution shape object OBJ matches again the target diffusion degree S' corresponding to the touch position detection value d'0.

When the diffusion degree difference value ΔS calculated in the diffusion degree difference value calculation processing after the diffusion degree display value S is matched to the target diffusion degree S' or after the diffusion degree display value S is adjusted in steps of the diffusion degree fine adjustment scale setting value SSC (second adjustment interval) exceeds the diffusion degree coarse adjustment scale setting value LSC (first adjustment interval), the diffusion degree display value S is adjusted in steps of the diffusion degree coarse adjustment scale setting value LSC (first adjustment interval). Accordingly, the diffusion degree display value S corresponding to the virtual position display value d0 of the light distribution shape object OBJ is again coarsely adjusted in a direction toward the target diffusion degree S' corresponding to the touch position detection value d'0. Thereafter, when the diffusion degree difference value ΔS calculated in the diffusion degree difference value calculation processing becomes equal to or larger than the diffusion degree fine adjustment scale setting value SSC (second adjustment interval) and equal to or smaller than the diffusion degree coarse adjustment scale setting value LSC (first adjustment interval), the diffusion degree display value S is matched to the target diffusion degree S'. Accordingly, the diffusion degree display value S corresponding to the virtual position display value d0 of the light distribution shape object OBJ matches again the target diffusion degree S' corresponding to the touch position detection value d'0.

Detection of the touch position detection value d'0 for defining the target diffusion degree S' is started when the continuation time T1 of a touch in the adjustment region TA has exceeded the predetermined long tap detection time (first time threshold) T1*th*, and the diffusion degree difference value calculation processing is executed at intervals of the predetermined setting value change time (second time threshold) T2*th* while the touch in the adjustment region TA is continuous.

Accordingly, for example, the current diffusion degree display value S is finalized with the current diffusion degree display value S being reflected in the control state of the horizontal diffusion degree of the illumination device 1*a* when the user releases a finger from the screen at a timing at which a desired diffusion degree display value S is obtained. Thus, a desired diffusion degree display value S can be easily obtained, which facilitates fine adjustment of the diffusion degree display value S. More specifically, in the control device 200*a* for the illumination device 1*a* of the present embodiment, the above-described coarse adjustment and fine adjustment are selected as appropriate based on the magnitude of the swipe amount of a user finger touching the screen (magnitude of the movement amount of the finger touching the screen), thereby improving operability. As a result, the user can obtain a desired diffusion degree through more intuitive operations.

The preferable embodiments of the present disclosure are described above, but the present disclosure is not limited to the embodiments. Contents disclosed in the embodiments are merely exemplary and may be modified in various kinds of manners without departing from the scope of the present disclosure. For example, in a case where an illumination device of the present disclosure is capable of adjusting not only the light distribution shape but also brightness and light color, the configuration of the present disclosure may be used to coarsely and finely adjust the brightness and light color. Appropriate modifications made without departing from the scope of the present disclosure naturally belong to the technical scope of the present disclosure.

What is claimed is:

1. A control device for an illumination device, the control device being configured to control a plurality of illumination devices each capable of setting a light distribution shape of light emitted onto a virtual plane in two directions of a first direction and a second direction intersecting the first direction, by adjusting a diffusion degree of light emitted from a light source, the control device comprising:

- a touch sensor having a detection region provided with a plurality of detection elements; and
- a display panel provided with a display region that overlaps the detection region of the touch sensor in plan view and configured to display, in the display region, an adjustment screen provided with an adjustment region for adjusting the diffusion degree of each illumination device, wherein the control device is configured to:

- acquire a target diffusion degree corresponding to a touch detection position in the adjustment region; and
- execute coarse adjustment processing of adjusting the diffusion degree of the illumination device to be close to the target diffusion degree in steps of a first adjustment interval, matching processing of matching the diffusion degree of the illumination device to the target diffusion degree, and fine adjustment processing of adjusting the diffusion degree of the illumination device to be close to the target diffusion degree in steps of a second adjustment interval smaller than the first adjustment interval, and the control device is configured to:

execute processing of calculating a diffusion degree difference value that is a difference between the target diffusion degree and a diffusion degree display value corresponding to a position on the display panel corresponding to the current diffusion degree of the illumination device; and execute any of the coarse adjustment processing, the matching processing, and the fine adjustment processing depending on the diffusion degree difference value.

2. The control device for an illumination device according to claim 1, wherein a long tap state in which a touch on the adjustment region is continuous for a predetermined time or longer is defined, and after transition to the long tap state, the coarse adjustment processing is executed when the diffusion degree difference value calculated in the calculation processing exceeds the first adjustment interval.

3. The control device for an illumination device according to claim 2, wherein after transition to the long tap state, the matching processing is executed when the diffusion degree difference value calculated in the calculation processing is equal to or larger than the second adjustment interval and equal to or smaller than the first adjustment interval.

4. The control device for an illumination device according to claim 2, wherein after the coarse adjustment processing is executed, the matching processing is executed when the diffusion degree difference value calculated in the calculation processing becomes equal to or larger than the second adjustment interval and equal to or smaller than the first adjustment interval.

5. The control device for an illumination device according to claim 2, wherein after the matching processing is executed, the fine adjustment processing is executed when the diffusion degree difference value calculated in the calculation processing becomes equal to or larger than the second adjustment interval and smaller than the first adjustment interval.

6. The control device for an illumination device according to claim 2, wherein after the matching processing is executed, the matching processing is executed again when the diffusion degree difference value calculated in the calculation processing becomes equal to the first adjustment interval.

7. The control device for an illumination device according to claim 2, wherein after the fine adjustment processing is executed, the matching processing is executed when the diffusion degree difference value calculated in the calculation processing becomes equal to the first adjustment interval.

8. The control device for an illumination device according to claim 2, wherein after the matching processing is executed, the coarse adjustment processing is executed when the diffusion degree difference value calculated in the calculation processing exceeds the first adjustment interval, and after the coarse adjustment processing is executed, the matching processing is executed again when the diffusion degree difference value calculated in the calculation processing becomes equal to or larger than the second adjustment interval and equal to or smaller than the first adjustment interval.

9. The control device for an illumination device according to claim 2, wherein after the fine adjustment processing is executed, the coarse adjustment processing is executed when the diffusion degree difference value calculated in the calculation processing exceeds the first adjustment interval, and after the coarse adjustment processing is executed, the matching processing is executed when the diffusion degree difference value calculated in the calculation processing becomes equal to or larger than the second adjustment interval and equal to or smaller than the first adjustment interval.

10. The control device for an illumination device according to claim 2, wherein when a continuation time of a touch in the adjustment region exceeds a predetermined first time threshold, it is determined that the long tap state is detected.

11. The control device for an illumination device according to claim 10, wherein in the long tap state, the target diffusion degree is acquired at intervals of a predetermined second time threshold different from the first time threshold, and the processing of calculating the diffusion degree difference value is executed.

12. The control device for an illumination device according to claim 11, wherein the adjustment screen is defined with an X direction corresponding to the first direction, a Y direction corresponding to the second direction, and an XY plane having an origin at a predetermined position on the adjustment screen and is provided with a light distribution shape object having a center point at the origin of the XY plane.

13. The control device for an illumination device according to claim 12, wherein the adjustment region is provided in a region of a figure including, on an outline of the light distribution shape object, a position corresponding to a maximum diffusion degree of the illumination device.

14. The control device for an illumination device according to claim 13, wherein a position corresponding to the diffusion degree of the illumination device is positioned on the outline of the light distribution shape object, and either the shape or size of the light distribution shape object on the adjustment screen changes with a change in the diffusion degree of the illumination device.

15. The control device for an illumination device according to claim 12, wherein the adjustment region includes a first adjustment region that includes a region overlapping an X axis of the XY plane and with which the light distribution shape is adjustable in the X direction, and a second adjustment region that includes a region overlapping a Y axis of the XY plane and with which the light distribution shape is adjustable in the Y direction.

16. The control device for an illumination device according to claim 15, wherein the light distribution shape object has a position on the X axis and a position on the Y axis on the outline of the light distribution shape object, the position on the X axis corresponding to the diffusion degree of the illumination device in the first direction, the position on the Y axis corresponding to the diffusion degree of the illumination device in the second direction, and the shape of the light distribution shape object on the adjustment screen changes into a circular or elliptical shape with a change in the diffusion degree of the illumination device in the first direction and a change in the diffusion degree of the illumination device in the second direction.

* * * * *